(12) United States Patent
Holt

(10) Patent No.: US 8,316,190 B2
(45) Date of Patent: Nov. 20, 2012

(54) COMPUTER ARCHITECTURE AND METHOD OF OPERATION FOR MULTI-COMPUTER DISTRIBUTED PROCESSING HAVING REDUNDANT ARRAY OF INDEPENDENT SYSTEMS WITH REPLICATED MEMORY AND CODE STRIPING

(75) Inventor: John M. Holt, Hornchurch (GB)

(73) Assignee: Waratek Pty. Ltd., Lyndfield, NSW (AU)

( * ) Notice: Subject to any disclaimer, the term of this patent is extended or adjusted under 35 U.S.C. 154(b) by 907 days.

(21) Appl. No.: 12/051,701

(22) Filed: Mar. 19, 2008

(65) Prior Publication Data

US 2008/0250213 A1    Oct. 9, 2008

Related U.S. Application Data

(60) Continuation-in-part of application No. 11/111,779, filed on Apr. 22, 2005, which is a continuation-in-part (Continued)

(51) Int. Cl.
*G06F 12/00* (2006.01)
(52) U.S. Cl. . 711/148; 711/114; 711/157; 711/E12.079; 712/10; 712/21; 712/22
(58) Field of Classification Search ........................ None
See application file for complete search history.

(56) References Cited

U.S. PATENT DOCUMENTS 4,969,092 A    11/1990    Shorter
(Continued)

FOREIGN PATENT DOCUMENTS

EP    0969377    1/2000
(Continued)

OTHER PUBLICATIONS

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

(Continued)

*Primary Examiner* — Charles Rones
*Assistant Examiner* — Baboucarr Faal
(74) *Attorney, Agent, or Firm* — Pillsbury Winthrop Shaw Pittman, LLP

(57) ABSTRACT

Computers and other computing machines and information appliances having a modified computer architecture and program structure which enables the operation of an application program concurrently or simultaneously on a plurality of computers interconnected via a communications link or network using a special distributed runtime (DRT), and that provides for a redundant array of independent computing systems that include computer code distribution using code-striping onto the plurality of the computers or computing machines. A redundant array of independent computing systems operating in concert and code-striping features.

7 Claims, 138 Drawing Sheets

Related U.S. Application Data

(60) of application No. 10/830,042, filed on Apr. 23, 2004, application No. 12/051,701, which is a continuation-in-part of application No. 11/111,778, filed on Apr. 22, 2005, which is a continuation-in-part of application No. 10/830,042, application No. 12/051,701, which is a continuation-in-part of application No. 11/111,946, filed on Apr. 22, 2005, which is a continuation-in-part of application No. 10/830,042, application No. 12/051,701, which is a continuation-in-part of application No. 11/111,757, filed on Apr. 22, 2005, which is a continuation-in-part of application No. 10/830,042, application No. 12/051,701, which is a continuation-in-part of application No. 11/111,781, filed on Apr. 22, 2005, which is a continuation-in-part of application No. 10/830,042, application No. 12/051,701, which is a continuation-in-part of application No. 11/259,634, filed on Oct. 25, 2005, and a continuation-in-part of application No. 11/259,744, filed on Oct. 25, 2005, and a continuation-in-part of application No. 11/259,761, filed on Oct. 25, 2005, and a continuation-in-part of application No. 11/259,762, filed on Oct. 25, 2005, and a continuation-in-part of application No. 11/259,885, filed on Oct. 25, 2005, and a continuation-in-part of application No. 11/973,391, filed on Oct. 5, 2007, and a continuation-in-part of application No. 11/973,370, filed on Oct. 5, 2007, and a continuation-in-part of application No. 11/973,317, filed on Oct. 5, 2007, and a continuation-in-part of application No. 11/973,318, filed on Oct. 5, 2007, and a continuation-in-part of application No. 11/973,353, filed on Oct. 5, 2007, and a continuation-in-part of application No. 11/973,396, filed on Oct. 5, 2007, and a continuation-in-part of application No. 11/973,387, filed on Oct. 5, 2007, and a continuation-in-part of application No. 11/973,339, filed on Oct. 5, 2007, and a continuation-in-part of application No. 11/973,379, filed on Oct. 5, 2007, and a continuation-in-part of application No. 11/973,375, filed on Oct. 5, 2007, and a continuation-in-part of application No. 11/973,378, filed on Oct. 5, 2007, and a continuation-in-part of application No. 11/973,394, filed on Oct. 5, 2007, and a continuation-in-part of application No. 11/973,393, filed on Oct. 5, 2007, and a continuation-in-part of application No. 11/973,384, filed on Oct. 5, 2007, and a continuation-in-part of application No. 11/973,374, filed on Oct. 5, 2007, and a continuation-in-part of application No. 11/973,373, filed on Oct. 5, 2007, and a continuation-in-part of application No. 11/973,322, filed on Oct. 5, 2007, and a continuation-in-part of application No. 11/973,389, filed on Oct. 5, 2007, and a continuation-in-part of application No. 11/973,368, filed on Oct. 5, 2007, and a continuation-in-part of application No. 11/973,380, filed on Oct. 5, 2007, and a continuation-in-part of application No. 11/973,401, filed on Oct. 5, 2007, and a continuation-in-part of application No. 11/973,400, filed on Oct. 5, 2007, and a continuation-in-part of application No. 11/973,395, filed on Oct. 5, 2007, and a continuation-in-part of application No. 11/973,388, filed on Oct. 5, 2007, and a continuation-in-part of application No. 11/973,349, filed on Oct. 5, 2007, and a continuation-in-part of application No. 11/973,399, filed on Oct. 5, 2007, and a continuation-in-part of application No. 11/973,329, filed on Oct. 5, 2007, and a continuation-in-part of application No. 11/973,390, filed on Oct. 5, 2007, and a continuation-in-part of application No. 11/973,345, filed on Oct. 5, 2007, and a continuation-in-part of application No. 11/973,346, filed on Oct. 5, 2007, and a continuation-in-part of application No. 11/973,347, filed on Oct. 5, 2007, and a continuation-in-part of application No. 11/973,340, filed on Oct. 5, 2007, and a continuation-in-part of application No. 11/973,350, filed on Oct. 5, 2007, and a continuation-in-part of application No. 11/973,351, filed on Oct. 5, 2007, and a continuation-in-part of application No. 11/973,369, filed on Oct. 5, 2007, and a continuation-in-part of application No. 11/973,355, filed on Oct. 5, 2007, and a continuation-in-part of application No. 11/973,356, filed on Oct. 5, 2007, and a continuation-in-part of application No. 11/973,385, filed on Oct. 5, 2007, and a continuation-in-part of application No. 11/973,376, filed on Oct. 5, 2007, and a continuation-in-part of application No. 11/973,381, filed on Oct. 5, 2007, and a continuation-in-part of application No. 11/973,382, filed on Oct. 5, 2007, and a continuation-in-part of application No. 11/973,372, filed on Oct. 5, 2007, and a continuation-in-part of application No. 11/973,397, filed on Oct. 5, 2007, and a continuation-in-part of application No. 11/973,341, filed on Oct. 5, 2007, and a continuation-in-part of application No. 11/973,392, filed on Oct. 5, 2007, and a continuation-in-part of application No. 11/973,383, filed on Oct. 5, 2007, and a continuation-in-part of application No. 11/973,371, filed on Oct. 5, 2007, and a continuation-in-part of application No. 11/973,325, filed on Oct. 5, 2007, and a continuation-in-part of application No. 11/973,342, filed on Oct. 5, 2007, and a continuation-in-part of application No. 11/973,348, filed on Oct. 5, 2007, and a continuation-in-part of application No. 11/973,331, filed on Oct. 5, 2007, and a continuation-in-part of application No. 11/973,338, filed on Oct. 5, 2007, and a continuation-in-part of application No. 11/973,324, filed on Oct. 5, 2007, and a continuation-in-part of application No. 11/973,354, filed on Oct. 5, 2007, and a continuation-in-part of application No. 11/973,330, filed on Oct. 5, 2007, and a continuation-in-part of application No. 11/973,326, filed on Oct. 5, 2007, and a continuation-in-part of application No. 11/973,328, filed on Oct. 5, 2007, and a continuation-in-part of application No. 11/973,320, filed on Oct. 5, 2007, and a continuation-in-part of application No. 11/973,377, filed on Oct. 5, 2007, and a continuation-in-part of application No. 11/973,398, filed on Oct. 5, 2007, and a continuation-in-part of application No. 11/973,386, filed on Oct. 5, 2007, and a continuation-in-part of application No. 11/912,141, filed as application No. PCT/AU2006/000532 on Apr. 20, 2006, which is a division of application No. 12/051,701, which is a continuation-in-part of application No. 12/011,216, filed on Jan. 23, 2008, which is a division of application No. 11/583,359, filed on Oct. 18, 2006, application No. 12/051,701, which is a continuation-in-part of application No. 12/011,218, filed on Jan. 23, 2008, which is a division of application No. 11/583,961, filed on Oct. 18, 2006, application No. 12/051,701, which is a continuation-in-part of application No. 12/011,215, filed on Jan. 23, 2008, which is a division of application No. 11/583,962, filed on Oct. 18, 2006, application No. 12/051,701, which is a continuation-in-part of application No. 12/011,199, filed on Jan. 23, 2008, which is a division of application No. 11/583,991, filed on Oct. 18, 2006, application No. 12/051,701, which is a continuation-in-part of application No. 12/011,198, filed on Jan. 23, 2008, which is a division of application No. 11/583,948, filed on Oct. 18, 2006, application No. 12/051,701, which is a continuation-in-part of application No. 12/011,207, filed on Jan. 23, 2008, which is a division of application No. 11/583,958, filed on Oct. 18, 2006, application No. 12/051,701, which is a continuation-in-part of application No. 12/011,217, filed on Jan. 23, 2008, which is a division of application No. 11/583,351, filed on Oct. 18, 2006.

(60) Provisional application No. 61/008,616, filed on Dec. 29, 2006, provisional application No. 61/008,615, filed on Apr. 6, 2007, provisional application No. 61/008,612, filed on Oct. 9, 2006, provisional application No. 61/008,611, filed on Oct. 9, 2006, provisional application No. 61/008,610, filed on Oct. 9, 2006, provisional application No. 61/008,545, filed on Oct. 9, 2006, provisional application No. 61/008,544, filed on Oct. 9, 2006, provisional application No. 61/008,543, filed on Oct. 9, 2006, provisional application No. 61/008,542, filed on Oct. 9, 2006, provisional application No. 61/008,541, filed on Oct. 9, 2006, provisional application No. 61/008,540, filed on Oct. 9, 2006, provisional application No. 61/008,539, filed on Oct. 9, 2006, provisional application No. 61/008,538, filed on Oct. 9, 2006, provisional application No. 61/008,537, filed on Oct. 9, 2006, provisional application No. 61/008,536, filed on Oct. 9, 2006, provisional application No. 61/008,535, filed on Oct. 9, 2006, provisional application No. 61/008,534, filed on Oct. 9, 2006, provisional application No. 61/008,533, filed on Oct. 9, 2006, provisional application No. 61/008,532, filed on Oct. 9, 2006, provisional application No. 61/008,531, filed on Oct. 9, 2006, provisional application No. 61/008,530, filed on Oct. 9, 2006, provisional application No. 61/008,529, filed on Oct. 9, 2006, provisional application No. 61/008,528, filed on Oct. 9, 2006, provisional application No. 61/008,527, filed on Oct. 9, 2006, provisional application No. 61/008,526, filed on Oct. 9, 2006, provisional application No. 61/008,525, filed on Oct. 9, 2006, provisional application No. 61/008,524, filed on Oct. 9, 2006, provisional application No. 61/008,523, filed on Oct. 9, 2006, provisional application No. 61/008,522, filed on Oct. 9, 2006, provisional application No. 61/008,518, filed on Oct. 9, 2006, provisional application No. 61/008,517, filed on Oct. 9, 2006, provisional application No. 61/008,516, filed on Oct. 9, 2006, provisional application No. 61/008,515, filed on Oct. 9, 2006, provisional application No. 61/008,514, filed on Oct. 9, 2006, provisional application No. 61/008,513, filed on Oct. 9, 2006, provisional application No. 61/008,512, filed on Oct. 9, 2006, provisional application No. 61/008,500, filed on Oct. 9, 2006, provisional application No. 61/008,499, filed on Oct. 9, 2006, provisional application No. 61/008,498, filed on Oct. 9, 2006, provisional application No. 61/008,497, filed on Oct. 9, 2006, provisional application No. 61/008,496, filed on Oct. 9, 2006, provisional application No. 61/008,470, filed on Oct. 9, 2006, provisional application No. 61/008,469, filed on Oct. 9, 2006, provisional application No. 61/008,466, filed on Oct. 9, 2006, provisional application No. 61/008,465, filed on Oct. 9, 2006, provisional application No. 61/008,464, filed on Oct. 9, 2006, provisional application No. 61/008,463, filed on Oct. 9, 2006, provisional application No. 61/008,462, filed on Oct. 9, 2006, provisional application No. 61/008,461, filed on Oct. 9, 2006, provisional application No. 61/008,460, filed on Oct. 9, 2006, provisional application No. 61/008,455, filed on Oct. 9, 2006, provisional application No. 61/008,454, filed on Oct. 9, 2006, provisional application No. 61/008,453, filed on Oct. 9, 2006, provisional application No. 61/008,452, filed on Oct. 9, 2006, provisional application No. 61/008,451, filed on Oct. 9, 2006, provisional application No. 61/008,450, filed on Oct. 9, 2006, provisional application No. 61/008,449, filed on Oct. 5, 2007, provisional application No. 61/008,448, filed on Oct. 9, 2006, provisional application No. 61/008,447, filed on Oct. 9, 2006, provisional application No. 61/008,446, filed on Oct. 9, 2006, provisional application No. 61/008,445, filed on Oct. 9, 2006, provisional application No. 61/008,444, filed on Oct. 9, 2006, provisional application No. 61/008,443, filed on Oct. 9, 2006, provisional application No. 61/008,442, filed on Oct. 9, 2006, provisional application No. 61/008,441, filed on Oct. 9, 2006, provisional application No. 61/008,440, filed on Oct. 9, 2006, provisional application No. 61/008,439, filed on Oct. 9, 2006, provisional application No. 61/008,438, filed on Oct. 9, 2006, provisional application No. 61/008,436, filed on Oct. 9, 2006, provisional application No. 60/998,090, filed on Oct. 9, 2006, provisional application No. 60/998,085, filed on Oct. 9, 2006, provisional application No. 60/922,251, filed on Oct. 9, 2006, provisional application No. 60/878,175, filed on Oct. 9, 2006, provisional application No. 60/850,717, filed on Oct. 9, 2006, provisional application No. 60/850,715, filed on Oct. 9, 2006, provisional application No. 60/850,713, filed on Oct. 9, 2006, provisional application No. 60/850,711, filed on Oct. 9, 2006, provisional application No. 60/850,541, filed on Dec. 19, 2007, provisional application No. 60/850,540, filed on Dec. 19, 2007, provisional application No. 60/850,537, filed on Dec. 19, 2007, provisional application No. 60/850,533, filed on Dec. 19, 2007, provisional application No. 60/850,532, filed on Dec. 19, 2007, provisional application No. 60/850,531, filed on Dec. 19, 2007, provisional application No. 60/850,528, filed on Dec. 19, 2007, provisional application No. 60/850,521, filed on Dec. 19, 2007, provisional application No. 60/850,519, filed on Dec. 19, 2007, provisional application No. 60/850,510, filed on Dec. 19, 2007, provisional application No. 60/850,508, filed on Dec. 19, 2007, provisional application No. 60/850,507, filed on Dec. 19, 2007, provisional application No. 60/850,505, filed on Dec. 19, 2007, provisional application No. 60/850,504, filed on Dec. 19, 2007, provisional application No. 60/850,503, filed on Dec. 19, 2007, provisional application No. 60/850,501, filed on Dec. 19, 2007, provisional application No. 60/850,500, filed on Dec. 19, 2007, provisional application No. 60/850,450, filed on Dec. 19, 2007, provisional application No. 60/850,449, filed on Dec. 19, 2007, provisional application No. 60/730,544, filed on Oct. 25, 2005, provisional application No. 60/730,543, filed on Oct. 25, 2005, provisional application No. 60/730,512, filed on Oct. 25, 2005, provisional application No. 60/730,493, filed on Oct. 25, 2005, provisional application No. 60/730,408, filed on Oct. 25, 2005, provisional application No. 60/730,354, filed on Oct. 25, 2005, provisional application No. 60/730,303, filed on Oct. 25, 2005.

(56) References Cited

U.S. PATENT DOCUMENTS

| | | |
|---|---|---|
| 5,214,776 A | 5/1993 | Bagnoli et al. |
| 5,291,597 A | 3/1994 | Shorter |
| 5,418,966 A | 5/1995 | Madduri |
| 5,434,994 A | 7/1995 | Shaheen et al. |
| 5,488,723 A | 1/1996 | Baradel et al. |
| 5,544,345 A | 8/1996 | Carpenter et al. |
| 5,568,609 A | 10/1996 | Sugiyama et al. |
| 5,612,865 A | 3/1997 | Dasgupta |
| 5,802,585 A | 9/1998 | Scales et al. |
| 5,918,248 A | 6/1999 | Newell et al. |
| 6,049,809 A | 4/2000 | Raman et al. |
| 6,148,377 A * | 11/2000 | Carter et al. ............. 711/147 |
| 6,163,801 A | 12/2000 | O'Donnell et al. |
| 6,192,514 B1 | 2/2001 | Lurndal |
| 6,314,558 B1 | 11/2001 | Angel et al. |
| 6,324,587 B1 | 11/2001 | Trenbeath et al. |
| 6,327,630 B1 | 12/2001 | Carroll et al. |
| 6,370,625 B1 * | 4/2002 | Carmean et al. ............. 711/152 |
| 6,389,423 B1 | 5/2002 | Sakakura |
| 6,425,016 B1 | 7/2002 | Banavar et al. |
| 6,571,278 B1 | 5/2003 | Negishi et al. |
| 6,574,628 B1 | 6/2003 | Kahn et al. |
| 6,574,674 B1 | 6/2003 | Mairs et al. |
| 6,611,955 B1 | 8/2003 | Logean et al. |
| 6,625,751 B1 | 9/2003 | Starovic et al. |
| 6,668,260 B2 | 12/2003 | Zoltan |
| 6,757,896 B1 | 6/2004 | Cohen et al. |
| 6,760,903 B1 | 7/2004 | Morshed et al. |
| 6,775,831 B1 | 8/2004 | Carrasco et al. |
| 6,779,093 B1 | 8/2004 | Gupta |
| 6,782,492 B1 | 8/2004 | Nakaso |
| 6,823,511 B1 | 11/2004 | McKenney et al. |
| 6,862,608 B2 | 3/2005 | Buhlman et al. |
| 6,954,794 B2 | 10/2005 | Rudd et al. |
| 6,968,372 B1 | 11/2005 | Thompson et al. |
| 7,010,576 B2 | 3/2006 | Bae |
| 7,020,736 B1 | 3/2006 | Cherukuri |
| 7,031,989 B2 | 4/2006 | Elmendorf et al. |
| 7,047,341 B2 | 5/2006 | Jung |
| 7,047,521 B2 | 5/2006 | Bunnell |
| 7,058,826 B2 | 6/2006 | Fung |
| 7,082,604 B2 | 7/2006 | Schneiderman |
| 7,206,827 B2 | 4/2007 | Viswanath et al. |
| 2002/0199172 A1 | 12/2002 | Bunnell |
| 2003/0004924 A1 | 1/2003 | Williams |
| 2003/0005407 A1 | 1/2003 | Hines |
| 2003/0067912 A1 | 4/2003 | Mead et al. |
| 2003/0105816 A1 | 6/2003 | Goswami |
| 2004/0073828 A1 | 4/2004 | Bronstein |
| 2004/0093588 A1 | 5/2004 | Gschwind et al. |
| 2004/0158819 A1 | 8/2004 | Cuomo et al. |
| 2004/0163077 A1 | 8/2004 | Dimpsey et al. |
| 2004/0250047 A1 * | 12/2004 | Kirsch ............. 712/11 |
| 2005/0039171 A1 | 2/2005 | Avakian et al. |
| 2005/0086384 A1 | 4/2005 | Ernst |
| 2005/0108481 A1 | 5/2005 | Iyengar et al. |
| 2005/0240737 A1 | 10/2005 | Holt |
| 2005/0257219 A1 * | 11/2005 | Holt ............. 718/1 |
| 2005/0262313 A1 | 11/2005 | Holt |
| 2005/0262513 A1 | 11/2005 | Holt |
| 2006/0020913 A1 | 1/2006 | Holt |
| 2006/0080389 A1 | 4/2006 | Powers et al. |
| 2006/0095483 A1 | 5/2006 | Holt |
| 2006/0143350 A1 | 6/2006 | Miloushev et al. |
| 2006/0167878 A1 | 7/2006 | Hartman |
| 2006/0242464 A1 | 10/2006 | Holt |
| 2006/0253844 A1 | 11/2006 | Holt |
| 2006/0265703 A1 | 11/2006 | Holt |
| 2006/0265704 A1 | 11/2006 | Holt |
| 2006/0265705 A1 | 11/2006 | Holt |
| 2008/0072238 A1 | 3/2008 | Monnie et al. |
| 2008/0189700 A1 | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/044835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", *IEEE CS International Conference on Computer Languages*, pp. 1-23, Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications on Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9, Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online] , XP008098868 ISSN: 0302-9743 ISBN: 978-3-540-55940-5-Retreived from the internet URL:http//www.springerlink.com/content/5v 028411810p6m700/> ,vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. Conf. 13, May 25, 1993, pp. 491-498, WP010095684 ISBN:978-0-8186-3770-4.

Radovic, et al., "Removing the overhead from software-based shared memory." Pro. 2001 ACM/IEEE Conf. Supercomputing (CDrom), Denver CO, Nov. Oct. 16, 2001, Supercomuting '01. ACM Press. NY.

Russ, et al. "The hector distributed run-time environment", 1EEEE Transactions on Parallel and Distributed Systems, vol. 9, No. 11 1998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/ {veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214 , Sep. 13-15, 1995.

Supplementary European Search Report EP 06 79 0317 Dated Mar. 5, 2009.

\* cited by examiner

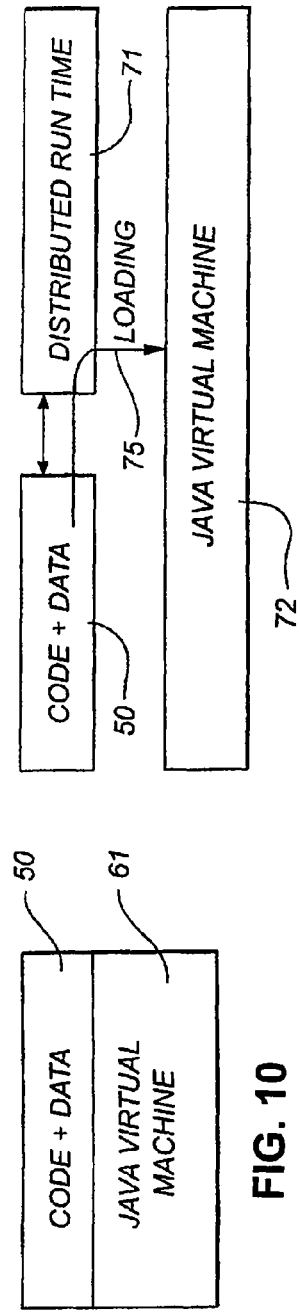
FIG. 10
PRIOR ART
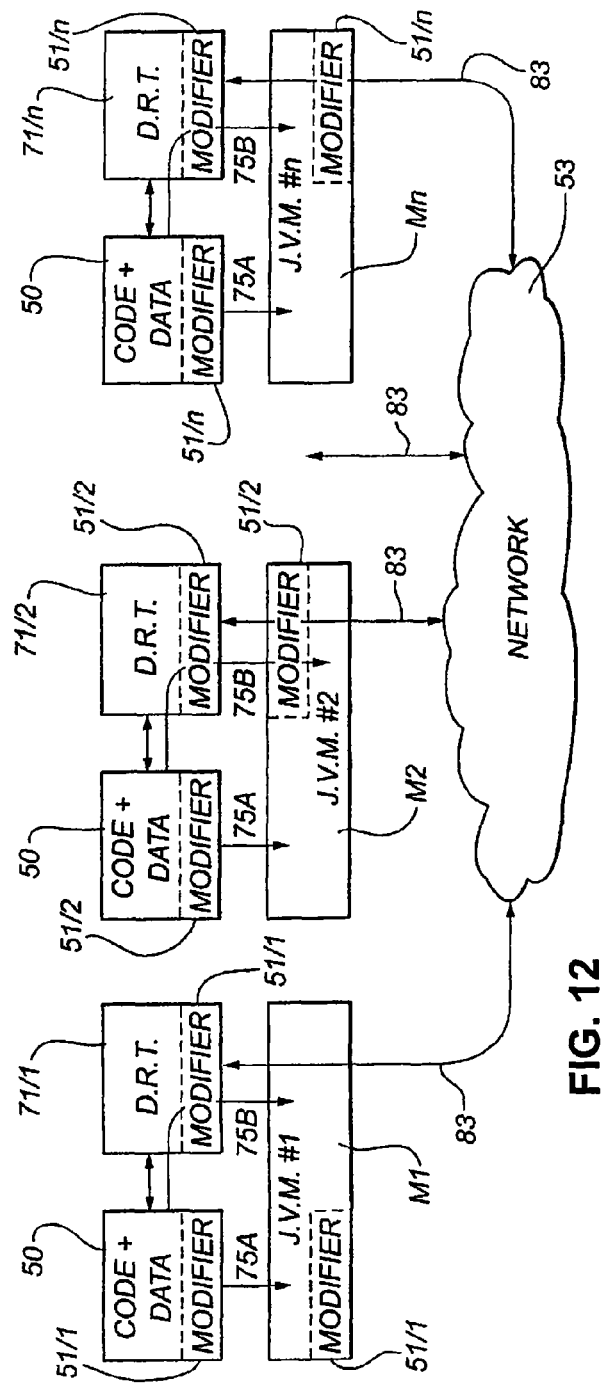
FIG. 11
FIG. 12

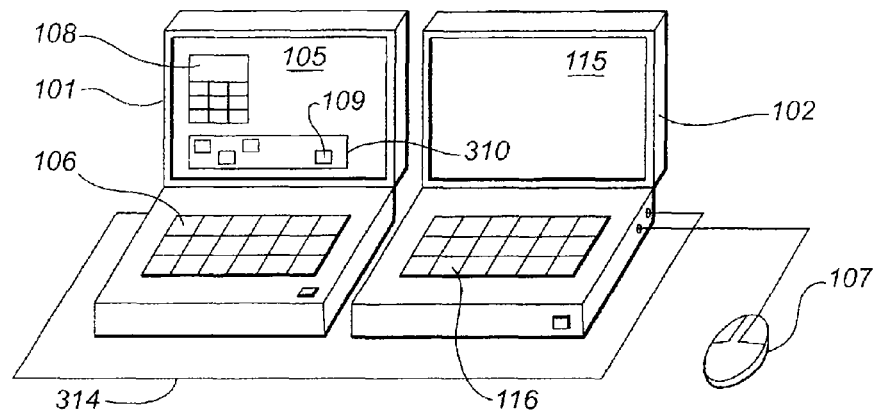
FIG. 20
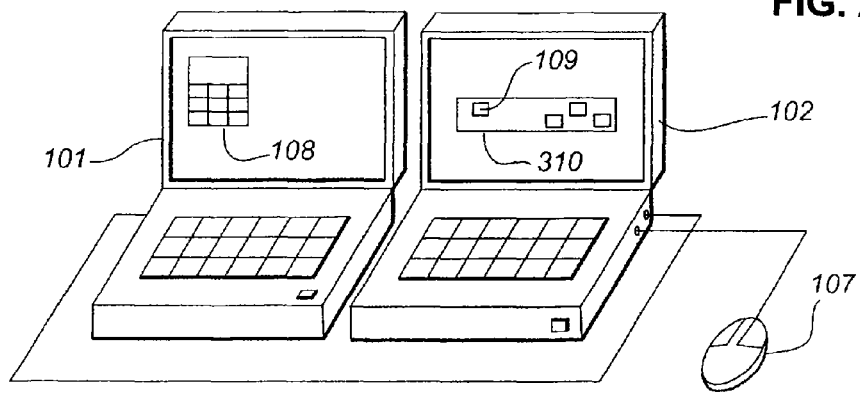
FIG. 21
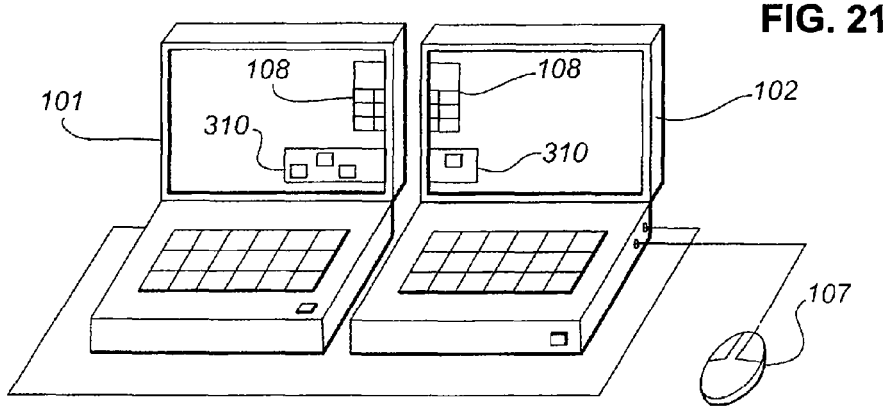

| LOCATION | MACHINE | | | | | |
|---|---|---|---|---|---|---|
| A | 1 | 2 | | | --- | n |
| B | 1 | | | | --- | |
| ⋮ | | | | | --- | |
| D | | 2 | | | --- | |
| E | | | | | --- | n |
| ⋮ | | | | | --- | |
| ⋮ | | | | | --- | |
| X | 1 | 2 | | | --- | n |

| LOCATION | MACHINE | | | | |
|---|---|---|---|---|---|
| A | 1 | 2 | | --- | n |
| B | 1 | | | --- | |
| ⋮ | | | | | |
| D | | 2 | | --- | |
| E | | | | --- | n |
| ⋮ | | | | | |
| K | 1 | 2 | | --- | n |
| ⋮ | | | | | |
| X | 1 | 2 | | --- | n |

| MACHINE | TABLE | | | | | |
|---|---|---|---|---|---|---|
| M1 | X1 | 1 | 2 | | --- | n |
| | B | 1 | | | | |

| | | | | | | |
|---|---|---|---|---|---|---|
| M2 | X2 | 1 | 2 | | --- | n |
| | D | | 2 | | | |

| | | | | | | |
|---|---|---|---|---|---|---|
| Mn | Xn | 1 | 2 | | --- | n |
| | E | | | | | n |
| | A | | | | | n |

FIG. 82

| MACHINE | TABLE | | | | | |
|---|---|---|---|---|---|---|
| M1 | X1 | 1 | 2 | | --- | n |
| | B | 1 | | | | |
| | A1 | 1 | 2 | | --- | n |

| | | | | | | |
|---|---|---|---|---|---|---|
| M2 | X2 | 1 | 2 | | --- | n |
| | D | | | | | |
| | A2 | 1 | 2 | | --- | n |

| | | | | | | |
|---|---|---|---|---|---|---|
| Mn | Xn | 1 | 2 | | --- | n |
| | E | | | | | |
| | An | 1 | 2 | | --- | n |

FIG. 83

| MACHINE | TABLE | | | | | |
|---|---|---|---|---|---|---|
| M1 | X1 | 1 | 2 | | | n |
|  | B | 1 | | | | |

| | | | | | | |
|---|---|---|---|---|---|---|
| M2 | X2 | 1 | 2 | | | n |
|  | D | | 2 | | | |

| | | | | | | |
|---|---|---|---|---|---|---|
| Mn | Xn | 1 | 2 | | | n |
|  | E | | | | | n |
|  | A | | | | | n |
|  | K | | | | | n |

FIG. 84

| MACHINE | TABLE | | | | | |
|---|---|---|---|---|---|---|
| M1 | X1 | 1 | 2 | | | n |
|  | B | 1 | | | | |
|  | A1 | 1 | 2 | | | n |
|  | K1 | 1 | 2 | | | n |

| | | | | | | |
|---|---|---|---|---|---|---|
| M2 | X2 | 1 | 2 | | | n |
|  | D | | 2 | | | |
|  | A2 | 1 | 2 | | | n |
|  | K2 | 1 | 2 | | | n |

| | | | | | | |
|---|---|---|---|---|---|---|
| Mn | Xn | 1 | 2 | | | n |
|  | E | | | | | n |
|  | An | 1 | 2 | | | n |
|  | Kn | 1 | 2 | | | n |

FIG. 85

| LOCATION | MACHINE | | | | | |
|---|---|---|---|---|---|---|
| A | 1 | 2 | | | | |
| B | 1 | | | | | |
| ⋮ | | | | | | |
| D | | 2 | | | | |
| E | | | | | | n |
| ⋮ | | | | | | |
| | | | | | | |
| | | | | | | |
| X | 1 | 2 | | | | n |

| MACHINE | TABLE | | | | | |
|---|---|---|---|---|---|---|
| | X1 | 1 | 2 | | | n |
| M1 | B | 1 | | | | |
| | A1 | 1 | 2 | | | |

| | | | | | | |
|---|---|---|---|---|---|---|
| | X2 | 1 | 2 | | | n |
| M2 | D | | 2 | | | |
| | A2 | 1 | 2 | | | |

| | | | | | | |
|---|---|---|---|---|---|---|
| | Xn | 1 | 2 | | | n |
| Mn | E | | | | | n |

| LOCATION | MACHINE | | | | | |
|---|---|---|---|---|---|---|
| A | 1 | 2 | | | | |
| B | 1 | | | | | |
| ⋮ | | | | | | |
| D | 1 | 2 | | | | |
| E | | | | | | n |
| ⋮ | | | | | | |
| | | | | | | |
| ⋮ | | | | | | |
| X | 1 | 2 | | | | n |

FIG. 90

MACHINE — TABLE

| LOCATION | MACHINE | | | | | |
|---|---|---|---|---|---|---|
| A | 1 | 2 | | | | n |
| B | 1 | | | | | |
| ⋮ | | | | | | |
| D | 1 | 2 | | | | n |
| E | | | | | | n |
| ⋮ | | | | | | |
| | | | | | | |
| | | | | | | |
| X | 1 | 2 | | | | n |

| MACHINE | TABLE | | | | | |
|---|---|---|---|---|---|---|
| | X1 | 1 | 2 | | | n |
| M1 | B | 1 | | | | |
| | A1 | 1 | 2 | | | n |
| | D1 | 1 | 2 | | | n |
| | | | | | | |
| | X2 | 1 | 2 | | | n |
| M2 | D2 | 1 | 2 | | | n |
| | A2 | 1 | 2 | | | n |
| | | | | | | |
| | Xn | 1 | 2 | | | n |
| Mn | E | | | | | n |
| | Dn | 1 | 2 | | | n |
| | An | 1 | 2 | | | n |

LOCATION        MACHINE

| A | 1 | 2 |   |   |   |
|---|---|---|---|---|---|
| B | 1 |   |   |   |   |
| ⋮ |   |   |   |   |   |
| D | 1 | 2 |   |   | n |
| E |   |   |   |   | n |
| ⋮ |   |   |   |   |   |
|   |   |   |   |   |   |
| ⋮ |   |   |   |   |   |
| X | 1 | 2 |   |   | n |

FIG. 96

MACHINE        TABLE

M1

| X1 | 1 | 2 |   |   | n |
|----|---|---|---|---|---|
| B  | 1 |   |   |   |   |
| A1 | 1 | 2 |   |   |   |
| D1 | 1 | 2 |   |   | n |

M2

| X2 | 1 | 2 |   |   | n |
|----|---|---|---|---|---|
| D2 | 1 | 2 |   |   | n |
| A2 | 1 | 2 |   |   |   |

Mn

| Xn | 1 | 2 |   |   | n |
|----|---|---|---|---|---|
| E  |   |   |   |   | n |
| Dn | 1 | 2 |   |   | n |

FIG. 97

MACHINE | TABLE

M1

| X1 | 1 | 2 |  |  | n |
|----|---|---|--|--|---|
| A1 | 1 | 2 |  |  | n |
| B  | 1 |   |  |  |   |
|    |   |   |  |  |   |

M2

| X2 | 1 | 2 |  |  | n |
|----|---|---|--|--|---|
| A2 | 1 | 2 |  |  | n |
| D  |   | 2 |  |  |   |
|    |   |   |  |  |   |

Mn

| Xn | 1 | 2 |  |  | n |
|----|---|---|--|--|---|
| An | 1 | 2 |  |  | n |
| E  |   |   |  |  | n |
|    |   |   |  |  |   |

FIG. 100

| LOCATION | MACHINE | | | | | |
|---|---|---|---|---|---|---|
| A | 1 | 2 | | | | n |
| B | 1 | | | | | |
| ⋮ | | | | | | |
| D | | 2 | | | | |
| E | | | | | | n |
| ⋮ | | | | | | |
| | | | | | | |
| ⋮ | | | | | | |
| X | 1 | 2 | | | | n |

MACHINE | TABLE

M1

| X1 | 1 | 2 |  |  | n |
|----|---|---|--|--|---|
| A1 | 1 | 2 |  |  | n |
| B  | 1 |   |  |  |   |
|    |   |   |  |  |   |

M2

| X2 | 1 | 2 |  |  | n |
|----|---|---|--|--|---|
| A2 | 1 | 2 |  |  | n |
| D  |   | 2 |  |  |   |
|    |   |   |  |  |   |

Mn

| Xn | 1 | 2 |  |  | n |
|----|---|---|--|--|---|
| An | 1 | 2 |  |  | n |
| E  |   |   |  |  | n |
|    |   |   |  |  |   |

FIG. 103

| LOCATION | MACHINE | | | | | |
|---|---|---|---|---|---|---|
| A | 1 | 2 | | | | |
| B | 1 | | | | | |
| ⋮ | | | | | | |
| D | 2 | | | | | |
| E | | | | | | n |
| ⋮ | | | | | | |
| | | | | | | |
| ⋮ | | | | | | |
| X | 1 | 2 | | | | n |

| MACHINE | TABLE | | | | | |
|---|---|---|---|---|---|---|
| | X1 | 1 | 2 | | | n |
| M1 | A1 | 1 | 2 | | | |
| | B | 1 | | | | |
| | | | | | | |

| | | | | | | |
|---|---|---|---|---|---|---|
| | X2 | 1 | 2 | | | n |
| M2 | A2 | 1 | 2 | | | |
| | D | | 2 | | | |
| | | | | | | |

| | | | | | | |
|---|---|---|---|---|---|---|
| | Xn | 1 | 2 | | | n |
| Mn | E | | | | | n |
| | | | | | | |
| | | | | | | |

FIG. 106

| MACHINE | TABLE | | | | | |
|---|---|---|---|---|---|---|
| | X1 | 1 | 2 | | | n |
| M1 | A | 1 | | | | |
| | B | 1 | | | | |
| | | | | | | |

| | X2 | 1 | 2 | | | n |
|---|---|---|---|---|---|---|
| M2 | D | | 2 | | | |
| | | | | | | |
| | | | | | | |

| | Xn | 1 | 2 | | | n |
|---|---|---|---|---|---|---|
| Mn | E | | | | | n |
| | | | | | | |
| | | | | | | |

FIG. 109

MACHINE | TABLE

M1

| X1 | 1 | 2 |  | --- | n |
|---|---|---|---|---|---|
| B | 1 |  |  |  |  |
|  |  |  |  |  |  |
|  |  |  |  |  |  |

M2

| X2 | 1 | 2 |  | --- | n |
|---|---|---|---|---|---|
| D |  | 2 |  |  |  |
|  |  |  |  |  |  |
|  |  |  |  |  |  |

Mn

| Xn | 1 | 2 |  | --- | n |
|---|---|---|---|---|---|
| A |  |  |  |  | n |
| E |  |  |  |  | n |
|  |  |  |  |  |  |

FIG. 112

| MACHINE | TABLE | | | | | |
|---|---|---|---|---|---|---|
| | X1 | 1 | 2 | | | n |
| M1 | A1 | 1 | 2 | | | n |
| | B | 1 | | | | |
| | | | | | | |

| | | | | | | |
|---|---|---|---|---|---|---|
| | X2 | 1 | 2 | | | n |
| M2 | A2 | 1 | 2 | | | n |
| | D | | 2 | | | |
| | | | | | | |

| | | | | | | |
|---|---|---|---|---|---|---|
| | Xn | 1 | 2 | | | n |
| Mn | An | 1 | 2 | | | n |
| | E | | | | | n |
| | | | | | | |

FIG. 115

| LOCATION | MACHINE | | | | |
|---|---|---|---|---|---|
| A | 1 | | | --- | n |
| B | 1 | | | --- | n |
| ⋮ | | | | --- | |
| D | | | | --- | |
| E | | | | --- | n |
| ⋮ | | | | --- | |
| | | | | --- | |
| ⋮ | | | | --- | |
| X | 1 | | | --- | n |

MACHINE TABLE

M1

| X1 | 1 |  |  |  | n |
|----|---|--|--|--|---|
| A1 | 1 |  |  |  | n |
| B  | 1 |  |  |  |   |
|    |   |  |  |  |   |

M2

| X2 | 1 |  |  |  | n |
|----|---|--|--|--|---|
| A2 | 1 |  |  |  | n |
| D  |   |  |  |  |   |
|    |   |  |  |  |   |

Mn

| Xn | 1 |  |  |  | n |
|----|---|--|--|--|---|
| An | 1 |  |  |  | n |
| E  |   |  |  |  | n |
|    |   |  |  |  |   |

FIG. 120

| GLOBAL |
|---|
| *C* |
| CRANIUM |
|  |
|  |

| *Mn-1* | *Mn* | *Mn+1* |
|---|---|---|
| *K* | *H* | *T* |
| KOPF | HEAD | TÊTE |
|  |  |  |
|  |  |  |

FIG. 124

| OBJECTS | MACHINES |
|---|---|
| A | { M1, M2 } |
| B | { M1, M2, M4 } |
| C | { M1, M2, M3 } |
| D | { M2, M4 } |
| E | { M3 } |

| MACHINES | OBJECTS |
|---|---|
| M1 | { A, B, C } |
| M2 | { A, B, C, D } |
| M3 | { C, E } |
| M4 | { B, D } |

|   | M1 | M2 | M3 | M4 |   |   | Mn |
|---|----|----|----|----|---|---|----|
| A | YES | YES | NO | NO |   |   |   |
| B | YES | YES | NO | YES |   |   |   |
| C | YES | YES | YES | NO |   |   |   |
| D | NO | YES | NO | YES |   |   |   |
| E | NO | NO | YES | NO |   |   |   |
|   |   |   |   |   |   |   |   |
| Z |   |   |   |   |   |   |   |

FIG. 135

```
ADDRESS # 123    ADDRESS # 226    ADDRESS #471    ADDRESS # 807
CONTENT = 978    CONTENT = 567    CONTENT = 6     CONTENT = 357
                    COUNT = 57
```
⤷ 95

FIG. 146

Mn
```
ADDRESS # 123
CONTENT = 978
COUNT   = 57

ADDRESS # 226
CONTENT = 567
COUNT   = 57

ADDRESS # 471
CONTENT = 6
COUNT   = 57

ADDRESS # 807
CONTENT = 357
COUNT   = 57
```

FIG. 147

```
ADDRESS # 123    ADDRESS # 226   ADDRESS #471   ADDRESS # 807
CONTENT = 978    CONTENT = 567   CONTENT = 6    CONTENT = 357
                      COUNT = 57
```
↳ 95

```
ADDRESS # 123
CONTENT = 978
COUNT   = 57

ADDRESS # 226
CONTENT = 567
COUNT   = 57

ADDRESS # 471
CONTENT = 6
COUNT   = 57

ADDRESS # 807
CONTENT = 357
COUNT   = 57
```

FIG. 149

```
.
.
.
iload_2
invokestatic    #3; //Method operation1:()I
iadd
istore_2
bipush  99
putstatic       #4; //Field memory_location_4:I
iload_1
iload_2
iadd
istore_1
.
.
.
```

FIG. 174

```
.
.
.
iload_2
invokestatic #3; //Method operation1:()I
iadd
istore_2
getstatic    #14; // Field memory_location_14:[I
astore_3
iconst_0
istore 4
iload 4
bipush  10
if_icmpge 41
aload_3
iload 4
iload_2
iastore
iinc    4, 1
goto    23
iload_1
iload_2
iadd
istore_1
.
.
.
```

FIG. 175

COMPUTER ARCHITECTURE AND METHOD OF OPERATION FOR MULTI-COMPUTER DISTRIBUTED PROCESSING HAVING REDUNDANT ARRAY OF INDEPENDENT SYSTEMS WITH REPLICATED MEMORY AND CODE STRIPING

CROSS-REFERENCE TO RELATED APPLICATIONS

This application claims benefit under 35 USC 119(e) to the following U.S. Provisional Applications: 60/922,251 filed Apr. 6, 2007; 60/878,175 filed Dec. 29, 2006; 60/998,090 filed Oct. 5, 2007; 60/998,085 filed Oct. 5, 2007; 61/008,529 filed Dec. 19, 2007; 61/008,530 filed Dec. 19, 2007; 61/008,531 filed Dec. 19, 2007; 61/008,526 filed Dec. 19, 2007; 61/008,527 filed Dec. 19, 2007; 61/008,528 filed Dec. 19, 2007; 61/008,523 filed Dec. 19, 2007; 61/008,524 filed Dec. 19, 2007; 61/008,525 filed Dec. 19, 2007; 61/008,535 filed Dec. 19, 2007; 61/008,538 filed Dec. 19, 2007; 61/008,522 filed Dec. 19, 2007; 61/008,544 filed Dec. 19, 2007; 61/008,541 filed Dec. 19, 2007; 61/008,542 filed Dec. 19, 2007; 61/008,539 filed Dec. 19, 2007; 61/008,518 filed Dec. 19, 2007; 61/008,543 filed Dec. 19, 2007; 61/008,536 filed Dec. 19, 2007; 61/008,545 filed Dec. 19, 2007; 61/008,537 filed Dec. 19, 2007; 61/008,540 filed Dec. 19, 2007; 61/008,532 filed Dec. 19, 2007; 61/008,533 filed Dec. 19, 2007; 61/008,516 filed Dec. 19, 2007; 61/008,517 filed Dec. 19, 2007; 61/008,534 filed Dec. 19, 2007; 61/008,513 filed Dec. 19, 2007; 61/008,514 filed Dec. 19, 2007; 61/008,515 filed Dec. 19, 2007; 61/008,442 filed Dec. 19, 2007; 61/008,441 filed Dec. 19, 2007; 61/008,452 filed Dec. 19, 2007; 61/008,454 filed Dec. 19, 2007; 61/008,444 filed Dec. 19, 2007; 61/008,443 filed Dec. 19, 2007; 61/008,439 filed Dec. 19, 2007; 61/008,438 filed Dec. 19, 2007; 61/008,455 filed Dec. 19, 2007; 61/008,500 filed Dec. 19, 2007; 61/008,499 filed Dec. 19, 2007; 61/008,440 filed Dec. 19, 2007; 61/008,447 filed Dec. 19, 2007; 61/008,611 filed Dec. 19, 2007; 61/008,610 filed Dec. 19, 2007; 61/008,449 filed Dec. 19, 2007; 61/008,450 filed Dec. 19, 2007; 61/008,453 filed Dec. 19, 2007; 61/008,451 filed Dec. 19, 2007; 61/008,446 filed Dec. 19, 2007; 61/008,448 filed Dec. 19, 2007; 61/008,466 filed Dec. 19, 2007; 61/008,445 filed Dec. 19, 2007; 61/008,460 filed Dec. 19, 2007; 61/008,612 filed Dec. 19, 2007; 61/008,463 filed Dec. 19, 2007; 61/008,464 filed Dec. 19, 2007; 61/008,469 filed Dec. 19, 2007; 61/008,616 filed Dec. 19, 2007; 61/008,615 filed Dec. 19, 2007; 61/008,498 filed Dec. 19, 2007; 61/008,497 filed Dec. 19, 2007; 61/008,496 filed Dec. 19, 2007; 61/008,461 filed Dec. 19, 2007; 61/008,462 filed Dec. 19, 2007; 61/008,465 filed Dec. 19, 2007; 61/008,436 filed Dec. 19, 2007; 61/008,470 filed Dec. 19, 2007; and 61/008,512 filed Dec. 19, 2007; each of which is incorporated herein by reference in their entirety.

This patent application incorporates the following applications by reference, and claims benefit under 35 USC 120 to these applications as follows:

As a continuation-in-part of U.S. patent application Ser. No. 10/830,042 filed Apr. 23, 2004, now issued as U.S. Pat. No. 7,849,452 on Dec. 7, 2010 and corresponding to PCT/AU2005/000582 and Australian Patent Application No. 2005 236 089, entitled "Modified Computer Architecture";

As a continuation-in-part of U.S. patent application Ser. No. 11/111,781 filed Apr. 22, 2005 and corresponding to PCT/AU2005/000578 and Australian Patent Application No. 2005 236 085, entitled "Modified Computer Architecture with Initialization of Objects", application Ser. No. 11/111,781 claims benefit as a continuation-in-part of U.S. patent application Ser. No. 10/830,042;

As a continuation-in-part of U.S. patent application Ser. No. 11/111,778 filed Apr. 22, 2005 and corresponding PCT/AU2005/000581 and to Australian Patent Application No. 2005 236 088, entitled "Modified Computer Architecture with Finalization of Objects", application Ser. No. 11/111,778 claims benefit as a continuation-in-part of U.S. patent application Ser. No. 10/830,042;

As a continuation-in-part of U.S. patent application Ser. No. 11/111,779 filed Apr. 22, 2005, now issued as U.S. Pat. No. 7,707,179 on Apr. 27, 2010 and corresponding to PCT/AU2005/000579 and Australian Patent Application No. 2005 236 086, entitled "Modified Computer Architecture with Synchronization of Objects", application Ser. No. 11/111,779 claims benefit as a continuation-in-part of U.S. patent application Ser. No. 10/830,042;

As a continuation-in-part of U.S. patent application Ser. No. 11/111,946 filed Apr. 22, 2005, now issued as U.S. Pat. No. 7,844,665 on Nov. 30, 2010 and corresponding to PCT/AU2005/000580 and Australian Patent Application No. 2005 236 087, entitled "Modified Computer Architecture with Coordinated Objects", application Ser. No. 11/111,779 claims benefit as a continuation-in-part of U.S. patent application Ser. No. 10/830,042;

As a continuation-in-part of U.S. patent application Ser. No. 11/111,757 filed Apr. 22, 2005, now issued as U.S. Pat. No. 7,844,665 on Nov. 30, 2010 and corresponding to PCT/AU2005/000580 and Australian Patent Application No. 2005 236 087, entitled "Modified Computer Architecture with Coordinated Objects", application Ser. No. 11/111,757 claims benefit as a continuation-in-part of U.S. patent application Ser. No. 10/830,042;

As a continuation-in-part of U.S. patent application Ser. No. 11/259,634 filed Oct. 25, 2005;

As a continuation-in-part of U.S. patent application Ser. No. 11/259,744 filed Oct. 25, 2005;

As a continuation-in-part of U.S. patent application Ser. No. 11/259,761 filed Oct. 25, 2005;

As a continuation-in-part of U.S. patent application Ser. No. 11/259,762 filed Oct. 25, 2005;

As a continuation-in-part of U.S. patent application Ser. No. 11/259,885 filed Oct. 25, 2005;

As a continuation-in-part of U.S. patent application Ser. No. 11/973,391 filed Oct. 5, 2007, application Ser. No. 11/973,391 claims benefit as a non-provisional application of U.S. provisional patent application Ser. Nos. 60/850,711 and 60/850,713, each filed on Oct. 9, 2006;

As a continuation-in-part of U.S. patent application Ser. No. 11/973,370 filed Oct. 5, 2007, application Ser. No. 11/973,370 claims benefit as a non-provisional application of U.S. provisional patent application Ser. Nos. 60/850,711 and 60/850,713, each filed on Oct. 9, 2006;

As a continuation-in-part of U.S. patent application Ser. No. 11/973,317 filed Oct. 5, 2007, application Ser. No. 11/973,317 claims benefit as a non-provisional application of U.S. provisional patent application Ser. Nos. 60/850,510 and 60/850,519, each filed on Oct. 9, 2006;

As a continuation-in-part of U.S. patent application Ser. No. 11/973,318 filed Oct. 5, 2007, application Ser. No. 11/973,318 claims benefit as a non-provisional application of U.S. provisional patent application Ser. Nos. 60/850,537 and 60/850,505, each filed on Oct. 9, 2006;

As a continuation-in-part of U.S. patent application Ser. No. 11/973,353 filed Oct. 5, 2007, application Ser. No. 11/973,353 claims benefit as a non-provisional application of U.S. provisional patent application Ser. Nos. 60/850,537 and 60/850,505, each filed on Oct. 9, 2006;

As a continuation-in-part of U.S. patent application Ser. No. 11/973,396 filed Oct. 5, 2007, application Ser. No. 11/973,396 claims benefit as a non-provisional application of U.S. provisional patent application Ser. Nos. 60/850,521 and 60/850,711, each filed on Oct. 9, 2006.

As a continuation-in-part of U.S. patent application Ser. No. 11/973,387 filed Oct. 5, 2007, application Ser. No. 11/973,387 claims benefit as a non-provisional application of U.S. provisional patent application Ser. Nos. 60/850,521 and 60/850,711, each filed on Oct. 9, 2006;

As a continuation-in-part of U.S. patent application Ser. No. 11/973,339 filed Oct. 5, 2007, application Ser. No. 11/973,339 claims benefit as a non-provisional application of U.S. provisional patent application Ser. Nos. 60/850,510 and 60/850,519, each filed on Oct. 9, 2006;

As a continuation-in-part of U.S. patent application Ser. No. 11/973,379 filed Oct. 5, 2007, application Ser. No. 11/973,379 claims benefit as a non-provisional application of U.S. provisional patent application Ser. Nos. 60/850,711, 60/850,531, 60/850,528, and 60/850,519, each filed on Oct. 9, 2006;

As a continuation-in-part of U.S. patent application Ser. No. 11/973,375 filed Oct. 5, 2007, application Ser. No. 11/973,375 claims benefit as a non-provisional application of U.S. provisional patent application Ser. Nos. 60/850,711, 60/850,531, 60/850,528, and 60/850,519, each filed on Oct. 9, 2006;

As a continuation-in-part of U.S. patent application Ser. No. 11/973,378 filed Oct. 5, 2007, application Ser. No. 11/973,378 claims benefit as a non-provisional application of U.S. provisional patent application Ser. Nos. 60/850,711, 60/850,531, 60/850,528, and 60/850,519, each filed on Oct. 9, 2006;

As a continuation-in-part of U.S. patent application Ser. No. 11/973,394 filed Oct. 5, 2007, application Ser. No. 11/973,394 claims benefit as a non-provisional application of U.S. provisional patent application Ser. Nos. 60/850,711 and 60/850,533, each filed on Oct. 9, 2006;

As a continuation-in-part of U.S. patent application Ser. No. 11/973,393 filed Oct. 5, 2007, application Ser. No. 11/973,393 claims benefit as a non-provisional application of U.S. provisional patent application Ser. Nos. 60/850,711 and 60/850,533, each filed on Oct. 9, 2006;

As a continuation-in-part of U.S. patent application Ser. No. 11/973,384 filed Oct. 5, 2007, application Ser. No. 11/973,384 claims benefit as a non-provisional application of U.S. provisional patent application Ser. Nos. 60/850,711 and 60/850,533, each filed on Oct. 9, 2006;

As a continuation-in-part of U.S. patent application Ser. No. 11/973,374 filed Oct. 5, 2007, application Ser. No. 11/973,374 claims benefit as a non-provisional application of U.S. provisional patent application Ser. Nos. 60/850,711 and 60/850,537, each filed on Oct. 9, 2006;

As a continuation-in-part of U.S. patent application Ser. No. 11/973,373 filed Oct. 5, 2007, application Ser. No. 11/973,373 claims benefit as a non-provisional application of U.S. provisional patent application Ser. Nos. 60/850,711 and 60/850,537, each filed on Oct. 9, 2006;

As a continuation-in-part of U.S. patent application Ser. No. 11/973,322 filed Oct. 5, 2007, application Ser. No. 11/973,322 claims benefit as a non-provisional application of U.S. provisional patent application Ser. Nos. 60/850,711 and 60/850,507, filed on Oct. 9, 2006;

As a continuation-in-part of U.S. patent application Ser. No. 11/973,389 filed Oct. 5, 2007, application Ser. No. 11/973,389 claims benefit as a non-provisional application of U.S. provisional patent application Ser. No. 60/850,532, filed on Oct. 9, 2006;

As a continuation-in-part of U.S. patent application Ser. No. 11/973,368 filed Oct. 5, 2007, application Ser. No. 11/973,368 claims benefit as a non-provisional application of U.S. provisional patent application Ser. No. 60/850,532, filed on Oct. 9, 2006;

As a continuation-in-part of U.S. patent application Ser. No. 11/973,380 filed Oct. 5, 2007, application Ser. No. 11/973,380 claims benefit as a non-provisional application of U.S. provisional patent application Ser. Nos. 60/850,711 and 60/850,537, filed on Oct. 9, 2006;

As a continuation-in-part of U.S. patent application Ser. No. 11/973,401 filed Oct. 5, 2007, application Ser. No. 11/973,401 claims benefit as a non-provisional application of U.S. provisional patent application Ser. No. 60/850,508, filed on Oct. 9, 2006;

As a continuation-in-part of U.S. patent application Ser. No. 11/973,400 filed Oct. 5, 2007, application Ser. No. 11/973,400 claims benefit as a non-provisional application of U.S. provisional patent application Ser. No. 60/850,508, filed on Oct. 9, 2006;

As a continuation-in-part of U.S. patent application Ser. No. 11/973,395 filed Oct. 5, 2007, application Ser. No. 11/973,395 claims benefit as a non-provisional application of U.S. provisional patent application Ser. No. 60/850,532, filed on Oct. 9, 2006;

As a continuation-in-part of U.S. patent application Ser. No. 11/973,388 filed Oct. 5, 2007, application Ser. No. 11/973,388 claims benefit as a non-provisional application of U.S. provisional patent application Ser. Nos. 60/850,541 and 60/850,711, each filed on Oct. 9, 2006;

As a continuation-in-part of U.S. patent application Ser. No. 11/973,349 filed Oct. 5, 2007, application Ser. No. 11/973,349 claims benefit as a non-provisional application of U.S. provisional patent application Ser. Nos. 60/850,537 and 60/850,500, each filed on Oct. 9, 2006;

As a continuation-in-part of U.S. patent application Ser. No. 11/973,399 filed Oct. 5, 2007, application Ser. No. 11/973,399 claims benefit as a non-provisional application of U.S. provisional patent application Ser. No. 60/850,508, filed on Oct. 9, 2006;

As a continuation-in-part of U.S. patent application Ser. No. 11/973,329 filed Oct. 5, 2007, application Ser. No. 11/973,329 claims benefit as a non-provisional application of U.S. provisional patent application Ser. Nos. 60/850,537 and 60/850,503, each filed on Oct. 9, 2006;

As a continuation-in-part of U.S. patent application Ser. No. 11/973,390 filed Oct. 5, 2007, application Ser. No. 11/973,390 claims benefit as a non-provisional application of U.S. provisional patent application Ser. Nos. 60/850,540 and 60/850,711, each filed on Oct. 9, 2006;

As a continuation-in-part of U.S. patent application Ser. No. 11/973,345 filed Oct. 5, 2007, application Ser. No. 11/973,345 claims benefit as a non-provisional application of U.S. provisional patent application Ser. Nos. 60/850,537 and 60/850,503, each filed on Oct. 9, 2006;

As a continuation-in-part of U.S. patent application Ser. No. 11/973,346 filed Oct. 5, 2007, application Ser. No. 11/973,346 claims benefit as a non-provisional application of U.S. provisional patent application Ser. No. 60/850,501, filed on Oct. 9, 2006;

As a continuation-in-part of U.S. patent application Ser. No. 11/973,347 filed Oct. 5, 2007, application Ser. No.

11/973,347 claims benefit as a non-provisional application of U.S. provisional patent application Ser. No. 60/850,501, filed on Oct. 9, 2006;

As a continuation-in-part of U.S. patent application Ser. No. 11/973,340 filed Oct. 5, 2007, application Ser. No. 11/973,340 claims benefit as a non-provisional application of U.S. provisional patent application Ser. Nos. 60/850,532 and 60/850,504, each filed on Oct. 9, 2006;

As a continuation-in-part of U.S. patent application Ser. No. 11/973,350 filed Oct. 5, 2007, application Ser. No. 11/973,350 claims benefit as a non-provisional application of U.S. provisional patent application Ser. Nos. 60/850,537 and 60/850,500, each filed on Oct. 9, 2006;

As a continuation-in-part of U.S. patent application Ser. No. 11/973,351 filed Oct. 5, 2007, application Ser. No. 11/973,351 claims benefit as a non-provisional application of U.S. provisional patent application Ser. Nos. 60/850,537 and 60/850,500, each filed on Oct. 9, 2006;

As a continuation-in-part of U.S. patent application Ser. No. 11/973,369 filed Oct. 5, 2007, application Ser. No. 11/973,369 claims benefit as a non-provisional application of U.S. provisional patent application Ser. Nos. 60/850,711 and 60/850,449, each filed on Oct. 9, 2006;

As a continuation-in-part of U.S. patent application Ser. No. 11/973,355 filed Oct. 5, 2007, application Ser. No. 11/973,355 claims benefit as a non-provisional application of U.S. provisional patent application Ser. Nos. 60/850,532 and 60/850,504, each filed on Oct. 9, 2006;

As a continuation-in-part of U.S. patent application Ser. No. 11/973,356 filed Oct. 5, 2007, application Ser. No. 11/973,356 claims benefit as a non-provisional application of U.S. provisional patent application Ser. Nos. 60/850,532 and 60/850,504, each filed on Oct. 9, 2006;

As a continuation-in-part of U.S. patent application Ser. No. 11/973,385 filed Oct. 5, 2007, application Ser. No. 11/973,385 claims benefit as a non-provisional application of U.S. provisional patent application Ser. Nos. 60/850,711, filed on Oct. 9, 2006;

As a continuation-in-part of U.S. patent application Ser. No. 11/973,376 filed Oct. 5, 2007, application Ser. No. 11/973,376 claims benefit as a non-provisional application of U.S. provisional patent application Ser. Nos. 60/850,711 and 60/850,449, each filed on Oct. 9, 2006;

As a continuation-in-part of U.S. patent application Ser. No. 11/973,381 filed Oct. 5, 2007, application Ser. No. 11/973,381 claims benefit as a non-provisional application of U.S. provisional patent application Ser. Nos. 60/850,711 and 60/850,449, each filed on Oct. 9, 2006;

As a continuation-in-part of U.S. patent application Ser. No. 11/973,382 filed Oct. 5, 2007, application Ser. No. 11/973,382 claims benefit as a non-provisional application of U.S. provisional patent application Ser. Nos. 60/850,711 and 60/850,717, each filed on Oct. 9, 2006;

As a continuation-in-part of U.S. patent application Ser. No. 11/973,372 filed Oct. 5, 2007, application Ser. No. 11/973,372 claims benefit as a non-provisional application of U.S. provisional patent application Ser. No. 60/850,711, filed on Oct. 9, 2006;

As a continuation-in-part of U.S. patent application Ser. No. 11/973,397 filed Oct. 5, 2007, application Ser. No. 11/973,397 claims benefit as a non-provisional application of U.S. provisional patent application Ser. No. 60/850,711, filed on Oct. 9, 2006;

As a continuation-in-part of U.S. patent application Ser. No. 11/973,341 filed Oct. 5, 2007, application Ser. No. 11/973,341 claims benefit as a non-provisional application of U.S. provisional patent application Ser. Nos. 60/850,711, 60/850,531, and 60/850,528, each filed on Oct. 9, 2006;

As a continuation-in-part of U.S. patent application Ser. No. 11/973,392 filed Oct. 5, 2007, application Ser. No. 11/973,392 claims benefit as a non-provisional application of U.S. provisional patent application Ser. Nos. 60/850,711 and 60/850,717, each filed on Oct. 9, 2006;

As a continuation-in-part of U.S. patent application Ser. No. 11/973,383 filed Oct. 5, 2007, application Ser. No. 11/973,383 claims benefit as a non-provisional application of U.S. provisional patent application Ser. Nos. 60/850,711 and 60/850,717, each filed on Oct. 9, 2006;

As a continuation-in-part of U.S. patent application Ser. No. 11/973,371 filed Oct. 5, 2007, application Ser. No. 11/973,350 claims benefit as a non-provisional application of U.S. provisional patent application Ser. Nos. 60/850,711 and 60/850,713, each filed on Oct. 9, 2006;

As a continuation-in-part of U.S. patent application Ser. No. 11/973,325 filed Oct. 5, 2007, application Ser. No. 11/973,325 claims benefit as a non-provisional application of U.S. provisional patent application Ser. Nos. 60/850,711 and 60/850,715, each filed on Oct. 9, 2006;

As a continuation-in-part of U.S. patent application Ser. No. 11/973,342 filed Oct. 5, 2007, application Ser. No. 11/973,342 claims benefit as a non-provisional application of U.S. provisional patent application Ser. Nos. 60/850,711, 60/850,531, and 60/850,528, each filed on Oct. 9, 2006;

As a continuation-in-part of U.S. patent application Ser. No. 11/973,348 filed Oct. 5, 2007, application Ser. No. 11/973,348 claims benefit as a non-provisional application of U.S. provisional patent application Ser. Nos. 60/850,711 and 60/850,528, each filed on Oct. 9, 2006;

As a continuation-in-part of U.S. patent application Ser. No. 11/973,327 filed Oct. 5, 2007, application Ser. No. 11/973,327 claims benefit as a non-provisional application of U.S. provisional patent application Ser. Nos. 60/850,711 and 60/850,528, each filed on Oct. 9, 2006;

As a continuation-in-part of U.S. patent application Ser. No. 11/973,331 filed Oct. 5, 2007, application Ser. No. 11/973,331 claims benefit as a non-provisional application of U.S. provisional patent application Ser. Nos. 60/850,711 and 60/850,528, each filed on Oct. 9, 2006;

As a continuation-in-part of U.S. patent application Ser. No. 11/973,338 filed Oct. 5, 2007, application Ser. No. 11/973,338 claims benefit as a non-provisional application of U.S. provisional patent application Ser. Nos. 60/850,711 and 60/850,715, each filed on Oct. 9, 2006

As a continuation-in-part of U.S. patent application Ser. No. 11/973,324 filed Oct. 5, 2007, application Ser. No. 11/973,324 claims benefit as a non-provisional application of U.S. provisional patent application Ser. Nos. 60/850,711 and 60/850,715, each filed on Oct. 9, 2006

As a continuation-in-part of U.S. patent application Ser. No. 11/973,354 filed Oct. 5, 2007, application Ser. No. 11/973,354 claims benefit as a non-provisional application of U.S. provisional patent application Ser. Nos. 60/850,711, 60/850,531 and 60/850,528, each filed on Oct. 9, 2006;

As a continuation-in-part of U.S. patent application Ser. No. 11/973,330 filed Oct. 5, 2007, application Ser. No. 11/973,330 claims benefit as a non-provisional application of U.S. provisional patent application Ser. Nos. 60/850,537 and 60/850,450, each filed on Oct. 9, 2006;

As a continuation-in-part of U.S. patent application Ser. No. 11/973,326 filed Oct. 5, 2007, application Ser. No. 11/973,326 claims benefit as a non-provisional application of U.S. provisional patent application Ser. Nos. 60/850,537 and 60/850,450, each filed on Oct. 9, 2006;

As a continuation-in-part of U.S. patent application Ser. No. 11/973,328 filed Oct. 5, 2007, application Ser. No. 11/973,328 claims benefit as a non-provisional application of U.S. provisional patent application Ser. Nos. 60/850,537 and 60/850,450, each filed on Oct. 9, 2006;

As a continuation-in-part of U.S. patent application Ser. No. 11/973,323 filed Oct. 5, 2007, application Ser. No. 11/973,323 claims benefit as a non-provisional application of U.S. provisional patent application Ser. Nos. 60/850,711 and 60/850,507, each filed on Oct. 9, 2006;

As a continuation-in-part of U.S. patent application Ser. No. 11/973,320 filed Oct. 5, 2007, application Ser. No. 11/973,320 claims benefit as a non-provisional application of U.S. provisional patent application Ser. Nos. 60/850,711 and 60/850,507, each filed on Oct. 9, 2006;

As a continuation-in-part of U.S. patent application Ser. No. 11/973,377 filed Oct. 5, 2007, application Ser. No. 11/973,377 claims benefit as a non-provisional application of U.S. provisional patent application Ser. Nos. 60/850,541 and 60/850,7110, each filed on Oct. 9, 2006;

As a continuation-in-part of U.S. patent application Ser. No. 11/973,398 filed Oct. 5, 2007, application Ser. No. 11/973,398 claims benefit as a non-provisional application of U.S. provisional patent application Ser. Nos. 60/850,540 and 60/850,711, each filed on Oct. 9, 2006;

As a continuation-in-part of U.S. patent application Ser. No. 11/973,386 filed Oct. 5, 2007, application Ser. No. 11/973,386 claims benefit as a non-provisional application of U.S. provisional patent application Ser. Nos. 60/850,541 and 60/850,711, each filed on Oct. 9, 2006;

As a continuation-in-part of U.S. patent application Ser. No. 11/912,141 filed Oct. 19, 2007, application Ser. No. 11/973,350 claims benefit as a national stage entry under 35 USC 371 of International Application PCT/AU06/000532 filed on Apr. 20, 2006;

As a continuation-in-part of U.S. patent application Ser. No. 12/011,216 filed Jan. 23, 2008, application Ser. No. 12/011,216 claims benefit under 35 USC 121 as a divisional application of U.S. application Ser. No. 11/583,359, filed on Oct. 18, 2006, and application Ser. No. 11/583,359 claims benefit under 35 USC 119(e) to U.S. provisional patent application Ser. No. 60/730,544 filed Oct. 25, 2005;

As a continuation-in-part of U.S. patent application Ser. No. 12/011,218 filed Jan. 23, 2008, application Ser. No. 12/011,218 claims benefit under 35 USC 121 as a divisional application of U.S. application Ser. No. 11/583,961, filed on Oct. 18, 2006, and U.S. application Ser. No. 11/583,961 claims benefit under 35 USC 119(e) to U.S. provisional patent application Ser. No 60/730,493 filed on Oct. 25, 2005;

As a continuation-in-part of U.S. patent application Ser. No. 12/011,215 filed Jan. 23, 2008, application Ser. No. 12/011,215 claims benefit under 35 USC 121 as a divisional application of U.S. application Ser. Nos. 11/583,962, filed on Oct. 18, 2006, and U.S. application Ser. No. 11/583,962 claims benefit under 35 USC 119(e) to U.S. provisional patent application Ser. No. 60/730,303 filed on Oct. 25, 2005;

As a continuation-in-part of U.S. patent application Ser. No. 12/011,199 filed Jan. 23, 2008, application Ser. No. 12/011,199 claims benefit under 35 USC 121 as a divisional application of U.S. application Ser. Nos. 11/583,991, filed on Oct. 18, 2006, and U.S. application Ser. No. 11/583,991 claims benefit under 35 USC 119(e) to U.S. provisional patent application Ser. No. 60/730,408 filed on Oct. 25, 2005;

As a continuation-in-part of U.S. patent application Ser. No. 12/011,198 filed Jan. 23, 2008, application Ser. No. 12/011,198 claims benefit under 35 USC 121 as a divisional application of U.S. application Ser. Nos. 11/583,948, filed on Oct. 18, 2006, and U.S. application Ser. No. 11/583,948 claims benefit under 35 USC 119(e) to U.S. provisional patent application Ser. No. 60/730,354 filed on Oct. 25, 2005;

As a continuation-in-part of U.S. patent application Ser. No. 12/011,207 filed Jan. 23, 2008, application Ser. No. 12/011,207 claims benefit under 35 USC 121 as a divisional application of U.S. application Ser. Nos. 11/583,958, filed on Oct. 18, 2006, and U.S. application Ser. No. 11/583,958 claims benefit under 35 USC 119(e) to U.S. provisional patent application Ser. No. 60/730,543 filed on Oct. 25, 2005; and As a continuation-in-part of U.S. patent application Ser. No. 12/011,217 filed Jan. 23, 2008, application Ser. No. 12/011,217 claims benefit under 35 USC 121 as a divisional application of U.S. application Ser. Nos. 11/583,351, filed on Oct. 18, 2006, and U.S. application Ser. No. 11/583,351 claims benefit under 35 USC 119(e) to U.S. provisional patent application Ser. No. 60/730,512 filed on Oct. 25, 2005.

Additional incorporated by reference patent applications are identified elsewhere in the specification, including, but not limited to four tables at the end of the specification.

FIELD OF THE INVENTION

The present invention relates to computers and other computing machines and information appliances, to a modified computer architecture and program structure which enables the operation of an application program concurrently or simultaneously on a plurality of computers interconnected via a communications link using a distributed runtime, and that provides for a redundant array of independent computing systems that include computer code distribution or striping onto the plurality of computers and enables improved performance to be achieved.

BACKGROUND OF THE INVENTION

Ever since the advent of computers and computing, software for computers has been written to be operated upon a single machine. As indicated in FIG. 1, that single prior art machine 1 is made up from a central processing unit, or CPU, 2 which is connected to a memory 3 via a bus 4. Also connected to the bus 4 are various other functional units of the single machine 1 such as a screen 5, keyboard 6 and mouse 7.

A fundamental limit to the performance of the machine 1 is that the data to be manipulated by the CPU 2, and the results of those manipulations, must be moved by the bus 4. The bus 4 suffers from a number of problems including so called bus "queues" formed by units wishing to gain an access to the bus, contention problems, and the like. These problems can, to some extent, be alleviated by various stratagems including cache memory; however, such stratagems invariably increase the administrative overhead of the machine 1.

Naturally, over the years various attempts have been made to increase machine performance. One approach is to use symmetric multi-processors. This prior art approach has been used in so called "super" computers and is schematically indicated in FIG. 2. Here a plurality of CPU's 12 is connected to global memory 13. Again, a bottleneck arises in the communications between the CPU's 12 and the memory 13. This process has been termed "Single System Image". There is only one application and one whole copy of the memory for the application which is distributed over the global memory. The single application can read from and write to, (i.e. share) any memory location completely transparently.

Where there are a number of such machines interconnected via a network, this is achieved by taking the single application written for a single machine and partitioning the required memory resources into parts. These parts are then distributed across a number of computers to form the global memory 13 accessible by all CPU's 12. This procedure relies on masking, or hiding, the memory partition from the single running application program. The performance degrades when one CPU on one machine must access (via a network) a memory location physically located in a different machine.

Although super computers have been technically successful in achieving high computational rates, they are not commercially successful in that their inherent complexity makes them extremely expensive not only to manufacture but to administer. In particular, the single system image concept has never been able to scale over "commodity" (or mass produced) computers and networks. In particular, the Single System Image concept has only found practical application on very fast (and hence very expensive) computers interconnected by very fast (and similarly expensive) networks.

A further possibility of increased computer power through the use of a plural number of machines arises from the prior art concept of distributed computing which is schematically illustrated in FIG. 3. In this known arrangement, a single application program (Ap) is partitioned by its author (or another programmer who has become familiar with the application program) into various discrete tasks so as to run upon, say, three machines in which case n in FIG. 3 is the integer 3. The intention here is that each of the machines M1 . . . M3 runs a different third of the entire application and the intention is that the loads applied to the various machines be approximately equal. The machines communicate via a network 14 which can be provided in various forms such as a communications link, the internet, intranets, local area networks, and the like. Typically the speed of operation of such networks 14 is an order of magnitude slower than the speed of operation of the bus 4 in each of the individual machines M1, M2, . . . , Mn.

Distributed computing suffers from a number of disadvantages. Firstly, it is a difficult job to partition the application and this must be done manually. Secondly, communicating data, partial results, results and the like over the network 14 is an administrative overhead. Thirdly, the need for partitioning makes it extremely difficult to scale upwardly by utilising more machines since the application having been partitioned into, say three, does not run well upon four machines. Fourthly, in the event that one of the machines should become disabled, the overall performance of the entire system is substantially degraded.

A further prior art arrangement is known as network computing via "clusters" as is schematically illustrated in FIG. 4. In this approach, the entire application is loaded onto each of the machines M1, M2, . . . , Mn. Each machine communicates with a common database but does not communicate directly with the other machines. Although each machine runs the same application, each machine is doing a different "job" and uses only its own memory. This is somewhat analogous to a number of windows each of which sell train tickets to the public. This approach does operate, is scalable and mainly suffers from the disadvantage that it is difficult to administer the network.

In computer languages such as for example JAVA and MICROSOFT.NET there are two major types of constructs with which programmers deal. In the JAVA language these are known as objects and classes. More generally they may be referred to as assets. Every time an object (or other asset) is created there is an initialization routine run known as an object initialization (e.g., "<init>") routine. Similarly, every time a class is loaded there is a class initialization routine known as "<clinit>". Other languages use different terms but utilize a similar concept. In either case, however, there is no equivalent "clean up" or deletion routine to delete an object or class (or other asset) once it is no longer required. Instead, this "clean up" happens unobtrusively in a background mode.

Furthermore, in any computer environment it is necessary to acquire and release a lock to enable the use of such objects, classes, assets, resources or structures to avoid different parts of the application program from attempting to use the same objects, classes, assets, resources or structures at the one time. In the JAVA environment this is known as synchronization. Synchronization more generally refers to the exclusive use of an object, class, resource, structure, or other asset to avoid contention between and among computers or machines. This is achieved in JAVA by the "monitor enter" and "monitor exit" instructions or routines. Other languages use different terms but utilize a similar concept.

Unfortunately, conventional computing systems, architectures, and operating schemes do not provide for computing environments and methods in which an application program can operate simultaneously on an arbitrary plurality of computers where the environment and operating scheme ensure that the abovementioned memory management, initialization, clean up and synchronization procedures operate in a consistent and coordinated fashion across all the computing machines.

Furthermore, conventional computing systems, architectures, and operating schemes do not provide for computing environments and methods which provide for a redundant array of independent systems or for code-striping in such systems.

SUMMARY

In one aspect, the present invention discloses a redundant array of independent computer systems (RAIS) that incorporates a code-striping architecture and methodology.

In another aspect, the invention provides in a multiple computer system including a plurality of computing machines, each computing machine having a processor and each processor having an associated local memory that is directly coupled to only one particular processor from among the plurality of processors, a method for stripping computer program code across the plurality of computing machines comprising: (1) replicating at least a portion of stored memory data contents from each local memory into the local memory of each of the plurality of computing machines; (2) updating a replicated memory content value in each other of the plurality of local memory every time a replicated local memory location is written to in any one or the local memory of the plurality of computing machines so that replicated memory locations remain substantially consistent between all of the computing machines, the updating including transmitting the updated content value from the computing machine that performed the content value update to other ones of the plurality of computing machines and receiving of the updated content value by the other ones of the plurality of computing machines; (3) satisfying all computing machine memory access requirements from the processor, including read access and write access, substantially exclusively by access to the associated local memory for memory content that is part of the replicated memory, and preventing access to memory that is resident in a different one of the plurality of computing machines; and (4) replicating at least a portion of an executable code of an application program, the executable code of the application program being different from the replicated memory data contents that may result from the execution of the application program code, on each of the plurality of computing machines, where replication may allow for variations of the executable code so that different computing machine operational requirements may be realized, and permits but does not require an exact copy of the executable code on each of the plurality of computing machines.

In another aspect, the above method may further provide that the code-striping comprises an arrangement of in-memory computer program executable code replicated on the plurality of computing machines.

In another aspect, the above method may further provide that the code-striping further comprises procedures for updating and manipulating the in-memory data.

In another aspect, the above method may further provide that the code-striping comprises an arrangement of in-memory computer program executable code replicated on the plurality of computing machines, and procedures for updating and manipulating the in-memory data.

In another aspect, the above method may further provide that the method further optionally include: (5) a contention controller that allows the plurality of computing machines to update the same replicated memory locations concurrently and resolve any conflicts or inconsistencies that might arise with such updating.

In another aspect, the above method may further provide that the contention controller comprises at least one of: (i) a contention detector, (ii) a contention detector and contention resolver, (iii) a contention detector with messenger and a modified message format, (iv) a contention detector with data consolidation, and (v) a contention resolver with echo cancellation, (vi) and any combination of two or more of these.

In another aspect, the above method may further provide that the method further comprising synchronizing updating of replicated memory locations between and among the plurality of computing machines.

In another aspect, invention provides a method for striping executable computer application program code between a plurality of computing machines interconnected via a network, each computing machine having an independent local memory directly coupled to only one particular associated a processor within a particular computing machine, the method comprising: satisfying all data read and write requests/operations by the processor within a particular computing machine to local memory within that particular computing machine independent of any other computing machine or the local memory within the other computing machine; creating relationships between memory locations to define related memory locations and values stored in the memory locations in the plurality of independent local memories and values of the independent memories of the plurality of machines; maintaining each related memory location of each independent memory so that each related memory location has the same value or content or an equivalent value or content; identifying a modification or change by a first computing machine of the plurality of computing machines to a particular memory location of the first computing machine own associated independent local memory which location is related to at least one other memory location of a different independent memory of a different computing machine of the plurality of computing machines; and updating the related memory locations in the other independent memories with the same or equivalent modified or changed value generated by the first machine.

In another aspect, the above method may further provide that each of the plurality of machines executing a same application program or a portion of a same application program.

In another aspect, the above method may further provide that the same application program was written or compiled so as to operate or be operable on a single computing machine with a single local memory coupled to a processor within the machine, and have been written or compiled so as to operate or be operable on plurality of machines with a plurality of memories.

In another aspect, the above method may be provided or implemented in hardware, in firmware, in software, or in a combination of hardware, firmware, and software.

In another aspect, the above methods may be implemented as computer program code stored in a computer readable forme or media that operates to alter the operation of each or all or a plurality of computing machines connected by a network or other communication link, network, or web.

In another aspect, the invention provides a Redundant Array of Independent computer Systems (RAIS) comprising: a plurality of computing machines interconnected via a communications network, each computing machine having a local independent memory coupled with a processor within the computing machine, and each independent memory comprising: (i) a first plurality of memory locations storing values or content which correspond and relate to and are substantially similar with, a plurality of memory locations storing first values or content on at least one other independent memory of a different one of the plurality of computing machines; distributed control means for satisfying all read and write requests by each machine exclusively by the local independent memory of each machine; detection means for detecting written-to first memory locations; and updating means for updating corresponding and related first memory locations and first values or content in the independent memories of the machines of the plurality of computing machines when the detection means detects a first memory location as having been written-to, so that corresponding first memory locations in all or the independent memories of the plurality of computing machines are updated to remain the same or substantially similar or equivalent in value or content.

In another aspect, the above system may further require that each independent memory further comprising: (ii) a second plurality of memory locations storing second values or content which do not correspond or relate to other memory locations of other independent memories of other computing machines.

In another aspect, the above system may further provide that the same or substantially similar or equivalent in value or content is the same value or content.

In another aspect, the above system may further provide that each of the plurality of machines executing a same application program or a portion of a same application program.

In another aspect, the above system may further provide that the same application program was written or compiled so as to operate or be operable on a single computing machine with a single local memory coupled to a processor within the machine, and have been written or compiled so as to operate or be operable on plurality of machines with a plurality of memories.

BRIEF DESCRIPTION OF THE DRAWINGS

Embodiments of the present invention are now described with reference to the drawings in which:

FIG. 10 is a schematic illustration of a prior art computer arranged to operate JAVA code and thereby constitute a JAVA virtual machine.

FIG. 11 is a drawing similar to FIG. 10 but illustrating the initial loading of code in accordance with the preferred embodiment.

FIG. 12 is a drawing similar to FIG. 9 but illustrating the interconnection of a plurality of computers each operating JAVA code.

FIG. 20 is a schematic representation of two laptop computers interconnected to simultaneously run a plurality of applications, with both applications running on a single computer.

FIG. 21 is a view similar to FIG. 20 but showing the FIG. 20 apparatus with one application operating on each computer.

FIG. 82, FIG. 83, FIG. 84 and FIG. 85 illustrate multiple reachability tables respectively corresponding to the individual reachability tables of FIG. 75, FIG. 77, FIG. 79 and FIG. 81.

FIG. 90 and FIG. 91 respectively illustrate the single and multiple reachability tables corresponding to the memory changes of FIG. 90.

FIG. 96 and FIG. 97 respectively illustrate the single and multiple reachability tables corresponding to the memory changes of FIG. 95.

FIG. 100 shows multiple reachability tables corresponding to the single table of FIG. 99.

FIG. 103 shows the multiple reachability tables corresponding to FIG. 102.

FIG. 104 is a memory map similar to FIG. 98 and FIG. 101 showing the reclamation of one memory location.

FIG. 105 and FIG. 106 respectively illustrate the single and multiple reachability tables corresponding to the memory changes of FIG. 104.

FIG. 107 illustrates another memory change.

FIG. 108 and FIG. 109 respectively illustrate the single and multiple reachability tables corresponding to the memory changes of FIG. 107.

FIG. 112 shows multiple reachability tables equivalent to FIG. 111.

FIG. 115 shows the multiple reachability tables corresponding to FIG. 113.

FIG. 120 shows the multiple reachability tables in the circumstance of FIG. 118.

FIG. 124 is a table listing the corresponding reference fields.

FIG. 132 is a schematic map of the memory locations of four computers.

FIG. 133, FIG. 134 and FIG. 135 are each a different form of tabulation or listing of which memory objects are present in which computers.

FIG. 146 illustrates a data format of a first embodiment which reduces the bandwidth requirements of the communication network.

FIG. 147 illustrates the consequence of use of the data format of FIG. 146.

FIG. 148 illustrates the data of format of a second embodiment.

FIG. 149 illustrates the consequences of the use of the data format of FIG. 148.

FIG. 156 is a timing diagram similar to FIG. 155 but illustrating creation of an echo.

FIG. 157 is a timing diagram similar to FIG. 156 but illustrating one embodiment for echo prevention.

FIG. 158 is a timing diagram illustrating both contention and creation of an echo.

FIG. 159 is a timing diagram illustrating resolution of contention in the presence of an echo.

FIG. 160 is a schematic diagram of a prior art replicated shared memory system.

FIG. 161 shows a single computer arrangement of storing write-indications, where one or more processors of a single computing machine store write-indications into one or more memory regions which are shared between all processors.

FIG. 162 shows an embodiment of the present invention in which a multiple processor machine is shown with a memory and one or more processors.

FIG. 163 shows a more sophisticated arrangement of FIG. 162, comprising a plurality of memory regions.

FIG. 164 is a drawing showing a multi-processor, multi-core computing system comprising a plurality of processors and a memory, wherein the memory comprises memory regions, and where each processor comprises two (or more) processing cores C1 and C2.

FIG. 165 is a drawing showing a multiple processor, multiple core computing system similar to that in FIG. 164 is but having three private memory regions in memory.

FIG. 166 shows a multiple processor computing system comprising three processors and a memory.

FIG. 167 shows a multiple processor computing system in a per-processor tagging arrangement.

Figure 168:
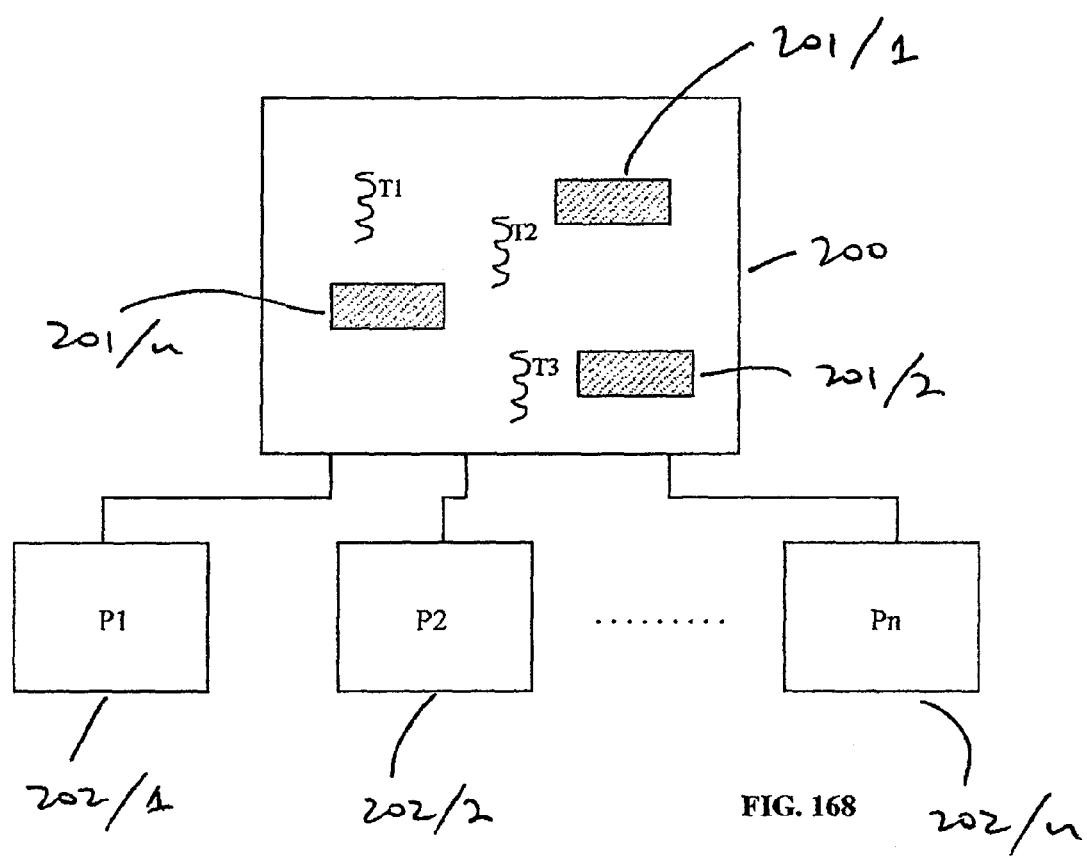

FIG. 168 shows a multiple processor computing system comprising three processors, a memory and private memory regions.

Figure 169:
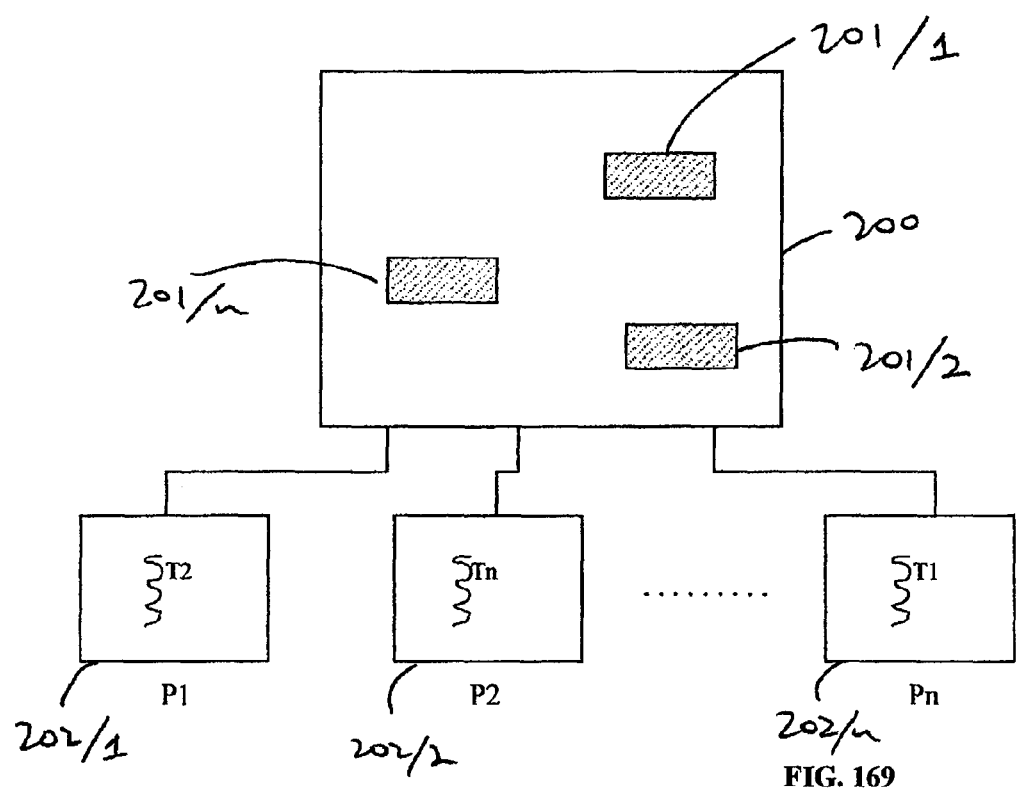

FIG. 169 shows one mode of an embodiment of this invention as it relates to the fixed assignment of application threads to processors (or processing units).

Figure 170:
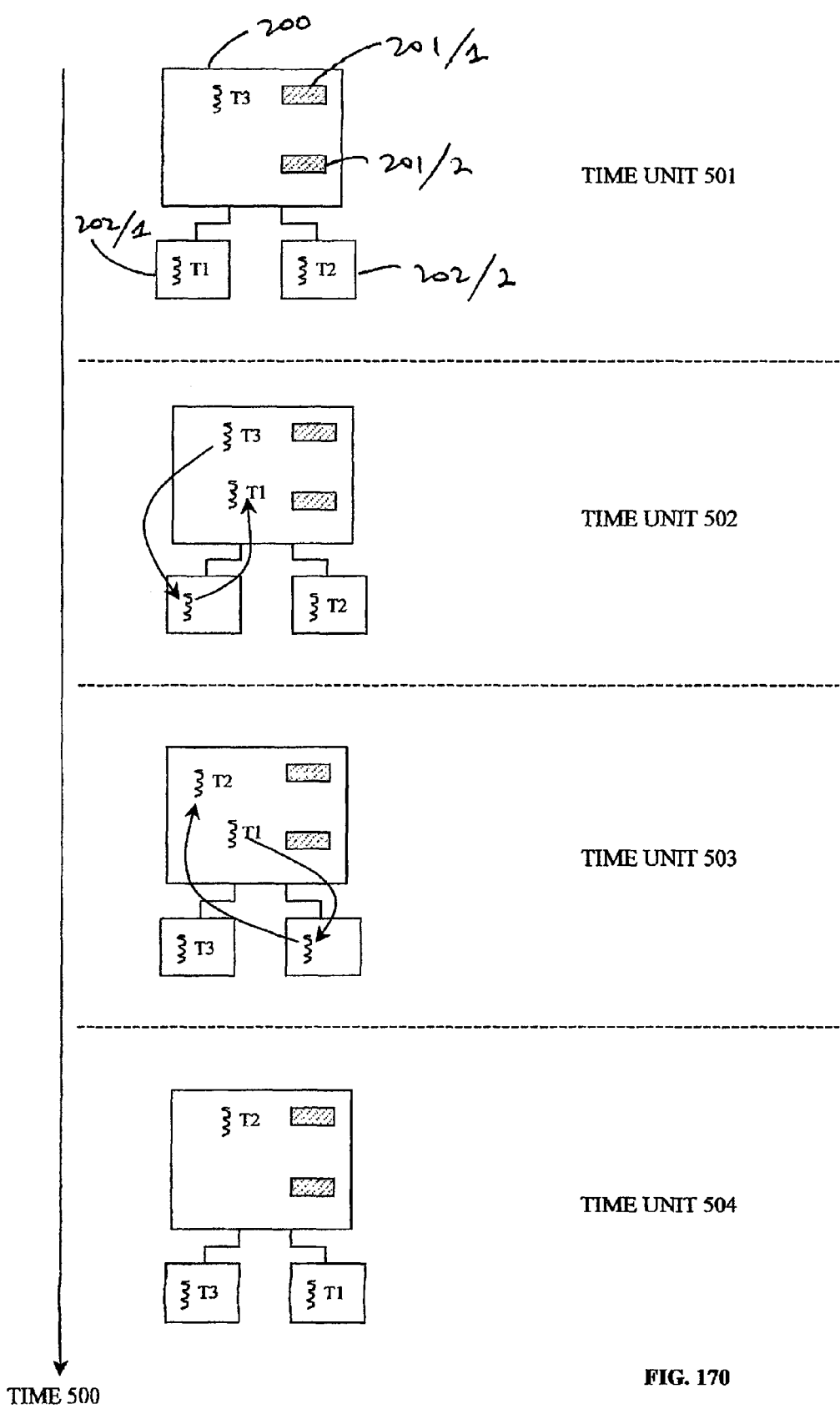

FIG. 170 shows a series of smaller diagrams presented in a time sequence in an embodiment according to the invention.

Figure 171:
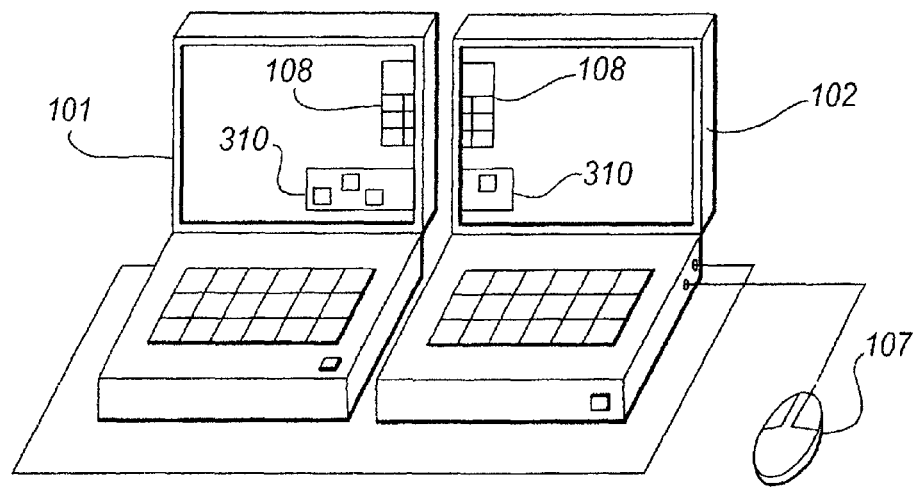

FIG. 171 is a view similar to FIG. 20 and FIG. 21 but showing the FIG. 20 apparatus with both applications operating simultaneously on both computers.

Figure 172:
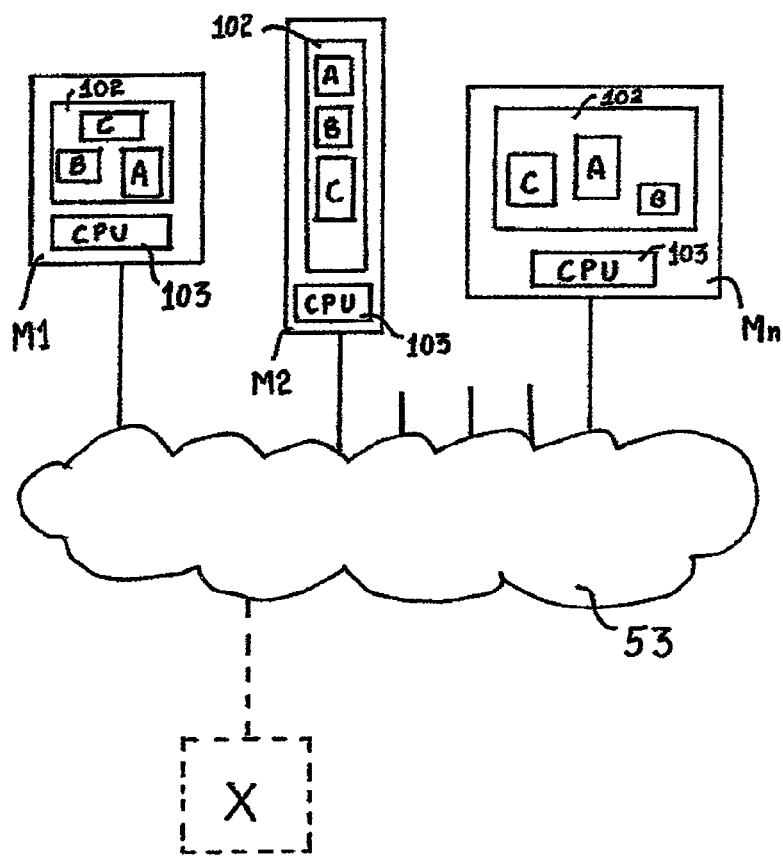

FIG. 172 is a schematic diagram of a prior art replicated shared memory system.

Figure 173:
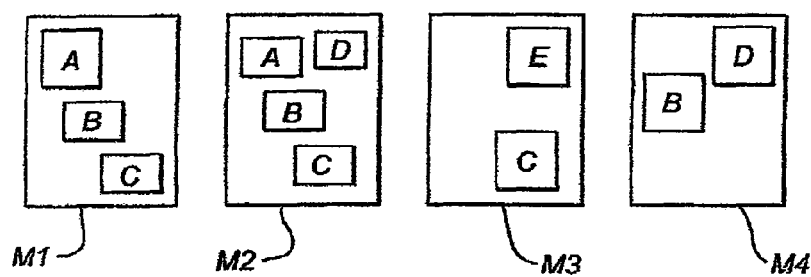

FIG. 173 is a schematic map of the memory locations of four machines M1-M4 is illustrated in a partial replicated shared memory arrangement.

FIG. 174 is an excerpt of a disassembled instruction sequence of Java application program. The instructions comprise a write-to-memory operation (putstatic #4), which for the purposes of this description is assumed to be a write to a replicated memory location of a plurality of machines operating in a replicated shared memory arrangement.

FIG. 175 is an excerpt of a disassembled instruction sequence of Java application program.

Figure 176:
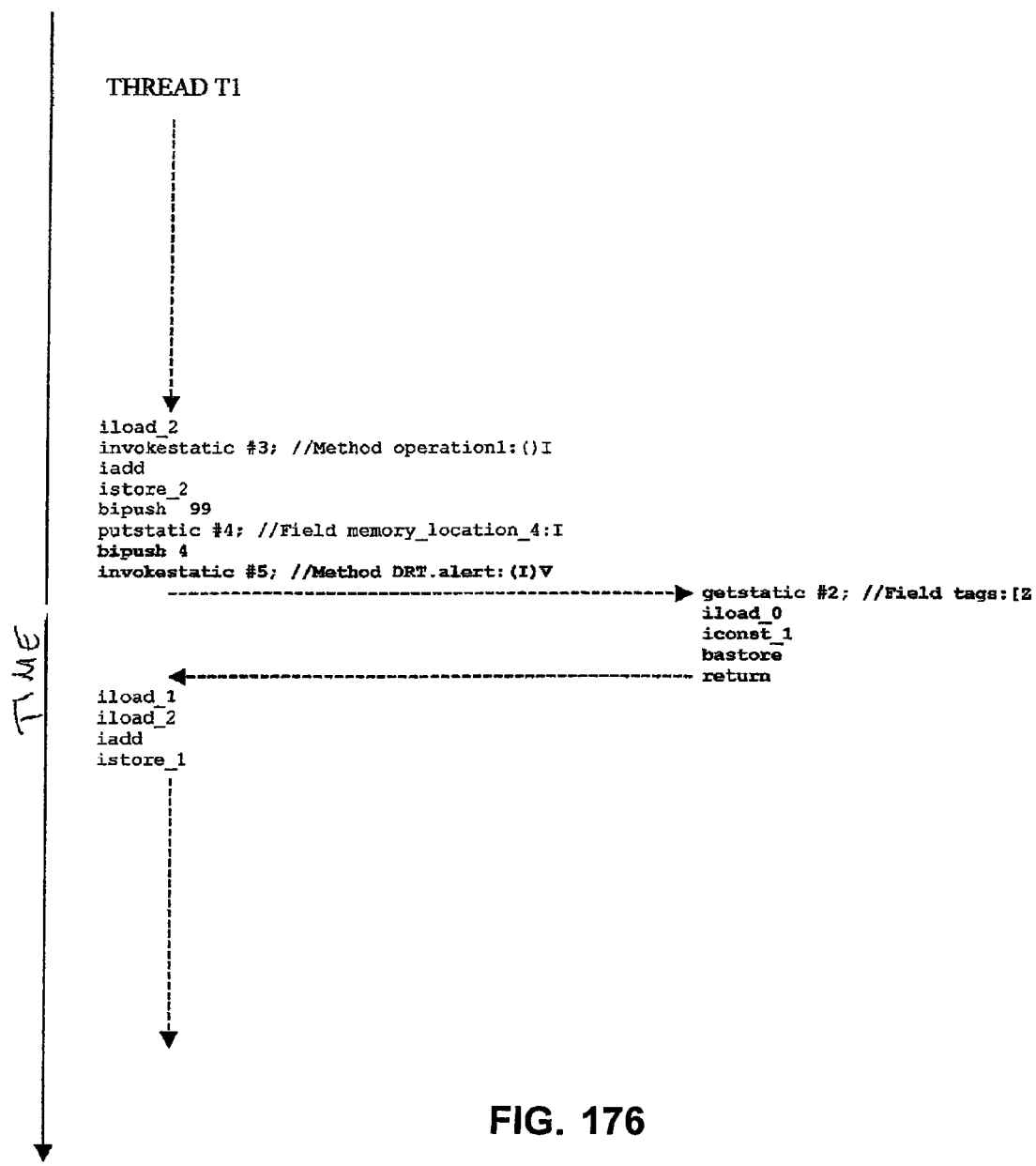

FIG. 176 is an illustrative diagram of the operations and progress of a single thread of execution T1, against the vertical indication of time from top to bottom.

Figure 177:
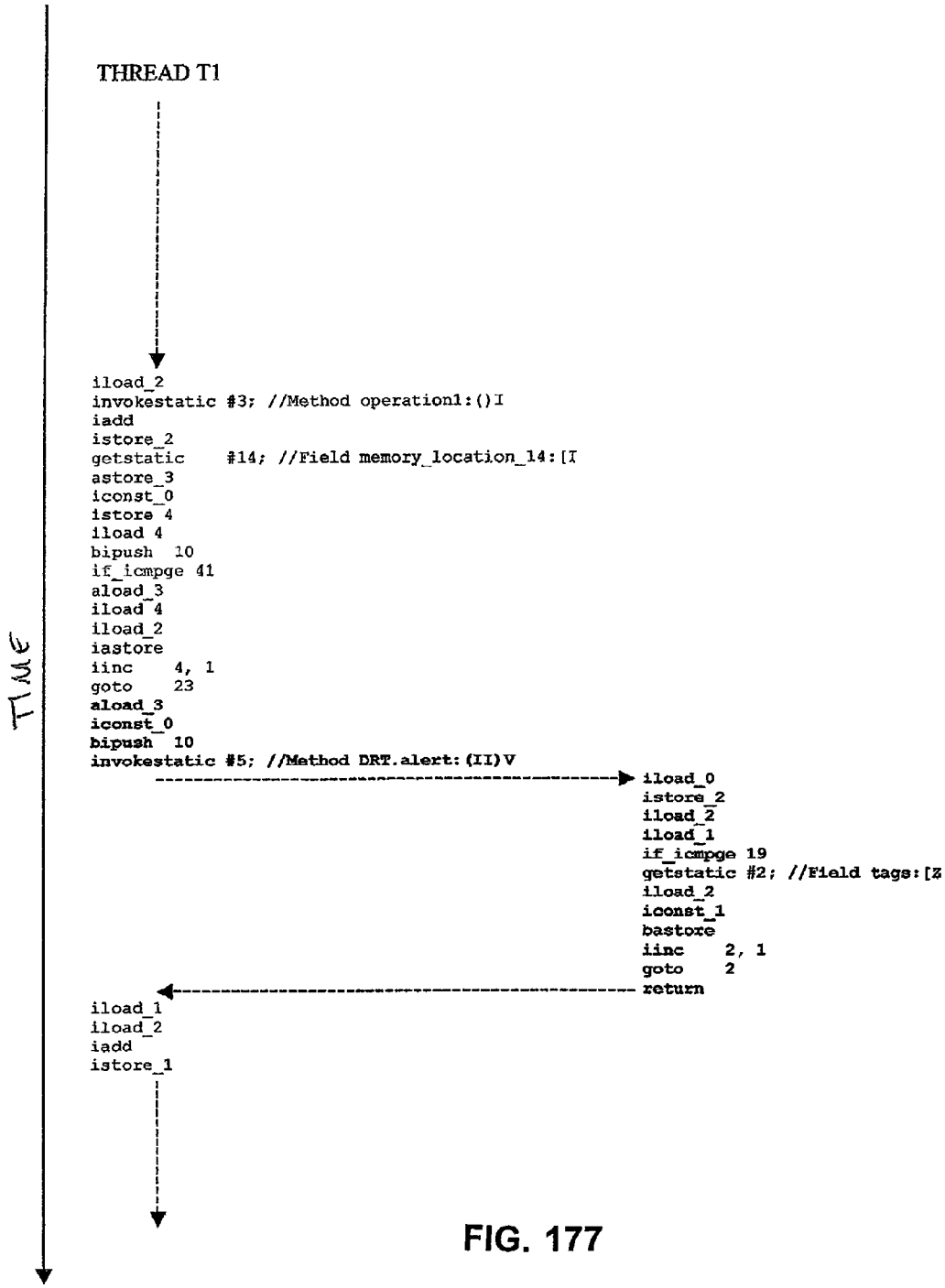

FIG. 177 is an illustrative diagram of the operations and progress of a single thread of execution T1, against the vertical indication of time from top to bottom.

Figure 178:
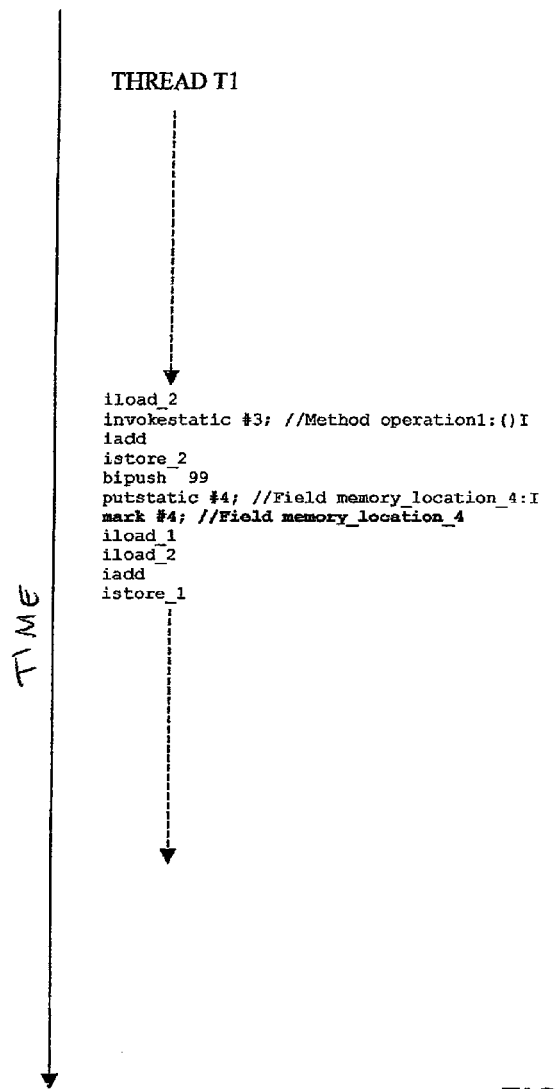

FIG. 178 shows a first arrangement of software modifications utilizing a special "mark instruction".

Figure 179:
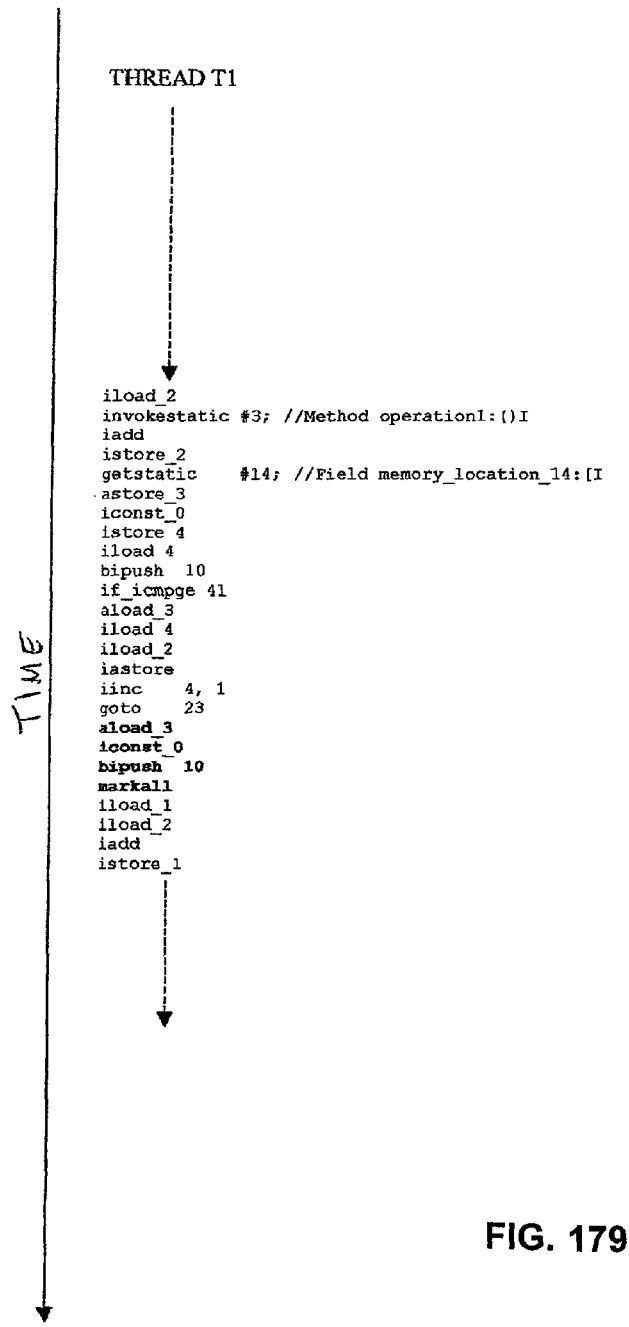

FIG. 179 is an illustrative diagram of the operations and progress of a single thread of execution T1, against the vertical indication of time from top to bottom.

Figure 180:
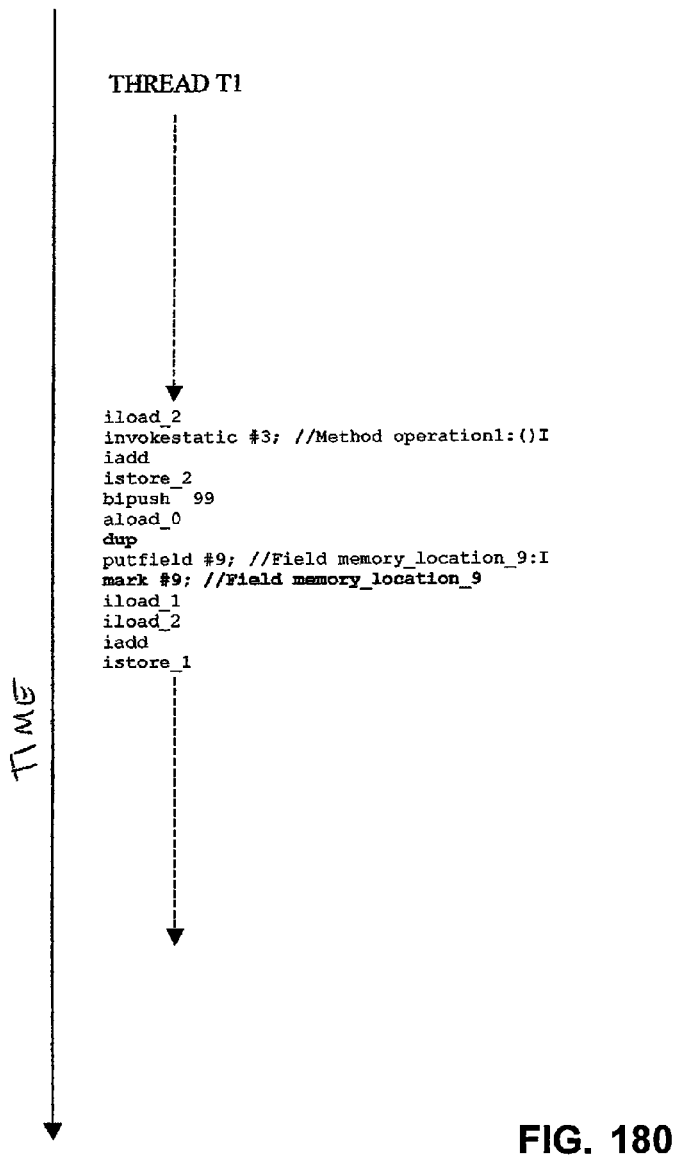

FIG. 180 shows a further alternative case such as indicated in FIG. 178 and FIG. 179, where an example code is indicated in un-bold and the inserted instructions and "mark" instruction of a processor in accordance with this invention are indicated in bold.

Figure 181:
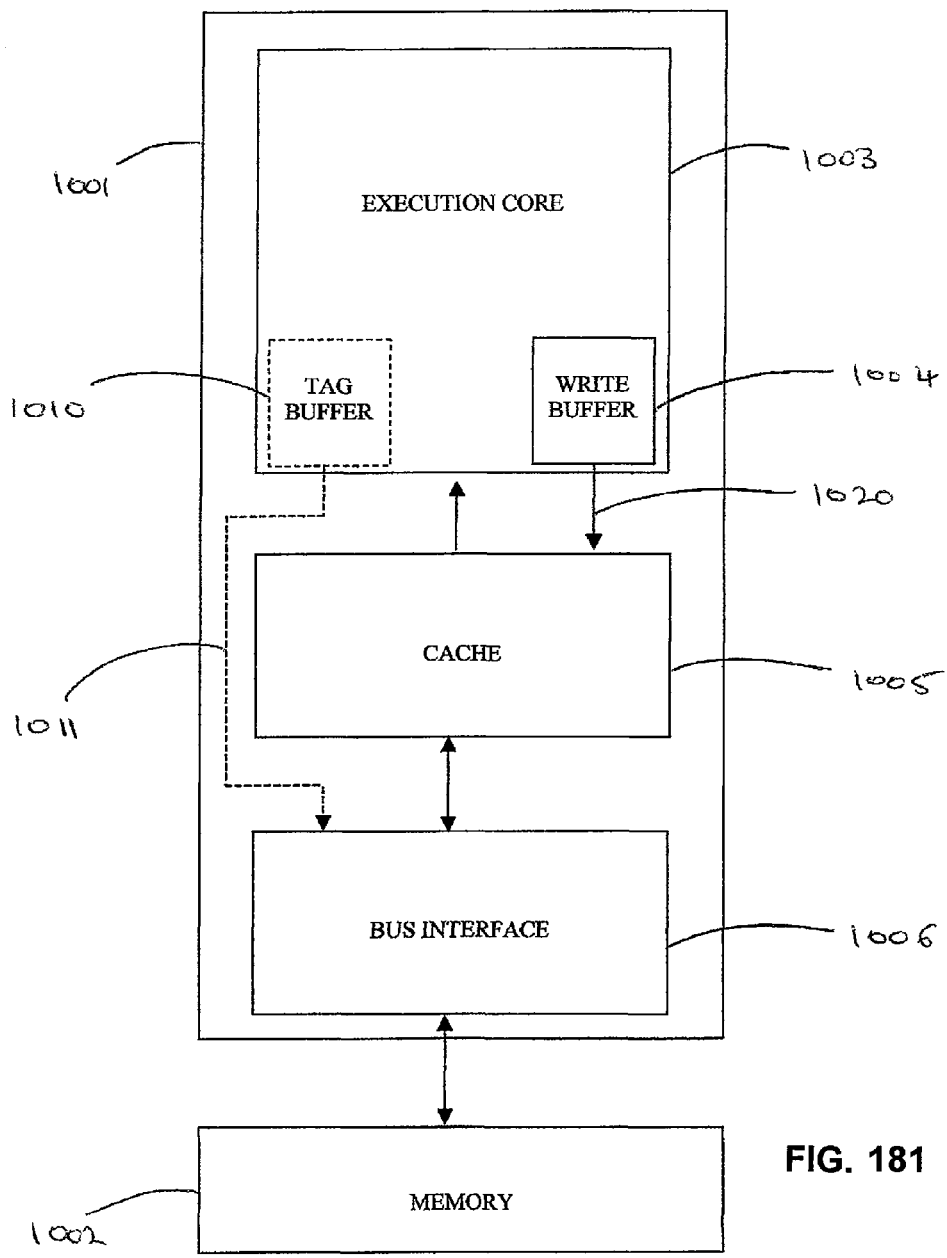

FIG. 181 shows a schematic arrangement of a CPU/processor comprising an execution core, write-buffer, cache memory, and bus interface and a memory of a computing system to be operated in a replicated shared memory arrangement and implementing one arrangement of the methods of this invention.

Figure 182:
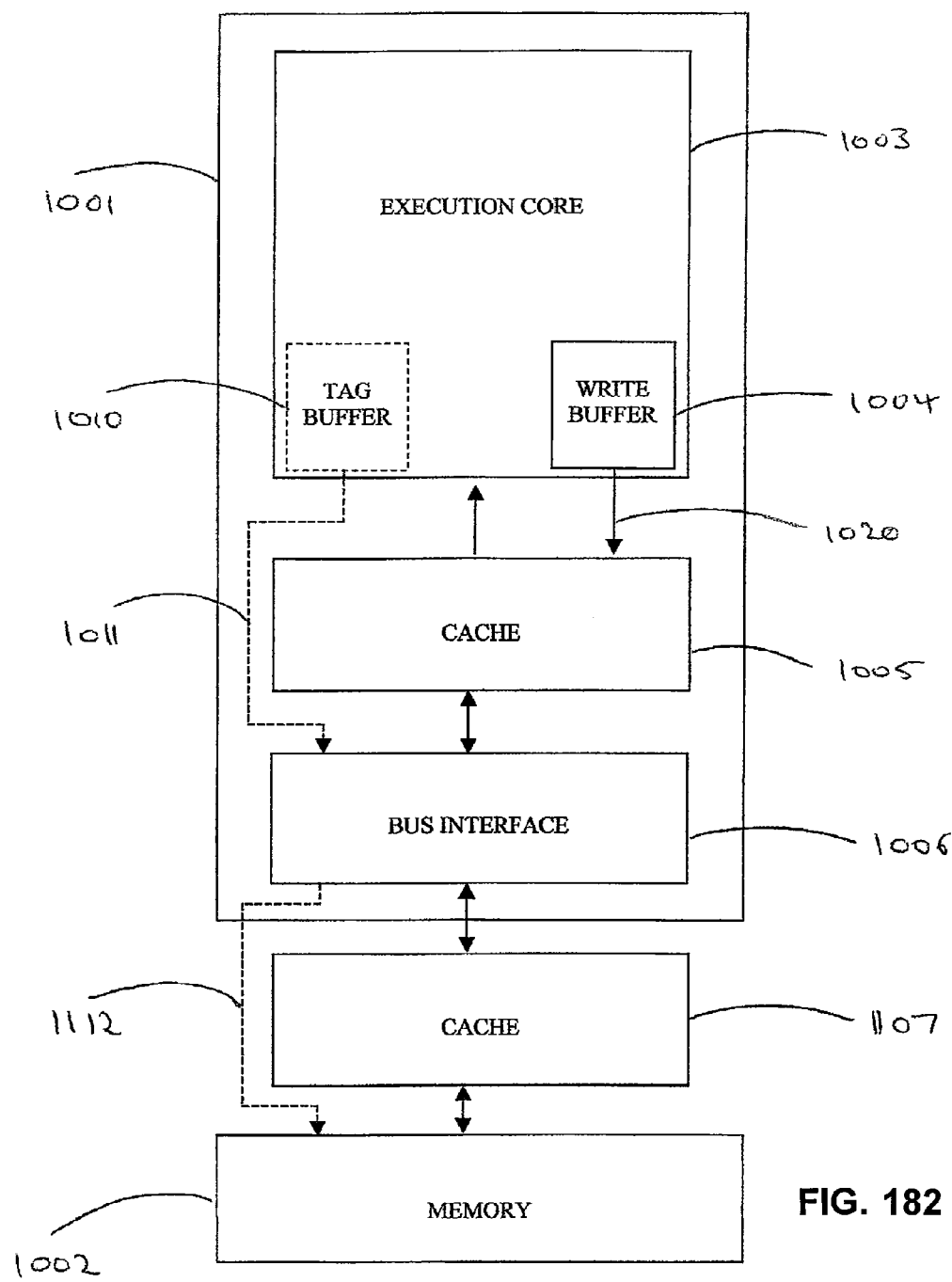

FIG. 182 shows a modified schematic diagram of a processor and memory arrangement as for FIG. 181.

Figure 183:
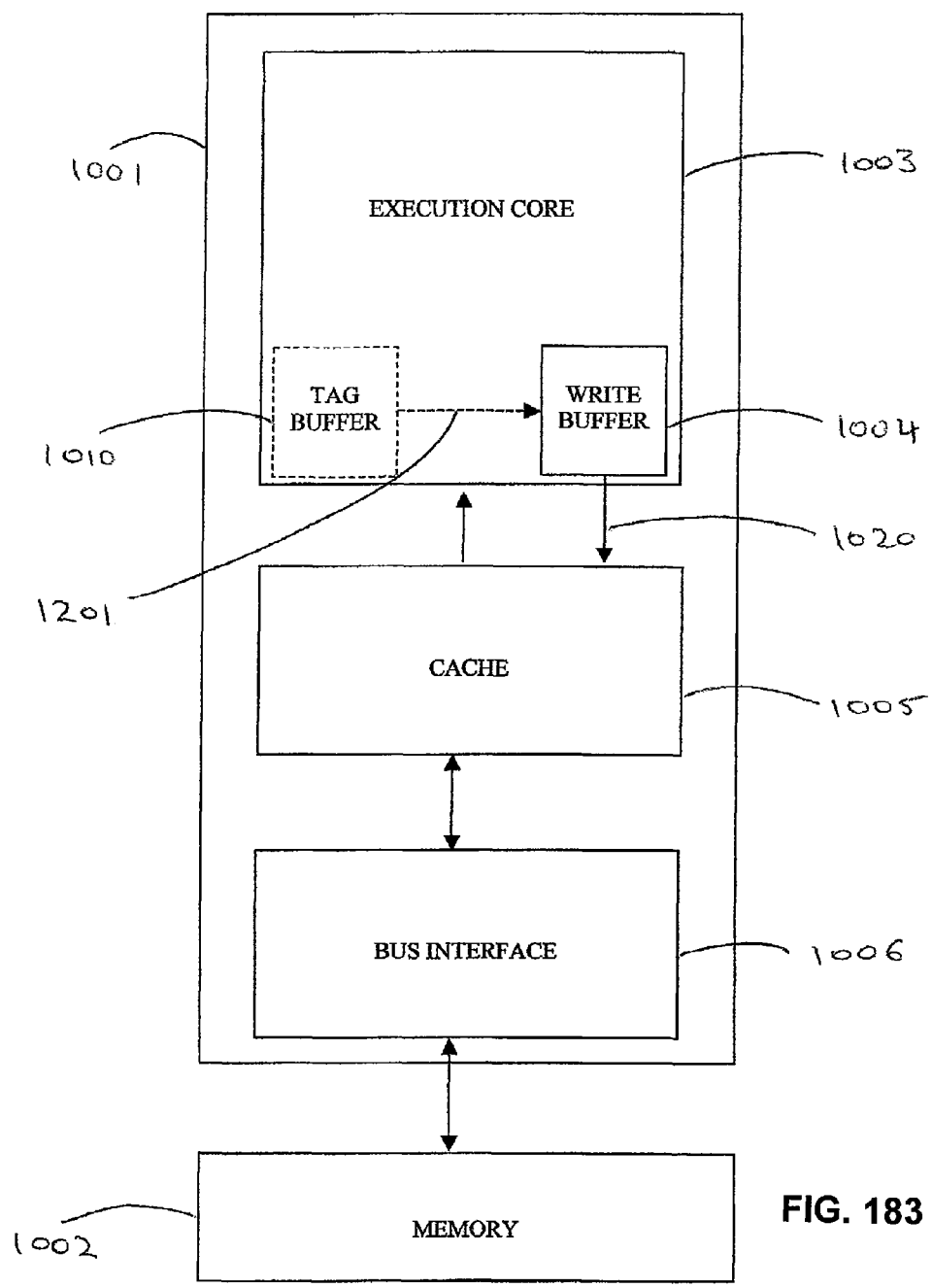

FIG. 183 shows a modified schematic diagram of a processor and memory arrangement as for FIG. 181 without the cache by-pass feature.

Figure 184:
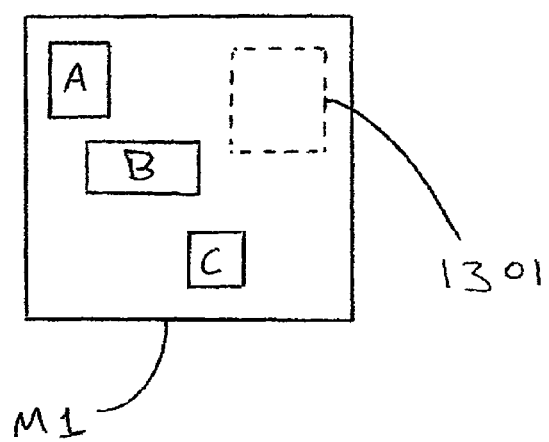

FIG. 184 describes this further preferred storage arrangement in which a single machine M1 of the plurality of machines depicted in FIG. 173.

Figure 185:
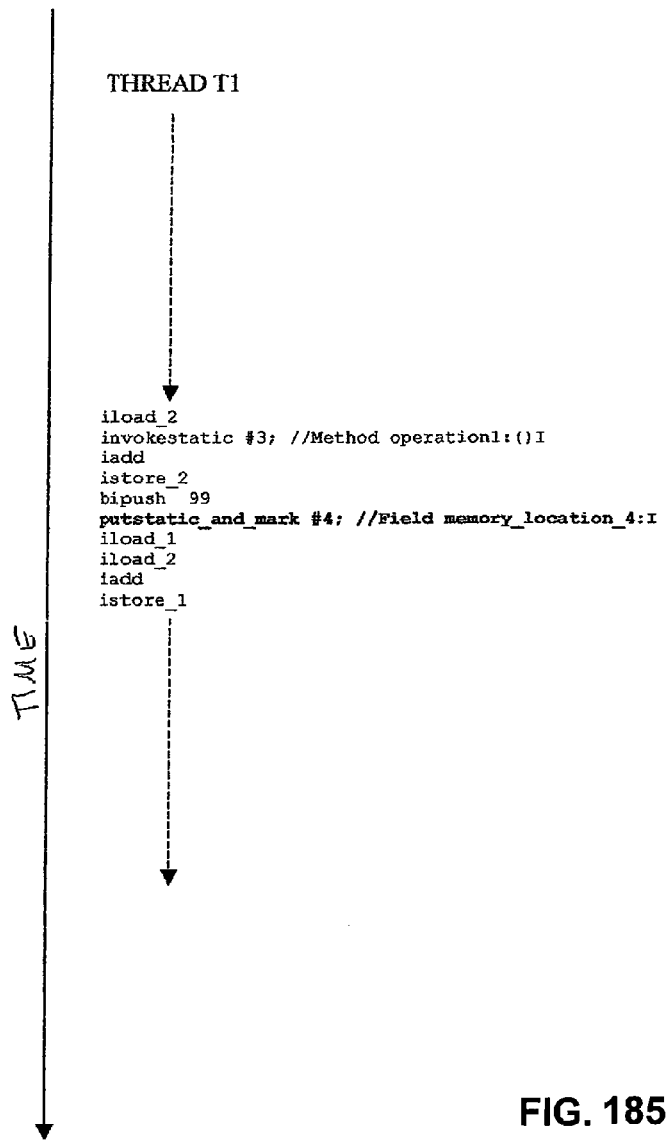

FIG. 185 is an illustrative diagram of the operations and progress of a single thread of execution T1, against the vertical indication of time from top to bottom for a case of the application program which has been modified in accordance with the methods of this invention to utilize a special "store-and-mark instruction" to record or mark written-to replicated memory locations as having been written or modified.

Figure 186:
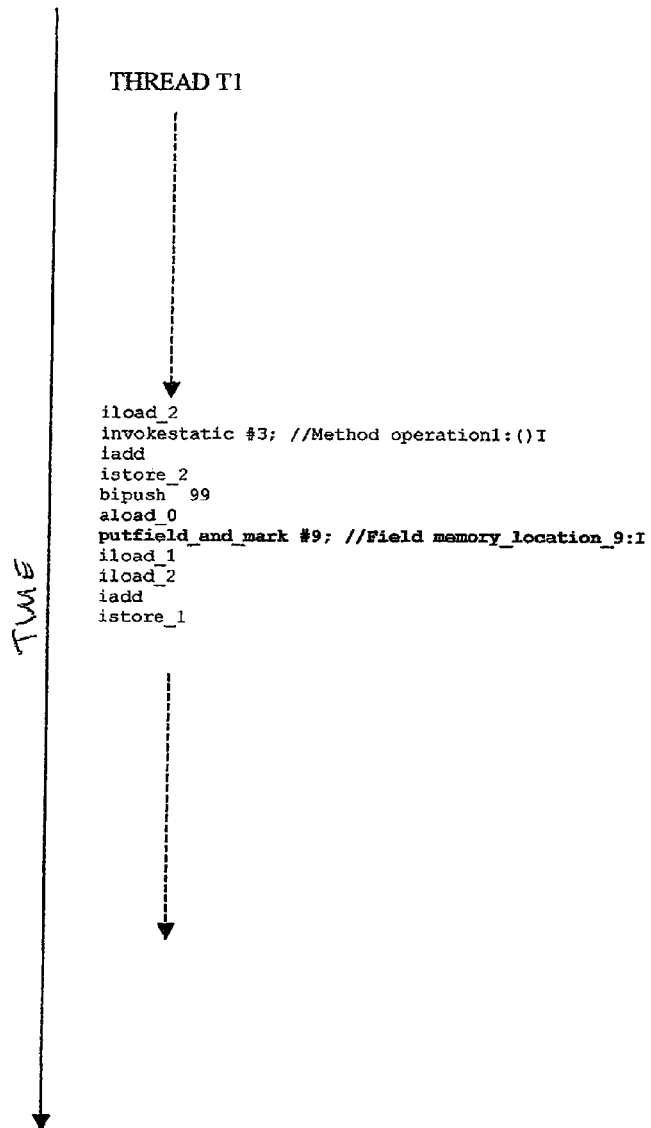

FIG. 186 shows a further example of a "store-and-mark instruction".

DETAILED DESCRIPTION OF EMBODIMENTS OF THE INVENTION

In one aspect, the present invention discloses a modified computer architecture which enables an applications program to be run simultaneously on a plurality of computers in a manner that overcomes the limitations of the aforedescribed conventional architectures, systems, methods, and computer programs.

In another aspect, the present invention discloses a redundant array of independent computer systems (RAIS) that incorporates a code-striping architecture and methodology.

These and other aspects and features of the invention are described below. Section headers and subheaders are provided for the convenience of the reader and it will be appreciated that features of embodiments of the invention are described throughout the specification, in the detailed description, and in the drawings. The headers and subheaders should therefore not be used to limit the scope of the invention or particular embodiments thereof.

The various embodiments, systems, structures, architectures, methods and procedures are enabling of architectures, systems, computers, and methods, as well as computer programs for establishing and operating a redundant array of independent computer systems (RAIS) and for providing code-striping amongst a plurality of computers and components within any one or subset of the computers or computing machines in a network of computers or computing machines.

Each patent application or specification of a patent application referenced herein is incorporated by reference in its entirety, including its specification, claims, drawings, and any appendicies that may be incorporated within or attached thereto. Furthermore, patent applications which may be referenced in or incorporated into those applications are also incorporated by reference herein.

Reference numbers in the figures may be specific to the figure so that the same reference number may represent different elements of different embodiments of the invention. In the event the need arises a two or three digit prefix may be added to the reference number in the text specification and on the figure corresponding to the figure number or other code to differentiate the elements or embodiments described herein.

I. Exemplary Embodiments of Redundant Array of Independent Systems and Code-Striping Embodiments of the present invention pertains generally to computers and other computing machines and information appliances having a modified computer architecture and program structure which enables the operation of an application program concurrently or simultaneously on a plurality of computers interconnected via a communications link or network using a special distributed runtime (DRT), and that provides for a redundant array of independent computing systems that include computer code distribution using code-striping onto the plurality of the computers or computing machines. The patent applications identified in the related applications section of this application, each of which are incorporated by reference, describes at least some of the features that enable redundant array and code-striping features to be implemented. Additional description of this redundant array of independent systems (RAIS) and of the code-striping features are described herein as well as descriptions of how features described in the earlier filed copending applications may be applied to these RAIS and code-striping features.

At a top-level, code-striping includes several aspects that are listed here and described in greater detail hereinafter. At one level, the inventive code-striping provides an arrangement of in-memory data on a plurality of machines and the methods and means of how that in-memory data is updated and manipulated. At another level, the inventive code-striping provides a procedure for distributing code and an arrangement of code on a plurality of machines and the methods and means of how that code is processed and utilized. The use of the term code-striping is used for convenience of simplified expression for a form of code distribution among a plurality of computers, even though in comparison to known data-striping, the structures, architectures, operation, and methodologies are different and unrelated.

The several aspects that contribute to successful code-striping include: (1) Memory Replication Across a Plurality of Computing Machines, (2) Updating Replicated Memory Locations with Modified Values or Content, (3) Satisfying All Memory Read and Write Operations Exclusively From Local Memory, and (4) Executable Code Of The Application Is Also Replicated On Each Machine. Other embodiments of the invention may provide for either or both of (5) Optional Update Contention Arbitration, and (6) Optional Synchronization of Updates. Each of these aspects is described in the paragraphs below as well as in the more detailed description to follow.

(1) Memory Replication Across a Plurality of Computing Machines

In one aspect, the inventive system and method provide for code-striping which in a general way relates to an arrangement of memory in a multiple or plural computer system where the plural computers are coupled by a communication link such as a network. The arrangement of memory more specifically relates to a memory replication arrangement spanning a plurality of machines.

In one embodiment, and in perhaps the simplest and general form though not the most efficient, all of memory (and stored memory content or value) is replicated in the local memory of all of the connected plurality of computing machines. This embodiment having a simple memory arrangement is depicted in the attached FIG. 5. In this embodiment, a plurality of computing machines (in this example, three computing machines) or more simply machines (M1, M2, . . . , Mn) each comprising a local CPU or processor 103 and a local memory 102. Local processor and local memory refer to processor and memory that are within the same computing machine, such as processor and memory within a typical personal computer or PC. Within memory 102 on each machine is indicated three "replicated memory locations", locations A, B, and C. Thus, memory location A on machine M1 is related to or corresponds to memory location A on machine M2, which is related to or corresponds to memory location A on machine Mn, and the like for other memory locations and other machines. Whenever any machine updates the content or value, or writes to, or otherwise modifies a local memory location—such as machine M2 updating the value of memory location B within the local memory of machine M2—then machine M2 must update the corresponding related replicated memory location B on the other machines, namely on machines M1 and Mn in this example.

Aspects of this memory arrangement are described in co-pending U.S. patent application Ser. No. 10/083,043 filed Apr. 23, 2004. This copending patent application also describes embodiments of a software modification method used to detect writing to memory locations and to then update corresponding replicated related or corresponding memory locations on other plurality of computing machines.

Figure 5:
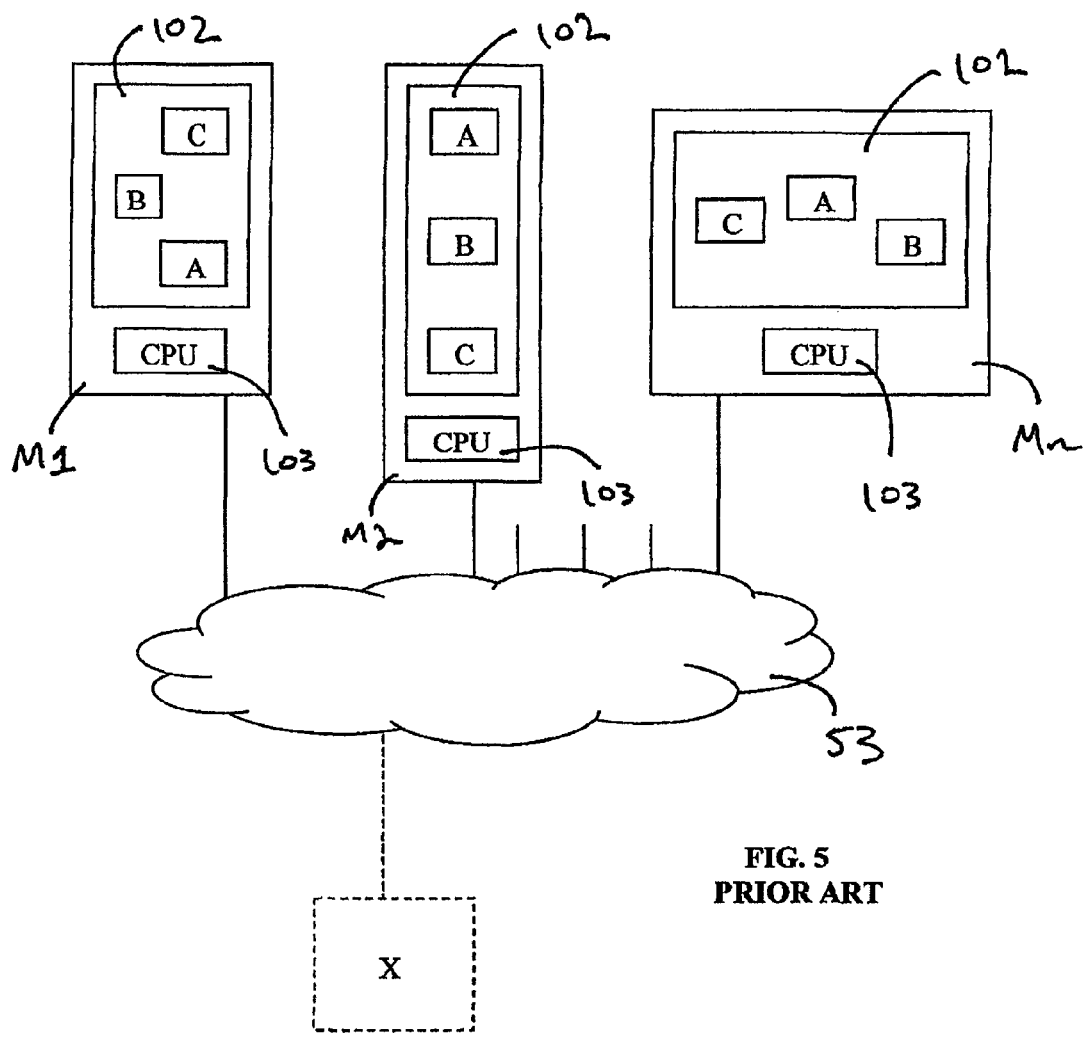
FIG. 5 is a drawing of a configuration having a simple memory arrangement.

It may be appreciated in light of the description provided here, that the depiction of the plurality of memory locations (here, three memory locations A, B, and C) of the embodiment illustrated in FIG. 5 are not representative of every single logical or physical memory location within the memory 102 of machines M1, M2, . . . , Mn. Instead, the scope of the replication of memory locations illustrated may be restricted to memory locations used by or allocated to a particular application program, or application code, or any other single logical memory space. In other words, there may be other memory locations within a memory of any particular computing machine which are not replicated across the plurality of computing machines and are not illustrated here. These memory locations may be used by operating system components, different application programs not executing across a plurality of machines, or even unused memory locations that are not being used or replicated. One non-limiting example, might for example be the case where different ones of the machines have different amounts of physical memory (e.g., RAM) so that even if all of the memory in a machine having the lowest amount of memory were to be replicated, a machine having a larger amount of memory would still include portions of its local memory that was not related to or did not correspond to memory in the lower memory machine.

It will also be apparent in light of the description provided here that the storage of memory locations A, B, and C on each of the three (or other plurality of) machines M1, M2, ..., M3 does not need to be identical. Instead, each machine may store its replicated memory locations of A, B, and C in any local arrangement, format, or mode such as is desirable or available for that specific machine, the only condition being that there exists a logical memory location corresponding to logical memory locations A, B, and C on the other machines, and further that the effective value or content (i.e. logical value used by the application program, not the strict value which may be different such as between two machines with one machine storing data in little-endian mode and the other machine storing data in big-endian mode) is similar—that is, so long as the effective value of a replicated memory location is identical between two machines (e.g., integer value "99" on both machines)—and there exists a method or means of relating or providing a correspondence between the two memory locations between the two or other plurality of machines, then the conditions of replication of a memory location are met.

Figure 6:
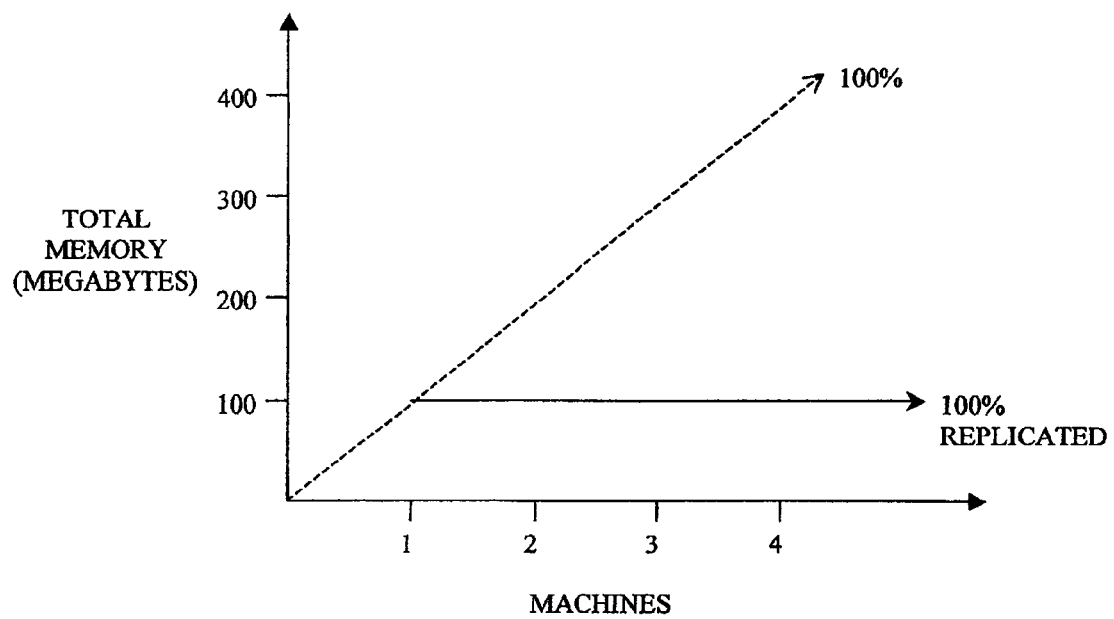
FIG. 6 is an illustration showing an aspect of the scalability of a 100% replicated memory model.

While the approach shown and described relative to the embodiment in FIG. 5 is workable, it is somewhat disadvantageous in that because since every memory location is replicated on all machines, the memory efficiency of replicating all of memory is low. FIG. 6 is an illustration showing an aspect of the scalability of a 100% replicated memory model. It may be noted that with the addition of each new computing machine and its associated coupled local memory, the total available memory across the plurality of computing machines does not increase, as each computing machine completely replicates the memory (or some region of memory) on the first machine.

Figure 7:
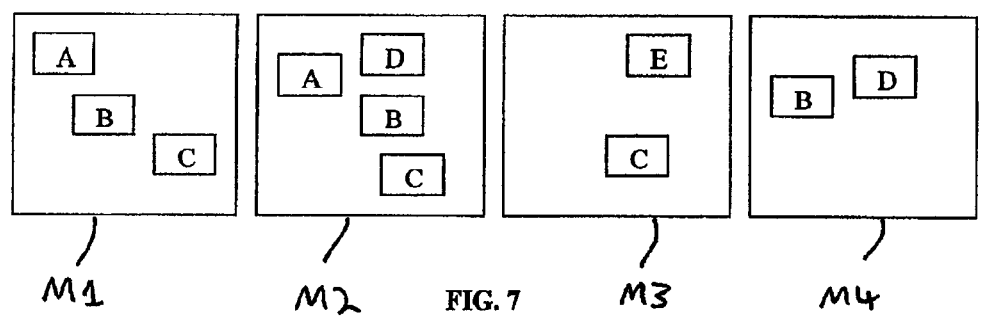
FIG. 7 is an illustration showing an alternative and more sophisticated embodiment that is more memory efficient.

FIG. 7 is an illustration showing an alternative and more sophisticated embodiment that is more memory efficient. In this embodiment, which is more likely to be implemented in a real-world system, only a subset of memory is selectively replicated on the different machines of the plurality of computing machines, where particular individual memory locations are replicated on individual machines according to which memory locations an individual machine can "reach".

This arrangement comes about by tracking the relationship between memory locations (such as by tracing memory pointers, references, handles, or the like) in order to construct a graph or map or other data structure of which memory locations direct to which other memory locations.

When an already replicated memory location points to another non-replicated memory location, it then becomes necessary to alter or upgrade that non-replicated memory location to a replicated memory location, as well as any other memory locations which the non-replicated memory location may in turn point to or reference. This newly upgraded non-replicated memory location is then replicated on the same machines as the replicated memory location which points to or references the previously non-replicated memory location. Aspects of this memory updating and changing from a non-replicated to a replicated memory location is described in co-pending U.S. Patent Application Ser. No. 60/730,543 filed Oct. 25, 2005. Aspects of this memory arrangement are described in co-pending U.S. patent application Ser. No. 10/083,043 filed Oct. 25, 2005. This copending patent application also describes embodiments of a software modification method used to detect writing to memory locations and to then update correcponding replicated related or corresponding memory location son other plurality of computing machines.

Thus, what results is a collection of "shared" memory locations which are replicated on some subset of all the plurality of computing machines such as shown in the embodiment of FIG. 7. One advantage of this system architecture and method is that (except for a limited number of niche cases), most of memory in any particular machine local memory and as a result in the set of computing machines is not shared. That is, most of memory isn't referenced or pointed to by an already replicated memory location, and therefore doesn't need to be replicated. The precise ratio between "replicated" and "non-replicated" memory on a given computing machine is variable and may be subject to the particulars of the application program or other factors, but as a general rule of thumb or guidance, for most real-world enterprise applications (transaction applications, application servers, and most other typical applications) the ratio between "replicated memory" and "non-replicated memory" has been found to be around about 20-30% replicated and 70-80% non-replicated for a 30:70 to 20:80 ratio. These ratios or percentages are not limitations of the invention or of particular embodiments of the invention, but merely empirical indicators of what might be expected in practice according to the described embodiment.

Figure 8:
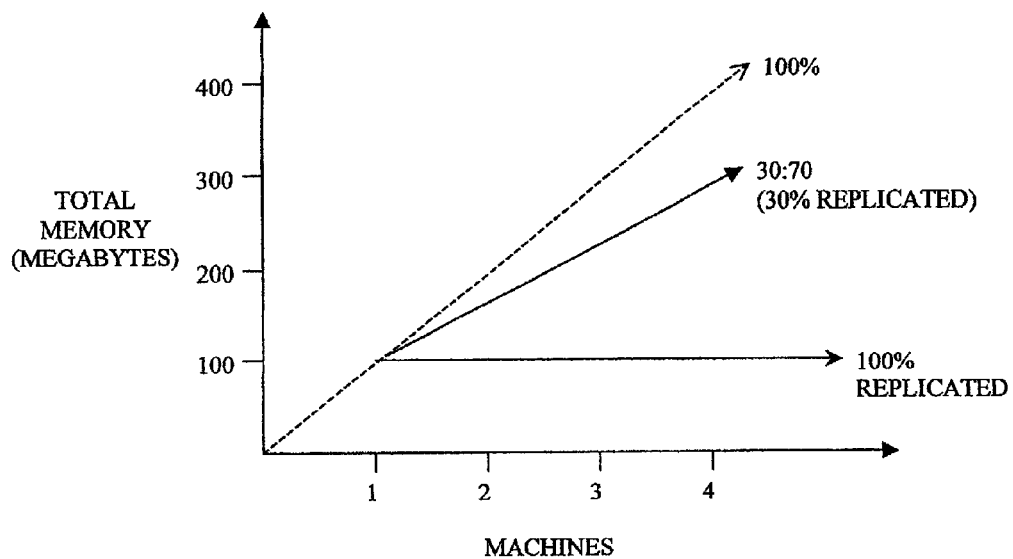
FIG. 8 is an illustration showing the 30:70 replication model with a scalability of approximately 75% on four machines, with zero scalability using an all-replicated memory model for the same case.

Therefore, when using this more sophisticated arrangement, where all of memory is not replicated, and when running applications, such as applications exhibiting the above 30:70 ratio, then the replication efficiency and scalability improves substantially for the partially-replicated memory case as compared to the all-replicated memory case. FIG. 8 is an illustration showing the 30:70 replication model with a scalability of approximately 75% on four machines, with zero scalability using an all-replicated memory model for the same case.

The scalability (for example the 75% scalability) may be calculated as follows, and it will be appreciated that other or alternative metrics for scalability may be adopted. The above 75% scalability factor is calculated as follows: for 4 machines each with 100 megabytes of memory, there exists a theoretical maximum aggregate memory of 400 megabytes (4×100 MB). In a 30:70 ratio replicated model, then 30% of the memory of each machine is allocated as replicated memory storing replicated memory values or other content, and the remaining 70% of memory is non-replicated memory unique to each machine. Therefore, for 4 machines, we apply the following formula: 4×70 MB (70 Megabytes being 70% of 100 MB)+30 MB (which is the single replicated memory block on all machines), which gives a result of "310 MB". This 310 Megabytes represents approximately 75% (actually 77.5%) of the total 400 MB of the 4 computing machines. Therefore, using this alternative and more sophisticated arrangement with partial replicated memory, a replicated memory system becomes more efficient, practical and feasible than a model having complete memory replication.

Embodiments of system, method, computing machines, and computer programs that address aspects of arrangement of memory in a multiple computer system and in members of such multiple computer system are described in co-pending U.S. patent applications Ser. Nos. 10/830,042 filed Apr. 23, 2004; 60/730,543 filed Oct. 25, 2005; 60/730,408 filed Oct. 25, 2005; 60/730,512 filed Oct. 25, 2005; 60/730,354 filed Oct. 25, 2005; 60/730,544 filed Oct. 25, 2005; 60/877,804 filed Dec. 29, 2006; 11/111/781 filed Apr. 22, 2005; and 11/111,778 filed apr. 22, 2005; each of which applications are incorporated herein by reference.

(2) Updating Replicated Memory Locations with Modified Values or Content

Several different alternative models have been described relative to defining replicated memory, including both complete memory replication and partial memory replication models and techniques. Regardless of which precise memory arrangement model or arrangement is used, every time a replicated memory location (replica) is written to (or at least if the value or content is altered from the prior value or content), its updated value needs to be transmitted by the machine that performed the updating to the other machines on which a replica of the written-to replicated memory location exists. It may be appreciated that if a memory location is updated because of a new computation or other operation, but the updated value or content is the same as the value or content that was previously stored, then there may be no need to actually communicate the update. For example, if a computation can generate either a "0" or a "1", and the prior value was a "1" and the new or updated value is also a "1" then such update may not be required but may optionally be performed.

Embodiments of system, method, computing machines, and computer programs that address aspects of updating replicated memory locations in a multiple computer system and in members of such multiple computer system are described in co-pending U.S. patent applications Ser. Nos. 10/830,042 filed Apr. 23, 2004, 60/877,865 filed Dec. 29, 2006, 61/008,469 filed Dec. 19, 2007, 60/850,502 filed Dec. 29, 2006, 60/877,796 filed Dec. 29, 2006, 60/878,173 filed Dec. 29, 2006, 60/730,543 filed Oct. 24, 2005, 60/730,408 filed Oct. 5, 2005, 60/730,512 filed Oct. 25, 2005, 60/730,354 filed Oct. 25, 2005, 60/730,544 filed Oct. 25, 2005, and 60/877,804 filed Dec. 29, 2006 each of which applications are incorporated herein by reference.

(3) Satisfying all Memory Read and Write Operations Exclusively from Local Memory As a result of the afore described memory arrangement and replicated memory updating, unlike conventional distributed shared memory (DSM) prior art, all memory reads and writes performed according to the inventive method are satisfied exclusively by accesses (read or write) to local memory. That is, no machine needs to (nor does it) access local memory resident in another different machine, instead it may only access its local replica memory location(s) which are updated to remain consistent or substantially consistent where the updating may be performed in due course prior to a need to use the updated value or content. Recall that consistency may not always require an identical content or value, particularly where the machines may be executing in different environments and equivalent values or content may be required to be stored in a different form or format. (There is an exception though, where replication of memory onto a new machine may be delayed or stalled until it is first requested or used by the new machine—even though the "reach" algorithm of replication above has determined that the memory location is "reached by" the new machine, actually copying of data to the new machine may be delayed or stalled. And a similar exceptional case is, a machine which does have a local replica of a replicated memory location may delete the memory of its replica even though it still able to "reach" the replicated memory location. Both of these are minor exceptions to the rule though, and for the vast majority of cases memory is replicated as described above.)

Embodiments of system, method, computing machines, and computer programs that address aspects of satisfying all memory reads and writes for application programs executing on a multiple computer system exclusively by local memory are described in co-pending U.S. patent applications Ser. No. 10/830,042 filed Apr. 23, 2004; each of which application is incorporated herein by reference.

(4) Executable Code of the Application is Also Replicated on Each Machine

In another aspect, the executable code of the application (as opposed to the application in memory data describe above) is also replicated on each of the plurality of computing machines. As for non-executable data, each machine may in a non-limiting embodiment only load executable code into memory that it needs at the time it needs it, rather than for example loading all of the executable code in advance of needing it or maintaining already executed code in memory after it has been executed. Therefore memory space and computational resources are not wasted storing portions of executable code of an application program that a given machine doesn't need or use. Where portions of large application programs are to be executed on different machines, the different machines may only need to store in memory the portion that they are responsible for executing.

Embodiments of system, method, computing machines, and computer programs that address aspects of arrangement of memory in a multiple computer system and in members of such multiple computer system are described in co-pending U.S. patent application Ser. Nos. 0/830,042 filed Apr. 23, 2004; 60/877,865 filed Dec. 29, 2006; 61/008,496 filed Dec. 19, 2007; 60/850,502 filed Dec. 29, 2006; 60/877,796 filed Dec. 29, 2006; 60/878,173 filed Dec. 29, 2006; 60/730,543 filed Oct. 25, 2005; 60/730,408 filed Oct. 5, 2005; 60/730,512 filed Oct. 25, 2005; 60/730,354 filed Oct. 25, 2005; 60/730,544 filed Oct. 25, 2005; and 60/877,804 filed Dec. 29, 2006; each of which applications are incorporated herein by reference.

(5) Optional Update Contention Arbitration

Co-pending U.S. Patent Application Ser. Nos. 60/850,541 filed Oct. 9, 2006; 60/850,449 filed Oct. 9, 2006; 60/850,717 filed Oct. 9, 2006; 60/850,715 filed Oct. 9, 2006; 60/850,540 filed Oct. 9, 2006; 60/850,521 filed Oct. 9, 2006; and 60/850,711 filed Oct. 9, 2006 include descriptions of various embodiments that pertain at least in part to contention between two or more of the computing machines, and each of which applications are hereby incorporated by reference. These patent applications describe various structures, means, methods, and procedures that allow ones or the plurality computing machines (which may represent peer machines) to update the same replicated memory locations concurrently and resolve any conflicts or inconsistencies that might arise. The use of these contention detection and resolution techniques is preferred and provides advantages including greater efficiency, though there may be other conventional structures and techniques that though less advantageous may be adopted to provide a measure of contention arbitration and control. It may be appreciate that the greater efficiency may in at least some embodiments, provide such additional efficiency and other advantages as to make practically possible implementations of replicated shared memory (RSM) that might not otherwise be commercially acceptable or practical. However, such contention techniques as are described here and in the above referenced co-pending application are not requires in at least some embodiments of the invention.

Embodiments of system, method, computing machines, and computer programs that address aspects of contention and arbitrating and resolving such contention than may arise in a multiple computer system having replicated memory location updating are described in co-pending U.S. Patent Application Ser. Nos. 60/850,541 filed Oct. 9, 2006; 60/850,449 filed Oct. 9, 2006; 60/850,717 filed Oct. 9, 2006; 60/850,715 Oct. 9, 2006; 60/850,540 filed Oct. 9, 2006; 60/850,521 filed Oct. 9, 2006; and 60/850,711 filed Oct. 9, 2006; each of which applications are incorporated herein by reference.

(6) Optional Synchronization of Updates

The inventive system and method may optionally provide for synchronization of the update to replicated memory locations. Embodiments of system, method, computing machines, and computer programs that address aspects of synchronization of replicated memory that may arise in a multiple computer system having replicated memory and replicated memory location updating are described in co-pending U.S. Patent Application Ser. Nos. 60/730,493 filed Oct. 25, 2005 and 60/730,303 filed Oct. 25, 2005; each of which applications are incorporated herein by reference.

Other of the related applications describe various aspects of application code and software-morphing which describe architectures, structures, and methods by which we re-architecture or modify a computer application program to be able it or them to operate in a replicated memory model.

II. Embodiment of Computer Architecture and Method of Operation for Multi-Computer Distributed Processing with Replicated Memory Co-pending U.S. Patent Application Attorney Ser. No. 10/083,043 describes a Computer Architecture And Method Of Operation For Multi-Computer Distributed Processing With Replicated Memory.

In one aspect, shared memory at each computer may be updated with amendments and/or overwrites so that all memory read requests are satisfied locally. Before, during or after program loading, but before execution of relevant portions of the program code are executed, or similar, instructions which result in memory being re-written or manipulated are identified. Additional instructions are inserted into the program code (or other modification made) to cause the equivalent memory locations at all computers to be updated. While the invention is not limited to JAVA language or virtual machines, exemplary embodiments are described relative to the JAVA language and standards.

In another aspect, the initialization of JAVA language classes and objects (or other assets) are provided for so all memory locations for all computers are initialized in the same manner. In another aspect, the finalisation of JAVA language classes and objects is also provide so finalisation only occurs when the last class or object present on all machines is no longer required. In still another aspect, synchronization is provided such that instructions which result in the application program acquiring (or releasing) a lock on a particular asset (synchronization) is identified. Additional instructions are inserted (or other code modifications performed) to result in a modified synchronization routine with which all computers are updated.

As will become more apparent in light of the further description provided herein, one of the features of the invention is to make it appear that one common application program or application code and its executable version (with likely modification) is simultaneously or concurrently executing across a plurality of computers or machines M1, . . . , Mn. As will be described in considerable detail hereinafter, the instant invention achieves this by running the same application program (for example, Microsoft Word or Adobe Photoshop CS2) on each machine, but modifying the executable code of that application program on each machine as necessary such that each executing instance ('copy') on each machine coordinates its local operations on any particular machine with the operations of the respective instances on the other machines such that they all function together in a consistent, coherent and coordinated manner and give the appearance of being one global instance of the application (i.e., a "meta-application").

In accordance with embodiments of the present invention a single application code 50 (sometimes more informally referred to as the application or the application program) can be operated simultaneously on a number of machines M1, M2 . . . Mn interconnected via a communications network or other communications link or path 53. The communications network or path may be any electronic signaling, data, or digital communications network or path and may advantageously be a relatively slow speed communications path, such as a network connection over the Internet or any common networking configurations known or available as of the date or this applications, and extensions and improvements, thereto.

By way of example but not limitation, one application code or program 50 may be a single application on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one" application code or program and a "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, and with some restrictions after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 (in some embodiments implemented as a distributed run time or DRT 71) on each machine M1, M2, . . . , Mn and thus all of the machines M1, M2 . . . Mn have the same (or substantially the same or similar) modifier 51 for each modification required. Different modification for example may be required for memory management and replication, initialization, finalisation, and/or synchronization (though not all of these modification types may be required for all embodiments).

In addition, during the loading of, or at any time preceding the execution of, the application code 50 (or relevant portion thereof) on each machine M1, M2 . . . Mn, each application code 50 has been modified by the corresponding modifier 51 according to the same rules (or substantially the same rules since minor optimizing changes are permitted within each modifier 51/1, 51/2, . . . , 51/n).

With specific reference to any memory management modifier that may be provided, such memory management modifier 51-M or DRT 71-M or other code modifying means component of the overall modifier or distributed run time means is responsible for creating or replicating a memory structure and contents on each of the individual machines M1, M2 . . . Mn that permits the plurality of machines to interoperate. In some embodiments this replicated memory structure will be identical, in other embodiments this memory structure will have portions that are identical and other portions that are not, and in still other embodiments the memory structures are or may not be identical.

These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Attention is now directed to the particulars of several aspects of the invention that may be utilised alone or in any combination.

Figure 9:
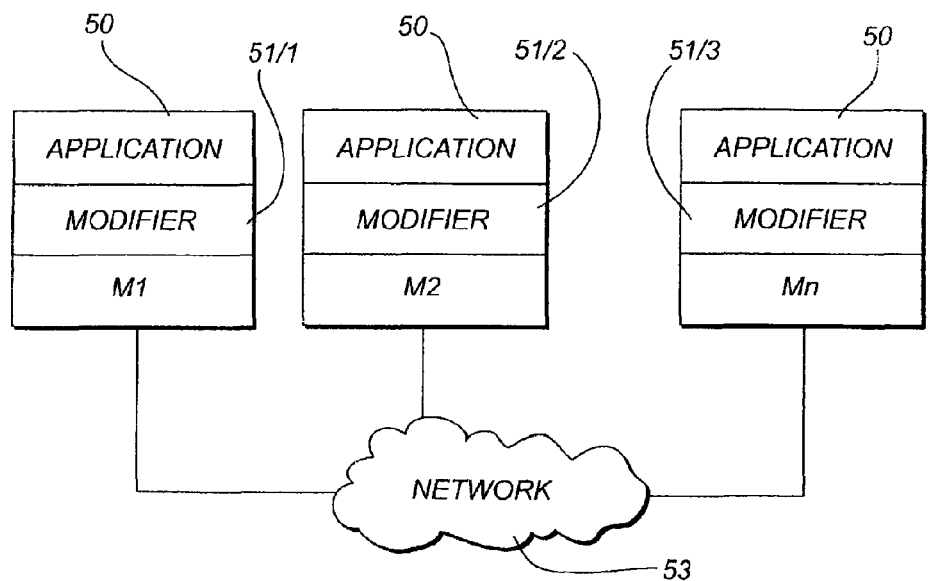
FIG. 9 is a schematic block diagram of a plurality of machines operating the same application program in accordance with a first embodiment of the present invention.

In connection with FIG. 9, in accordance with a preferred embodiment of the present invention a single application code 50 (sometimes more informally referred to as the application or the application program) can be operated simultaneously on a number of machines M1, M2 . . . Mn interconnected via a communications network or other communications link or path 53. By way of example but not limitation, one application code or program 50 would be a single common application program on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one", "single", and "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, or after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 on each machine M1, M2, . . . , Mn and thus all of the machines M1, M2 . . . Mn have the same (or substantially the same or similar) modifier 51 with the modifier of machine M1 being designated 51/1 and the modifier of machine M2 being designated 51/2, etc. In addition, before or during the loading of, or preceding the execution of, or even after execution has commenced, the application code 50 on each machine M1, M2 . . . Mn is modified by the corresponding modifier 51 according to the same rules (or substantially the same rules since minor optimizing changes are permitted within each modifier 51/1, 51/2, . . . , 51/n).

As will become more apparent in light of the further description provided herein, one of the features of the invention is to make it appear that one application program instance of application code 50 is executing simultaneously across all of the plurality of machines M1, M2, . . . , Mn. As will be described in considerable detail hereinafter, the instant invention achieves this by running the same application program code (for example, Microsoft Word or Adobe Photoshop CS2) on each machine, but modifying the executable code of that application program on each machine such that each executing occurrence (or 'local instance') on each one of the machines M1 . . . Mn coordinates its local operations with the operations of the respective occurrences on each one of the other machines such that each occurrence on each one of the plurality of machines function together in a consistent, coherent and coordinated manner so as to give the appearance of being one global instance (or occurrence) of the application program and program code (i.e., a "meta-application").

As a consequence of the above described arrangement, if each of the machines M1, M2, . . . , Mn has, say, an internal memory capability of 10 MB, then the total memory available to each application code 50 is not necessarily, as one might expect the number of machines (n) times 10 MB, or alternatively the additive combination of the internal memory capability of all n machines, but rather or still may only be 10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as a 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn is normally approximately equal but need not be. It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation of the invention.

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 10.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 10 is modified in accordance with embodiments of the present invention by the provision of an additional facility which is conveniently termed a "distributed run time" or a "distributed run time system" DRT 71 and as seen in FIG. 11.

In FIG. 11 and FIG. 12, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 12. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine or operating environment.

FIG. 12 shows in modified form the arrangement of the JAVA virtual machines, each as illustrated in FIG. 11. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing embodiments of the invention may optionally be connected to or coupled with other computers, machines, information appliances, or the like that do not implement embodiments of the invention.

Essentially in at least one embodiment the modifier 51 or DRT 71 or other code modifying means is responsible for modifying the application code 50 so that it may execute memory manipulation operations, such as memory putstatic and putfield instructions in the JAVA language and virtual machine environment, in a coordinated, consistent, and coherent manner across and between the plurality of individual machines M1 . . . Mn. It follows therefore that in such a computing environment it is necessary to ensure that each of memory location is manipulated in a consistent fashion (with respect to the others).

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

A machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT71 and in other embodiments implemented as an adjunct to the application code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalisation, and/or for synchronization (though not all of these modification types may be required for all embodiments).

There are alternative implementations of the modifier 51 and the distributed run time 71. For example, as indicated by broken lines in FIG. 12, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial to the invention.

However, in the arrangement illustrated in FIG. 12, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (e.g., dual or multiple core processors and/or chip multithreading processors) manufactured by Intel, AMD, or others, or implemented on a single printed circuit board or even within a single chip or chip set. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions.

These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one embodiment, the analysis or scrutiny of the application code 50 takes place during the loading of the application program code such as by the operating system reading the application code 50 from the hard disk or other storage device, medium or source and copying it into memory and preparing to begin execution of the application program code. In another embodiment, in a JAVA virtual machine, the analysis or scrutiny may take place during the class loading procedure of the java.lang.ClassLoader.loadClass method (e.g., "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some embodiments this replicated memory structure will be identical. Whilst in other embodiments this memory structure will have portions that are identical and other portions that are not. In still other embodiments the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The invention is transport, network, and communications path independent, and does not depend on how the communication between machines or DRTs takes place. In one embodiment, even electronic mail (email) exchanges between machines or DRTs may suffice for the communications.

Figure 13:
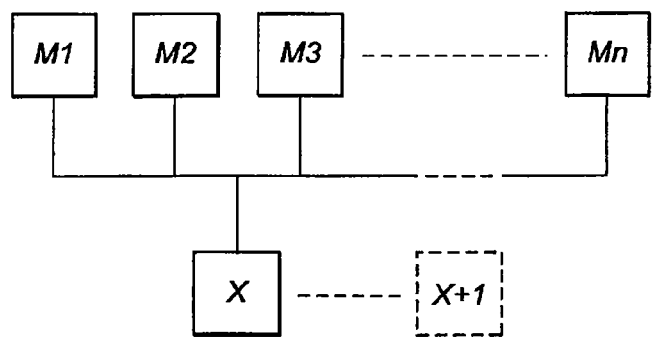
FIG. 13 schematically illustrates "n" application running computers to which at least one additional server machine X is connected as a server.

In connection with the above, it will be seen from FIG. 13 that there are a number of machines M1, M2, . . . , Mn, "n" being an integer greater than or equal to two, on which the application program 50 of FIG. 12 is being run substantially simultaneously. These machines are allocated a number 1, 2, 3, . . . , etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the present invention, if desired. However, this would result in generally undesirable complexity. If the machine X is not provided then its functions, such as housekeeping functions, are provided by one, or some, or all of the other machines.

Figure 15:
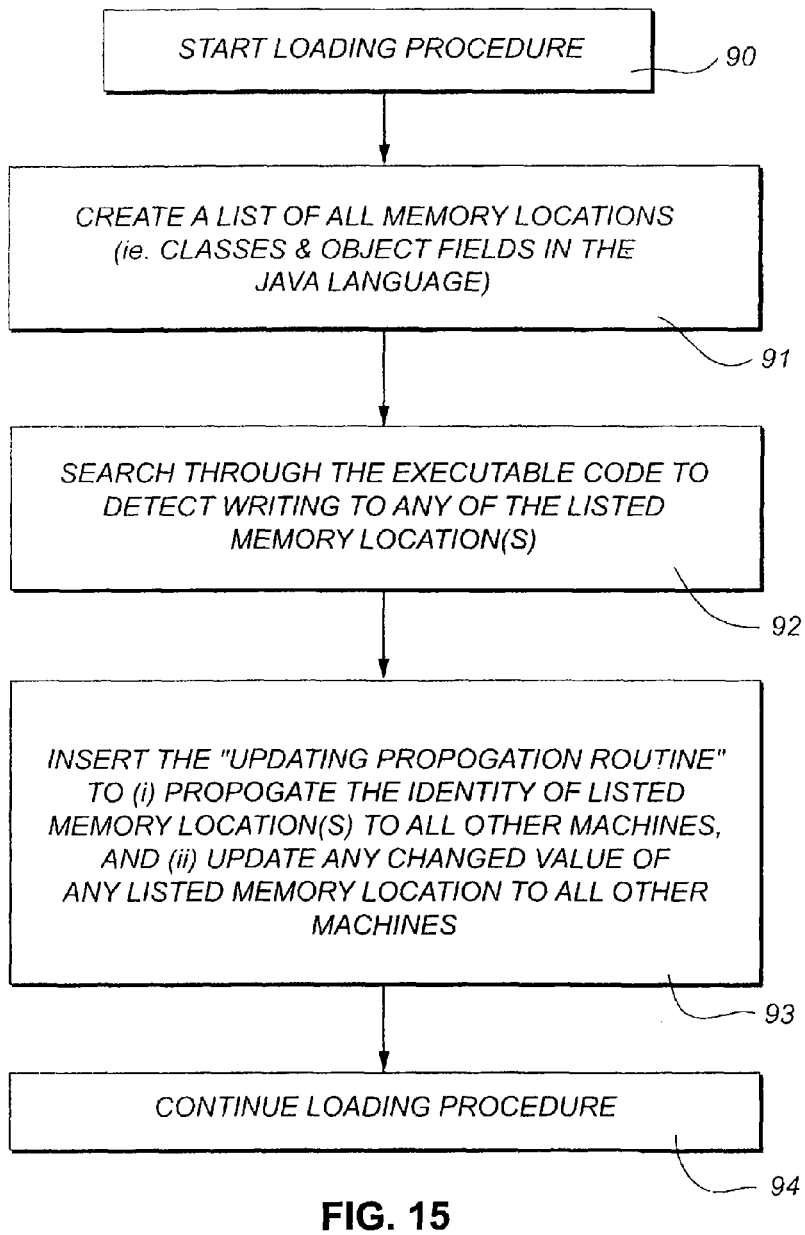
FIG. 15 is a flow chart of the procedure followed during loading of the same application on each machine in the network.

Turning now to FIG. 15, during the loading procedure 75, the application code 50 being loaded onto or into each JAVA virtual machine 72 is modified by DRT 71. This modification commences at Step 90 in FIG. 15 and involves the initial step 91 of preferably scrutinizing or analysing the code and detecting all memory locations addressable by the application code 50, or optionally some subset of all memory locations addressable by the application code 50; such as for example named and unnamed memory locations, variables (such as local variables, global variables, and formal arguments to subroutines or functions), fields, registers, or any other address space or range of addresses which application code 50 may access. Such memory locations in some instances need to be identified for subsequent processing at steps 92 and 93. In some embodiments, where a list of detected memory locations is required for further processing, the DRT 71 during the loading procedure 75 creates a list of all the memory locations thus identified. In one embodiment, the memory locations in the form of JAVA fields are listed by object and class, however, the memory locations, fields, or the like may be listed or organized in any manner so long as they comport with the architectural and programming requirements of the system on which the program is to be used and the principles of the invention described herein. This detection is optional and not required in all embodiments of the invention. It may be noted that the DRT is at least in part fulfilling the roll of the modifier 51.

The next phase (designated Step 92 in FIG. 15) [Step 92] of the modification procedure is to search through the application code 50 in order to locate processing activity or activities that manipulate or change values or contents of any listed memory location (for example, but not limited to JAVA fields) corresponding to the list generated at step 91 when required. Preferably, all processing activities that manipulate or change any one or more values or contents of any one or more listed memory locations, are located.

When such a processing activity or operation (typically "putstatic" or "putfield" in the JAVA language, or for example, a memory assignment operation, or a memory write operation, or a memory manipulation operation, or more generally operations that otherwise manipulate or change value(s) or content(s) of memory or other addressable areas), is detected which changes the value or content of a listed or detected memory location, then an "updating propagation routine" is inserted by step 93 in the application code 50 corresponding to the detected memory manipulation operation, to communicate with all other machines in order to notify all other machines of the identity of the manipulated memory location, and the updated, manipulated or changed value(s) or content(s) of the manipulated memory location. The inserted "updating propagation routine" preferably takes the form of a method, function, procedure, or similar subroutine call or operation to a network communications library of DRT 71. Alternatively, the "updating propagation routine" may take the optional form of a code-block (or other inline code form) inserted into the application code instruction stream at, after, before, or otherwise corresponding to the detected manipulation instruction or operation. And preferably, in a multi-tasking or parallel processing machine environment (and in some embodiments inclusive or exclusive of operating system), such as a machine environment capable of potentially simultaneous or concurrent execution of multiple or different threads or processes, the "updating propagation routine" may execute on the same thread or process or processor as the detected memory manipulation operation of step 92. Thereafter, the loading procedure continues, by loading the modified application code 50 on the machine 72 in place of the unmodified application code 50, as indicated by step 94 in FIG. 15.

Figure 16:
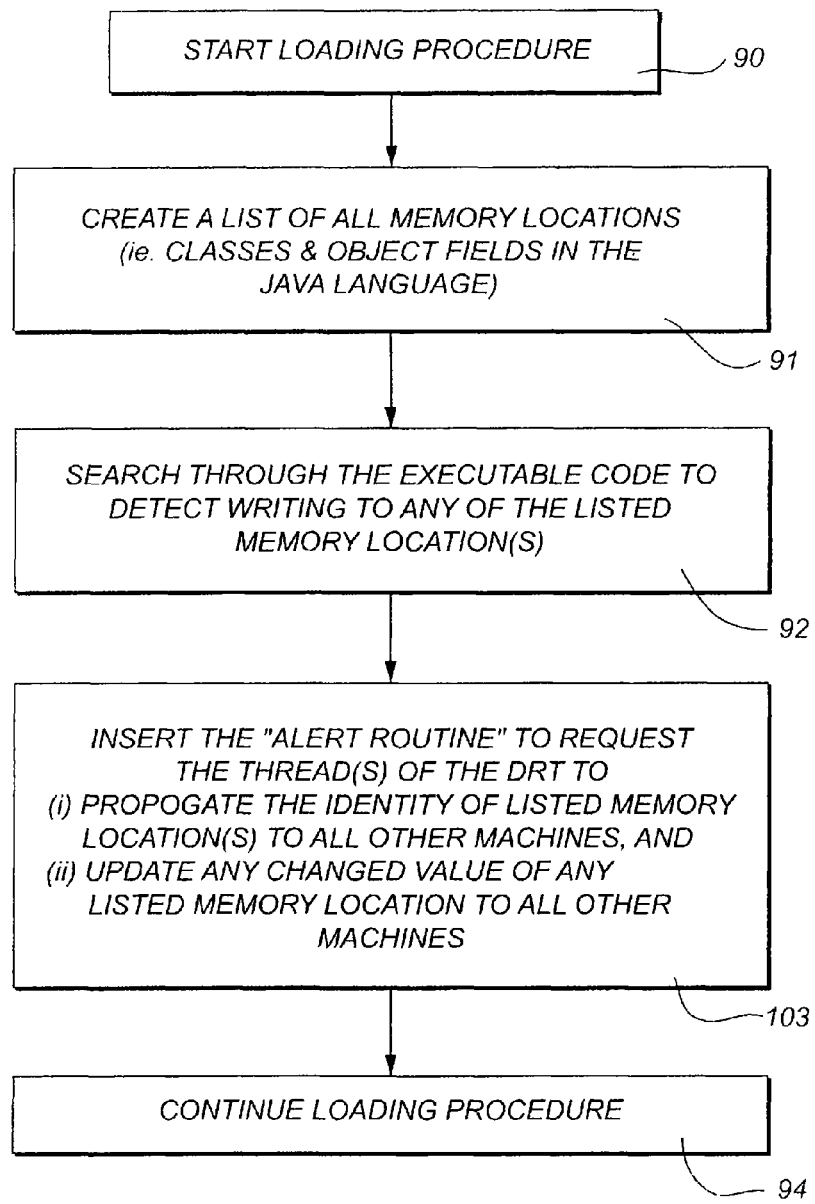
FIG. 16 is a flow chart showing a modified procedure similar to that of FIG. 15.

An alternative form of modification during loading is illustrated in the illustration of FIG. 16. Here the start and listing steps 90 and 91 and the searching step 92 are the same as in FIG. 15. However, rather than insert the "updating propagation routine" into the application code 50 corresponding to the detected memory manipulation operation identified in step 92, as is indicated in step 93, in which the application code 50, or network communications library code 71 of the DRT executing on the same thread or process or processor as the detected memory manipulation operation, carries out the updating, instead an "alert routine" is inserted corresponding to the detected memory manipulation operation, at step 103. The "alert routine" instructs, notifies or otherwise requests a different and potentially simultaneously or concurrently executing thread or process or processor not used to perform the memory manipulation operation (that is, a different thread or process or processor than the thread or process or processor which manipulated the memory location), such as a different thread or process allocated to the DRT 71, to carry out the notification, propagation, or communication of all other machines of the identity of the manipulated memory location, and the updated, manipulated or changed value(s) or content(s) of the manipulated memory location.

Figure 17:
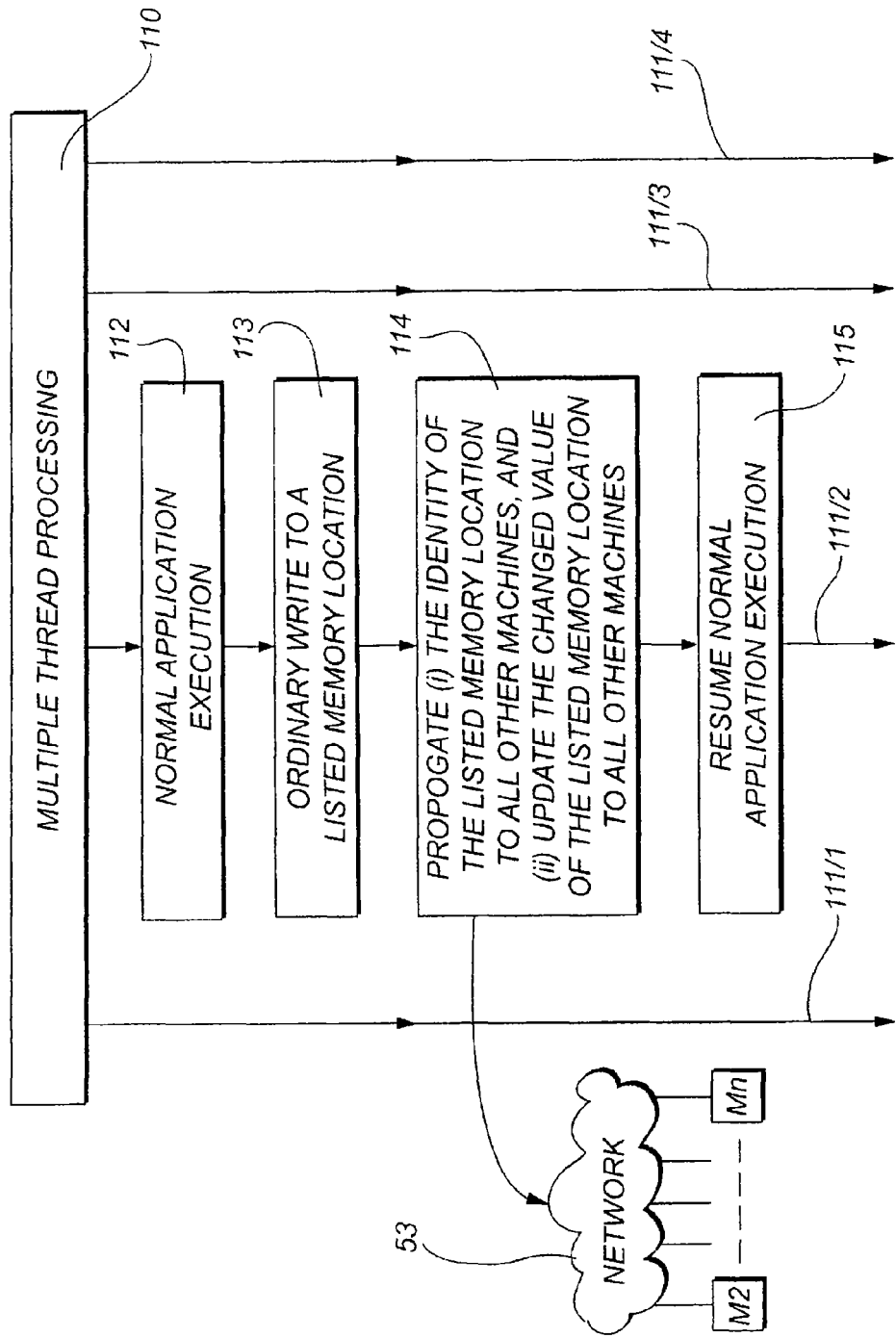
FIG. 17 is a schematic representation of multiple thread processing carried out on the machines of FIG. 14 utilizing a first embodiment of memory updating.
Figure 18:
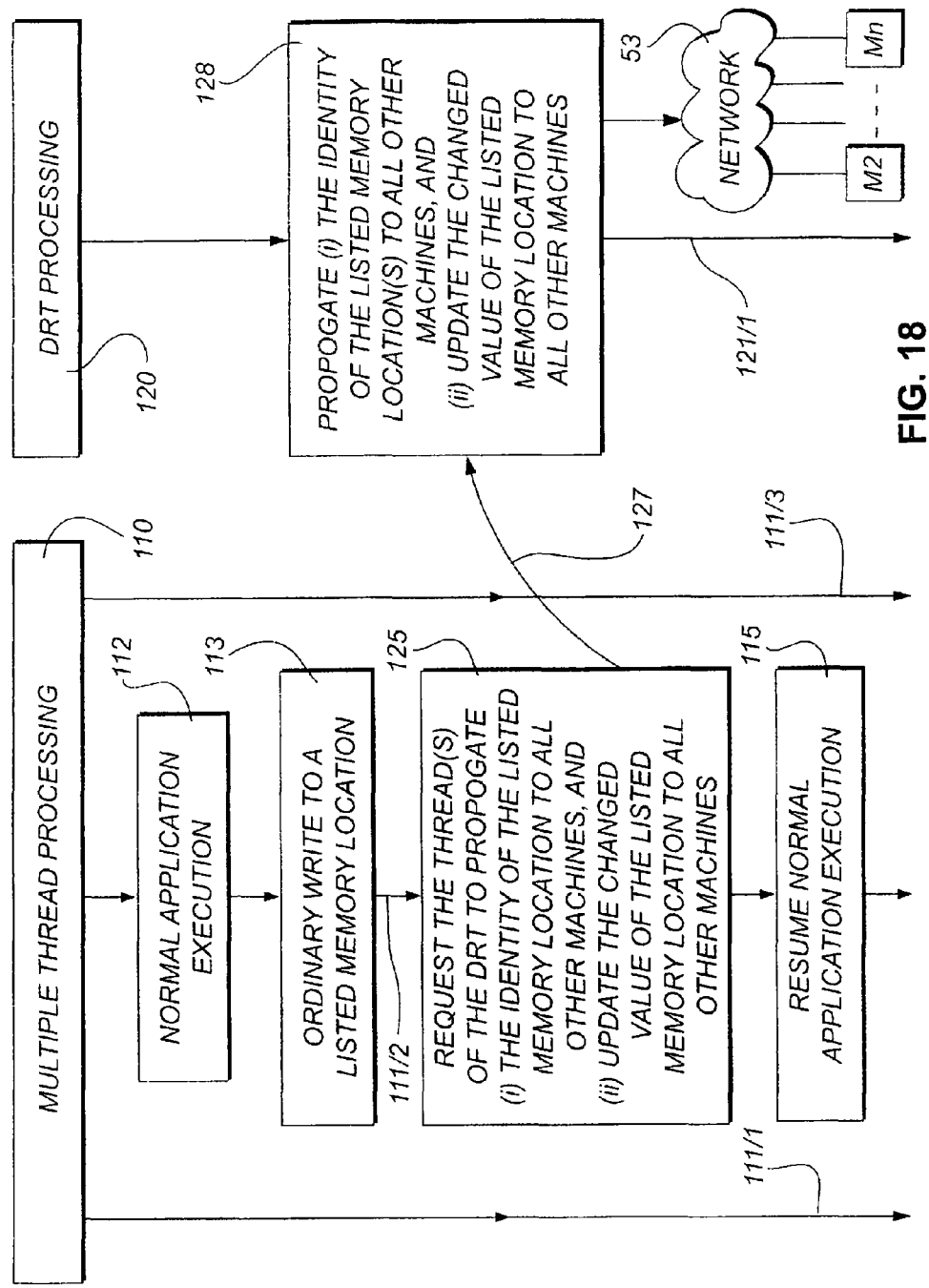
FIG. 18 is a schematic representation similar to FIG. 17 but illustrating an alternative embodiment.

Once this modification during the loading procedure has taken place and execution begins of the modified application code 50, then either the steps of FIG. 17 or FIG. 18 take place. FIG. 17 (and the steps 112, 113, 114, and 115 therein) correspond to the execution and operation of the modified application code 50 when modified in accordance with the procedures set forth in and described relative to FIG. 15. FIG. 18 on the other hand (and the steps 112, 113, 125, 127, and 115 therein) set forth therein correspond to the execution and operation of the modified application code 50 when modified in accordance with FIG. 16.

This analysis or scrutiny of the application code 50 may take place either prior to loading the application program code 50, or during the application program code 50 loading procedure, or even after the application program code 50 loading procedure. It may be likened to an instrumentation, program transformation, translation, or compilation procedure in that the application code may be instrumented with additional instructions, and/or otherwise modified by meaning-preserving program manipulations, and/or optionally translated from an input code language to a different code language (such as for example from source-code language or intermediate-code language to object-code language or machine-code language), and with the understanding that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary-code languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.ClassLoader loadClass method (e.g., "java.lang.ClassLoader.loadClass( )").

Alternatively, the analysis or scrutiny of the application code 50 may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

As seen in FIG. 17, a multiple thread processing machine environment 110, on each one of the machines M1, . . . , Mn and consisting of threads 111/1 . . . 111/4 exists. The processing and execution of the second thread 111/2 (in this example) results in that thread 111/2 manipulating a memory location at step 113, by writing to a listed memory location. In accordance with the modifications made to the application code 50 in the steps 90-94 of FIG. 15, the application code 50 is modified at a point corresponding to the write to the memory location of step 113, so that it propagates, notifies, or communicates the identity and changed value of the manipulated memory location of step 113 to the other machines M2, . . . , Mn via network 53 or other communication link or path, as indicated at step 114. At this stage the processing of the application code 50 of that thread 111/2 is or may be altered and in some instances interrupted at step 114 by the executing of the inserted "updating propagation routine", and the same thread 111/2 notifies, or propagates, or communicates to all other machines M2, . . . , Mn via the network 53 or other communications link or path of the identity and changed value of the manipulated memory location of step 113. At the end of that notification, or propagation, or communication procedure 114, the thread 111/2 then resumes or continues the processing or the execution of the modified application code 50 at step 115.

In the alternative arrangement illustrated in FIG. 18, a multiple thread processing machine environment 110 comprising or consisting of threads 111/1, . . . 111/3, and a simultaneously or concurrently executing DRT processing environment 120 consisting of the thread 121/1 as illustrated, or optionally a plurality of threads, is executing on each one of the machines M1, . . . Mn. The processing and execution of the modified application code 50 on thread 111/2 results in a memory manipulation operation of step 113, which in this instance is a write to a listed memory location. In accordance with the modifications made to the application code 50 in the steps 90, 91, 92, 103, and 94 of FIG. 15, the application code 50 is modified at a point corresponding to the write to the memory location of step 113, so that it requests or otherwise notifies the threads of the DRT processing environment 120 to notify, or propagate, or communicate to the other machines M2, . . . , Mn of the identity and changed value of the manipulated memory location of step 113, as indicated at steps 125 and 128 and arrow 127. In accordance with this modification, the thread 111/2 processing and executing the modified application code 50 requests a different and potentially simultaneously or concurrently executing thread or process (such as thread 121/1) of the DRT processing environment 120 to notify the machines M2, . . . , Mn via network 53 or other communications link or path of the identity and changed value of the manipulated memory location of step 113, as indicated in step 125 and arrow 127. In response to this request of step 125 and arrow 127, a different and potentially simultaneously or concurrently executing thread or process 121/1 of the DRT processing environment 120 notifies the machines M2, . . . , Mn via network 53 or other communications link or path of the identity and changed value of the manipulated memory location of step 113, as requested of it by the modified application code 50 executing on thread 111/2 of step 125 and arrow 127.

Figure 1:
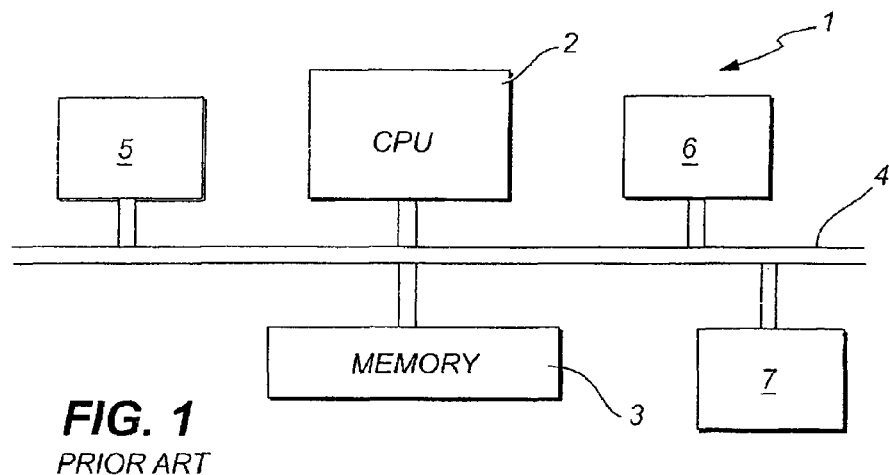
FIG. 1 is a schematic view of the internal architecture of a conventional computer.

When compared to the earlier described step 114 of thread 111/2 of FIG. 17, step 125 of thread 111/2 of FIG. 18 can be carried out quickly, because step 114 of thread 111/2 must notify and communicate with machines M2, . . . , Mn via the relatively slow network 53 (relatively slow for example when compared to the internal memory bus 4 of FIG. 1 or the global memory 13 of) of the identity and changed value of the manipulated memory location of step 113, whereas step 125 of thread 111/2 does not communicate with machines M2, . . . , Mn via the relatively slow network 53. Instead, step 125 of thread 111/2 requests or otherwise notifies a different and potentially simultaneously or concurrently executing thread 121/1 of the DRT processing environment 120 to perform the notification and communication with machines M2, . . . , Mn via the relatively slow network 53 of the identify and changed value of the manipulated memory location of step 113, as indicated by arrow 127. Thus thread 111/2 carrying out step 125 is only interrupted momentarily before the thread 111/2 resumes or continues processing or execution of modified application code in step 115. The other thread 121/1 of the DRT processing environment 120 then communicates the identity and changed value of the manipulated memory location of step 113 to machines M2, . . . , Mn via the relatively slow network 53 or other relatively slow communications link or path.

This second arrangement of FIG. 18 makes better utilisation of the processing power of the various threads 111/1 . . . 111/3 and 121/1 (which are not, in general, subject to equal demands). Irrespective of which arrangement is used, the identity and change value of the manipulated memory location(s) of step 113 is (are) propagated to all the other machines M2 . . . Mn on the network 53 or other communications link or path.

Figure 19:
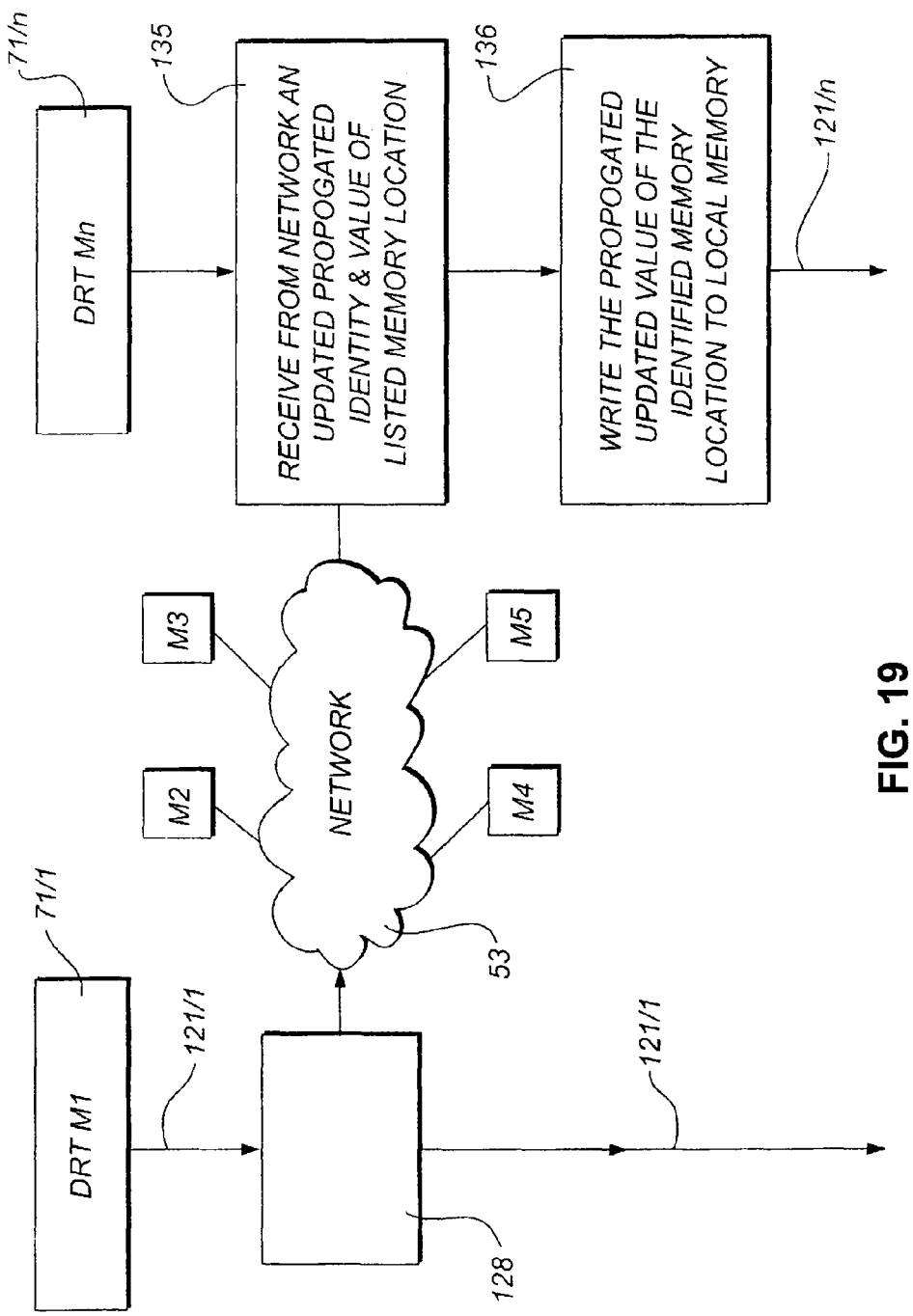
FIG. 19 illustrates multi-thread memory updating for a set of computers.

This is illustrated in FIG. 19 where step 114 of FIG. 17, or the DRT 71/1 (corresponding to the DRT processing environment 120 of FIG. 18) and its thread 121/1 of FIG. 18 (represented by step 128 in FIG. 19), send, via the network 53 or other communications link or path, the identity and changed value of the manipulated memory location of step 113 of FIG. 17 and FIG. 18, to each of the other machines M2, . . . , Mn.

With reference to FIG. 19, each of the other machines M2, . . . , Mn carries out the action of receiving from the network 53 the identity and changed value of, for example, the manipulated memory location of step 113 from machine M1, indicated by step 135, and writes the value received at step 135 to the local memory location corresponding to the identified memory location received at step 135, indicated by step 136.

Figure 3:
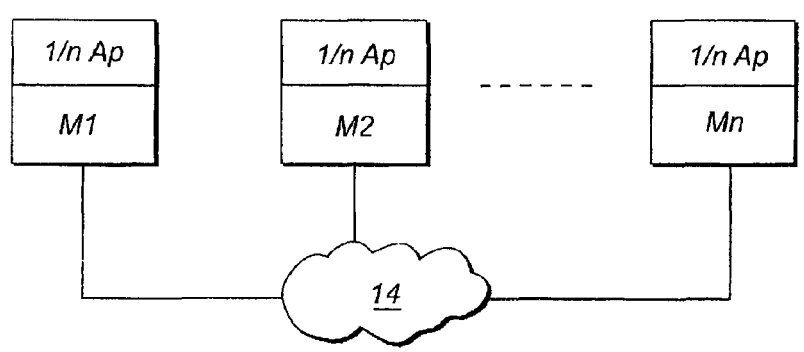
FIG. 3 is a schematic representation of prior art distributed computing.
Figure 4:
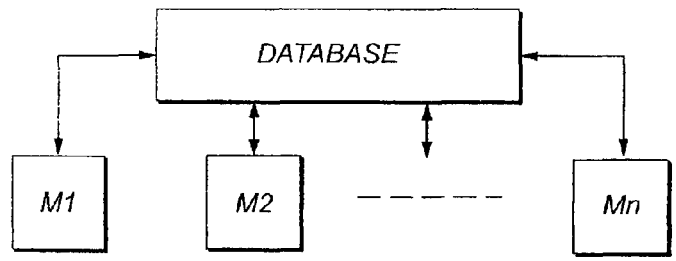
FIG. 4 is a schematic representation of a prior art network computing using clusters.

In the conventional arrangement in FIG. 3 utilising distributed software, memory access from one machine's software to memory physically located on another machine is permitted by the network interconnecting the machines. However, because the read and/or write memory access to memory physically located on another computer require the use of the slow network 14, in these configurations such memory accesses can result in substantial delays in memory read/write processing operation, potentially of the order of $10^6$-$10^7$ cycles of the central processing unit of the machine, but ultimately being dependant upon numerous factors, such as for example, the speed, bandwidth, and/or latency of the network 14. This in large part accounts for the diminished performance of the multiple interconnected machines in the prior art arrangement of FIG. 3.

However, in the present arrangement as described above in connection with FIG. 14, it will be appreciated that all reading of memory locations or data is satisfied locally because a current value of all (or some subset of all) memory locations is stored on the machine carrying out the processing which generates the demand to read memory.

Similarly, in the present arrangement as described above in connection with FIG. 14, it will be appreciated that all writing of memory locations or data may be satisfied locally because a current value of all (or some subset of all) memory locations is stored on the machine carrying out the processing which generates the demand to write to memory.

Such local memory read and write processing operation as performed according to the invention can typically be satisfied within $10^2$-$10^3$ cycles of the central processing unit. Thus, in practice, there is substantially less waiting for memory accesses which involves reads than the arrangement shown and described relative to FIG. 3. Additionally, in practice, there may be less waiting for memory accesses which involve writes than the arrangement shown and described relative to FIG. 3

It may be appreciated that most application software reads memory frequently but writes to memory relatively infrequently. As a consequence, the rate at which memory is being written or re-written is relatively slow compared to the rate at which memory is being read. Because of this slow demand for writing or re-writing of memory, the memory locations or fields can be continually updated at a relatively low speed via the possibly relatively slow and inexpensive commodity network 53, yet this possibly relatively slow speed is sufficient to meet the application program's demand for writing to memory. The result is that the performance of the FIG. 14 arrangement is superior to that of FIG. 3. It may be appreciated in light of the description provided herein that while a relatively slow network communication link or path 53 may advantageously be used because it provides the desired performance and low cost, the invention is not limited to a relatively low speed network connection and may be used with any communication link or path. The invention is transport, network, and communications path independent, and does not depend on how the communication between machines or DRTs takes place. In one embodiment, even electronic mail (email) exchanges between machines or DRTs may suffice for the communications.

In a further optional modification in relation to the above, the identity and changed value pair of a manipulated memory location sent over network 53, each pair typically sent as the sole contents of a single packet, frame or cell for example, can be grouped into batches of multiple pairs of identities and changed values corresponding to multiple manipulated memory locations, and sent together over network 53 or other communications link or path in a single packet, frame, or cell. This further modification further reduces the demands on the communication speed of the network 53 or other communications link or path interconnecting the various machines, as each packet, cell or frame may contain multiple identity and changed value pairs, and therefore fewer packets, frames, or cells require to be sent.

It may be apparent that in an environment where the application program code writes repeatedly to a single memory location, the embodiment illustrated of FIG. 17 of step 114 sends an updating and propagation message to all machines corresponding to every performed memory manipulation operation. In a still further optimal modification in relation to the above, the DRT thread 121/1 of FIG. 18 does not need to perform an updating and propagation operation corresponding to every local memory manipulation operation, but instead may send fewer updating and propagation messages than memory manipulation operations, each message containing the last or latest changed value or content of the manipulated memory location, or optionally may only send a single updating and propagation message corresponding to the last memory manipulation operation. This further improvement reduces the demands on the network 53 or other communications link or path, as fewer packets, frames, or cells require to be sent.

It will also be apparent to those skilled in the art in light of the detailed description provided herein that in a table or list or other data structure created by each DRT 71 when initially recording or creating the list of all, or some subset of all, memory locations (or fields), for each such recorded memory location on each machine M1, . . . , Mn there is a name or identity which is common or similar on each of the machines M1, . . . , Mn. However, in the individual machines the local memory location corresponding to a given name or identity (listed for example, during step 91 of FIG. 15) will or may vary over time since each machine may and generally will store changed memory values or contents at different memory locations according to its own internal processes. Thus the table, or list, or other data structure in each of the DRTs will have, in general, different local memory locations corresponding to a single memory name or identity, but each global "memory name" or identity will have the same "memory value" stored in the different local memory locations.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading,
(ii) by a pre-compilation procedure prior to loading,
(iii) compilation prior to loading,
(iv) a "just-in-time" compilation, or
(v) re-compilation after loading (but, or for example, before execution of the relevant or corresponding application code in a distributed environment).

These alternatives to modification of the application program or computer code apply to all of the various embodiments described herein.

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language Given the fundamental concept of modifying memory manipulation operations to coordinate operation between and amongst a plurality of machines M1 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3, . . . , Mn (either sequentially or simultaneously or according to any other order, routine or procedure) with the modified object (or class or other asset or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is binary executable object code. Alternatively, the memory manipulation operation(s) that is (are) loaded is executable intermediary code.

In this arrangement, which may be termed "master/slave" each of the slave (or secondary) machines M1, M3, . . . , Mn loads the modified object (or class), and inclusive of the new modified memory manipulation operation(s), that was sent to it over the computer communications network or other communications link or path by the master (or primary) machine, such as machine M2, or some other machine such as a machine X of FIG. 21. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a still further embodiment, each machine M1, . . . , Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different and to be enhanced, customized, and/or optimized based upon its particular machine architecture, hardware, processor, memory, configuration, operating system, or other factors, yet still similar, coherent and consistent with other machines with all other similar modifications and characteristics that may not need to be similar or identical.

In all of the described instances or embodiments, the supply or the communication of the asset code (such as class code or object code) to the machines M1, . . . , Mn, and optionally inclusive of a machine X of FIG. 21, can be branched, distributed or communicated among and between the different machines in any combination or permutation; such as by providing direct machine to machine communication (for example, M2 supplies each of M1, M3, M4, etc. directly), or by providing or using cascaded or sequential communication (for example, M2 supplies M1 which then supplies M3 which then supplies M4, and so on), or a combination of the direct and cascaded and/or sequential.

It will be appreciated that the modified code permits, in a distributed computing environment having a plurality of computers or computing machines, the coordinated operation of memory manipulation operations so that the problems associated with the operation of the unmodified code or procedure on a plurality of machines M1 . . . Mn (such as for example inconsistent and incoherent memory state and manipulation and updating operation) does not occur when applying the modified code or procedure.

III. Exemplary Embodiment of Computer Architecture and Method of Operation for Multi-Computer Distributed Processing with Initialization of Objects Co-pending U.S. Patent Application Ser. No. 11/111,781 filed Apr. 22, 2005 describes a Computer Architecture And Method Of Operation For Multi-Computer Distributed Processing With Initialization Of Objects which may be used in conjunction with the present invention.

With reference to any initialisation modifier that may be present, such initialisation modifier 51-I or DRT 71-I or other code modifying means component of the overall modifier or distributed run time means is responsible for modifying the application code 50 so that it may execute initialisation routines or other initialization operations, such as for example class and object initialization methods or routines in the JAVA language and virtual machine environment, in a coordinated, coherent, and consistent manner across the plurality of individual machines M1, M2 . . . , Mn These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Embodiments of the present invention relates to computers and other computing machines and information appliances, in particular, to a modified computer architecture and program structure which enables the operation of an application program concurrently or simultaneously on a plurality of computers interconnected via a communications link using a distributed runtime and enables improved performance to be achieved.

It will be appreciated that the modified code permits, in a distributed computing environment having a plurality of computers or computing machines, the coordinated operation of memory manipulation operations so that the problems associated with the operation of the unmodified code or procedure on a plurality of machines M1 . . . Mn (such as for example inconsistent and incoherent memory state and manipulation and updating operation) does not occur when applying the modified code or procedure.

Figure 22:
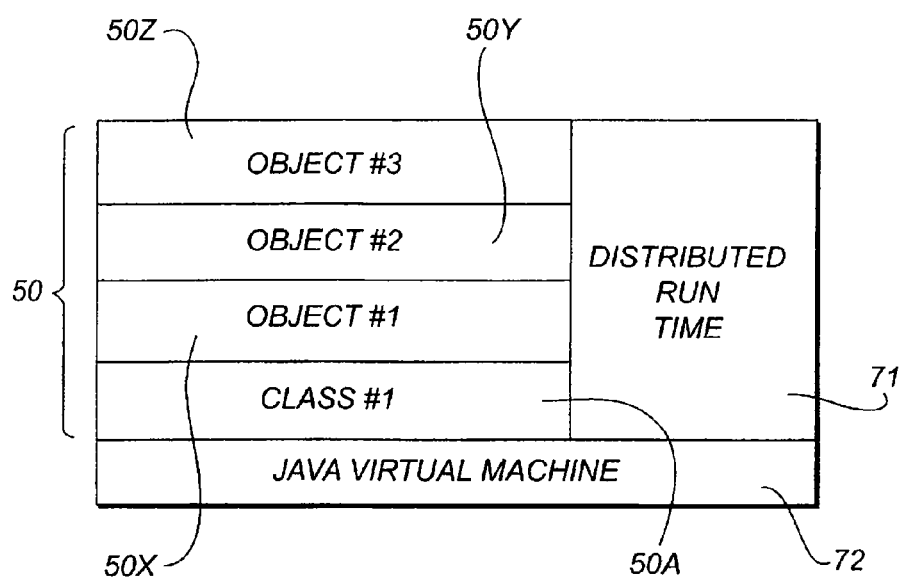
FIG. 22 is a schematic illustration of a prior art computer arranged to operate in JAVA code and thereby constitute a JAVA virtual machine.

Turning to FIG. 22, there is illustrated a schematic representation of a single prior art computer operated as a JAVA virtual machine. In this way, a machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that the platform and/or runtime system may include virtual machine and non-virtual machine software and/or firmware architectures, as well as hardware and direct hardware coded applications and implementations.

Returning to the example of the JAVA language virtual machine environment, in the JAVA language, the class initialization routine <clinit> happens only once when a given class file 50A is loaded. However, the object initialization routine <init> typically happens frequently, for example the object initialization routine may usually occur every time a new object (such as an object 50X, 50Y or 50Z) is created. In addition, within the JAVA environment and other machine or other runtime system environments using classes and object constructs, classes (generally being a broader category than objects) are loaded prior to objects (which are the narrower category and wherein the objects belong to or are identified with a particular class) so that in the application code 50 illustrated in FIG. 22, having a single class 50A and three objects 50X, 50Y, and 50Z, the first class 50A is loaded first, then first object 50X is loaded, then second object 50Y is loaded and finally third object 50Z is loaded.

Where, as in the embodiment illustrated relative to FIG. 22, there is only a single computer or machine 72 (and not a plurality of connected or coupled computers or machines), then no conflict or inconsistency arises in the running of the initialization routines (such as class and object initialization routines) intended to operate during the loading procedure because for conventional operation each initialization routine is executed only once by the single virtual machine or machine or runtime system or language environment as needed for each of the one or more classes and one or more objects belonging to or identified with the classes, or equivalent where the terms classes and object are not used.

For a more general set of virtual machine or abstract machine environments, and for current and future computers and/or computing machines and/or information appliances or processing systems, and that may not utilize or require utilization of either classes and/or objects, the inventive structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, the terms 'class' and 'object' may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

Returning to the example of the JAVA language virtual machine environment, in the JAVA language, the class initialization routine <clinit> happens only once when a given class file 50A is loaded. However, the object initialization routine <init> typically happens frequently, for example the object initialisation routine will occur every time a new object (such as an object 50X, 50Y and 50Z) is created. In addition, within the JAVA environment and other machine or other runtime system environments using classes and object constructors, classes (being the broader category) are loaded prior to objects (which are the narrower category and wherein the objects belong to or are identified with a particular class) so that in the application code 50 illustrated in FIG. 22, having a single class 50A and three objects 50X-50Z, the first class 50A is loaded first, then the first object 50X is loaded, then second object 50Y is loaded and finally third object 50Z is loaded.

Where, as in the embodiment illustrated relative to FIG. 22, there is only a single computer or machine 72 (not a plurality of connected or coupled machines), then no conflict or inconsistency arises in the running of the initialization routines (i.e. the class initialization routine <clinit> and the object initialisation routine <init>) intended to operate during the loading procedure because for conventional operation each initialisation routine is executed only once by the single virtual machine or machine or runtime system or language environment as needed for each of the one or more classes and one or more objects belonging to or identified with the classes.

Figure 14:
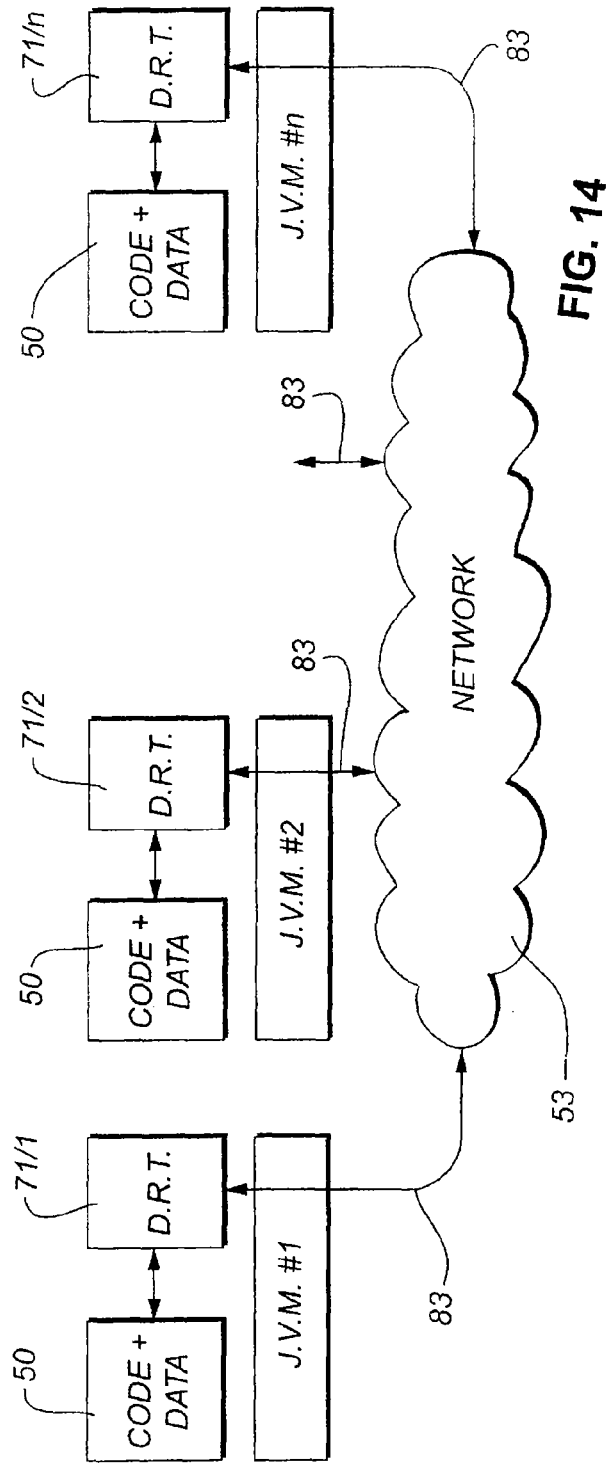
FIG. 14 is a drawing similar to FIG. 9 but illustrating the interconnection of a plurality of computers each operating JAVA code.

However, in the arrangement illustrated in FIG. 14, a plurality of individual computers or machines M1, M2, ..., Mn are provided, each of which are interconnected via a communications network 53 or other communications link and each of which individual computers or machines provided with a modifier 51 (See in FIG. 9) and realised by or in for example the distributed runtime system (DRT) 71 (See FIG. 14) and loaded with a common application code 50. The term common application program is to be understood to mean an application program or application program code written to operate on a single machine, and loaded and/or executed in whole or in part on each one of the plurality of computers or machines M1, M2 ... Mn, or optionally on each one of some subset of the plurality of computers or machines M1, M2 ... Mn. Put somewhat differently, there is a common application program represented in application code 50, and this single copy or perhaps a plurality of identical copies are modified to generate a modified copy or version of the application program or program code, each copy or instance prepared for execution on the plurality of machines. At the point after they are modified they are common in the sense that they perform similar operations and operate consistently and coherently with each other. It will be appreciated that a plurality of computers, machines, information appliances, or the like implementing the features of the invention may optionally be connected to or coupled with other computers, machines, information appliances, or the like that do not implement the features of the invention.

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

Essentially the modifier 51 or DRT 71 or other code modifying means is responsible for modifying the application code 50 so that it may execute initialisation routines or other initialization operations, such as for example class and object initialization methods or routines in the JAVA language and virtual machine environment, in a coordinated, coherent, and consistent manner across and between the plurality of individual machines M1, M2 ... Mn. It follows therefore that in such a computing environment it is necessary to ensure that the local objects and classes on each of the individual machines M1, M2 ... Mn is initialized in a consistent fashion (with respect to the others).

It will be appreciated in light of the description provided herein that there are alternative implementations of the modifier 51 and the distributed run time 71. For example, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71. In one embodiment, the modifier 51 and DRT 71 are implemented or written in a single piece of computer program code that provides the functions of the DRT and modifier. The modifier function and structure therefore maybe subsumed into the DRT and considered to be an optional component. Independent of how implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT may for example implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures within the invention are less important than that they are provided.

In order to ensure consistent class and object (or equivalent) initialisation status and initialisation operation between and amongst machines M1, M2, . . . , Mn, the application code 50 is analysed or scrutinized by searching through the executable application code 50 in order to detect program steps (such as particular instructions or instruction types) in the application code 50 which define or constitute or otherwise represent an initialization operation or routine (or other similar memory, resource, data, or code initialization routine or operation). In the JAVA language, such program steps may for example comprise or consist of some part of, or all of, a "<init>" or "<clinit>" method of an object or class, and optionally any other code, routine, or method related to a "<init>" or "<clinit>" method, for example by means of a method invocation from the body of the "<init>" of "<clinit>" method to a different method.

This analysis or scrutiny of the application code 50 may take place either prior to loading the application program code 50, or during the application program code 50 loading procedure, or even after the application program code 50 loading procedure. It may be likened to an instrumentation, program transformation, translation, or compilation procedure in that the application code may be instrumented with additional instructions, and/or otherwise modified by meaning-preserving program manipulations, and/or optionally translated from an input code language to a different code language (such as for example from source-code language or intermediate-code language to object-code language or machine-code language), and with the understanding that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary-code languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.ClassLoader loadClass method (e.g., "java.lang.ClassLoader.loadClass( )").

Alternatively, the analysis or scrutiny of the application code 50 may take place even after the application program code loading procedure, such as after the operating system has loaded the application code into memory, or optionally even after execution of the application program code has started or commenced, such as for example after the JAVA virtual machine has loaded the application code into the virtual machine via the "java.lang.ClassLoader.loadClass( )" method and optionally commenced execution.

As a consequence, of the above described analysis or scrutiny, initialization routines (for example <clinit> class initialisation methods and <init> object initialization methods) are initially looked for, and when found or identified a modifying code is inserted, so as to give rise to a modified initialization routine. This modified routine is adapted and written to initialize the class 50A on one of the machines, for example JVM#1, and tell, notify, or otherwise communicate to all the other machines M2, . . . , Mn that such a class 50A exists and optionally its initialized state. There are several different alternative modes wherein this modification and loading can be carried out.

Thus, in one mode, the DRT 71/1 on the loading machine, in this example Java Virtual Machine M1 (JVM#1), asks the DRT's 71/2 . . . 71/n of all the other machines M1, . . . , Mn if the similar equivalent first class 50A is initialized (i.e. has already been initialized) on any other machine. If the answer to this question is yes (that is, a similar equivalent class 50A has already been initialized on another machine), then the execution of the initialization procedure is aborted, paused, terminated, turned off or otherwise disabled for the class 50A on machine JVM#1. If the answer is no (that is, a similar equivalent class 50A has not already been initialised on another machine), then the initialization operation is continued (or resumed, or started, or commenced and the class 50A is initialized and optionally the consequential changes (such as for example initialized code and data-structures in memory) brought about during that initialization procedure are transferred to each similar equivalent local class on each one of the other machines as indicated by arrows 83 in FIG. 14.

A similar procedure happens on each occasion that an object, say 50X, 50Y or 50Z is to be loaded and initialized. Where the DRT 71/1 of the loading machine, in this example Java Machine M1 (JVM#1), does not discern, as a result of interrogation of the other machines M2 . . . Mn that, a similar equivalent object to the particular object to be initialized on machine M1, say object 50Y, has already been initialised by another machine, then the DRT 71/1 on machine M1 may execute the object initialization routine corresponding to object 50Y, and optionally each of the other machines M2 . . . Mn may load a similar equivalent local object (which may conveniently be termed a peer object) and associated consequential changes (such as for example initialized data, initialized code, and/or initialized system or resources structures) brought about by the execution of the initialization operation on machine M1. However, if the DRT 71/1 of machine M1 determines that a similar equivalent object to the object 50Y in question has already been initialization on another machine of the plurality of machines (say for example machine M2), then the execution by machine M1 of the initialization function, procedure, or routine corresponding to object 50Y is not started or commenced, or is otherwise aborted, terminated, turned off or otherwise disabled, and object 50Y on machine M1 is loaded, and preferably but optionally the consequential changes (such as for example initialized data, initialized code, and/or other initialized system or resource structures) brought about by the execution of the initialization routine by machine M2, is loaded on machine M1 corresponding to object 50Y. Again there are various ways of bringing about the desired result.

Preferably, execution of the initialization routine is allocated to one machine, such as the first machine M1 to load (and optionally seek to initialize) the object or class. The execution of the initialization routine corresponding to the determination that a particular class or object (and any similar equivalent local classes or objects on each of the machines M1 . . . Mn) is not already initialized, is to execute only once with respect to all machines M1 . . . Mn, and preferably by only one machine, on behalf of all machines M1 . . . Mn. Corresponding to, and preferably following, the execution of the initialization routine by one machine (say machine M1), all other machines may then each load a similar equivalent local object (or class) and optionally load the consequential changes (such as for example initialized data, initialized code, and/or other initialized system or resource structures) brought about by the execution of the initialization operation by machine M1.

Figure 23:
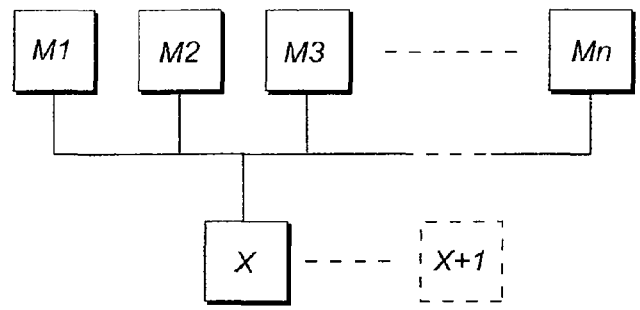
FIG. 23 is a schematic representation of n machines running the application program and serviced by an additional server machine X.

As seen in FIG. 23 a modification to the general arrangement of FIG. 14 is provided in that machines M1, M2 . . . Mn are as before and run the same application code 50 (or codes) on all machines M1, M2 . . . Mn simultaneously or concurrently. However, the previous arrangement is modified by the provision of a server machine X which is conveniently able to supply housekeeping functions, for example, and especially the initialisation of structures, assets, and resources. Such a server machine X can be a low value commodity computer such as a PC since its computational load is low. As indicated by broken lines in FIG. 23, two server machines X and X+1 can be provided for redundancy purposes to increase the overall reliability of the system. Where two such server machines X and X+1 are provided, they are preferably but optionally operated as redundant machines in a failover arrangement.

It is not necessary to provide a server machine X as its computational load can be distributed over machines M1, M2 . . . Mn. Alternatively, a database operated by one machine (in a master/slave type operation) can be used for the housekeeping function(s).

Figure 24:
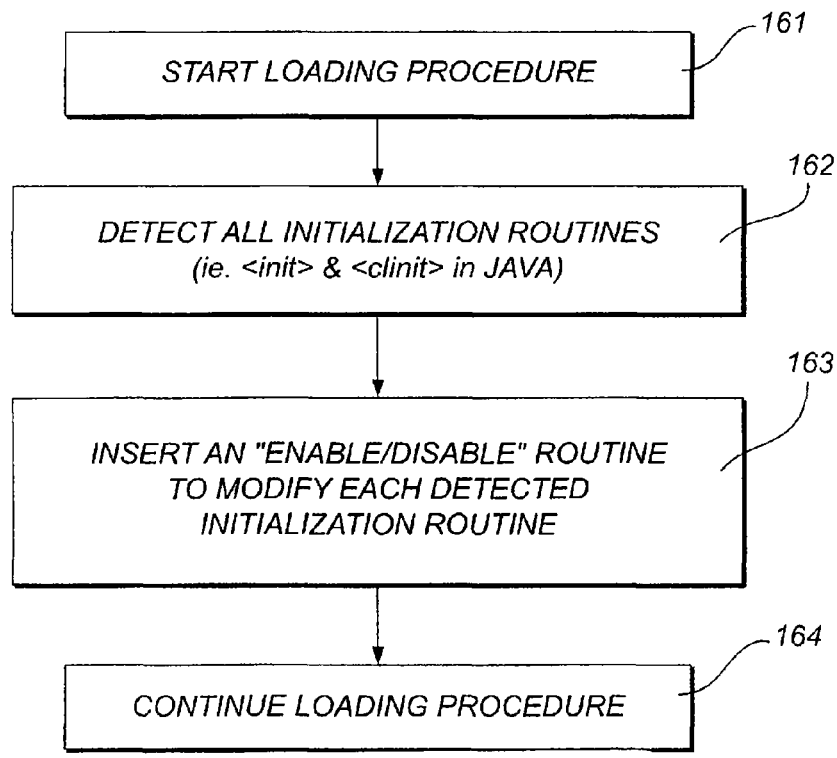
FIG. 24 is a flow chart of illustrating the modification of initialization routines.

FIG. 24 shows a preferred general procedure to be followed. After a loading step 161 has been commenced, the instructions to be executed are considered in sequence and all initialization routines are detected as indicated in step 162. In the JAVA language these are the object initialisation methods (e.g. "<init>") and class initialisation methods (e.g. "<clinit>"). Other languages use different terms.

Where an initialization routine is detected in step 162, it is modified in step 163 in order to perform consistent, coordinated, and coherent initialization operation (such as for example initialization of data structures and code structures) across and between the plurality of machines M1, M2 . . . Mn, typically by inserting further instructions into the initialisation routine to, for example, determine if a similar equivalent object or class (or other asset) on machines M1 . . . Mn corresponding to the object or class (or asset) to which this initialisation routine corresponds, has already been initialised, and if so, aborting, pausing, terminating, turning off, or otherwise disabling the execution of this initialization routine (and/or initialization operation(s)), or if not then starting, continuing, or resuming the executing the initialization routine (and/or initialization operation(s)), and optionally instructing the other machines M1 . . . Mn to load a similar equivalent object or class and consequential changes brought about by the execution of the initialization routine. Alternatively, the modifying instructions may be inserted prior to the routine, such as for example prior to the instruction(s) or operation(s) which commence initialization of the corresponding class or object. Once the modification step 163 has been completed the loading procedure continues by loading the modified application code in place of the unmodified application code, as indicated in step 164. Altogether, the initialization routine is to be executed only once, and preferably by only one machine, on behalf of all machines M1 . . . Mn corresponding to the determination by all machines M1 . . . Mn that the particular object or class (i.e. the similar equivalent local object or class on each machine M1 . . . Mn corresponding to the particular object or class to which this initialization routine relates) has not been initialized.

Figure 25:
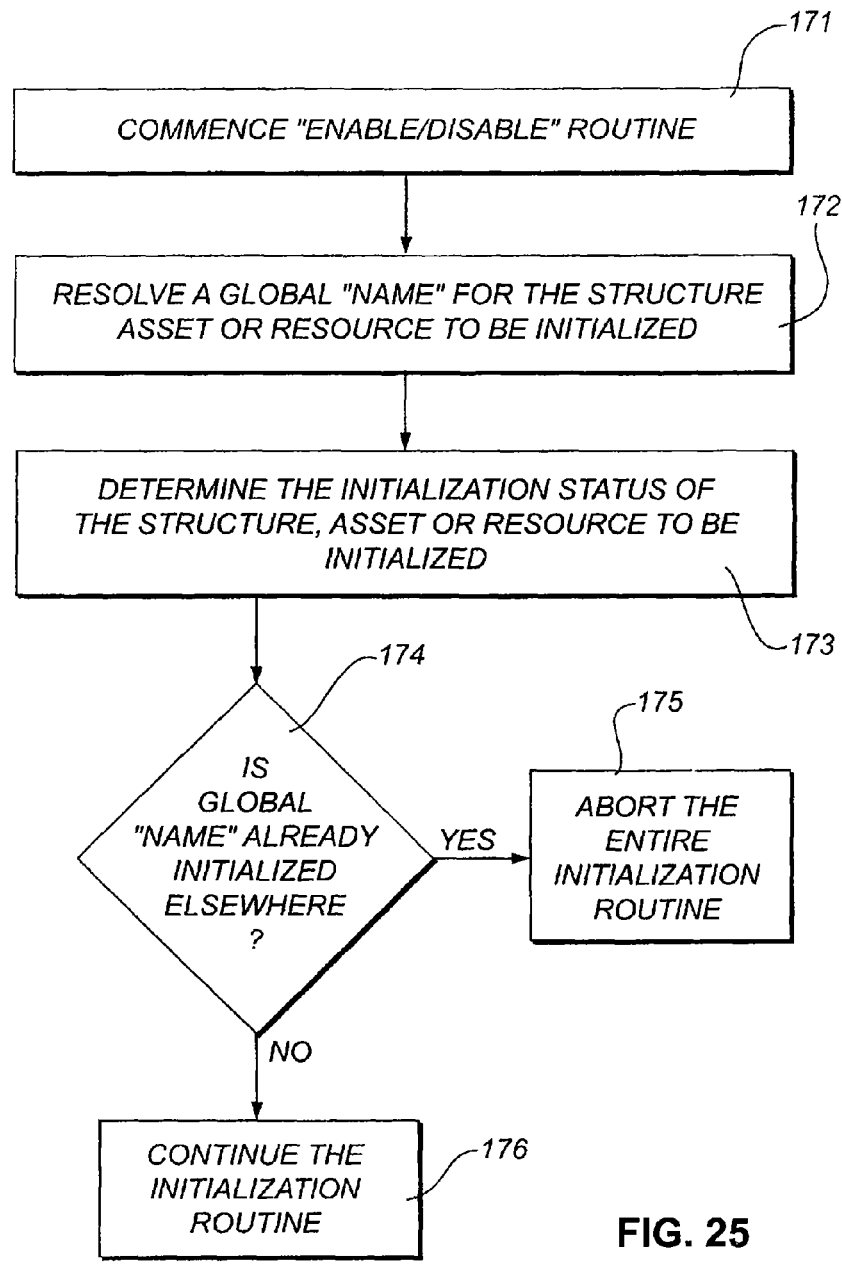
FIG. 25 is a flow chart illustrating the continuation or abortion of initialization routines.

FIG. 25 illustrates a particular form of modification. After commencing the routine in step 171, the structures, assets or resources (in JAVA termed classes or objects) to be initialised are, in step 172, allocated a name or tag (for example a global name or tag) which can be used to identify corresponding similar equivalent local objects on each of the machines M1, . . . , Mn. This is most conveniently done via a table (or similar data or record structure) maintained by server machine X of FIG. 23. This table may also include an initialization status of the similar equivalent classes or object to be initialised. It will be understood that this table or other data structure may store only the initialization status, or it may store other status or information as well.

As indicated in FIG. 25, if steps 173 and 174 determine by means of the communication between machines M1 . . . Mn by DRT 71 that the similar equivalent local objects on each other machine corresponding to the global name or tag is not already initialised (i.e., not initialized on a machine other than the machine carrying out the loading and seeking to perform initialization), then this means that the object or class can be initialised, preferably but optionally in the normal fashion, by starting, commencing, continuing, or resuming the execution of, or otherwise executing, the initialization routine, as indicated in step 176, since it is the first of the plurality of similar equivalent local objects or classes of machines M1 . . . Mn to be initialized.

In one embodiment, the initialization routine is stopped from initiating or commencing or beginning execution; however, in some implementations it is difficult or practically impossible to stop the initialization routine from initiating or beginning or commencing execution. Therefore, in an alternative embodiment, the execution of the initialization routine that has already started or commenced is aborted such that it does not complete or does not complete in its normal manner. This alternative abortion is understood to include an actual abortion, or a suspend, or postpone, or pause of the execution of a initialization routine that has started to execute (regardless of the stage of execution before completion) and therefore to make sure that the initialization routine does not get the chance to execute to completion the initialization of the object (or class or other asset)—and therefore the object (or class or other asset) remains "un-initialized" (i.e., "not initialized").

However or alternatively, if steps 173 and 174 determine that the global name corresponding to the plurality of similar equivalent local objects or classes, each on a one of the plurality of machines M1 . . . Mn, is already initialised on another machine, then this means that the object or class is considered to be initialized on behalf of, and for the purposes of, the plurality of machines M1 . . . Mn. As a consequence, the execution of the initialisation routine is aborted, terminated, turned off, or otherwise disabled, by carrying out step 175.

Figure 26:
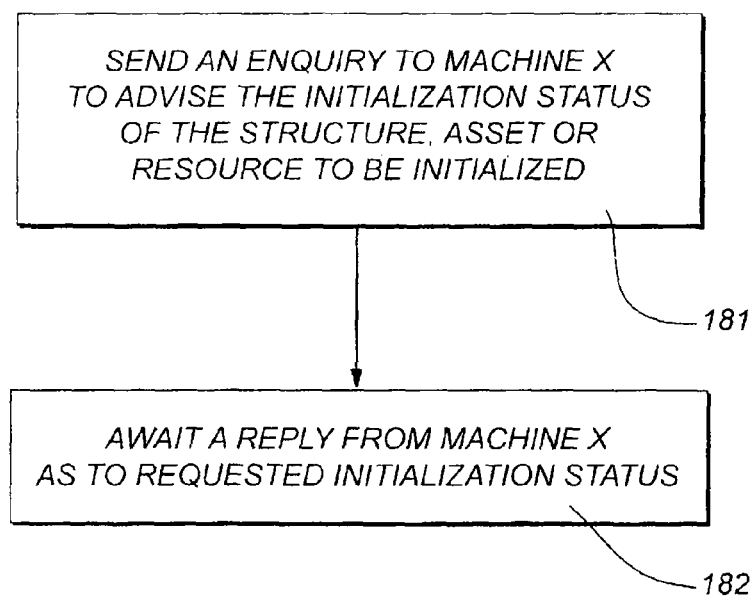
FIG. 26 is a flow chart illustrating the enquiry sent to the server machine X.

FIG. 26, illustrative of one embodiment of step 173 of FIG. 25, shows the inquiry made by the loading machine (one of M1, M2 . . . Mn) to the server machine X of FIG. 23, to enquire as to the initialisation status of the plurality of similar equivalent local objects (or classes) corresponding to the global name. The operation of the loading machine is temporarily interrupted as indicated by step 181, and corresponding to step 173 of FIG. 25, until a reply to this preceding request is received from machine X, as indicated by step 182. In step 181 the loading machine sends an inquiry message to machine X to request the initialization status of the object (or class or other asset) to be initialized. Next, the loading machine awaits a reply from machine X corresponding to the inquiry message sent by the proposing machine at step 181, indicated by step 182.

Figure 27:
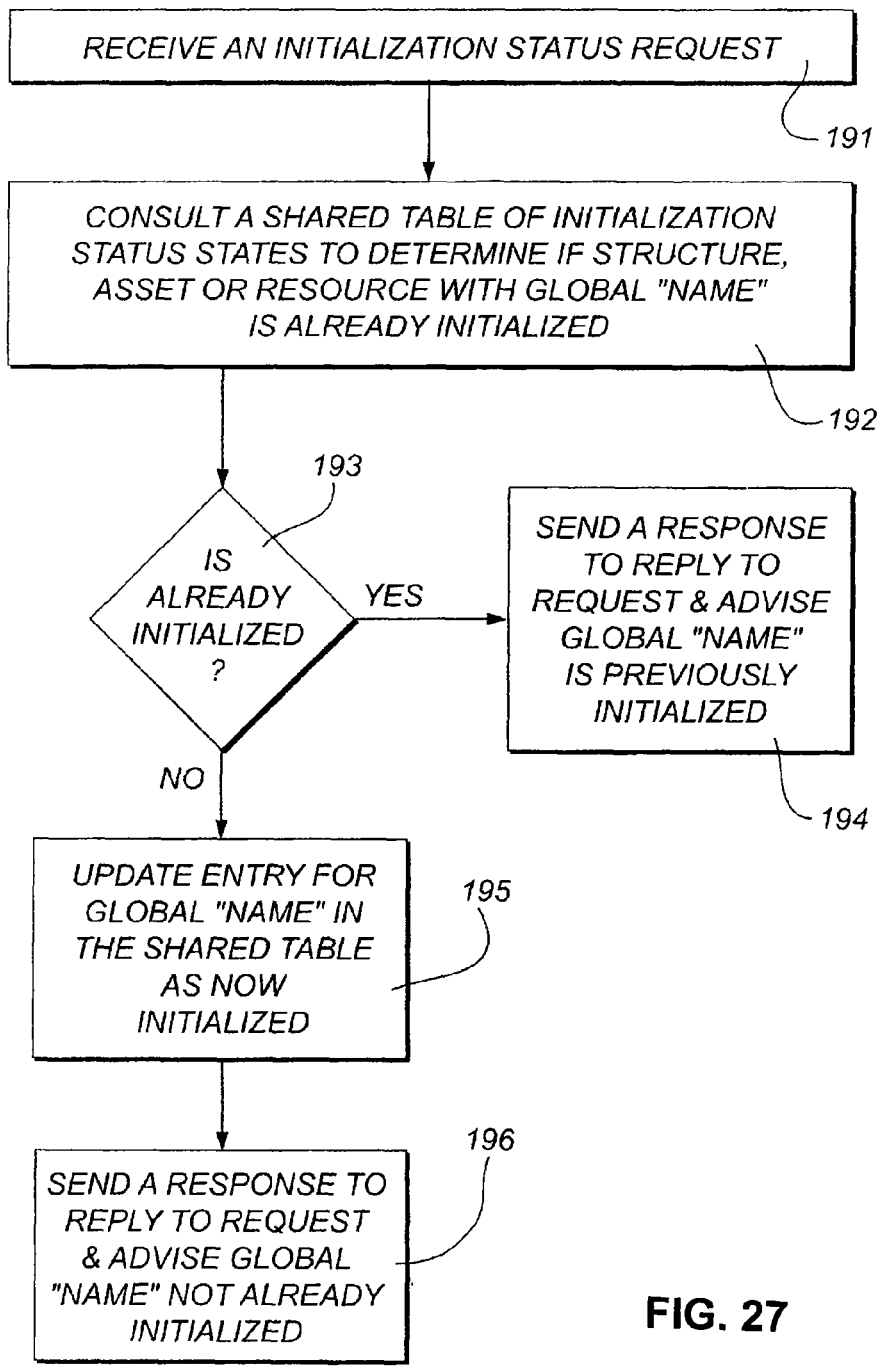
FIG. 27 is a flow chart of the response of the server machine X to the request of FIG. 26.

FIG. 27 shows the activity carried out by machine X of FIG. 23 in response to such an initialization enquiry of step 181 of FIG. 26. The initialization status is determined in steps 192 and 193, which determines if a similar equivalent object (or class or other asset) corresponding to the initialization status request of global name, as received at step 191, is initialized on another machine (i.e. a machine other than the enquiring machine 181 from which the initialization status request of step 191 originates), where a table of initialisation states is consulted corresponding to the record for the global name and, if the initialisation status record indicates that a similar equivalent local object (or class) on another machine (such as on a one of the machines M1 . . . Mn) and corresponding to global name is already initialised, the response to that effect is sent to the enquiring machine by carrying out step 194. Alternatively, if the initialisation status record indicates that a similar equivalent local object (or class) on another machine (such as on a one of the plurality of machines M1 . . . Mn) and corresponding to global name is uninitialized, a corresponding reply is sent to the enquiring machine by carrying out steps 195 and 196. The singular term object or class as used here (or the equivalent term of asset, or resource used in step 192) are to be understood to be inclusive of all similar equivalent objects (or classes, or assets, or resources) corresponding to the same global name on each one of the plurality of machines M1 . . . Mn. The waiting enquiring machine of step 182 is then able to respond and/or operate accordingly, such as for example by (i) aborting (or pausing, or postponing) execution of the initialization routine when the reply from machine X of step 182 indicated that a similar equivalent local object on another machine (such as a one of the plurality of machines M1 . . . Mn) corresponding to the global name of the object proposed to be initialized of step 172 is already initialized elsewhere (i.e. is initialized on a machine other than the machine proposing to carry out the initialization); or (ii) by continuing (or resuming, or starting, or commencing) execution of the initialization routine when the reply from machine X of step 182 indicated that a similar equivalent local object on the plurality of machines M1 . . . Mn corresponding to the global name of the object proposing to be initialized of step 172 is not initialized elsewhere (i.e. not initialized on a machine other than the machine proposing to carry out the initialization).

If the class corresponding to the initialization status request is not initialized on another machine other than the requesting machine, then machine X will send a response indicating that the class was not already initialized, and update a record entry corresponding to the specified class to indicate the class is now initialized. Alternatively, if the class corresponding to the initialization status request is initialized on another machine other than the requesting machine, then machine X will send a response indicating that the class is already initialized. Corresponding to the determination that the class to which this initialization status request pertains is not initialized on another machine other than the requesting machine, a reply is generated and sent to the requesting machine indicating that the class is not initialized. Additionally, machine X preferably updates the entry corresponding to the class to which the initialization status request pertained to indicate the class is now initialized. Following a receipt of such a message from machine X indicating that the class is not initialized on another machine, the is AlreadyLoaded( ) method and operations terminate execution and return a 'false' value to the previous method frame, which is the executing method frame of the <clinit> method. Alternatively, following a receipt of a message from machine X indicating that the class is already initialized on another machine, the is AlreadyLoaded( ) method and operations terminate execution and return a "true" value to the previous method frame, which is the executing method frame of the <clinit> method. Following this return operation, the execution of the <clinit> method frame then resumes.

It will be appreciated that the modified code permits, in a distributed computing environment having a plurality of computers or computing machines, the coordinated operation of initialization routines or other initialization operations between and amongst machines M1 . . . Mn so that the problems associated with the operation of the unmodified code or procedure on a plurality of machines M1 . . . Mn (such as for example multiple initialization operation, or re-initialization operation) does not occur when applying the modified code or procedure.

Figure 2:
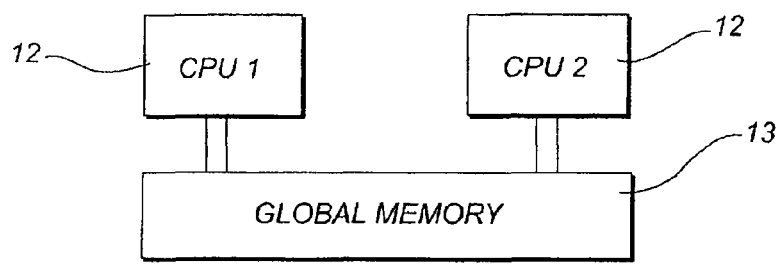
FIG. 2 is a schematic illustration showing the internal architecture of known symmetric multiple processors.

As a result of procedures and steps operating on a single machine of the conventional configurations in FIG. 1 and FIG. 2, the JAVA virtual machine can keep track of the initialization status of an object in a consistent, coherent and coordinated manner, and in executing the <init> method containing the initialization operations is able to ensure that unwanted behaviour (for example execution of the <init> method of a single 'example.java' object more than once, or re-initialization of the same object) such as may be caused by inconsistent and/or incoherent initialization operation, does not occur. Were these steps to be carried out on the plurality of machines of the configurations of FIG. 9 and FIG. 14 with the memory update and propagation replication means of FIG. 15, FIG. 16, FIG. 17, FIG. 18, and FIG. 19, and concurrently executing the application program code 50 on each one of the plurality of machines M1. Mn, the initialization operations of each concurrently executing application program occurrence on each one of the machines would be performed without coordination between any other of the occurrences on any other of the machine(s). Given the goal of consistent, coordinated and coherent initialization operation across a plurality of a machines, this prior art arrangement would fail to perform such consistent coordinated initialization operation across the plurality of machines, as each machine performs initialization only locally and without any attempt to coordinate their local initialization operation with any other similar initialization operation on any one or more other machines. Such an arrangement would therefore be susceptible to unwanted or other anomalous behaviour due to uncoordinated, inconsistent and/or incoherent initialization states, and associated initialization operation. Therefore it is the goal of the present invention to overcome this limitation of the prior art arrangement.

If the object corresponding to the initialization status request is not initialized on another machine other than the requesting machine, then machine X will send a response indicating that the object was not already initialized, and update a record entry corresponding to the specified object to indicate the object is now initialized. Alternatively, if the object corresponding to the initialization status request is initialized on another machine other than the requesting machine, then machine X will send a response indicating that the object is already initialized. Corresponding to the determination that the object to which this initialization status request pertains is not initialized on another machine other than the requesting machine, a reply is generated and sent to the requesting machine indicating that the object is not initialized. Additionally, machine X preferably updates the entry corresponding to the object to which the initialization status request pertained to indicate the object is now initialized. Following a receipt of such a message from machine X indicating that the object is not initialized on another machine, an already loaded method and operations terminate execution and return a 'false' value to the previous method frame, which is the executing method frame of the <init> method. Alternatively, following a receipt of a message from machine X indicating that the object is already initialized on another machine, the already loaded method and operations terminate execution and return a "true" value to the previous method frame, which is the executing method frame of the <init> method. Following this return operation, the execution of the <init> method frame then resumes.

It will be appreciated that the modified code permits, in a distributed computing environment having a plurality of computers or computing machines, the coordinated operation of initialization routines or other initialization operations so that the problems associated with the operation of the unmodified code or procedure on a plurality of machines M1 . . . Mn (such as for example multiple initialization, or re-initialization operation) does not occur when applying the modified code or procedure.

Figure 28:
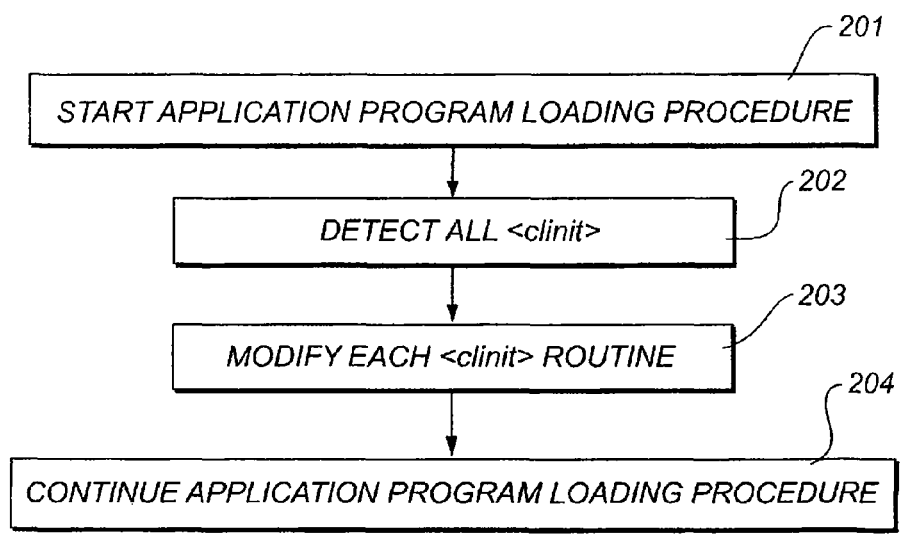
FIG. 28 is a flowchart illustrating a modified initialization routine for the class initialization <clinit> instruction.
Figure 29:
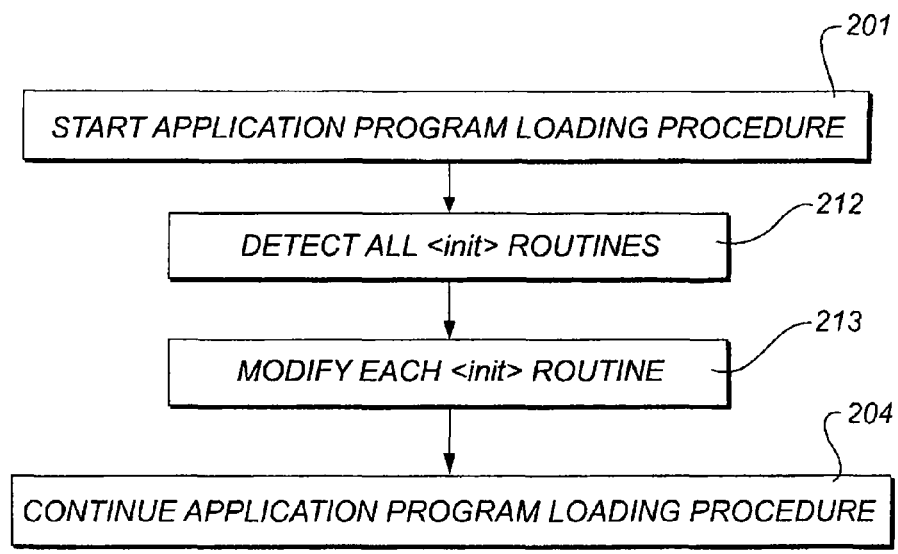
FIG. 29 is a flowchart illustrating a modified initialization routine for the object initialization <init> instruction.
Figure 30:
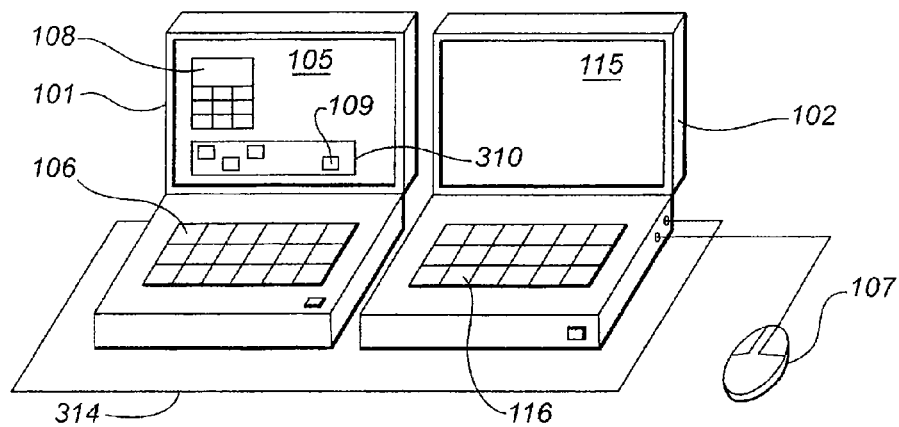
FIG. 30 is a schematic representation of two laptop computers interconnected to simultaneously run a plurality of applications, with both applications running on a single computer.
Figure 31:
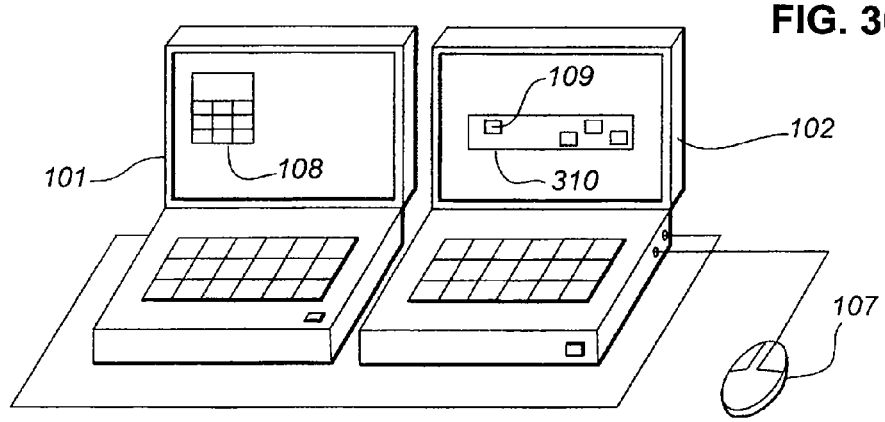
FIG. 31 is a view similar to FIG. 30 but showing the FIG. 30 apparatus with one application operating on each computer.
Figure 32:
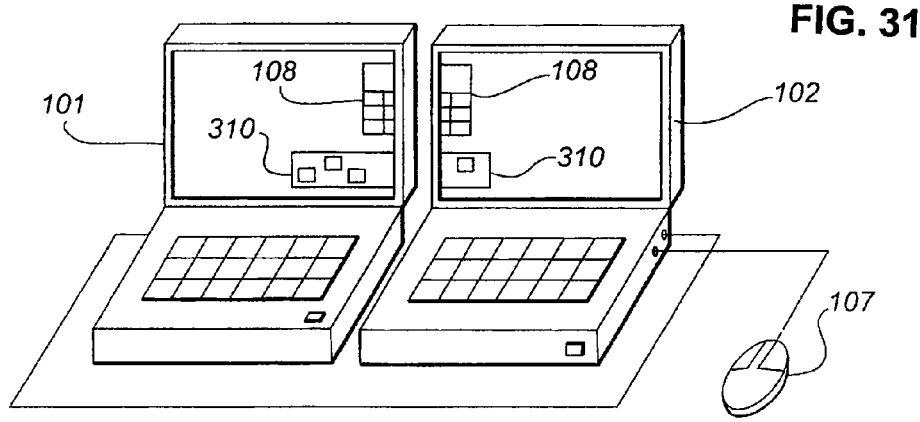
FIG. 32 is a view similar to FIG. 30 and FIG. 31 but showing the FIG. 30 apparatus with both applications operating simultaneously on both computers.

Turning now to FIG. 28 and FIG. 29, the procedure followed to modify class initialisation routines (i.e., the "<clinit>" method) and object initialization routines (i.e. the "<init>" method) is presented. Similarly, the procedure followed to modify an object initialization <init> method relating to objects so as to convert from the code fragment to the code fragment is indicated.

The initial loading of the application code 50 onto the JAVA virtual machine 72 is commenced at step 201, and the code is analysed or scrutinized in order to detect one or more class initialization instructions, code-blocks or methods (i.e. "<clinit>" methods) by carrying out step 202, and/or one or more object initialization instructions, code-blocks, or methods (i.e. "<init>" methods) by carrying out step 212. Once so detected, an <clinit> method is modified by carrying out step 203, and an <init> method is modified by carrying out step 213. As indicated by step 204 and 214, after the modification is completed the loading procedure is then continued such that the modified application code is loaded into or onto each of the machines instead of the unmodified application code.

Thus, without management of coordinated class initialisation in a distributed environment of a plurality of machines M1, . . . , Mn, and each with a memory updating and propagation means of FIG. 15, FIG. 16, FIG. 17, FIG. 18, and FIG. 19, whereby the application program code 50 is to operate as a single coordinated, consistent, and coherent instance across the plurality of machines M1 . . . Mn, each computer or computing machine would re-initialise (and optionally alternatively re-write or over-write) the "currentExample" memory location (field) with multiple and different objects corresponding to the multiple executions of the <clinit> method, leading to potentially incoherent or inconsistent memory between and amongst the occurrences of the application program code 50 on each of the machines M1, . . . , Mn. Clearly this is not what the programmer or user of a single application program code 50 instance expects to happen.

So, taking advantage of the DRT, the application code 50 is modified as it is loaded into the machine by changing the class initialisation routine (i.e., the <clinit> method). The changes made (highlighted in bold) are the initial instructions that the modified <clinit> method executes. These added instructions determine the initialization status of this particular class by checking if a similar equivalent local class on another machine corresponding to this particular class, has already been initialized and optionally loaded, by calling a routine or procedure to determine the initialization status of the plurality of similar equivalent classes, such as the "is already loaded" (e.g., "is AlreadyLoaded( )") procedure or method. An is already loaded (e.g., "is AlreadyLoaded( )") method of InitClient of DRT 71 performing the steps of 172-176 of FIG. 25 determines the initialization status of the similar equivalent local classes each on a one of the machines M1, . . . , Mn corresponding to the particular class being loaded, the result of which is either a true result or a false result corresponding to whether or not another one (or more) of the machines M1 . . . Mn have already initialized, and optionally loaded, a similar equivalent class.

The initialisation determination procedure or method "isAlreadyLoaded( )" of InitClient of the DRT 71 can optionally take an argument which represents a unique identifier for this class. For example, the name of the class that is being considered for initialisation, a reference to the class or classobject representing this class being considered for initialization, or a unique number or identifier representing this class across all machines (that is, a unique identifier corresponding to the plurality of similar equivalent local classes each on a one of the plurality of machines M1 . . . Mn), to be used in the determination of the initialisation status of the plurality of similar equivalent local classes on each of the machines M1 . . . Mn. This way, the DRT can support the initialization of multiple classes at the same time without becoming confused as to which of the multiple classes are already loaded and which are not, by using the unique identifier of each class.

The DRT 71 can determine the initialization status of the class in a number of possible ways. Preferably, the requesting machine can ask each other requested machine in turn (such as by using a computer communications network to exchange query and response messages between the requesting machine and the requested machine(s)) if the requested machine's similar equivalent local class corresponding to the unique identifier is initialized, and if any requested machine replies true indicating that the similar equivalent local class has already been initialized, then return a true result at return from the is AlreadyLoaded( ) method indicating that the local class should not be initialized, otherwise return a false result at return from the is AlreadyLoaded( ) method indicating that the local class should be initialized. Of course different logic schemes for true or false results may alternatively be implemented with the same effect. Alternatively, the DRT on the local machine can consult a shared record table (perhaps on a separate machine (eg machine X), or a coherent shared record table on each local machine and updated to remain substantially identical, or in a database) to determine if one of the plurality of similar equivalent classes on other machines has been initialised.

If the is AlreadyLoaded( ) method of the DRT 71 returns false, then this means that this class (of the plurality of similar equivalent local classes on the plurality of machines M1 . . . Mn) has not been initialized before on any other machine in the distributed computing environment of the plurality of machines M1 . . . Mn, and hence, the execution of the class initialisation method is to take place or proceed as this is considered the first and original initialization of a class of the plurality of similar equivalent classes on each machine. As a result, when a shared record table of initialisation states exists, the DRT must update the initialisation status record corresponding to this class in the shared record table to true or other value indicating that this class is initialized, such that subsequent consultations of the shared record table of initialisation states (such as performed by all subsequent invocations of is AlreadyLoaded method) by all machines, and optionally including the current machine, will now return a true value indicating that this class is already initialized. Thus, if is AlreadyLoaded( ) returns false, the modified class initialisation routine resumes or continues (or otherwise optionally begins or starts) execution.

On the other hand, if the is AlreadyLoaded method of the DRT 71 returns true, then this means that this class (of the plurality of similar equivalent local classes each on one of the plurality of machines M1 . . . Mn) has already been initialised in the distributed environment, as recorded in the shared record table on machine X of the initialisation states of classes. In such a case, the class initialisation method is not to be executed (or alternatively resumed, or continued, or started, or executed to completion), as it will potentially cause unwanted interactions or conflicts, such as re-initialization of memory, data structures or other machine resources or devices. Thus, when the DRT returns true, the inserted instructions at the start of the <clinit> method prevent execution of the initialization routine (optionally in whole or in part) by aborting the start or continued execution of the <clinit> method through the use of the return instruction, and consequently aborting the JAVA Virtual Machine's initialization operation for this class.

An equivalent procedure for the initialization routines of object (for example "<init>" methods) is illustrated in FIG. 29 where steps 212 and 213 are equivalent to steps 202 and 203 of FIG. 28.

Without management of coordinated object initialisation in a distributed environment of a plurality of machines M1, . . . , Mn, and each with a memory updating and propagation means of FIG. 15, FIG. 17, FIG. 18, and FIG. 19, whereby the application program code 50 is to operate as a single co-ordinated, consistent, and coherent instance across the plurality of machines M1 . . . Mn, each computer or computing machine would re-initialise (and optionally alternatively re-write or over-write) the "timestamp" memory location (field) with multiple and different values corresponding to the multiple executions of the <init> method, leading to potentially incoherent or inconsistent memory between and amongst the occurrences of application program code 50 on each of the machines M1, . . . , Mn. Clearly this is not what the programmer or user of a single application program code 50 instance expects to happen.

So, taking advantage of the DRT, the application code 50 is modified as it is loaded into the machine by changing the object initialisation routine (i.e. the <init> method). The changes made (highlighted in bold) are the initial instructions that the modified <init> method executes. These added instructions determine the initialisation status of this particular object by checking if a similar equivalent local object on another machine corresponding to this particular object, has already been initialized and optionally loaded, by calling a routine or procedure to determine the initialisation status of the object to be initialised, such as the "is already loaded" (e.g., "is AlreadyLoaded( )") procedure or method. The "is AlreadyLoaded( )" method of DRT 71 performing the steps of 172-176 of FIG. 25 determines the initialization status of the similar equivalent local objects each on a one of the machines M1, . . . , Mn corresponding to the particular object being loaded, the result of which is either a true result or a false result corresponding to whether or not another one (or more) of the machines M1 . . . Mn have already initialized, and optionally loaded, this object.

The initialisation determination procedure or method "is AlreadyLoaded( )" of the DRT 71 can optionally take an argument which represents a unique identifier for this object. For example, the name of the object that is being considered for initialisation, a reference to the object being considered for initialization, or a unique number or identifier representing this object across all machines (that is, a unique identifier corresponding to the plurality of similar equivalent local objects each on a one of the plurality of machines M1 . . . Mn), to be used in the determination of the initialisation status of this object in the plurality of similar equivalent local objects on each of the machines M1 . . . Mn. This way, the DRT can support the initialization of multiple objects at the same time without becoming confused as to which of the multiple objects are already loaded and which are not, by using the unique identifier of each object.

The DRT 71 can determine the initialization status of the object in a number of possible ways. Preferably, the requesting machine can ask each other requested machine in turn (such as by using a computer communications network to exchange query and response messages between the requesting machine and the requested machine(s)) if the requested machine's similar equivalent local object corresponding to the unique identifier is initialized, and if any requested machine replies true indicating that the similar equivalent local object has already been initialized, then return a true result at return from the is AlreadyLoaded( ) method indicating that the local object should not be initialized, otherwise return a false result at return from the is AlreadyLoaded( ) method indicating that the local object should be initialized. Of course different logic schemes for true or false results may alternatively be implemented with the same effect. Alternatively, the DRT on the local machine can consult a shared record table (perhaps on a separate machine (eg machine X), or a coherent shared record table on each local machine and updated to remain substantially identical, or in a database) to determine if this particular object (or any one of the plurality of similar equivalent objects on other machines) has been initialised by one of the requested machines.

If the is AlreadyLoaded( ) method of the DRT 71 returns false, then this means that this object (of the plurality of similar equivalent local objects on the plurality of machines M1 . . . Mn) has not been initialized before on any other machine in the distributed computing environment of the plurality of machines M1 . . . Mn, and hence, the execution of the object initialisation method is to take place or proceed as this is considered the first and original initialization. As a result, when a shared record table of initialisation states exists, the DRT must update the initialisation status record corresponding to this object in the shared record table to true or other value indicating that this object is initialized, such that subsequent consultations of the shared record table of initialisation states (such as performed by all subsequent invocations of is AlreadyLoaded method) by all machines, and including the current machine, will now return a true value indicating that this object is already initialized. Thus, if is AlreadyLoaded( ) returns false, the modified object initialisation routine resumes or continues (or otherwise optionally begins or starts) execution.

On the other hand, if the is AlreadyLoaded method of the DRT 71 returns true, then this means that this object (of the plurality of similar equivalent local objects each on one of the plurality of machines M1 . . . Mn) has already been initialised in the distributed environment, as recorded in the shared record table on machine X of the initialisation states of objects. In such a case, the object initialisation method is not to be executed (or alternatively resumed, or continued, or started, or executed to completion), as it will potentially cause unwanted interactions or conflicts, such as re-initialization of memory, data structures or other machine resources or devices. Thus, when the DRT returns true, the inserted instructions near the start of the <init> method prevent execution of the initialization routine (optionally in whole or in part) by aborting the start or continued execution of the <init> method through the use of the return instruction, and consequently aborting the JAVA Virtual Machine's initialization operation for this object.

A similar modification as used for <clinit> is used for <init>. The application program's<init> method (or methods, as there may be multiple) is or are detected as shown by step 212 and modified as shown by step 213 to behave coherently across the distributed environment.

Given the fundamental concept of testing to determine if initialization has already been carried out on a one of a plurality of similar equivalent classes or object or other asset each on a one of the machines M1 . . . Mn, and if not carrying out the initialization, and if so, not carrying out the initialization; there are several different ways or embodiments in which this coordinated and coherent initialization concept, method, and procedure may be carried out or implemented.

In the first embodiment, a particular machine, say machine M2, loads the asset (such as class or object) inclusive of an initialisation routine, modifies it, and then loads each of the other machines M1, M3, . . . , Mn (either sequentially or simultaneously or according to any other order, routine or procedure) with the modified object (or class or other asset or resource) inclusive of the new modified initialization routine(s). Note that there may be one or a plurality of routines corresponding to only one object in the application code, or there may be a plurality of routines corresponding to a plurality of objects in the application code. Note that in one embodiment, the initialization routine(s) that is (are) loaded is binary executable object code. Alternatively, the initialization routine(s) that is (are) loaded is executable intermediary code.

In this arrangement, which may be termed "master/slave" each of the slave (or secondary) machines M1, M3, . . . , Mn loads the modified object (or class), and inclusive of the new modified initialisation routine(s), that was sent to it over the computer communications network or other communications link or path by the master (or primary) machine, such as machine M2, or some other machine such as a machine X of FIG. 23. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a further variation of this "master/slave" or "primary/secondary" arrangement, machine M2 loads asset (such as class or object) inclusive of an (or even one or more) initialization routine in unmodified form on machine M2, and then (for example, machine M2 or each local machine) modifies the class (or object or asset) by deleting the initialization routine in whole or part from the asset (or class or object) and loads by means of a computer communications network or other communications link or path the modified code for the asset with the now modified or deleted initialization routine on the other machines. Thus in this instance the modification is not a transformation, instrumentation, translation or compilation of the asset initialization routine but a deletion of the initialization routine on all machines except one.

The process of deleting the initialization routine in its entirety can either be performed by the "master" machine (such as machine M2 or some other machine such as machine X of FIG. 23) or alternatively by each other machine M1, M3, . . . , Mn upon receipt of the unmodified asset. An additional variation of this "master/slave" or "primary/secondary" arrangement is to use a shared storage device such as a shared file system, or a shared document/file repository such as a shared database as means of exchanging the code (including for example, the modified code) for the asset, class or object between machines M1, M2, . . . , Mn and optionally a machine X of FIG. 23.

In a still further embodiment, each machine M1, . . . , Mn receives the unmodified asset (such as class or object) inclusive of one or more initialization routines, but modifies the routines and then loads the asset (such as class or object) consisting of the now modified routines. Although one machine, such as the master or primary machine may customize or perform a different modification to the initialization routine sent to each machine, this embodiment more readily enables the modification carried out by each machine to be slightly different and to be enhanced, customized, and/or optimized based upon its particular machine architecture, hardware, processor, memory, configuration, operating system, or other factors, yet still similar, coherent and consistent with other machines with all other similar modifications and characteristics that may not need to be similar or identical.

In a further arrangement, a particular machine, say M1, loads the unmodified asset (such as class or object) inclusive of one or more initialisation routine and all other machines M2, M3, . . . , Mn perform a modification to delete the initialization routine of the asset (such as class or object) and load the modified version.

In all of the described instances or embodiments, the supply or the communication of the asset code (such as class code or object code) to the machines M1, . . . , Mn, and optionally inclusive of a machine X of FIG. 23, can be branched, distributed or communicated among and between the different machines in any combination or permutation; such as by providing direct machine to machine communication (for example, M2 supplies each of M1, M3, M4, etc. directly), or by providing or using cascaded or sequential communication (for example, M2 supplies M1 which then supplies M3 which then supplies M4, and so on), or a combination of the direct and cascaded and/or sequential.

In a still further arrangement, the initial machine, say M2, can carry out the initial loading of the application code 50, modify it in accordance with this invention, and then generate a class/object loaded and initialised table which lists all or at least all the pertinent classes and/or objects loaded and initialised by machine M2. This table is then sent or communicated (or at least its contents are sent or communicated) to all other machines (including for example in branched or cascade fashion). Then if a machine, other than M2, needs to load and therefore initialise a class listed in the table, it sends a request to M2 to provide the necessary information, optionally consisting of either the unmodified application code 50 of the class or object to be loaded, or the modified application code of the class or object to be loaded, and optionally a copy of the previously initialised (or optionally and if available, the latest or even the current) values or contents of the previously loaded and initialised class or object on machine M2. An alternative arrangement of this mode may be to send the request for necessary information not to machine M2, but some other, or even more than one of, machine M1, . . . Mn or machine X. Thus the information provided to machine Mn is, in general, different from the initial state loaded and initialise by machine M2.

Under the above circumstances it is preferable and advantageous for each entry in the table to be accompanied by a counter which is incremented on each occasion that a class or object is loaded and initialised on one of the machines M1, . . . , Mn. Thus, when data or other content is demanded, both the class or object contents and the count of the corresponding counter, and optionally in addition the modified or unmodified application code, are transferred in response to the demand. This "on demand" mode may somewhat increase the overhead of the execution of this invention for one or more machines M1, . . . , Mn, but it also reduces the volume of traffic on the communications network which interconnects the computers and therefore provides an overall advantage.

In a still further arrangement, the machines M1 to Mn, may send some or all load requests to an additional machine X (see for example the embodiment of FIG. 23), which performs the modification to the application code 50 inclusive of an (and possibly a plurality of) initialisation routine(s) via any of the afore mentioned methods, and returns the modified application code inclusive of the now modified initialization routine(s) to each of the machines M1 to Mn, and these machines in turn load the modified application code inclusive of the modified routines locally. In this arrangement, machines M1 to Mn forward all load requests to machine X, which returns a modified application program code 50 inclusive of modified initialization routine(s) to each machine. The modifications performed by machine X can include any of the modifications covered under the scope of the present invention. This arrangement may of course be applied to some of the machines and other arrangements described herein before applied to other of the machines.

Persons skilled in the computing arts will be aware of various possible techniques that may be used in the modification of computer code, including but not limited to instrumentation, program transformation, translation, or compilation means.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code. The present invention encompasses all such modification routes and also a combination of two, three or even more, of such routes.

IV. Exemplary Embodiment of System and Method for Withholding Assignment of Object Initialization Co-pending U.S. Patent Application Ser. No. 60/878,173 filed Dec. 29, 2006 describes systems, architectures, and methods for withholding assignment of object initialization which may be used in conjunction with the present invention.

The system and method for withholding assignment of object initialization is not limited to, but is particularly applicable to replicated shared memory (RSM) systems including partial or hybrid RSM systems and is also applicable to other shared memory systems including distributed shared memory (DSM) systems. More particularly, this invention relates to a means to initialise objects, arrays or other data structures comprising a plurality of related memory locations for application programs running in a replicated shared memory arrangement.

Conventional arrangements of a replicated shared memory system may allow a single application program written for, and intended to be run on, a single machine, to be substantially simultaneously executed on a plurality of machines, each with independent local memories, accessible only by the corresponding portion of the application program executing on that machine, and interconnected via the network.

In International Patent Application No. PCT/AU2005/000580 published under WO 2005/103926 (and to which U.S. patent application Ser. No. 11/111,946 corresponds and is incorporated by reference herein) a technique is disclosed to initialise replicated memory locations. The present invention addresses certain limitations described in co-pending U.S. Patent Application Ser. No. 60/830,042 filed Apr. 23, 2004 abovementioned PCT specification regarding initialisation of complex data structures comprising a related set of memory locations, such as objects or arrays. The genesis of the present invention is a desire to provide a way to optimise application programs which initialise memory locations in a multiple computer system.

According to a first aspect of the present invention there is disclosed a method of initializing replicated memory locations in a multiple computer system, said method comprising the step of denying access by each computer being updated to each newly initialized memory location in each computer being updated until all the data being transmitted to each said computer being updated is received thereby.

In one aspect, the invention provides system and method for withholding assignment of object initialization. In one aspect, the invention provides a method of initializing replicated memory locations in a multiple computer system, the method characterized at least in that it comprises denying access by each computer being updated to each newly initialized memory location in each computer being updated until all the data being transmitted to each said computer being updated is received thereby.

Figure 33:
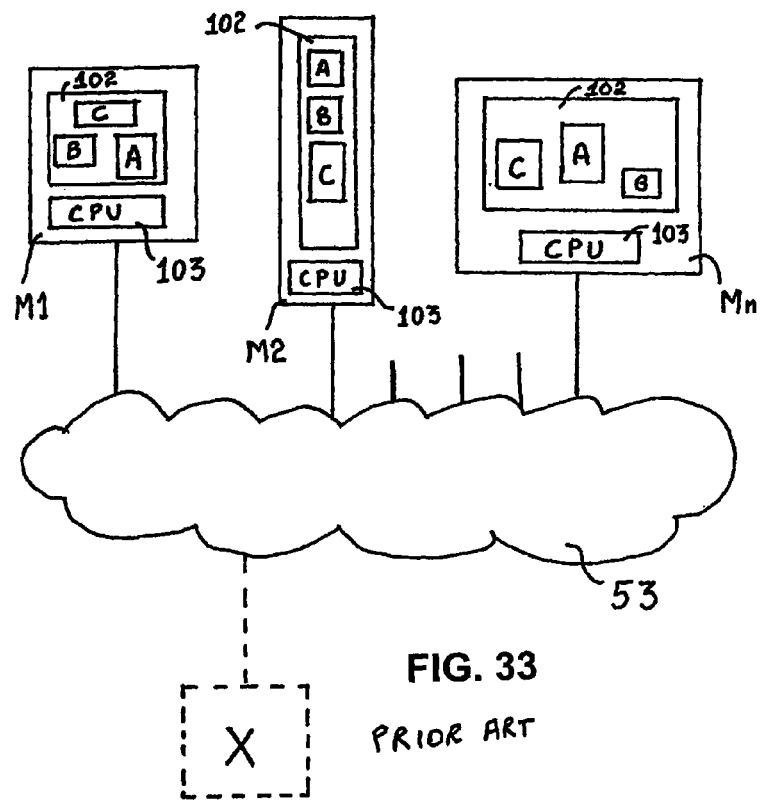
FIG. 33 is a schematic representation of a prior art RSM multiple computer system.

FIG. 33 is a schematic diagram of a prior art replicated shared memory system. In FIG. 33 three machines are shown, that is machines M1, M2, . . . Mn. Additionally, a communications network 53 is shown interconnecting the three machines and a preferable (but optional) server machine X which can also be provided and which is indicated by broken lines. In each of the individual machines, there exists a memory 102 and a CPU 103. In each memory 102 there exists three memory locations, a memory location A, a memory location B, and a memory location C. Each of these three memory locations is replicated in a memory 102 of each machine.

Figure 34:
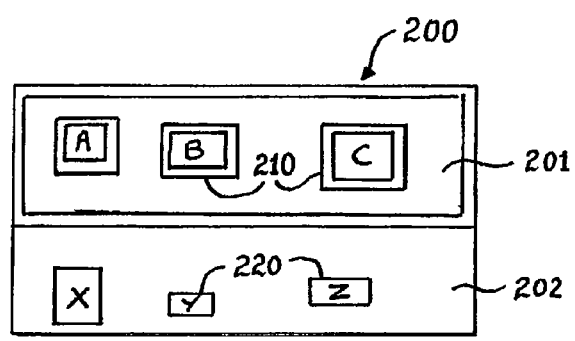
FIG. 34 is a diagram illustrating different types of memory.

Turning now to FIG. 34 FIG. 34 shows a diagram of one important aspect of this invention. The diagram of FIG. 34, that is the box designated as memory 200 is a detailed depiction of the memory 102 of FIG. 33 that has been expanded by the inclusion of two sub regions of memory, that is application memory 201 and non-application memory 202. FIG. 34 depicts the memory space 200 as comprising of an application memory 201 inclusive of memory locations A, B, and C and a non-application memory 202, inclusive of memory locations X, Y and Z. Importantly, the application memory 201 is to be understood to be the memory area comprising application code and data that is accessible and useable by the application instructions and/or operations executing in accordance with the application code and data 210 within application memory 201. In FIG. 34 application memory is drawn bounded by a doubled line.

The second memory region, that is the non-application memory 202 comprising of three memory locations X, Y and Z is a memory region which is to be understood to be not accessible by application instructions and/or operations like the memory region 201. Therefore it might be said that the non-application memory 202 is a private memory region as application instruction and/or operations do not have access to non-application memory 202 or otherwise unable to access due to restrictions, inaccessible ranges, or because a reference, pointer, handle, or other accessing address or accessing means has not been made available to the application code and data 210 of application memory 201. An example of application memory 201 which is distinguished from a non-application memory 202 is the user memory space of most virtual memory systems. Thus in typical virtual systems the application memory 201 may be understood to mean the user memory space and the non-application memory 202 may be understood to mean the kernel space.

As will be known to those skilled in the computing arts the kernel space operates in typical virtual machine environments as a region of memory which is not accessible or ordinarily accessible as is the memory of the user space. Other similar arrangements will be known to those skilled in the computing arts resulting in a distinction between application memory 201 and a non-application memory 202.

Finally, as indicated by the reference to application code and data 210 and non-application code and data 220, in a preferred embodiment the non-application memory 201 comprises both the application data residing in the application memory 201 as well as the application code as indicated in FIG. 34. This however is not essential and in other alternative arrangements known to those skilled in the computing arts, the application code may be segregated or separated from the application data such that the application code is itself stored in a region of non-application memory such as a non-application memory 202. All such arrangements are to be included within the scope of this invention as what is important is not the placement of the application code per se but rather the distinguished region of memory which the application is to use during execution of the application code, and that this application memory is separate from, or separated from, a non-application memory 202 which may comprise code or data or a mixture of both but which is understood to be inaccessible or unusable by the instructions and/or operations of the application code.

Figure 35A:
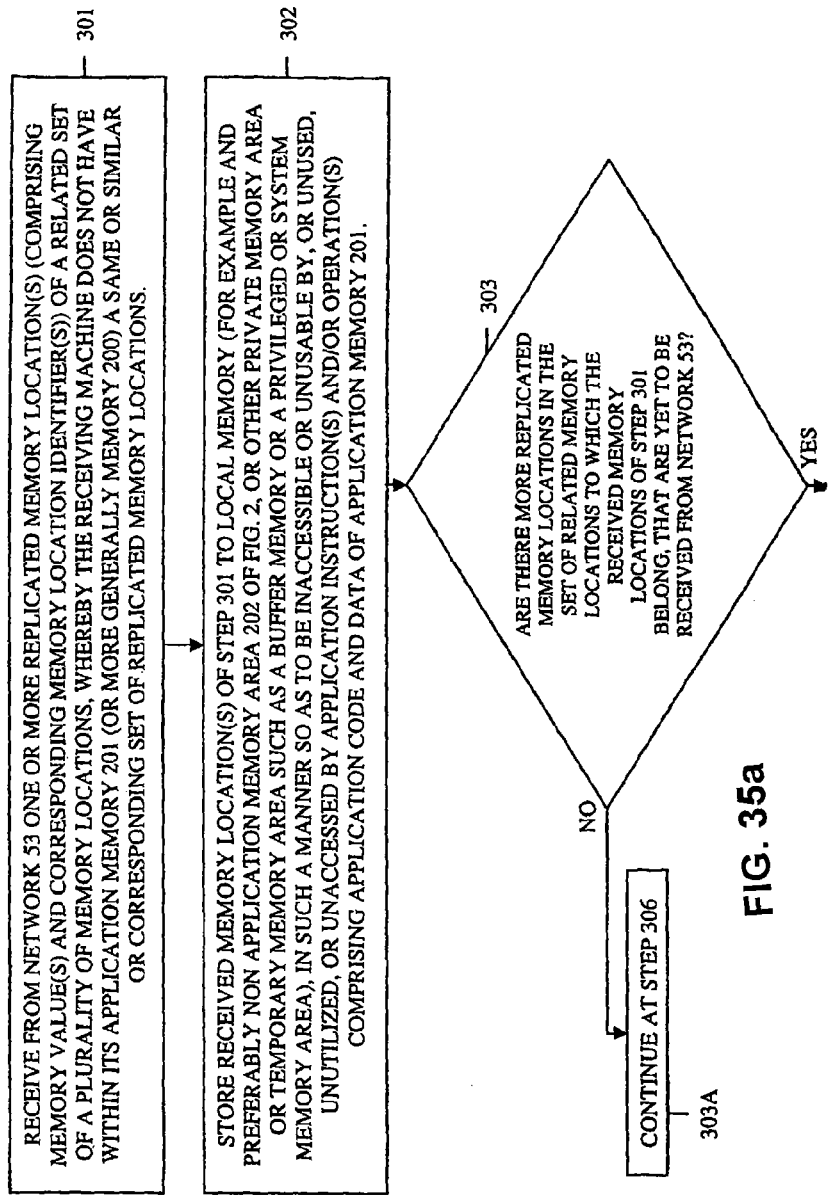
FIG. 35 is a flow chart showing the loading procedure of a first embodiment.
Figure 35B:
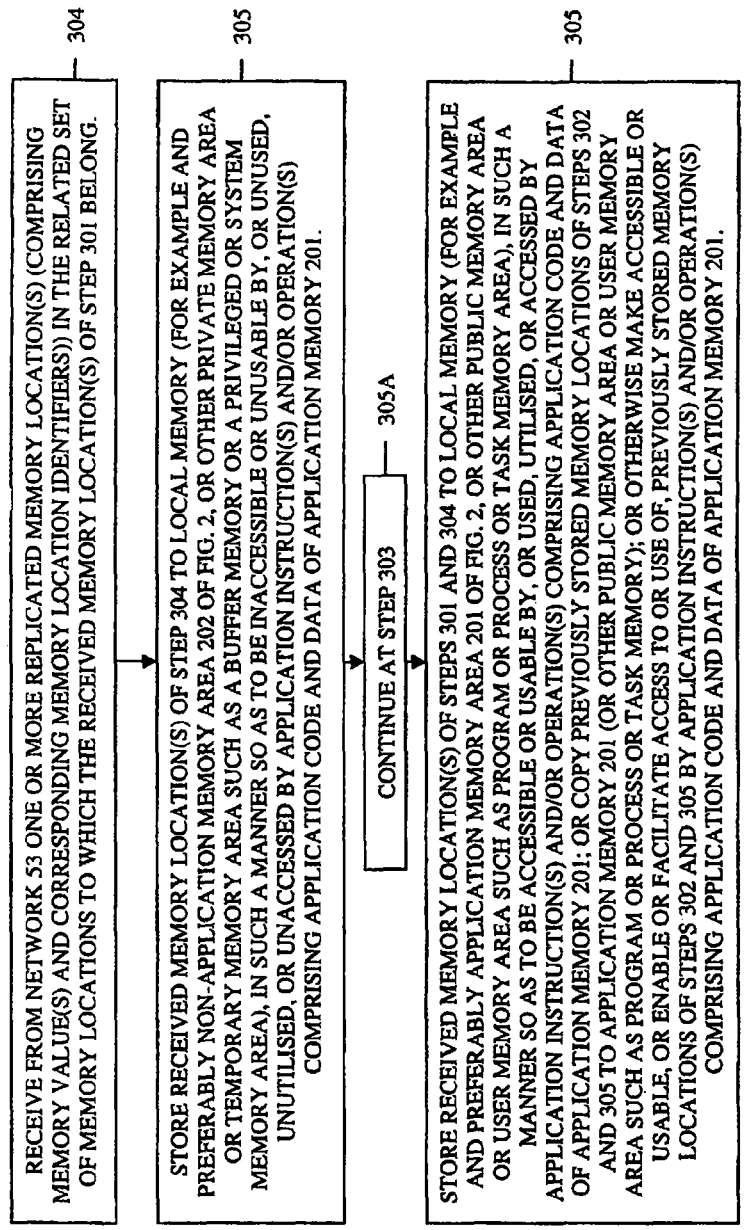

FIG. 35 shows a preferred embodiment of the present invention shown in flowchart form. At step 301 one or more replicated memory locations comprising memory values and corresponding memory location identifiers are received from a network 53. The received memory locations of step 301 importantly are part of a set of related memory locations, for example the memory locations for an array data structure (e.g. elements 1, 2, 3 . . . 10 for example) and another example is the various fields of an object or class (e.g. field 1, 2, 3, 4). Generally such related set of memory locations comprises a data structure whereby the set of memory locations may be treated or operated upon as a single collective unit or at least are identified or managed as a single collective unit. At step 301, the replicated memory locations of a set of memory locations are received on a receiving machine which does not have within its application memory 201 or more generally 200 a same or similar or corresponding set of replicated memory locations.

Step 301 will generally take place when a set of memory locations is being initialised on one or some plurality machines in a replicated shared memory arrangement. This typically takes place when one machine in the replicated shared memory arrangement has created or allocated a related set of memory locations, such as may take place when said first machine creates or allocates a data structure such as an array data type or object which comprises a plurality of memory locations. In accordance with the abovementioned PCT specification such newly created or allocated memory locations may, or will, require creation and replication in each of the other, or some subset of, the plurality of machines in a replicated shared memory arrangement. Step 301 then takes place corresponding to the first machine propagating the newly created or allocated memory locations to the one or more other machines in a replicated shared memory arrangement. Step 301 corresponds to the receipt of such a sent propagation comprising of one or more of the related set of memory locations which are to be stored on the receiving machines so that it may be used. Importantly then, at step 301 as indicated in FIG. 35, the receiving machines receives one or more replicated memory locations in a set of related memory locations, whereby the receiving machine does not have within its application memory 201 (or more generally its memory 200) a same or similar or corresponding set of replicated memory locations. Thus the receiving machine is to be initialised with the set of memory locations.

Following step 301, control passes as indicated to step 302. At step 302, the receiving machine stores the received memory locations of step 301 to local memory in such a manner so as to be inaccessible or unusable by, or unused, unutilised or unaccessed by the application instructions and/or operations comprising the application code and data of application memory 201. For example, in a preferred embodiment the received memory locations of step 301 may be stored to the non-application memory area 202 of FIG. 34, or other private memory area or temporary memory area such as a buffer memory or privileged or system memory area. Importantly at step 302, the received memory locations of step 301 are stored to location memory in such a manner so as to be inaccessible or unusable by, or unused, unutilised or unaccessed by the application instructions and/or operations preferably comprising the application code and data 210 of application memory 201. Thus the received memory locations of step 301 are not to be stored in the application memory 201 so as to be accessible or usable by the application instructions and/or operations of the application code of the application program being run.

In alternative arrangements though, it may be desirable to store such received memory locations of step 301 at step 302 to application memory 201, but in such an arrangement it is necessary to ensure that the stored received memory locations of step 302 are inaccessible or unusable by, or unused, unutilised or unaccessed by the application instructions and/or operations comprising the application code and data 210 of application memory 201.

At step 303 a determination is made as to whether there are more replicated memory locations in the set of related memory locations to which the received memory locations of step 301 belong that are yet to be received from network 53. For example where the transmission a related set of memory locations is divided into multiple packets or other network transmission means then corresponding to the receipt of the first of multiple packets at step 301, and subsequent storage at step 302, a determination is made at step 303 as to whether there are outstanding packets yet to be received. If only the first has been received a "yes" determination is made, and control will pass via the "yes" branch as indicated to step 304. Alternatively, should step 303 make a "no" determination, that is, that there are no replicated memory locations in the set of related memory locations which are yet to be received (e.g. packets which have yet to arrive), then a "no" determination is made and control passes via the "no" branch as indicated to step 303A and subsequently to step 306.

At step 304 one or more replicated memory locations in the related set of memory locations to which the received memory locations of step 301 belong are received from network 53. Step 304 takes place in a similar manner to step 301 but the outstanding memory locations in the related set of memory locations not received at step 301, or earlier iterations of step 304, are received as indicated. Following receipt of such yet to be received memory locations in the related set of memory locations of step 304, control passes as indicated to step 305.

At step 305, the received memory locations of step 304 are stored to location memory in such a manner so as to be inaccessible, unusable by, or unused, unutilised or unaccessed by application instructions and/or operations comprising the application code and data of application memory 201. Steps 304 and 305 are very similar to steps 301 and 302.

Following step 305, execution is returned as indicated by step 305A to step 303. Thus at step 303, a new determination is made as to whether there still are outstanding memory locations which are yet to be received in the related set of memory locations to which the first received memory locations of step 301 belong. Thus it will be appreciated that steps 303, 304, 305 may take place in a looping arrangement so long as it is determined that each iteration of such looping at step 303 that there are outstanding memory locations in the set of memory locations which are yet to be received. Not until step 303 makes the determination that there are no memory locations in the set of memory locations which are yet to be received, (that is, that all memory locations in the related set of memory locations have been received and stored in accordance with steps 301, 302, 304, and 305), will a "no" determination may be made and control passed as indicated to step 306.

At step 306, the received memory locations of steps 301 and 304 are stored to local memory in such a manner so as to be accessible or useable by, or used, utilised, or accessed by the application instructions and/or operations of the application code and data of application memory 201. Or alternatively as described, the previously stored memory locations of steps 302 and 305 may be copied from their present stored locations to application memory 201, or other public memory area or user memory area such as program or process or task memory. Or alternatively again, the previously stored memory locations of steps 302 and 305 may be made accessible or usable by the application instructions and/or operations of the application code and data of application memory 201, or otherwise access to or use of the previously stored memory locations of steps 302 and 305 is enabled, allowed or facilitated so that application instructions and/or operations of the application code and data of application memory 201 may now make use of, and access, the previously stored memory locations of steps 302 and 305.

Regardless of which specific storage arrangement is used, what is important is that corresponding to step 306, the related set of memory locations is made accessible or usable by the application instructions and/or operations of the application code and data of application memory 201, and that this action of making the related set of memory locations accessible and/or usable by the application instructions and/or operations takes place in such a manner so as to make available the related set of memory locations all at once, or as a single unit. In other words, taken together, the steps of FIG. 35 act to collect and store the received memory locations which are received in an incremental or piece meal fashion from a network 53. These are stored to non-application memory or other memory space which is not accessible or not usable by the application code and data until such a time as all the memory locations in the related set of memory locations are, or have been received. At that time, the related set of memory locations can be made available or accessible or usable to and by to application code and data of the application program.

Figure 36:
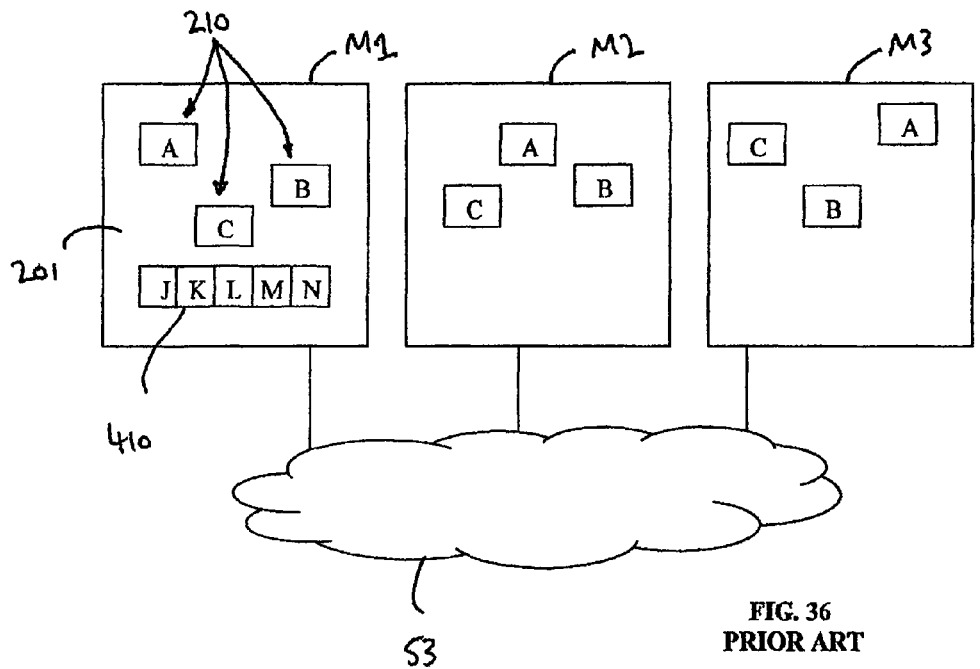
FIG. 36, FIG. 37 and FIG. 38 illustrate the initialization processes of the abovementioned PCT specification.
Figure 37:
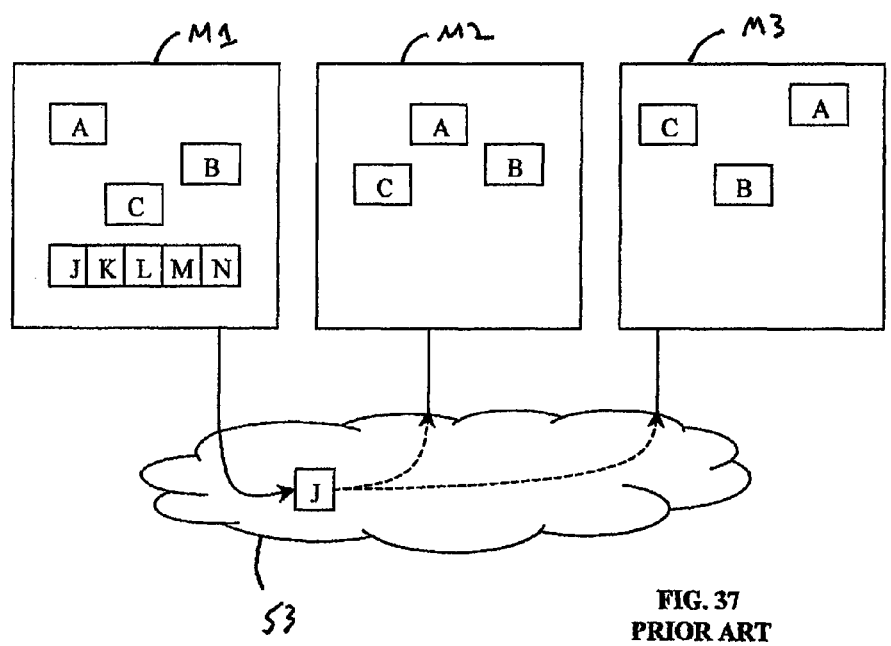
Figure 38:
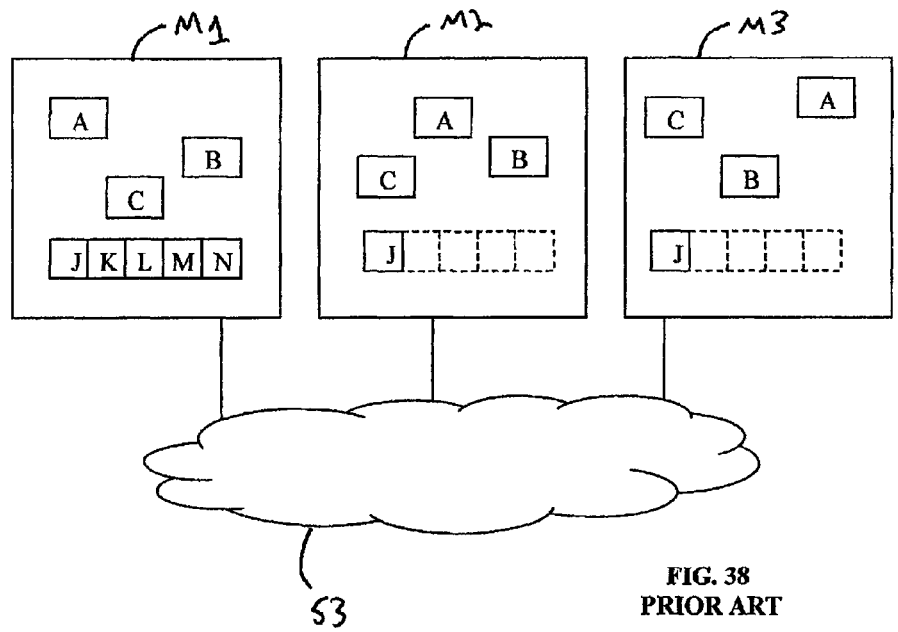

FIG. 36, FIG. 37 and FIG. 38 illustrate the prior art arrangements of the abovementioned PCT specification and are provided here for the purposes of illustrating the shortcomings of the prior art techniques with regard to initialisation of data structure or other related sets of multiple memory locations. In FIG. 36, three machines are depicted and connected to a network 53. Each of these three machines depicted shows the memory 200 of each machine comprising a replicated set of three memory locations A, B, C (labelled 210) and a related set of memory locations 410 on the first of the three machines. The arrangement depicted in FIG. 36 will be subsequently explored with regard to the initialisation and initial replication of the memory set 410, comprising five memory locations J, K, L, M and N as they are initialised and replicated onto the other two machines in the replicated shared memory arrangement.

FIG. 37 depicts the prior art process and method whereby the memory set 410 is being replicated and initialised onto the other two machines in the arrangement. The J memory location shown in the network 53 as travelling from the first machine destined for each of the two other machines as shown by the dotted arrows. The arrangement depicted in FIG. 37 is typical of the prior art whereby memory locations are sent typically one by one are sent via a network 53 to the other machines of the replicated shared memory arrangement. On receipt they are subsequently stored and sometimes initialised. Particularly with consideration to the memory set 410 of FIG. 36 comprising the memory locations J, K, L, M and N, FIG. 37 shows the breakdown of the memory set into individual transmissions of some subset of the full memory set 410 to each of the other machines.

Turning now to FIG. 38, the consequence of the transmission of the J portion of the memory set 410 transmitted in FIG. 37 is shown. It will be observed that the second and third machines in the three machine arrangement are now shown with an initialised memory location J indicated by the box with the letter J inside of it. It will also be observed that corresponding to the J box on the second and third machine, there are also indicated four boxes in dotted lines indicating that the J memory location is part of a memory set of related memory locations, which in this instance is a set of five memory locations. Thus the four dotted boxes are shown on machines M2 and M3 corresponding to the first box J. Thus FIG. 38 shows a scenario which can reasonably and typically come about as a consequence of the prior art methods being applied and which are applied to individual memory locations.

Unfortunately in situations where an individual memory location is part of a related set of memory locations, for example array elements forming part of an array data structure, or fields part of an object data structure, or in the case of FIG. 36, FIG. 37 and FIG. 38, the memory locations J, K, L, M and N forming part of the collective memory set 410, then the prior art will typically breakdown the transmission of the memory set into smaller parts each comprising some subset of the memory locations in the memory set as required or limited by a network 53. For example, if the number of memory locations exceeds the maximum transmission unit of the underlying network 53, then it will be absolutely necessary to transmit a memory set 410 in parts so that the packet or cell or frame to be transmitted containing the values and location identifiers of the transmitted memory locations, does not exceed the maximum transmission unit of the underlying network.

In other arrangements, it may also be advantageous to send some subset of the memory locations of a related set of memory locations in a single operation and this to results in the arrangement shown in FIG. 38. Importantly, through operation of a prototype computer system utilising the prior art methods observed that when the prior art methods are applied to memory sets comprising a plurality of related memory locations (such as the memory set of 410 of FIG. 36, FIG. 37 and FIG. 38), then undesirable behaviour may result during the time between the transmission of the first one or some of the memory locations in the set of memory locations, and the time of transmission of the last memory location in the set of memory locations. Such undesirable behaviour may come about when some initial memory locations in the set of memory locations are received by the receiving machine (such as machines M2 and M3 of FIG. 38) and immediately stored to application memory 201 of the receiving machine(s) (as indicated for the J memory location on FIG. 38 for machines 2 and 3).

In such a circumstance as depicted in FIG. 38 whereby a one or some subset of the complete set of memory locations in the memory set 410 (that is memory location J) is transmitted to a second and third machine as shown in FIG. 37, and in due course stored into application memory 210 prior to the receipt and corresponding store of the other memory locations in the set of memory locations (that is memory locations K, L, M and N), then the result may be that the memory observed by the application program(s) running on machines M2 and M3 may be inconsistent and/or incoherent. More specifically, such inconsistent or incoherent memory will be observed were either of the application code executing on machines 2 or 3 to attempt to access the local replica memory location corresponding to memory location K or L or M or N when those memory locations have not been received. Restated in the arrangement shown in FIG. 38 a first one of a memory set 410 has been received and stored in the application memory 201 of machines M2 and M3 but the other memory locations in the set of memory locations, that is memory locations K, L, M and N, have not been received and thus have not been and cannot be, stored yet into their corresponding replica memory locations on machines 2 and 3.

In such a circumstance then only memory location J has been properly initialised with its replicated value from machine number M1 but memory locations K, L, M and N are possibly empty, inconsistent or otherwise undefined as no such receipt of replicated K, L, M or N memory locations from machine M1 has yet taken place on either of machines M2 or M3. Were an application code running on machine M2 or machine M3 to access memory location J and do so successfully, the same application code may therefore assume that as it was able to access memory location J, so memory locations K, L, M and N are similarly, or should be similarly, accessible and available. In such an arrangement then, if the application code having accessed memory location J attempts to access memory locations K, L, M or N then undefined behaviour for the application code may arise caused by either the unavailability of those four other memory locations, or incorrect or inappropriately initialised values for the memory locations to be the replicated memory locations on machines M2 or M3 for memory locations K, L, M or N.

Thus operation of a prototype computer system utilising the prior art methods made apparent that there exists a limitation in the propagation and initialisation methods of the abovementioned PCT specification with regards to memory sets comprising of a related set of memory locations. This shortcoming and the problems it causes may manifest themselves as inconsistent or incoherent memory on the part of the machines which are in the process of receiving the memory set and have received some one or some subset of the memory locations in the set but not all and in accordance with the prior art stored the received one or some subset of received memory locations into application memory 201. Therefore it is desirable to conceive of a method for initialising and propagating memory sets comprising of a plurality of memory locations, which does not suffer from the shortcoming depicted in FIG. 36, FIG. 37 and FIG. 38 caused by the prior art methods.

Turning now to FIG. 39, FIG. 40, FIG. 41, FIG. 42, FIG. 43 and FIG. 44, these show an arrangement for the initialisation and propagation of a memory set 410 in accordance with the steps of FIG. 35. The arrangements of FIG. 39, FIG. 40, FIG. 41, FIG. 42, FIG. 43 and FIG. 44 are in contrast to the prior art arrangements of FIG. 36, FIG. 37 and FIG. 38, whereby the problems or shortcomings of the arrangements shown in FIG. 36, FIG. 37, and FIG. 38 will be seen not to be present in the arrangement shown in FIG. 39, FIG. 40, FIG. 41, FIG. 43 and FIG. 44.

Figure 39:
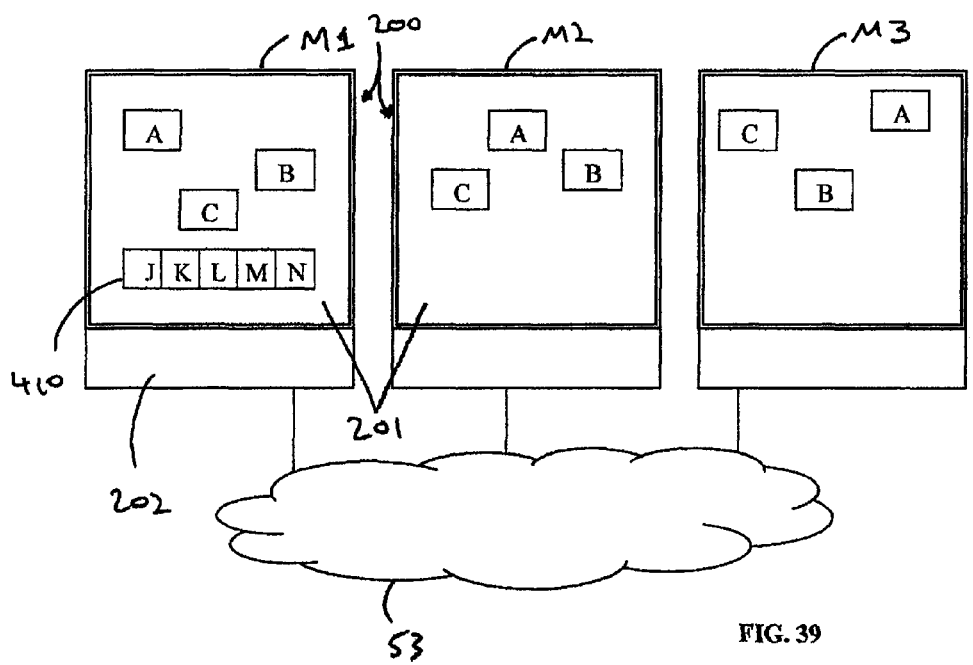
FIG. 39, FIG. 40, FIG. 41, FIG. 42, FIG. 43 and FIG. 44 illustrate the corresponding process in accordance with the steps of FIG. 35.

Turning then more specifically to FIG. 39, this shows an initial arrangement of three machines in a replicated shared memory arrangement. The three machines, M1, M2 and M3 are each depicted with three memory areas 200 which are internally each divided into a first application memory 201 and a second non application memory 202. Within the application memory 201, of the first machine M1 there are three memory locations A, B and C which are also replicated within the application memory 201 of the second and third machines. Additionally there exists in the application memory 201 of the first machine M1 a memory set 410 comprising a plurality of related memory locations, such as may be the case for various data structures such as array data structures or data types, objects or classes comprising of their associated fields or any other related association of multiple memory locations. Application memory 201 is shown bounded by double lines.

In the instance of FIG. 39, the memory set 410 comprises five individual memory locations, namely those of memory locations J, K, L, M and N. The three machines are interconnected via a network 53 through which communication between the machines is to take place. The subsequent FIG. 40 through FIG. 44 will now be described with reference to the initialisation and propagation of the memory set 410 to each of the second and third machines M1, M2 so that they will in due course have a local replica of the memory set 410 in accordance with and the steps of FIG. 35.

Figure 40:
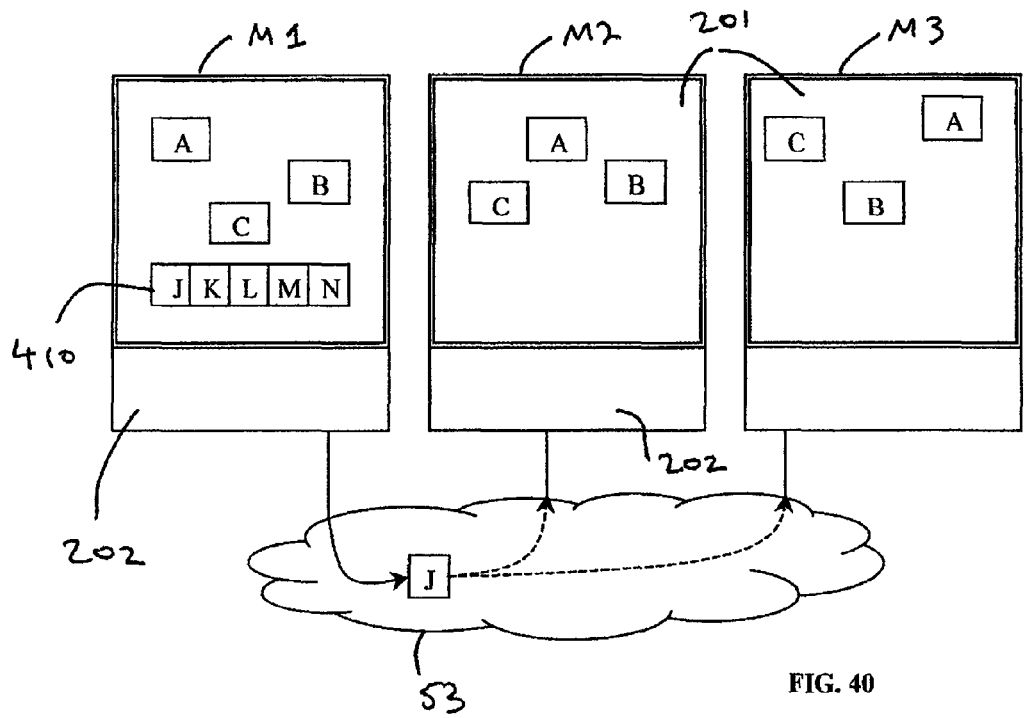

Turning then to FIG. 40, it shows the arrangement of FIG. 39 with the additional indication of a transmission or propagation of the J memory location through the network 53 to the second and third machine. This transmission of the K memory location is indicated via the arrow coming from the first machine and the two dotted arrows leading to machines M2 and M3. Thus in FIG. 40 the first machine has commenced the process of initialising, propagation and otherwise transmitting the memory set 410 to the second and third machines. This transmission is taking place as depicted in FIG. 40 in a piecemeal or part by part fashion whereby the memory set 410 is not transmitted in a single network operation (such as a single network packet or frame) but rather divided into, or broken up into, multiple parts. Each part comprises some subset of the total memory set 410. In the instance of FIG. 40, this subset being transmitted is the first memory location J. The other four memory locations in the memory set 410 (that is memory locations K, L, M and N) are yet to be transmitted.

Figure 41:
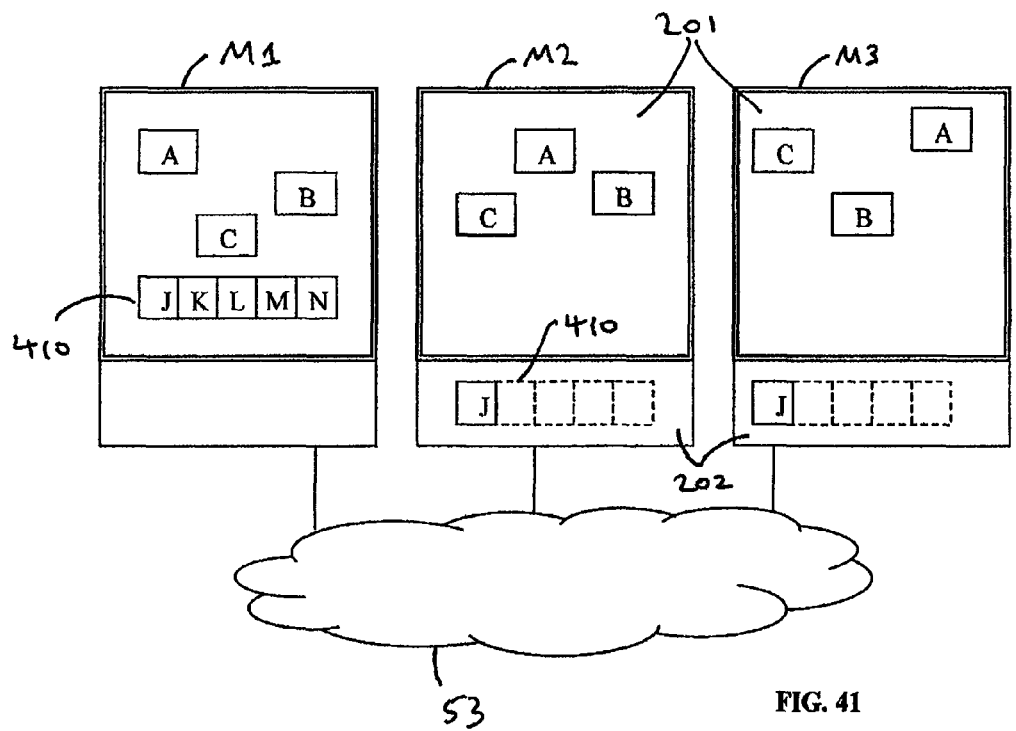

FIG. 41 shows the receipt of the J memory location sent in FIG. 40 by machines 2 and 3. This is indicated by the presence of a J memory location in the non-application memory area 202 on machine 2 and machine 3. Importantly, it will also be observed that there is, indicated in dotted lines the presence of four related boxes adjoined to the J memory location. This indicates that the J memory location is itself part of a memory set which in this instance is memory set 410 comprising the additional memory locations K, L, M and N as observed on the first machine M1. It is important to appreciate at this point that the arrangement depicted in FIG. 41 is in contrast to the arrangement depicted in FIG. 38. More specifically, the arrangement of FIG. 41 has the received J memory location being stored in a non-application memory area 202 whereby the received J memory location is inaccessible, or otherwise unusable by application code and data of application memory 201. This is in contrast to the depiction of FIG. 38 whereby the initially received memory location J in the set of memory locations 410 has been stored into the application memory area 201 in accordance with the prior art methods.

Unlike the arrangement depicted in FIG. 38 whereby the received memory location J is or may be accessible to the application code and/or data of application memory 201, the arrangement of FIG. 41 is not similarly accessible to the application code and data and application memory 201. This is advantageous as the problems of accessing incompletely initialised memory sets of FIG. 38 is avoided in the example of FIG. 41 as the initially received memory location J is stored in the non application memory area 202.

Figure 42:
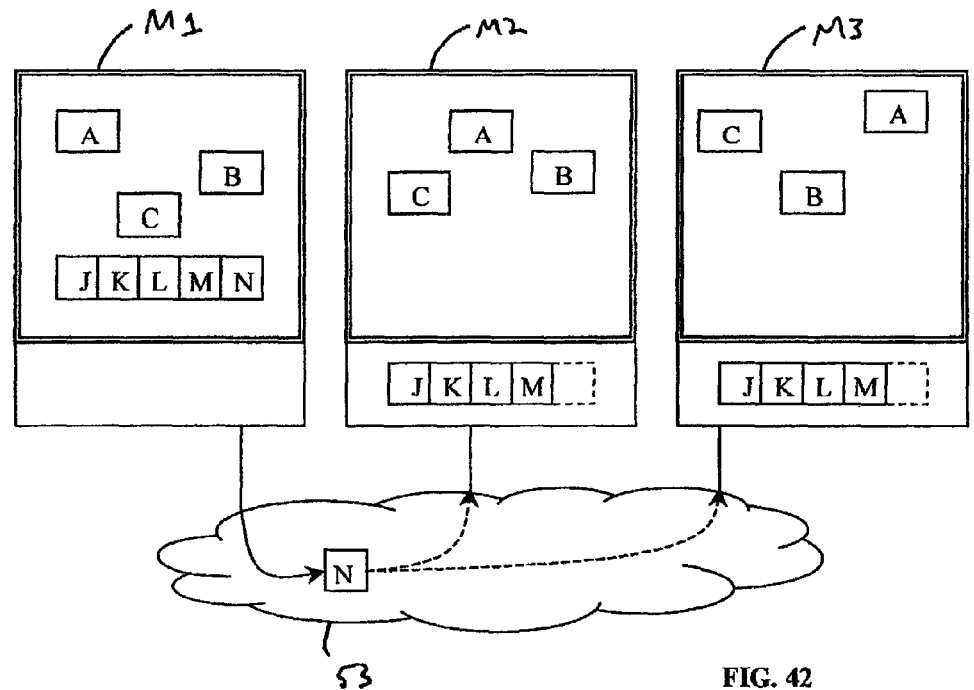

FIG. 42 shows the further receipt of memory locations K, L and M within the memory set 410 by machines 2 and 3. In accordance with the receipt of the memory locations K, L, and M these three received memory locations are stored into their corresponding location in non-application memory area 202 and associated with memory location J as indicated in FIG. 42. Importantly, the last memory location N that is part of the memory set 410 has yet to be received by machines M2 and M3. This is indicated on machines M2 and M3 by the single dotted box at the end of the memory location M. Also it will observed that within the network 53 there is the memory location N "in flight" indicated by the arrow coming from machine number 1 and the dotted arrows pointing to machines M2 and M3 indicating that memory location N is on its way to the second and third machines M2 and M3.

Importantly in FIG. 42 despite having received the additional memory locations K, and L and M, following the receipt of the J memory location of FIG. 41, the memory set 410 is still not available or made available to application memory 201 of FIG. 42. Instead it is continued to be stored in the non-application memory area 202, or otherwise continued to be made inaccessible to the application code and data of application memory 201. In accordance with the steps of FIG. 35 then, not until all parts of the memory set 410 are received by machine M2 and M3 independently, may either machine M2 or M3 transition the memory set 410 locally from the non-application memory area 202 to the application memory area 201.

Figure 43:
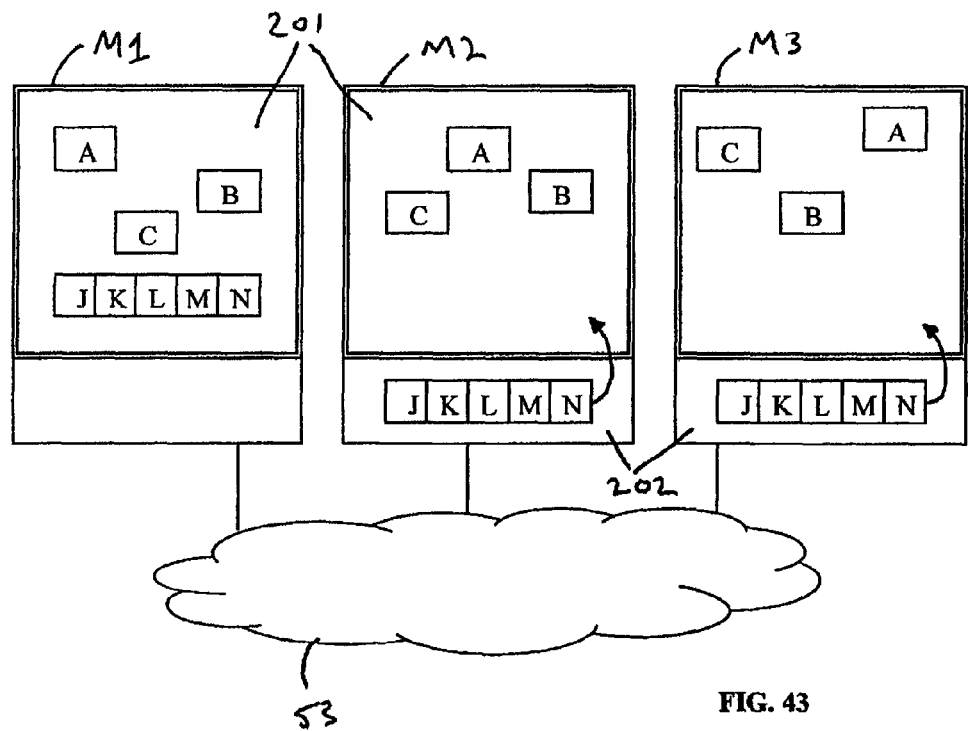

Such an arrangement is shown in FIG. 43. The completed memory set 410 is shown as indicated by the completed boxes J, K, L, M and N stored in the non-application memory area 202. Also indicated on each of the machines M2 and M3, is an arrow pointing from the memory set 410 to the application memory area 201. This is to be understood to imply or mean that the memory set 410 comprising the J, K, L, M and N memory locations is now to be changed so as to be made available, made accessible and/or made useable by the application memory area 201.

Figure 44:
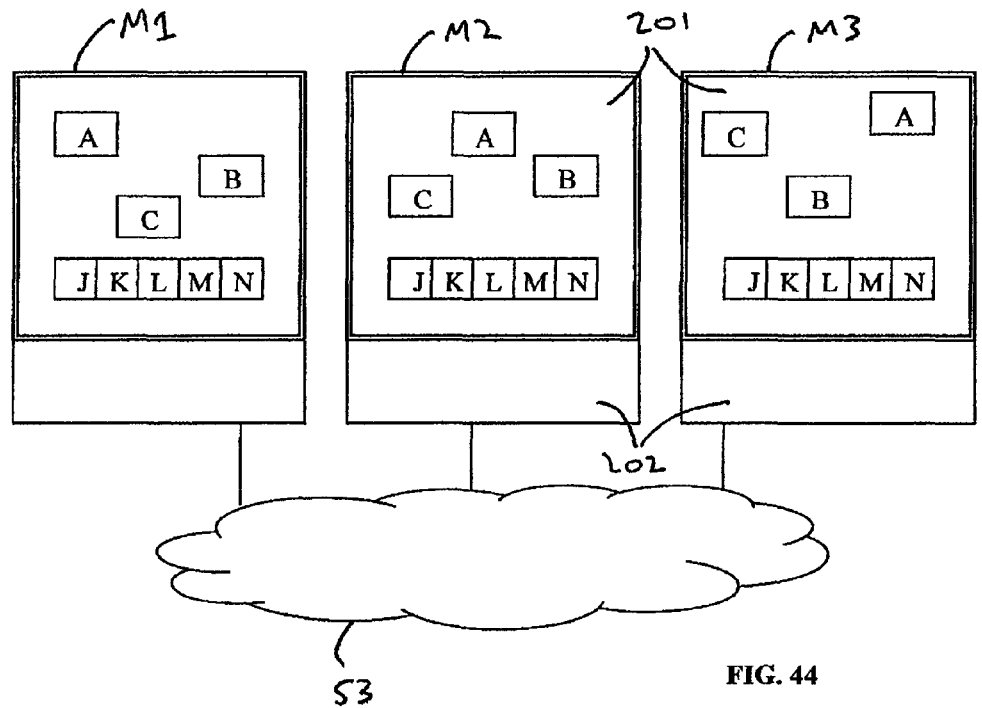

In accordance with this, as indicated in FIG. 44, the memory set 410 originally located in the non-application memory area 202 of machines 2 and 3 is now shown to be occupying a region of application memory area 201. Accordingly then, the memory set 410 comprising the J, K, L, M and N memory locations are now resident in, or otherwise accessible or useable by, the application memory area 201 as indicated. Thus at this point, the initialisation or propagation of the memory set 410 may be considered to be completed as the memory set is now available to application instructions and/or operations of the application code and data comprising application memory 201.

Exactly how the memory set 410 is transitioned from a non-application memory 202 area or designation to an application memory area 201, or otherwise made accessible to memory area 201, is not important so long as that during the receipt of memory location(s) within the plurality of related memory locations comprising the memory set, the memory set is not accessible or accessed by application memory area 201, and only at such a time as the memory set 410 is fully initialised and formed within its non-application memory area 202 designation, may it then be transitioned to be accessible or usable by application memory area 201.

Figure 45:
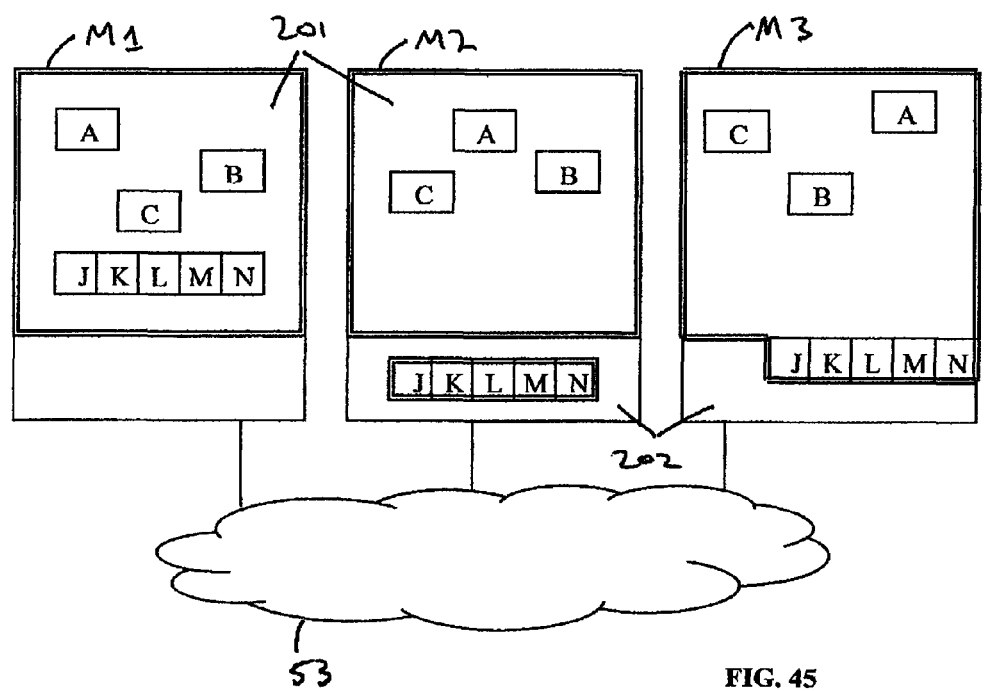
FIG. 45, FIG. 46, FIG. 47, FIG. 48, FIG. 49 and FIG. 50 illustrate the corresponding steps of an alternative embodiment.

Turning now to FIG. 45, an alternative arrangement is shown. Here, it can be seen that the memory set 410 of machines 2 and 3 is completed and all five memory locations are indicated as being bounded by a double line. However unlike FIG. 43 and FIG. 44, in FIG. 45 the memory set 410 is depicted to have changed state so that the original locations to which the memory locations in the memory set were stored upon receipt from network 53 are not moved or copied elsewhere but rather made accessible to application memory area 201 as indicated in FIG. 45. Thus such an arrangement may come about where the memory set 410 is initialised in a non-application memory area 202 or region or otherwise not accessible to or by application memory area 201 and corresponding to its completion a handle, reference, pointer, address, or other access means to the stored memory set of the non application memory area 202 is made available or otherwise facilitated so that the memory set 410 originally stored in the non application memory area 202 becomes accessible and useable by, and may be used or utilised by, the application memory area 201.

Figure 46:
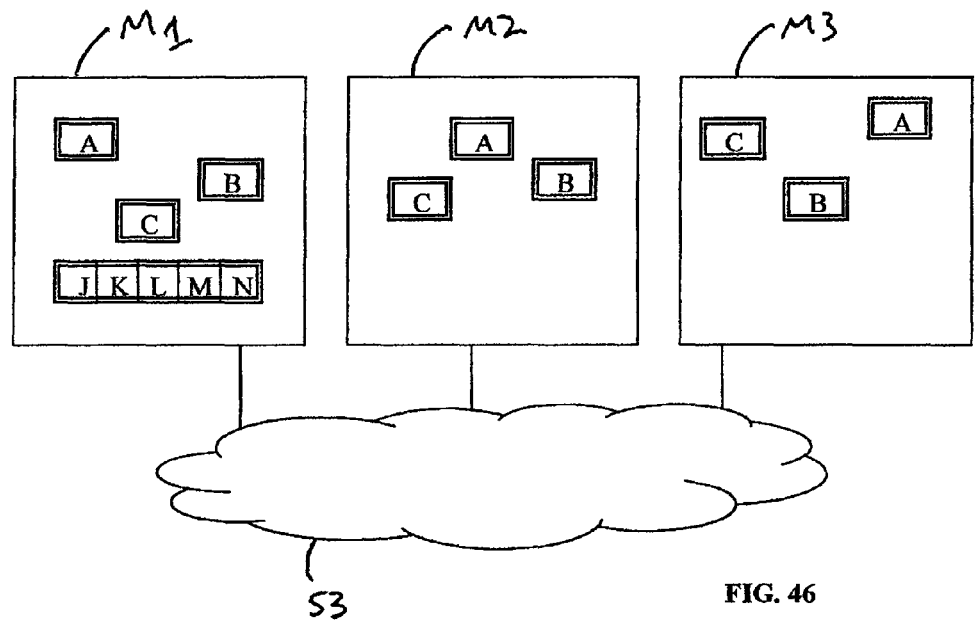

Turning now to FIG. 46, FIG. 47, FIG. 48, FIG. 49, and FIG. 50, these show a further alternative embodiment or arrangement of the steps of FIG. 35. FIG. 46 depicts three machines M1-M3 interconnected via a network 53 consisting of a memory 200 and an application memory 201. Within the application memory of the first machine M1 there exists three memory locations A, B and C which are also similarly replicated in the application memory of machines M2 and M3. Additionally machine M1 also has a memory set 410 consisting of a plurality of related memory locations labelled J, K, L, M and N. It is desirable to initialise a replica of the memory set 410 onto the second machine M2 in the replicated shared memory arrangement.

Figure 47:
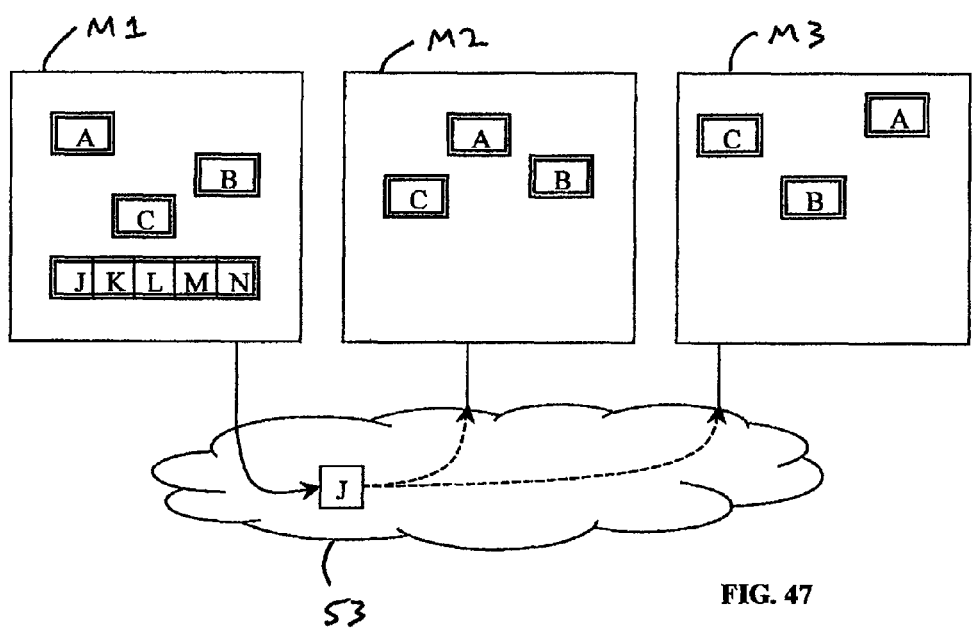

FIG. 47 depicts an initial transmission of a J memory location within the set of memory locations 410 to the second and third machines. This is depicted by the broken arrows within the network 53 directed to the second and third machines M2 and M3.

Figure 48:
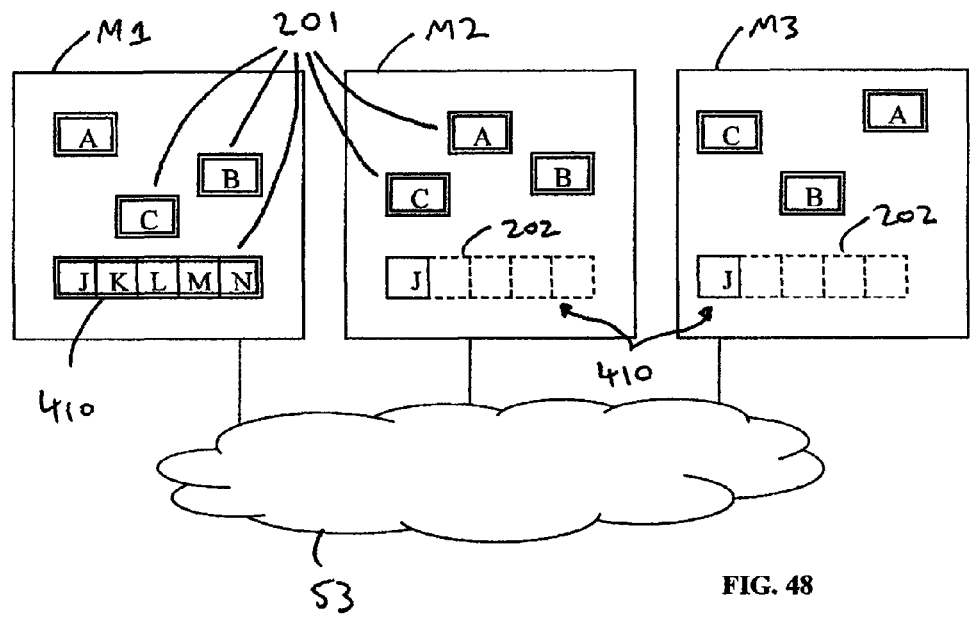

FIG. 48 shows the receipt of the J memory location transmitted in FIG. 47. Attention is drawn to the J memory location indicated to be stored in the second and third machine of this figure. Closer examination also shows that the memory set 410 comprising the outstanding memory locations K, L, M and N is indicated in four dotted boxes. Lastly, it will also be noticed that the memory set of the initial memory location J and the four dotted boxes present in the application memory 201 of the second and third machine is bounded by a single line, and this indicates that the memory set consisting of the J memory location and the four dotted boxes for the outstanding K, L, M and N memory locations is distinguished and distinct from the application memory 201 and is actually classified as non-application memory 202. This is indicated in the figure where the memory set 410 in the second and third machine is designated as a non application memory 202. For example this may come about in various embodiments or implementations whereby corresponding to the receipt of the memory location J transmitted in FIG. 47, machines M2 and M3 stored J to a region of application memory 201 and subsequently mark the stored J memory location as no longer being accessible or able to be accessed or used by the application memory 201, and thereby make the memory set 410 shown in machines M2 and M3 to be non-application memory 202.

Exactly how such a non-application memory designation or storage is to be attributed to the recently stored J memory location, and optionally or preferably the outstanding K, L and M and N memory locations which are yet to be received, is not important so long as corresponding to the storage of the J memory location in the application memory 201 the necessary steps or tasks are undertaken so as to ensure that the stored J memory location and its other related memory locations in the memory set 410 are not accessible or usable or able to be accessed by the application memory 201. Therefore memory set 410 by definition becomes a non-application memory area 202. This is indicated in FIG. 48.

Figure 49:
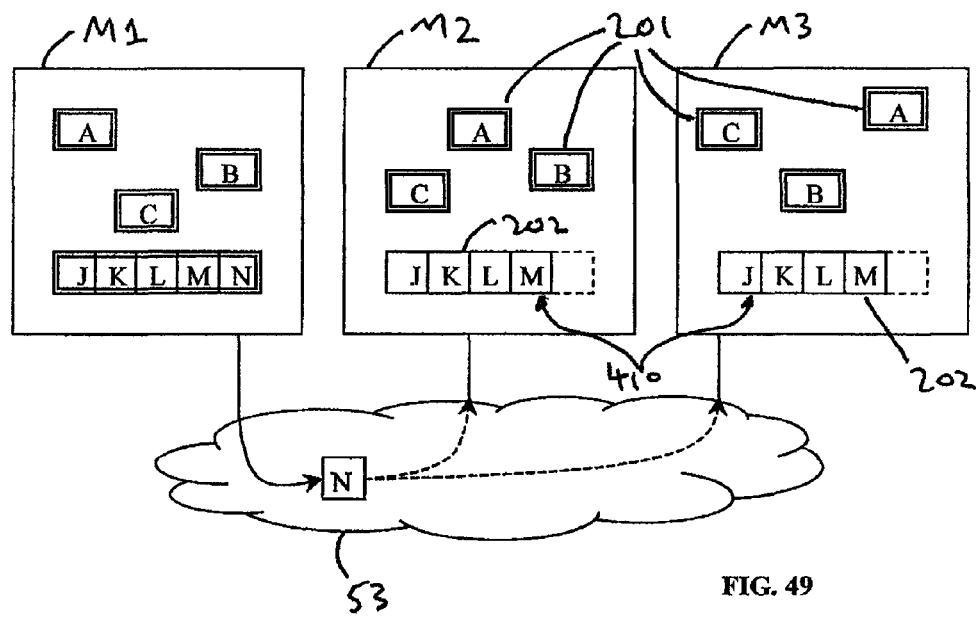

At FIG. 49 the transmission of the final memory location in the memory set 410 is depicted by the transmission of the N memory location through the network cloud 53. Additionally, it is seen in machines M2 and M3 that the memory locations K, L and M have also been received by machines 2 and 3 and stored in their corresponding locations within the memory set 410. The memory set 410 comprising the J, K, L and M memory locations on machines 2 and 3 is bounded by a single line to indicate that the memory area is a non-application memory area 202 and not an application memory area 201.

Figure 50:
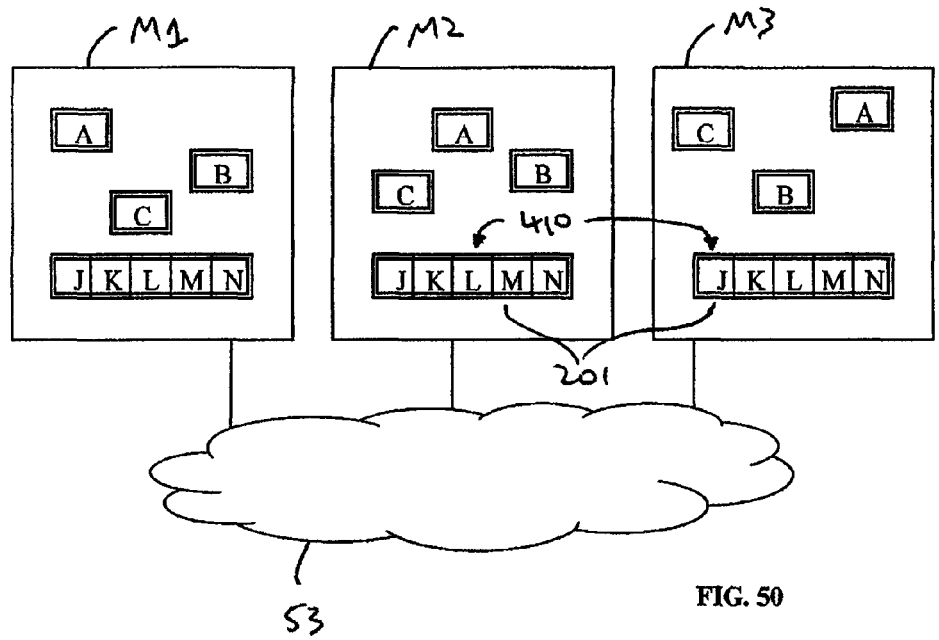

With reference to FIG. 50, FIG. 50 corresponds to the receipt of the last outstanding memory location N in the memory set 410 by the machines M2 and M3. In particular, N memory location from network 53, shown as being transmitted in FIG. 49, has now been received and stored in the corresponding memory location within the memory set of machines M2 and M3. Additionally, machines M2 and M3 have taken the action or steps necessary so as to make the memory set 410 (originally stored at a non application memory 202) become part of the application memory 201. Thus the arrangement depicted in FIG. 50 shows the memory set 410 to no longer be bounded by a single line (as was the case in FIG. 48 and FIG. 49 indicating that the memory set 410 was part of a non-application memory area 202). Instead, the memory set 410 is shown to be bounded by double lines and thus now part of the application memory area of 201.

It may be appreciated in light of the description provided here that in one embodiment, the invention provides a method of initializing replicated memory locations in a multiple computer system, the method comprising the step of denying access by each computer being updated to each newly initialized memory location in each computer being updated until all the data being transmitted to each computer being updated is received thereby.

V. Exemplary Embodiment of Computer Architecture and Method of Operation for Multi-Computer Distributed Processing with Finalization of Objects Co-pending U.S. Patent Application Ser. No. 11/111,778 filed Apr. 22, 2005 describes a Computer Architecture And Method Of Operation For Multi-Computer Distributed Processing With Finalization Of Objects which may be used in conjunction with the present invention.

With reference to the finalisation modifier that may be present, such finalisation modifier 51-F or DRT 71-F or other code modifying means is responsible for modifying the application code 50 so that the code may execute finalisation clean-up, or other memory reclamation, recycling, deletion or finalisation operations, such as for example finalisation methods in the JAVA language and virtual machine environment, in a coordinated, coherent and consistent manner across the plurality of individual machines M1, M2, . . . , Mn.

These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

In another aspect, embodiments of the invention pertain to computers and other computing machines and information appliances, in particular, to a modified computer architecture and program structure which enables the operation of an application program concurrently or simultaneously on a plurality of computers interconnected via a communications link using a distributed runtime and enables improved performance to be achieved.

Figure 51:
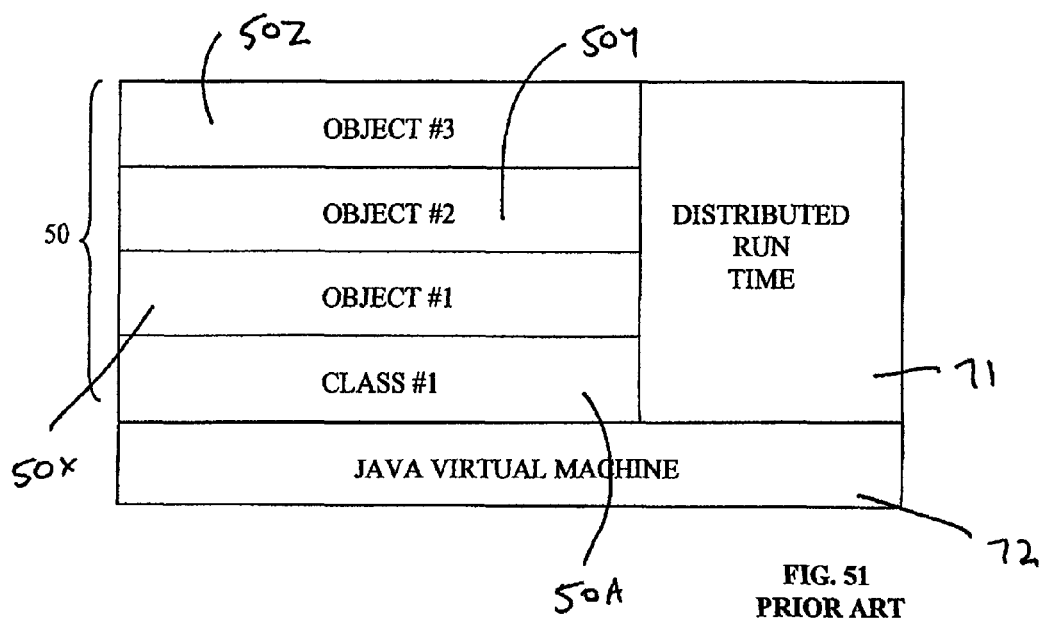
FIG. 51 is a schematic illustration of a prior art computer arranged to operate in JAVA code and thereby constitute a JAVA virtual machine.

Turning to FIG. 51, there is illustrated a schematic representation of a single prior art computer operated as a JAVA virtual machine. In this way, a machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that the platform and/or runtime system may include virtual machine and non-virtual machine software and/or firmware architectures, as well as hardware and direct hardware coded applications and implementations.

Furthermore, when there is only a single computer or machine 72, the single machine of FIG. 51 is able to easily keep track of whether the specific objects 50X, 50Y, and/or 50Z are, liable to be required by the application code 50 at a later point of execution of the application code 50. This may typically be done by maintaining a "handle count" or similar count or index for each object and/or class. This count may typically keep track of the number of places or times in the executing application code 50 where reference is made to a specific object (or class). For a handle count (or other count or index based) implementation that increments the handle count (or index) upward when a new reference to the object or class is created or assigned, and decrements the handle count (or index) downward when a reference to the object or class is destroyed or lost, when the object handle count for a specific object reaches zero, there is nowhere in the executing application code 50 which makes reference to the specific object (or class) for which the zero object handle count (or class handle count) pertains. For example, in the JAVA language and virtual machine environment, a "zero object handle count" correlates to the lack of the existence of any references (zero reference count) which point to the specific object. The object is then said to be "finalizable" or exist in a finalizable state. Object handle counts (and handle counters) may be maintained for each object in an analogous manner so that finalizable or non-finalizable state of each particular or specific object may be known. Class handle counts (and class handle counters) may be maintained for each class in an analogous manner to that for objects so that finalizable or non-finalizable state of each particular or specific class may be known. Furthermore, asset handle counts or indexes and counters may be maintained for each asset in an analogous manner to that for classes and objects so that finalizable or non-finalizable state of each particular or specific asset may be known.

Once this finalizable state has been achieved for an object (or class), the object (or class) can be safely finalised. This finalisation may typically include object (or class) deletion, removal, clean-up, reclamation, recycling, finalisation or other memory freeing operation because the object (or class) is no longer needed.

Therefore, in light of the availability of these reference, pointer, handle count or other class and object type tracking means, the computer programmer (or other automated or nonautomated program generator or generation means) when writing a program such as the application code 50 using the JAVA language and architecture, need not write any specific code in order to provide for this class or object removal, clean up, deletion, reclamation, recycling, finalisation or other memory freeing operation. As there is only a single JAVA virtual machine 72, the single JAVA virtual machine 72 can keep track of the class and object handle counts in a consistent, coherent and coordinated manner, and clean up (or carry out finalisation) as necessary in an automated and unobtrusive fashion, and without unwanted behaviour for example erroneous, premature, supernumerary, or re-finalisation operation such as may be caused by inconsistent and/or incoherent finalisation states or handle counts. In analogous manner, a single generalized virtual machine or machine or runtime system can keep track of the class and object handle counts (or equivalent if the machine does not specifically use "object" and "class" designations) and clean up (or carry out finalisation) as necessary in an automated and unobtrusive fashion.

The automated handle counting system described above is used to indicate when an object (or class) of an executing application program 50 is no longer needed and may be 'deleted' (or cleaned up, or finalised, or reclaimed, or recycled, or other otherwise freed). It is to be understood that when implemented in 'non-automated memory management' languages and architectures (such as for example 'non-garbage collected' programming languages such as C, C++, FORTRAN, COBOL, and machine-CODE languages such as x86, SPARC, PowerPC, or intermediate-code languages), the application program code 50 or programmer (or other automated or non-automated program generator or generation means) may be able to make the determination at what point a specific object (or class) is no longer needed, and consequently may be 'deleted' (or cleaned up, or finalised, or reclaimed, or recycled). Thus, 'deletion' in the context of this invention is to be understood to be inclusive of the deletion (or cleaning up, or finalisation, or reclamation, or recycling, or freeing) of objects (or classes) on 'non-automated memory management' languages and architectures corresponding to deletion, finalisation, clean up, recycling, or reclamation operations on those 'non-automated memory management' languages and architectures.

For a more general set of virtual machine or abstract machine environments, and for current and future computers and/or computing machines and/or information appliances or processing systems, and that may not utilize or require utilization of either classes and/or objects, the inventive structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, the terms 'class' and 'object' may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

Figure 57:
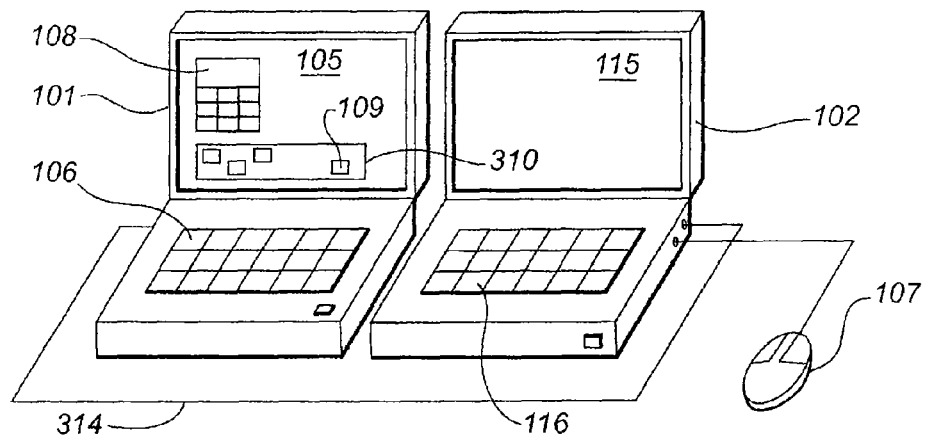
FIG. 57 is a schematic representation of two laptop computers interconnected to simultaneously run a plurality of applications, with both applications running on a single computer.
Figure 58:
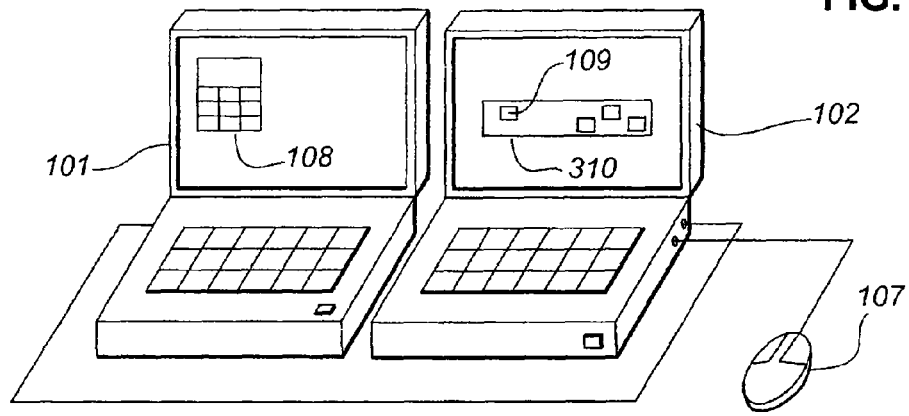
FIG. 58 is a view similar to FIG. 57 but showing the FIG. 57 apparatus with one application operating on each computer.
Figure 59:
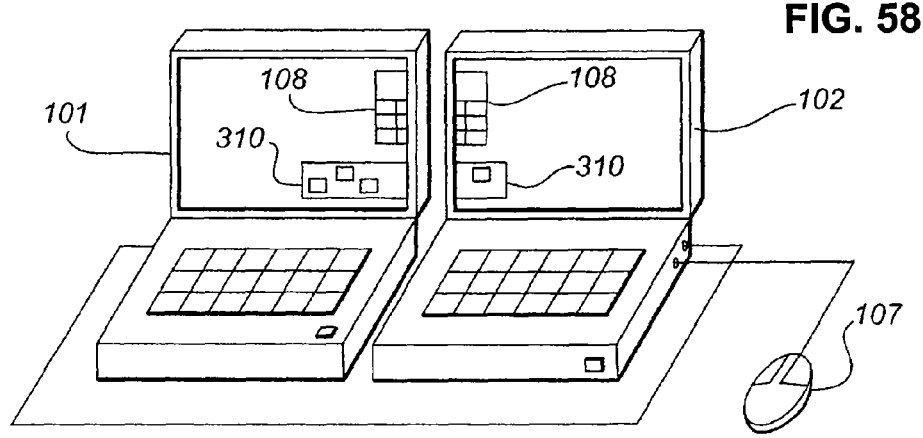
FIG. 59 is a view similar to FIG. 57 and FIG. 58 but showing the FIG. 57 apparatus with both applications operating simultaneously on both computers.

However, in the arrangement illustrated in FIG. 14 (and also in FIG. 57 to FIG. 59), a plurality of individual computers or machines M1, M2 . . . Mn are provided, each of which are interconnected via a communications network 53 or other communications link and each of which individual computers or machines is provided with a modifier 51 (See FIG. 9) and realised or implemented by or in for example the distributed run-time system (DRT) 71 (See FIG. 14) and loaded with a common application code 50. The term common application program is to be understood to mean an application program or application program code written to operate on a single machine, and loaded and/or executed in whole or in part on the plurality of computers or machines M1, M2 . . . Mn. Put somewhat differently, there is a common application program represented in application code 50, and this single copy or perhaps a plurality of identical copies are modified to generate a modified copy or version of the application program or program code, each copy or instance prepared for execution on the plurality of machines. At the point after they are modified they are common in the sense that they perform similar operations and operate consistently and coherently with each other. It will be appreciated that a plurality of computers, machines, information appliances, or the like implementing the features of the invention may optionally be connected to or coupled with other computers, machines, information appliances, or the like that do not implement the features of the invention.

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

Essentially the modifier 51 or DRT 71, or other code modifying means is responsible for modifying the application code 50 so that it may execute clean up or other memory reclamation, recycling, deletion or finalisation operations, such as for example finalisation methods in the JAVA language and virtual machine environment, in a coordinated, coherent and consistent manner across and between the plurality of individual machines M1, M2, . . . , Mn. It follows therefore that in such a computing environment it is necessary to ensure that the local objects and classes on each of the individual machines is finalised in a consistent fashion (with respect to the others).

It will be appreciated in light of the description provided herein that there are alternative implementations of the modifier 51 and the distributed run time 71. For example, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71. In one embodiment, the modifier 51 and DRT 71 are implemented or written in a single piece of computer program code that provides the functions of the DRT and modifier. The modifier function and structure therefore maybe subsumed into the DRT and considered to be an optional component. Independent of how implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT may for example implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures within the invention are less important than that they are provided.

In particular, whilst the application program code executing on one particular machine (say, for example machine M3) may have no active handle, reference, or pointer to a specific local object or class (i.e. a "zero handle count"), the same application program code executing on another machine (say for example machine M5) may have an active handle, reference, or pointer to the local similar equivalent object or class corresponding to the 'un-referenced' local object or class of machine M3, and therefore this other machine (machine M5) may still need to refer to or use that object or class in future. Thus if the corresponding similar equivalent local object or class on each machine M3 and M5 were to be finalised (or otherwise cleaned-up by some other memory clean-up operation) in an independent and uncoordinated manner relative to other machine(s), the behaviour of the object and application as a whole is undefined—that is, in the absence of coordinated, coherent, and consistent finalisation or memory clean-up operations between machines M1 . . . Mn, conflict, unwanted interactions, or other anomalous behaviour such as permanent inconsistency between local similar equivalent corresponding objects on machine M5 and machine M3 is likely to result. For example, if the local similar equivalent object or class on machine M3 were to be finalised, such as by being deleted, or cleaned up, or reclaimed, or recycled, from machine M3, in an uncoordinated and inconsistent manner with respect to machine M5, then if machine M5 were to perform an operation on or otherwise use the local object or class corresponding to the now finalised similar equivalent local object on machine M3 (such operation being for example, in an environment with a memory updating and propagation means of FIG. 15, FIG. 16, FIG. 17, FIG. 18, and FIG. 19, a write to (or try to write to) the similar equivalent local object on machine M5 or amendment to that particular object's value), then that operation (the change or attempted change in value) could not be performed (propagated from machine M5) throughout all the other machines M1, M2 . . . Mn since at least the machine M3 would not include the relevant similar equivalent corresponding particular object in its local memory, the object and its data, contents and value(s) having been deleted by the prior object clean-up or finalisation or reclamation or recycling operation. Therefore, even though one may contemplate machine M5 being able to write to the object (or class) the fact that it has already been finalised on machine M3 means that likely such a write operation is not possible, or at the very least not possible on machine M3.

Additionally, if an object of class on machine M3 were to be marked finalizable and subsequently finalised (such as by being deleted, or cleaned up, or reclaimed, or recycled) whilst the same object on the other machines M1, M2 . . . Mn were not also marked as finalizable, then the execution of the finalisation (or deletion, or clean up, or reclamation, or recycling) operation of that object on machine M3 would be premature with respect to coordinated finalisation operation between all machines M1, M2 . . . Mn, as machines other than M3 are not yet ready to finalise their local similar equivalent object corresponding to the particular object now finalised or finalizable by machine M3. Therefore were machine M3 to execute the cleanup or other finalisation routine on a given particular object (or class), the cleanup or other finalisation routine would preform the clean-up or finalisation not just for that local object (or class) on machine M3, but also for all similar equivalent local objects or classes (i.e., corresponding to the particular object or class to be cleaned-up or otherwise finalised) on all other machines as well.

Were such either these circumstance to happen, the behaviour of the equivalent object on the other machines M1, M2 . . . Mn is undefined and likely to result in permanent and irrecoverable inconsistency between machine M3 and machines M1, M2 . . . Mn. Therefore, though machine M3 may independently determine an object (or class) is ready for finalisation and proceed to finalise the specified object (or class), machine M5 may not have made the same determination as to the same similar equivalent local object (or class) being ready to be finalised, and therefore inconsistent behaviour will likely result due to the deletion of one of the plurality of similar equivalent objects on one machine (e.g., machine M3) but not on the other machine (eg, machine M5) or machines, and the premature execution of the finalisation routine of the specified object (or class) by machine M3 and on behalf of all other machines M1, M2 . . . Mn. At the very least operation of machine M5 as well as other machines in such as an above circumstance is unpredictable and would likely lead to inconsistent results, such inconsistency potentially arising for example from, uncoordinated premature execution of the finalisation routine and/or deletion of the object on one, or a subset of, machines but not others. Thus, a goal of achieving or providing consistent coordinated finalisation operation (or other memory clean-up operation) as required for the simultaneous operation of the same application program code on each of the plurality of machines M1, M2 . . . Mn would not be achieved. Any attempt therefore to maintain identical memory contents with a memory updating and propagation means of 5027D_FIG. 9, 5027D_FIG. 10, 5027D_FIG. 11, 5027D_FIG. 12, and 5027D_FIG. 13, or even identical memory contents as to a particular or defined set of classes, objects, values, or other data, for each of the machines M1, M2, . . . , Mn, as required for simultaneous operation of the same application program, would not be achieved given conventional schemes.

In order to ensure consistent class and object (or equivalent) finalizable status and finalisation or clean up between and amongst machines M1, M2, . . . , Mn, the application code 50 is analysed or scrutinized by searching through the executable application code 50 in order to detect program steps (such as particular instructions or instruction types) in the application code 50 which define or constitute or otherwise represent a finalisation operation or routine (or other memory, data, or code clean up routine, or other similar reclamation, recycling, or deletion operation). In the JAVA language, such program steps may for example comprise or consist of some part of, or all of, a "finalise( )" method of an object, and optionally any other code, routine, or method related to a 'finalise( )' method, for example by means of a method invocation from the body of the 'finalise( )' method to a different method.

This analysis or scrutiny may take place either prior to loading the application program, or during the application program code 50 loading procedure, or even after the application program code 50 loading procedure. It may be likened to an instrumentation, program transformation, translation, or compilation procedure in that the application program may be instrumented with additional instructions, and/or otherwise modified by meaning-preserving program manipulations, and/or optionally translated from an input code language to a different code language (such as from source-code or intermediate-code language to machine language), and with the understanding that the term compilation normally involves a change in code or language, for example, from source to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.Class-Loader loadClass method (e.g., "java.lang.ClassLoader.load-Class( )").

Alternatively, the analysis or scrutiny of the application code 50 may take place even after the application program code loading procedure, such as after the operating system has loaded the application code into memory, or optionally even after execution of the application program code has started, such as for example after the JAVA virtual machine has loaded the application code into the virtual machine via the "java.lang.ClassLoader.loadClass( )" method and optionally commenced execution.

As a consequence, of the above described analysis or scrutiny, clean up routines are initially looked for, and when found or identified a modifying code is inserted so as to give rise to a modified clean up routine. This modified routine is adapted and written to abort the clean up routine on any specific machine unless the class or object (or in the more general case to be 'asset') to be deleted, cleaned up, reclaimed, recycled, freed, or otherwise finalised is marked for deletion by all other machines. There are several different alternative modes wherein this modification and loading can be carried out.

By way of illustration and not limitation, in one embodiment, the analysis or scrutiny of the application code 50 may take place during the loading of the application program code such as by the operating system reading the application code from the hard disk or other storage device and copying it into memory whilst preparing to begin execution of the application program. In another embodiment, in a JAVA virtual machine, the analysis or scrutiny may take place during the execution of the java.lang.ClassLoader loadClass (e.g., "java.lang.ClassLoader.loadClass( )") method.

Alternatively, the analysis or scrutiny of the application code 50 may take place even after the application program code loading procedure such as after the operating system has loaded the application code into memory and even started execution, or after the java virtual machine has loaded the application code into the virtual machine via the "java.lang.ClassLoader.loadClass( )" method. In other words, in the case of the JAVA virtual machine, after the execution of "java.lang.ClassLoader.loadclass( )" has concluded.

Thus, in one mode, the DRT 71/1 on the loading machine, in this example Java Machine M1 (JVM#1), asks the DRT's 71/2, ..., 71/n of all the other machines M2, ... Mn if the similar equivalent first object 50X on all machines, say, is utilized, referenced, or in-use (i.e., not marked as finalizable) by any other machine M2, ..., Mn. If the answer to this question is yes (that is, a similar equivalent object is being utilized by another one or more of the machines, and is not marked as finalizable and therefore not liable to be deleted, cleaned up, finalised, reclaimed, recycled, or freed), then the ordinary clean up procedure is turned off, aborted, paused, or otherwise disabled for the similar equivalent first object 50X on machine JVM#1. If the answer is no, (that is the similar equivalent first object 50X on each machine is marked as finalizable on all other machines with a similar equivalent object 50X) then the clean up procedure is operated (or resumed or continued, or commenced) and the first object 50X is deleted not only on machine JVM#1 but on all other machines M2 ... Mn with a similar equivalent object 50X. Preferably, execution of the clean up routine is allocated to one machine, such as the last machine M1 marking the similar equivalent object or class as finalizable. The execution of the finalisation routine corresponding to the determination by all machines that the plurality of similar equivalent objects is finalizable, is to execute only once with respect to all machines M1 ... Mn, and preferably by only one machine, on behalf of all machines M1 ... Mn. Corresponding to, and preferably following, the execution of the finalisation routine, all machines may then delete, reclaim, recycle, free or otherwise clean-up the memory (and other corresponding system resources) utilized by their local similar equivalent object.

Overall the method is responsible for disposing of system resources or to perform other cleanup corresponding to the determination by the garbage collector of a JAVA virtual machine that there are no more references to this object, and the steps the "example.java" code performs are described in turn.

As a result of these steps operating on a single machine of the conventional configurations in FIG. 1 and FIG. 2, the JAVA virtual machine can keep track of the object handle count in a consistent, coherent and coordinated manner, and in executing the finalise( ) method containing the println operation is able to ensure that unwanted behaviour (for example premature or supernumerary finalisation operation such as execution of the finalise( ) method of a single 'example.java' object more than once) such as may be caused by inconsistent and/or incoherent finalisation states or handle counts, does not occur. Were these steps to be carried out on the plurality of machines of the configurations of FIG. 9 and FIG. 14 with the memory update and propagation replication means of FIG. 15, FIG. 16, FIG. 17, FIG. 18, and FIG. 19, and concurrently executing the application program code 50 on each one of the plurality of machines M1. Mn, the finalisation operations of each concurrently executing application program occurrence on each of the one of the machines would be performed without coordination between any other of the occurrences on any other of the machine(s). Given the goal of consistent, coordinated and coherent finalisation operation across a plurality of a machines, this prior art arrangement would fail to perform such consistent coordinated finalisation operation across the plurality of machines, as each machine performs finalisation only locally and without any attempt to coordinate their local finalisation operation with any other similar finalisation operation on any one or more other machines. Such an arrangement would therefore be susceptible to unwanted or other anomalous behaviour due to uncoordinated, inconsistent and/or incoherent finalisation states or handle counts, and associated finalisation operation. Therefore it is the goal of the present invention to overcome this limitation of the prior art arrangement.

In the example the code has been modified so that it solves the problem of consistent, coordinated finalisation operation for a plurality of machines M1 ... Mn.

If the plurality of similar equivalent objects one each one of the plurality of machines M1 ... Mn corresponding to the clean-up status request is marked for clean-up on all other machines than the requesting machine (i.e. n−1 machines), then machine X will send a response indicating that the plurality of similar equivalent objects are marked for clean-up on all other machines, and optionally update a record entry corresponding to the specified similar equivalent objects to indicate the similar equivalent objects as now cleaned up. Alternatively, if the plurality of the similar equivalent objects corresponding to the clean-up status request is not marked for clean-up on all other machines than the requesting machine (i.e. less than n−1 machines), then machine X will send a response indicating that the plurality of similar equivalent objects is not marked for cleanup on all other machines, and increment the "marked for clean-up counter" record (or other similar finalisation record means) corresponding to the specified object, to record that the requesting machine has marked its one of the plurality of similar equivalent objects to be cleaned-up. Corresponding to the determination that the plurality of similar equivalent objects to which this clean-up status request pertains is marked for clean-up on all other machines than the requesting machine, a reply is generated and sent to the requesting machine indicating that the plurality of similar equivalent objects is marked for clean-up on all other machines than the requesting machine. Additionally, and optionally, machine X may update the entry corresponding to the object to which the clean-up status request pertained to indicate the plurality of similar equivalent objects as now "cleaned-up". Following a receipt of such a message from machine X indicating that the plurality of similar equivalent objects is marked for clean-up on all other machines, the is LastReference( ) method and operations terminate execution and return a 'true' value to the previous method frame, which is the executing method frame of the finalise( ) method. Alternatively, following a receipt of a message from machine X indicating that the plurality of similar equivalent objects is not marked for clean-up on all other machines, the is LastReference( ) method and operations terminate execution and return "false" value to the previous method frame, which is the executing method frame of the finalise( ) method. Following this return operation, the execution of the finalise( ) method frame then resumes.

It will be appreciated that the modified code permits, in a distributed computing environment having a plurality of computers or computing machines, the coordinated operation of finalisation routines or other clean-up operations so that the problems associated with the operation of the unmodified code or procedure on a plurality of machines M1 ... Mn (such as for example erroneous, premature, multiple finalisation, or re-finalisation operation) does not occur when applying the modified code or procedure.

Figure 52:
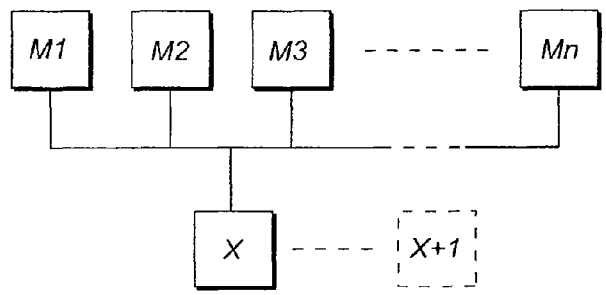
FIG. 52 is a schematic representation of n machines running the application program and serviced by an additional server machine X.

As seen in FIG. 52 a modification to the general arrangement of FIG. 14 is provided in that machines M1, M2, ..., Mn are as before and run the same application code 50 (or codes) on all machines M1, M2, ..., Mn simultaneously or concurrently. However, the previous arrangement is modified by the provision of a server machine X which is conveniently able to supply housekeeping functions, for example, and especially the clean up of structures, assets and resources. Such a server machine X can be a low value commodity computer such as a PC since its computational load is low. As indicated by broken lines in FIG. 52, two server machines X and X+1 can be provided for redundancy purposes to increase the overall reliability of the system. Where two such server machines X and X+1 are provided, they are preferably operated as redundant machines in a failover arrangement.

It is not necessary to provide a server machine X as its computational load can be distributed over machines M1, M2, . . . , Mn. Alternatively, a database operated by one machine (in a master/slave type operation) can be used for the housekeeping function(s).

Figure 53:
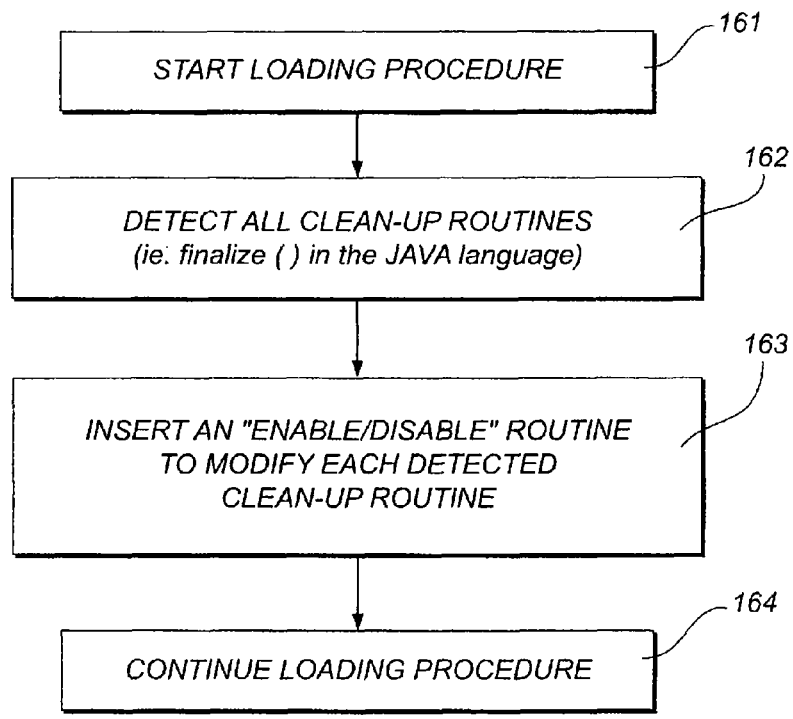
FIG. 53 is a flow chart of illustrating the modification of "clean up" or finalisation routines.

FIG. 53 shows a preferred general procedure to be followed. After loading 161 has been commenced, the instructions to be executed are considered in sequence and all clean up routines are detected as indicated in step 162. In the JAVA language these are the finalisation routines or finalise method (e.g., "finalise( )"). Other languages use different terms.

Where a clean up routine is detected, it is modified at step 163 in order to perform consistent, coordinated, and coherent clean up or finalisation across and between the plurality of machines M1, M2 . . . Mn, typically by inserting further instructions into the clean up routine to, for example, determine if the object (or class or other asset) containing this finalisation routine is marked as finalizable across all similar equivalent local objects on all other machines, and if so performing finalisation by resuming the execution of the finalisation routine, or if not then aborting the execution of the finalisation routine, or postponing or pausing the execution of the finalisation routine until such a time as all other machines have marked their similar equivalent local objects as finalizable. Alternatively, the modifying instructions could be inserted prior to the routine. Once the modification has been completed the loading procedure continues by loading modified application code in place of the unmodified application code, as indicated in step 164. Altogether, the finalisation routine is to be executed only once, and preferably by only one machine, on behalf of all machines M1 . . . Mn corresponding to the determination by all machines M1 . . . Mn that the particular object is finalizable.

Figure 54:
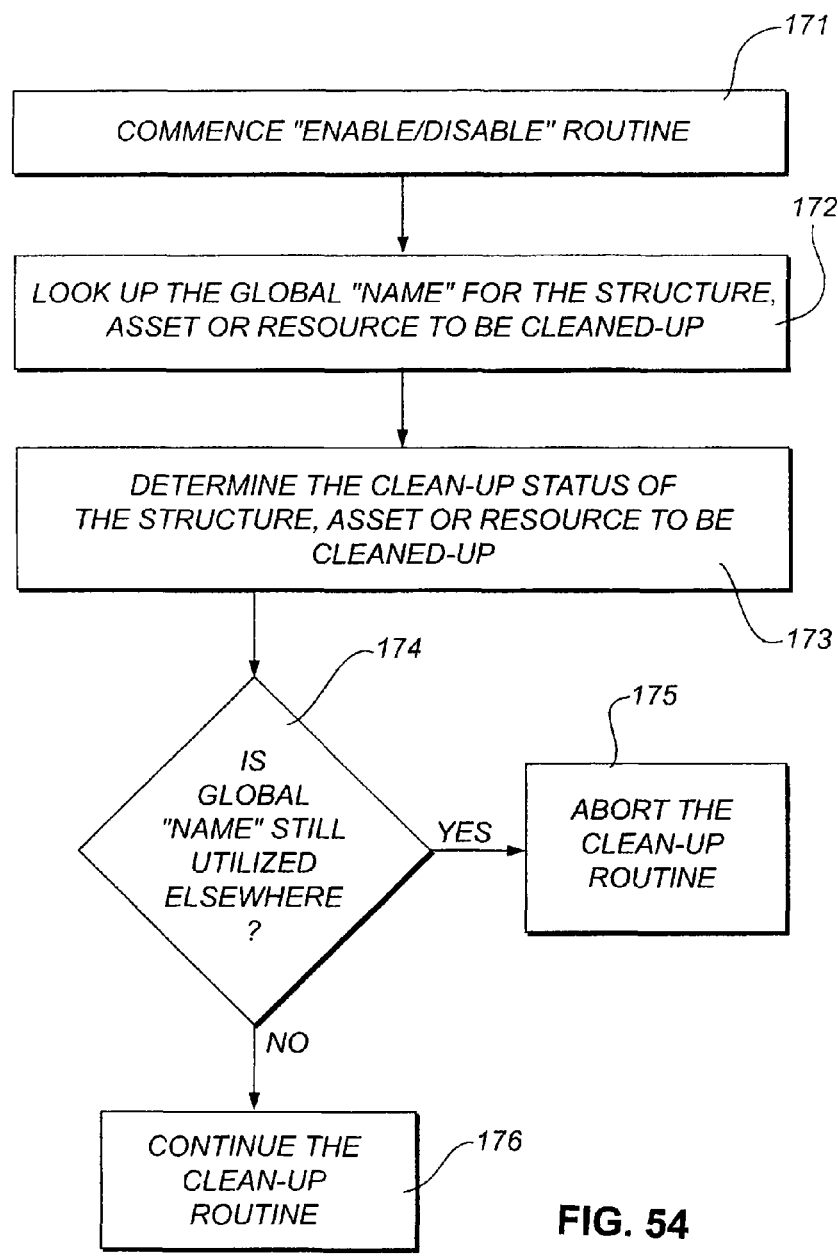
FIG. 54 is a flow chart illustrating the continuation or abortion of finalisation routines.

FIG. 54 illustrates a particular form of modification. Firstly, the structures, assets or resources (in JAVA termed classes or objects) 50A, 50X . . . 50Y which are possible candidates to be cleaned up, are allocated a name or tag (for example a global name or tag), or have already been allocated a global name or tag, which can be used to identify corresponding similar equivalent local structures, assets, or resources (such as classes and objects in JAVA) globally on each of the machines M1, M2 . . . Mn, as indicated by step 172. This preferably happens when the classes or objects are originally initialized. This is most conveniently done via a table maintained by server machine X. This table also includes the "clean up status" of the class or object (or other asset). It will be understood that this table or other data structure may store only the clean up status, or it may store other status or information as well. In one embodiment, this table also includes a counter which stores a machine asset deletion count value identifying the number of machines (and optionally the identity of the machines although this is not required) which have marked this particular object, class, or other asset for deletion. In one embodiment, the count value is incremented until the count value equals the number of machines. Thus a total machine asset deletion count value of less than (n−1), where n is the total number of machines in Mn indicates a "do not clean up" status for the object, class, or other asset as a network (or machine constellation) whole, because the machine asset deletion count of less than n−1 means that one or more machines have yet to mark their similar equivalent local object (or class or other asset) as finalizable and that object cannot be cleaned up as unwanted or other anomalous behaviour may result. Stated differently, and by way of example but not limitation, if there are six machines and the asset deletion count is less than five then it means that not all the other machines have attempted to finalise this object (i.e., not yet marked this object as finalizable), and therefore the object can't be finalised. If however the asset deletion count is five, then it means that there is only one machine that has yet to attempt to finalise this object (i.e., mark this object as finalizable) and therefore that last machine yet to mark the object as finalizable must be the current machine attempting to finalise the object (i.e., marking the object as finalizable and consequently consulting the finalisation table as to finalisation status of this object on all other machines). In the configuration of six machines, the count value of n−1=5 means that five machines must have previously marked the object for deletion and the sixth machine to mark this object for deletion is the machine that actually executes the full finalisation routine.

As indicated in FIG. 54, if the global name or identifier is not marked for cleanup or deletion or other finalisation on all other machines (i.e., all except on the machine proposing to carry out the clean up or deletion routine) then this means that the proposed clean up or finalisation routine of the object or class (or other asset) should be aborted, stopped, suspend, paused, postponed, or cancelled prior to its initiation or if already initiated then to its completion if it has already begun execution, since the object or class is still required by one or more of the machines M1, M2 . . . Mn, as indicated by step 175.

In one embodiment, the clean up or finalisation routine is stopped from initiating or beginning execution; however, if some implementations it is difficult or practically impossible to stop the clean up or finalisation routine from initiating or beginning execution. Therefore, in an alternative embodiment, the execution of the finalisation routine that has already started is aborted such that it does not complete or does not complete in its normal manner. This alternative abortion is understood to include an actual abortion, or a suspend, or postpone, or pause of the execution of a finalisation routine that has started to execute (regardless of the stage of execution before completion) and therefore to make sure that the finalisation routine does not get the chance to execute to completion to clean up the object (or class or other asset), and therefore the object (or class or other asset) remains "uncleaned" (i.e., "unfinalised", or "not deleted").

However or alternatively, if the global name or other unique number or identifier for a plurality of similar equivalent local objects each on of the plurality of machines M1, M2 . . . Mn is marked for deletion on all other machines, this means that no other machine requires the class or object (or other asset) corresponding to the global name or other unique number or identifier. As a consequence clean up routine and operation, or optionally the regular or conventional ordinary clean up routine and operation, indicated in step 176 can be, and should be, carried out.

Figure 55:
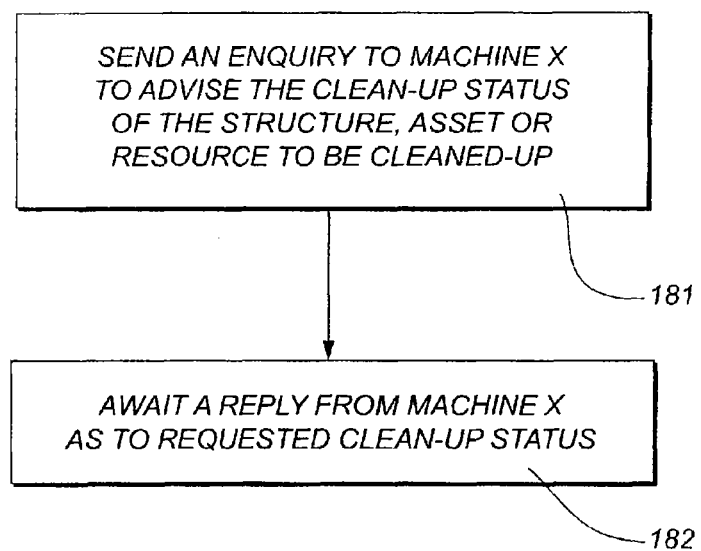
FIG. 55 is a flow chart illustrating the enquiry sent to the server machine X.

FIG. 55 shows the enquiry made by the machine proposing to execute a clean up routine (one of M1, M2 . . . Mn) to the server machine X. The operation of this proposing machine is temporarily interrupted, as shown in step 181 and 182, and corresponding to step 173 of FIG. 54. In step 181 the proposing machine sends an enquiry message to machine X to request the clean-up or finalisation status of the object (or class or other asset) to be cleaned-up. Next, the proposing machine awaits a reply from machine X corresponding to the enquiry message sent by the proposing machine at step 181, indicated by step 182.

Figure 56:
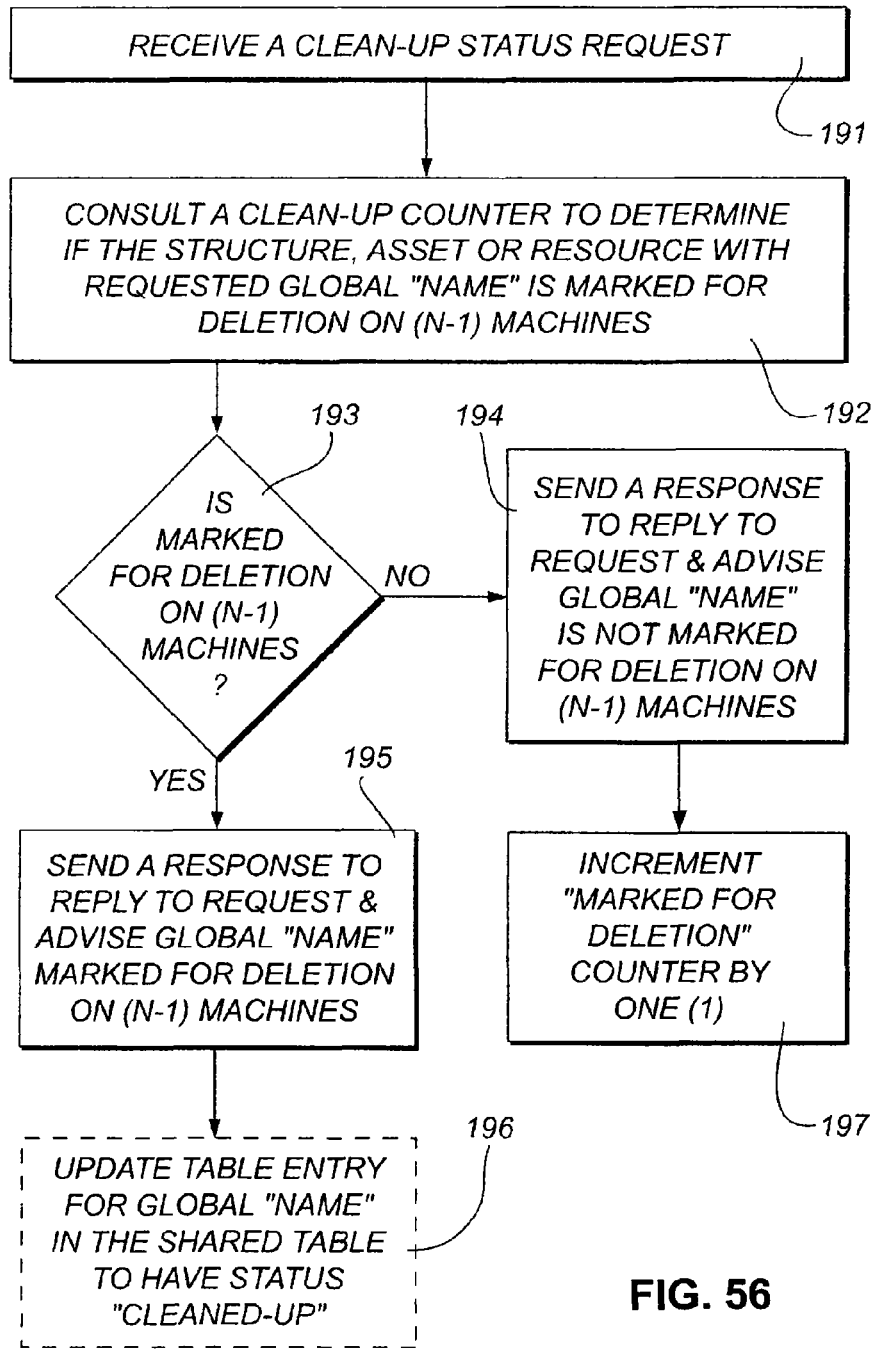
FIG. 56 is a flow chart of the response of the server machine X to the request of FIG. 55.

FIG. 56 shows the activity carried out by machine X in response to such a finalisation or clean up status enquiry of step 181 in FIG. 55. The finalisation or clean up status is determined as seen in step 192 which determines if the object (or class or other asset) corresponding to the clean-up status request of global name, as received at step 191 (191A), is marked for deletion on all other machines other than the enquiring machine 181 from which the clean-up status request of step 191 originates. The singular term object or class as used in this document (or the equivalent term of asset, or resource used in step 192 (192A) and other Figures) are to be understood to be inclusive of all similar equivalent objects (or classes, or assets, or resources) corresponding to the same global name on each of the plurality of machines M1, M2, . . . , Mn. If the step 193 (193A) determination is made that determines that the global named resource is not marked ("No") for deletion on (n−1) machines (i.e., is utilized elsewhere), then a response to that effect is sent to the enquiring machine 194 (194A) but the "marked for deletion" counter is incremented by one (1), as shown by step 197 (197A). Similarly, if the answer to this determination is marked for deletion ("Yes") indicating that the global named resource is marked for deletion on all other machines other than the waiting enquiring machine 182 then a corresponding reply is sent to the waiting enquiring machine 182 from which the clean-up status request of step 191 originated as indicated by step 195 (195A). The waiting enquiring machine 182 is then able to respond accordingly, such as for example by: (i) aborting (or pausing, or postponing) execution of the finalisation routine when the reply from machine X of step 182 indicated that the similar equivalent local objects on the plurality of machines M1, M2, . . . , Mn corresponding to the global name of the object proposed to be finalised of step 172 is still utilized elsewhere (i.e., not marked for deletion on all other machines other than the machine proposing to carry out finalisation); or (ii) by continuing (or resuming, or starting) execution of the finalisation routine when the reply from machine X of step 182 indicated that the similar equivalent local objects on the plurality of machines M1, M2 . . . Mn corresponding to the global name of the object proposed to be finalised of step 172 are not utilized elsewhere (i.e., marked for deletion on all other machines other than the machine proposing to carry out finalisation). As indicated by broken lines in FIG. 56, preferably in addition to the "yes" response shown in step 195, the shared table or cleaned-up statuses stored or maintained on machine X is updated so that the status of the globally named asset is changed to "cleaned up" as indicated by step 196.

Without management of object finalisation in a distributed environment, each machine would re-finalise the same object, thus executing the finalise method more than once for a single globally-named coherent plurality of similar equivalent objects. Clearly this is not what the programmer or user of a single application program code instance expects to happen.

So, taking advantage of the DRT, the application code 50 is modified as it is loaded into the machine by changing the clean-up, deletion, or finalisation routine or method. It will be appreciated that the term finalisation is typically used in the context of the JAVA language relative to the JAVA virtual machine specification existent at the date of filing of this specification. Therefore, finalisation refers to object and/or class cleanup or deletion or reclamation or recycling or any equivalent form of object, class, asset or resource clean-up in the more general sense. The term finalisation should therefore be taken in this broader meaning unless otherwise restricted.

The changes made (highlighted in bold) are the initial instructions that the finalise method executes. These added instructions check if this particular object is the last remaining object of the plurality of similar equivalent objects on the plurality of machines M1, M2 . . . Mn to be marked as finalizable, by calling a routine or procedure to determine the clean-up status of the object to be finalised, such as the "is LastReference( )" procedure or method of a DRT 71 performing the steps of 172-176 of FIG. 54 where the determination as to the clean-up status of the particular object is sought, and which determines either a true result or a false result corresponding to whether or not this particular object on this particular machine that is executing the determination procedure is the last of the plurality of machines M1, M2 . . . Mn, each with one of a similar equivalent peer object, to request finalisation. Recall that a peer object refers to a similar equivalent object on a different one of the machines, so that for example, in a configuration having eight machines, there will be eight peer objects (i.e. eight similar equivalent objects each on one of eight machines).

The finalisation determination procedure or method "is LastReference( )" of the DRT 71 can optionally take an argument which represents a unique identifier for this object. For example, the name of the object that is being considered for finalisation, a reference to the object in question being considered for finalisation, or a unique number or identifier representing this object across all machines (or nodes), to be used in the determination of the finalisation status of this object or class or other asset. This way, the DRT can support the finalisation of multiple objects (or classes or assets) at the same time without becoming confused as to which of the multiple objects are already finalised and which are not, by using the unique identifier of each object to consult the correct record in the finalisation table referred to earlier.

The DRT 71 can determine the finalisation state of the object in a number of possible ways. Preferably, it (the requesting machine) can ask each other requested machine in turn (such as by using a computer communications network to exchange query and response messages between the requesting machine and the requested machine(s) if their requested machine's similar equivalent object has been marked for finalisation, and if any requested machine replies false indicating that their similar equivalent object is not marked for finalisation, then return a false result at return from the "is LastReference( )" method indicating that the local similar equivalent object should not be finalised, otherwise return a true result at return from the "is LastReference( )" method indicating that the local similar equivalent object can be finalised. Of course different logic schemes for true or false result may alternatively be implemented with the same effect. Alternatively, the DRT 71 on the local machine can consult a shared record table (perhaps on a separate machine (e.g., machine X), or a coherent shared record table on each local machine and updated to remain substantially identical, or in a database) to determine if each of the plurality of similar equivalent objects have been marked for finalisation by all requested machines except the current requesting machine.

If the "is LastReference( )" method of the DRT 71 returns true then this means that this object has been marked for finalisation on all other machines in the virtual or distributed computing environment (i.e. the plurality of machines M1 . . . Mn), and hence, the execution of the finalise method is to proceed as this is considered the last remaining similar equivalent object on the plurality of machines M1, M2 . . . Mn to be marked or declared as finalizable.

On the other hand, if the "is LastReference( )" method of the DRT 71 returns false, then this means that the plurality of similar equivalent objects has not been marked for finalisation by all other machines in the distributed environment, as recorded in the shared record table on machine X of the finalisation states of objects. In such a case, the finalise method is not to be executed (or alternatively resumed, or continued), as it will potentially invalidate the object on those machine(s) that are continuing to use their similar equivalent object and have yet to mark their similar equivalent object for finalisation. Thus, when the DRT returns false, the inserted four instructions at the start of the finalise method prevent execution of the remaining code of the finalise method by aborting the execution of the finalise method through the use of a return instruction, and consequently aborting the Java Virtual Machine's finalisation operation for this object.

Given the fundamental concept of testing to determine if a finalisation, such as a deletion or clean up, is ready to be carried out on a class, object, or other asset; and if ready carrying out the finalisation, and if not ready, then not carrying out the finalisation, there are several different ways or embodiments in which this finalisation concept, method, and procedure may be implemented.

In the first embodiment, a particular machine, say machine M2, loads the asset (such as class or object) inclusive of a clean up routine modifies it, and then loads each of the other machines M1, M3, . . . , Mn (either sequentially or simultaneously or according to any other order, routine, or procedure) with the modified object (or class or asset) inclusive of the now modified clean up routine or routines. Note that there may be one or a plurality of routines corresponding to only one object in the application code or there can be a plurality of routines corresponding to a plurality of objects in the application code. Note that in one embodiment, the cleanup routine(s) that is (are) loaded is binary executable object code. Alternatively, the cleanup routine(s) that is (are) loaded is executable intermediate code.

In one arrangement, which may be termed "master/slave" (or primary/secondary) each of the slave (or secondary) machines M1, M3, . . . , Mn loads the modified object (or class), and inclusive of the now modified clean-up routine(s), that was sent to it over the computer communications network or other communications link or path by the master (or primary) machine, such as machine M2, or some other machine such as a machine X of FIG. 52. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a further variation of this "master/slave" or "primary/secondary" arrangement, machine M2 loads the asset (such as class or object) inclusive of a cleanup routine in unmodified form on machine M2, and then (for example, M2 or each local machine) deletes the unmodified clean up routine that had been present on the machine in whole or part from the asset (such as class or object) and loads by means of a computer communications network the modified code for the asset with the now modified or deleted clean up routine on the other machines. Thus in this instance the modification is not a transformation, instrumentation, translation or compilation of the asset clean up routine but a deletion of the clean up routine on all machines except one. In one embodiment, the actual code-block of the finalisation or cleanup routine is deleted on all machines except one, and this last machine therefore is the only machine that can execute the finalisation routine because all other machines have deleted the finalisation routine. One benefit of this approach is that no conflict arises between multiple machines executing the same finalisation routine because only one machine has the routine.

The process of deleting the clean up routine in its entirety can either be performed by the "master" machine (such as machine M2 or some other machine such as machine X of FIG. 52) or alternatively by each other machine M1, M3 . . . Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 . . . Mn and optionally a machine X of FIG. 52.

In a still further embodiment, each machine M1, . . . , Mn receives the unmodified asset (such as class or object) inclusive of finalisation or clean up routine(s), but modifies the routine(s) and then loads the asset (such as class or object) consisting of the now modified routine(s). Although one machine, such as the master or primary machine may customize or perform a different modification to the finalisation or clean up routine(s) sent to each machine, this embodiment more readily enables the modification carried out by each machine to be slightly different and to be enhanced, customized or optimized based upon its particular machine architecture, hardware, processor, memory, configuration, operating system or other factors, yet still similar, coherent and consistent with other machines with all other similar modifications and characteristics that may not need to be similar or identical.

In a further arrangement, a particular machine, say M1, loads the unmodified asset (such as class or object) inclusive of a finalisation or clean up routine and all other machines M2, M3, . . . , Mn perform a modification to delete the clean up routine of the asset (such as class or object) and load the modified version.

In all of the described instances or embodiments, the supply or communication of the asset code (such as class code or object code) to the machines M1, . . . , Mn, and optionally inclusive of a machine X of FIG. 52 can be branched, distributed or communicated among and between the different machines in any combination or permutation; such as by providing direct machine to machine communication (for example, M2 supplies each of M1, M3, M4, etc directly), or by providing or using cascaded or sequential communication (for example, M2 supplies M1 which then supplies M3, which then supplies M4, and so on), or a combination of the direct and cascaded and/or sequential.

In a still further arrangement, the machines M1, . . . , Mn, may send some or all load requests to an additional machine X (See for example the embodiment of FIG. 52), which performs the modification to the application program code 50 (such as consisting of assets, and/or classes, and/or objects)

and inclusive of finalisation or clean up routine(s), via any of the afore mentioned methods, and returns the modified application program code inclusive of the now modified finalisation or clean-up routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalisation or clean-up routine(s) to each machine. The modifications performed by machine X can include any of the modifications covered under the scope of the present invention. This arrangement may of course be applied to some of the machines and other arrangements described herein before applied to other of the machines.

Persons skilled in the computing arts will be aware of various possible techniques that may be used in the modification of computer code, including but not limited to instrumentation, program transformation, translation, or compilation means.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

VI. Exemplary Embodiments of a System and Method for Abstract Reachability

Co-pending U.S. Patent Application Ser. No. 60/877,804 describes aspects of Abstract Reachability which may be used in conjunction with the present invention, and which includes a method of storing for each object or other data or code structure of an application program operating in a replicated shared memory arrangement (comprising a plurality of machines), a table or record or other recording means listing the machines which contain a local replica of the object (or data or code structure), and where the record or recording means is stored in such a manner so as to be inaccessible by the application program.

Embodiments of the invention provides a system and method of storing for each object or other data or code structure of an application program operating in a replicated shared memory arrangement comprising a plurality of machines, a table or record or other recording means listing the machines in said plurality which contain a local replica of said object (or data or code structure), and where said record or recording means is stored in such a manner so as to be inaccessible by said application program.

For example, for an object A and object B of an application program, storing a record or other recording means in memory which records the machines on which said object is replicated on.

Preferably, the record or recording means is inaccessible by said application program code. For example, said record or recording means is preferably stored in a private region of 'non-application' memory.

Further, the stored record for each of object A and object B is substantially similar on each of the machines in said plurality on which a local replica of object A or object B is present.

VII. Exemplary Embodiment of an Architecture, Device, and Operating Method for A Modified Central Processor Unit Co-pending U.S. Patent Application Ser. No. 60/877,796 filed Dec. 29, 2006 describes aspects of a modified central processor unit that may be used in conjunction with the instant application and invention.

This invention relates to a method for hardware-assisted tagging and is related to Co-pending U.S. Patent Application Ser. No. 10/830,042 filed Apr. 23, 2004 which describes certain limited aspects of tagging. More specifically, this invention relates to an improved method of hardware-assisted tagging of write-to-memory operations in accordance with features described in Co-pending U.S. Patent Application Ser. No. 10/830,042 filed Apr. 23, 2004. This embodiment of the invention conceives of an improved means comprising a hardware-assisted tagging system within the CPU and systems architecture together with partial software modification. The advantages that such a hybrid hardware/software tagging system would have over an all software and all hardware implementation of tagging will be described thus.

An all software tagging system has certain benefits over an all hardware tagging system, but also has certain disadvantages. Alternatively, an all hardware tagging system has certain benefits over an all software tagging system, but also has certain disadvantages. Speaking generally, an all software tagging system is unlikely to be as efficient as an all hardware tagging system, as an all software tagging system requires additional instructions to be inserted in the application program code to implement the desired tagging operations, thus slowing the application program down. On the other hand, a hardware tagging system is able to perform tagging without the aid of additional inserted instructions into the application program code and so executes faster. Thus on this level, an all hardware tagging system may be more desirable than an all software tagging system.

However, all hardware tagging system also have disadvantages which all software tagging systems don't have. For example, an all hardware tagging system typically can't differentiate between "tagged" memory locations and "untagged" memory locations—either tagging all memory locations or none at all. On the other hand, a software tagging system is able to differentiate between "tagged" and "nontagged" memory locations, and not insert tagging operations at those application program code points where writing to "untagged" memory locations takes place.

This invention anticipates a system whereby a "tagging" system is implemented in a combination of hardware and software. More specifically, this invention conceives of a special additional instruction (or instructions or other operations) which act to store a tag indication (or other identifier indication) of a memory location which is written.

This invention also conceives of a system of modifying the application program executable code as it is being loaded into a computer system, or after it has loaded into a computer system, and even after it has commenced execution, whereby said modifications are to detect write operations to memory locations which are to be, or may be, tagged. And corresponding to locating such write to memory operations, inserting an additional instruction or instructions, wherein said inserted additional instruction is a said "special additional instruction".

Further, this invention conceives of a CPU or other processing means which implements said "special additional instruction" by storing an indication or other identifier means to memory indicating that an identified memory location has been written. And where, said implementation of the "special additional instruction" within a CPU stores said an indication or identifier directly to main memory without storing said indication or identifier to cache memory. Further wherein, said implementation of the "special additional instruction" within a CPU queues said tag indications to memory via a private write-buffer not shared with the write buffer used for non-indication and non-identifier store-to-memory operations.

VIII. Exemplary Embodiments of Cpu Hardware for Multiple Computer Systems

Co-pending U.S. Patent Application Ser. No. 60/850,052 filed Dec. 29, 2006 describes aspects of a cpu hardware for multiple computer system which may be used in conjunction with the present invention.

Embodiments of the present invention also pertain to but are not limited to the management of memory within one or more computers operating as a multiple computer system incorporating replicated shared memory (rsm) or hybrid replicated shared memory.

Briefly stated, the abovementioned related patent applications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In one aspect, embodiments of the present invention enable replicated memory to be updated utilizing either a CPU or associated entities.

Figure 60:
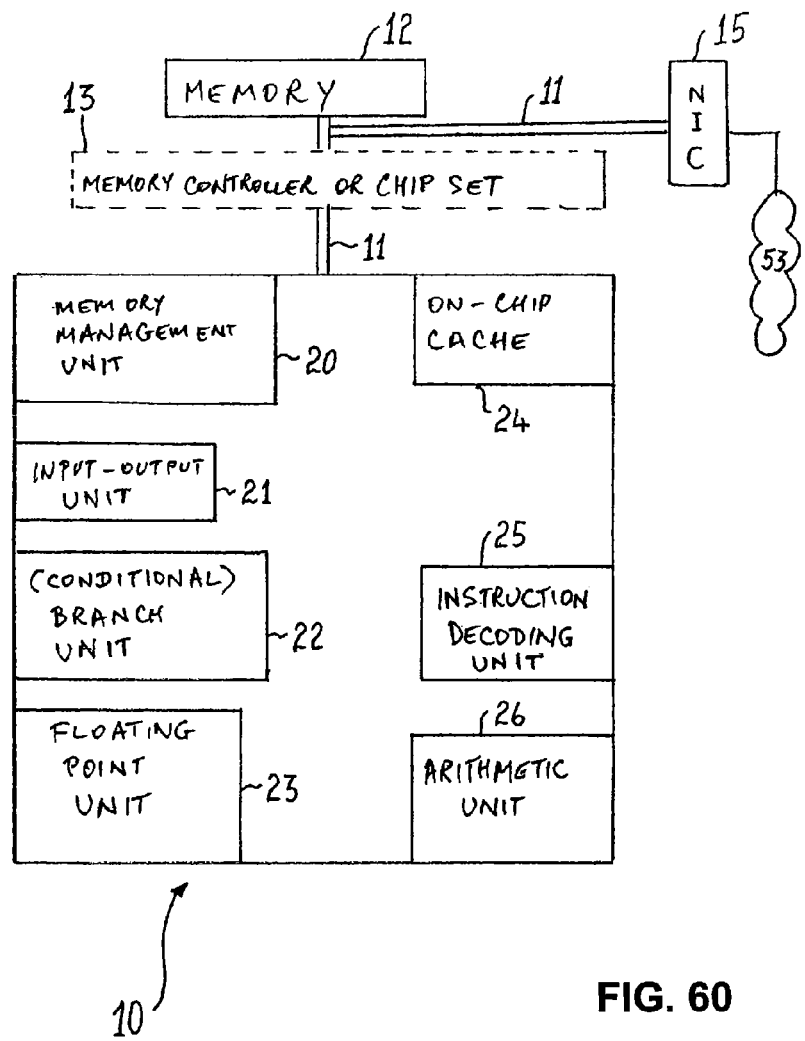
FIG. 60 is a schematic representation of a conventional central processor unit (CPU) of one computer of a multiple computer system and showing the interconnection of the CPU to a communications network via a network interface card (NIC).

As illustrated in the embodiment of FIG. 60, a CPU 10 is connected via a bus 11 to a memory 12. As indicated by broken lines, optionally a memory controller or chipset 13 can be positioned between the CPU 10 and memory 12. The bus 11 also connects to a network interface card (NIC) 15 which is in turn connected to a communications network 53.

Located within the CPU 10 is a memory management unit 20, an input-output unit 21, a (conditional) branch unit 22, a floating point unit 23, an on-chip cache 24, an instruction decoding unit 25 and an arithmetic unit 26. The memory management unit 20 includes a translation lookaside buffer which operates in conventional fashion to translate instructions using virtual addresses, to instructions using real addresses in the memory 12.

During execution of an application program, the CPU 10 is able to read data from the memory 12, carry out various instructions which often results in the generation of new data, and write that new data to the memory 12.

In the specifications incorporated herein by cross-reference, the new data written to the memory 12 (or some of the new data written to the memory 12) of one computer of the multiple computer system is replicated under program control in the memory of all other computers in the multiple computer system. However, in accordance with an embodiment of present invention, it is possible for this memory replication activity to be carried out by the CPU 10 and associated entities.

Figure 61:
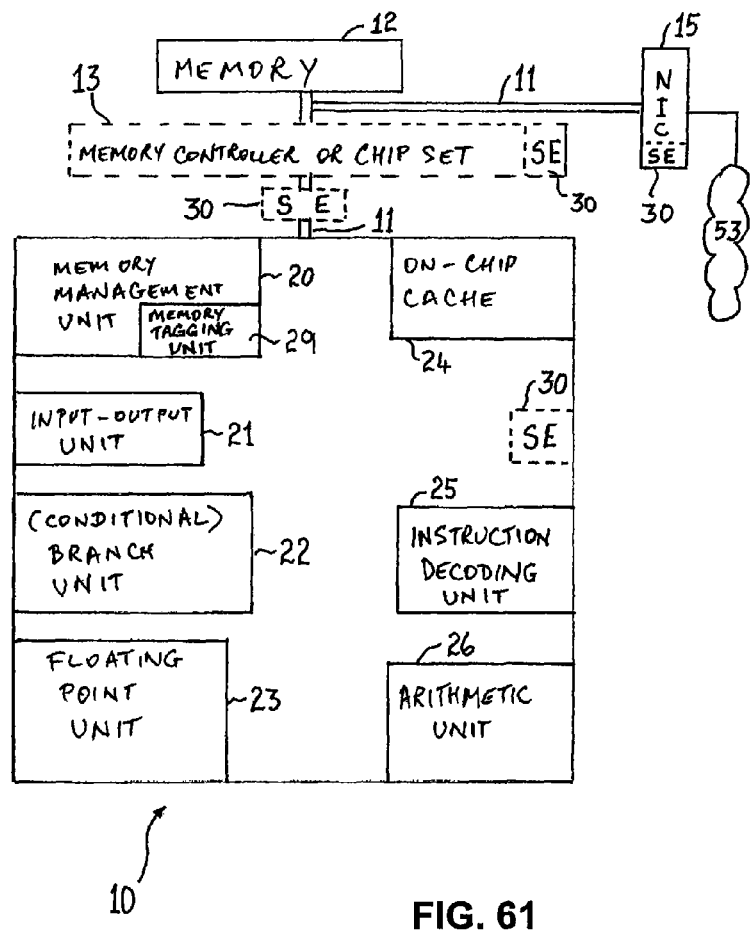
FIG. 61 is a similar schematic representation illustrating the modifications made to the arrangement of FIG. 60 in accordance with embodiments of the present invention.

As illustrated in the embodiment of FIG. 61, the arrangement of FIG. 60 is modified by the provision of a memory tagging unit 29 within the memory management unit 20, and by the provision of a serialisation engine (SE) 30. The serialisation engine 30 can be provided in any one of four possible locations each of which is indicated by broken lines in FIG. 61. The serialisation engine 30 can be incorporated within the integrated circuit forming the CPU 10. The serialisation engine 30 can take the form of a separate chip which is directly connected with the bus 11. The serialisation engine 30 can be incorporated within the memory controller or chipset 13. The serialisation engine 30 can also be incorporated within the network interface card (NIC) 15 and this is the presently preferred arrangement since it requires a minimum of alteration to the overall arrangement of the CPU 10. In particular, the network interface card 15 can be a transmission control protocol offload engine (or TCP offload engine or TOE) manufactured by Adaptec or Alacratech of the USA.

In accordance with the preferred embodiment of present invention, the memory 12 is divided into two parts, an application memory and a tag memory. The application memory consists of a series of memory locations each of which has an address which can be considered to be an offset from a specific starting address. Thus memory location A has an offset of, say, 100; memory location B has an offset of, say, 200; memory location C as an offset of, say, 300; and so on. For each memory location in the application memory where a write takes place, a corresponding indication is made in the tag memory. Thus if all three of memory locations A, B, and C have been written to then the tag memory will have a single bit in corresponding location "a" having an offset of, say, 10,000; another single bit in corresponding location "b" having an offset of 10,001; and a further single bit in corresponding location "c" having an offset of 10,002; and so on. This division of the application memory is conceptually similar to the use of real and virtual addresses in memory but differs in structure, method, and operation.

Where RSM is used, the application memory corresponds to each of the independent memory locations of each computer. However, if hybrid or partial RSM is used, the application memory corresponds to only those memory locations which are shared by the computers.

Thus the function of the memory tagging unit 29 is to firstly select only writes to memory, whilst ignoring all memory reads, and for each write generating a corresponding entry or indication in the tag memory.

The serialisation engine 30 notes the existence of the entries in the tag memory, reads the corresponding memory locations which have been written to, and then assembles a message which consists essentially of the addresses of the memory locations which have been written to, and the latest content of those memory locations. This message is then broadcast via the communications network 53 to all the other computers (not illustrated) forming the multiple computer system. Preferably, the serialisation engine 30 utilises the encoding system incorporating a count value described in co-pending U.S. Patent Application Ser. No. 60/850,711 filed Oct. 9, 2006 which describes Advanced Contention Detection features.

In one aspect, embodiments of the invention provide a method of modifying CPU operation in a first computer for replicated shared memory operation or hybrid replicated shared memory operation in which data written to at least some memory locations is to be duplicated in at least one other computer, said method comprising the steps of: (i) providing an application memory and a tag memory; (ii) for each write made by the CPU to a memory location in said application memory, creating a corresponding tag indication in said tag memory; and (iii) reading said tag indication(s) to assemble a message comprising the contents of the written to memory locations of said application memory.

IX. Exemplary Embodiment of a Modified Machine Architecture with Advanced Synchronization Co-pending U.S. Patent Application Ser. No. 5027G describes aspects of a synchronization that may be utilized with the instant invention.

Figure 62:
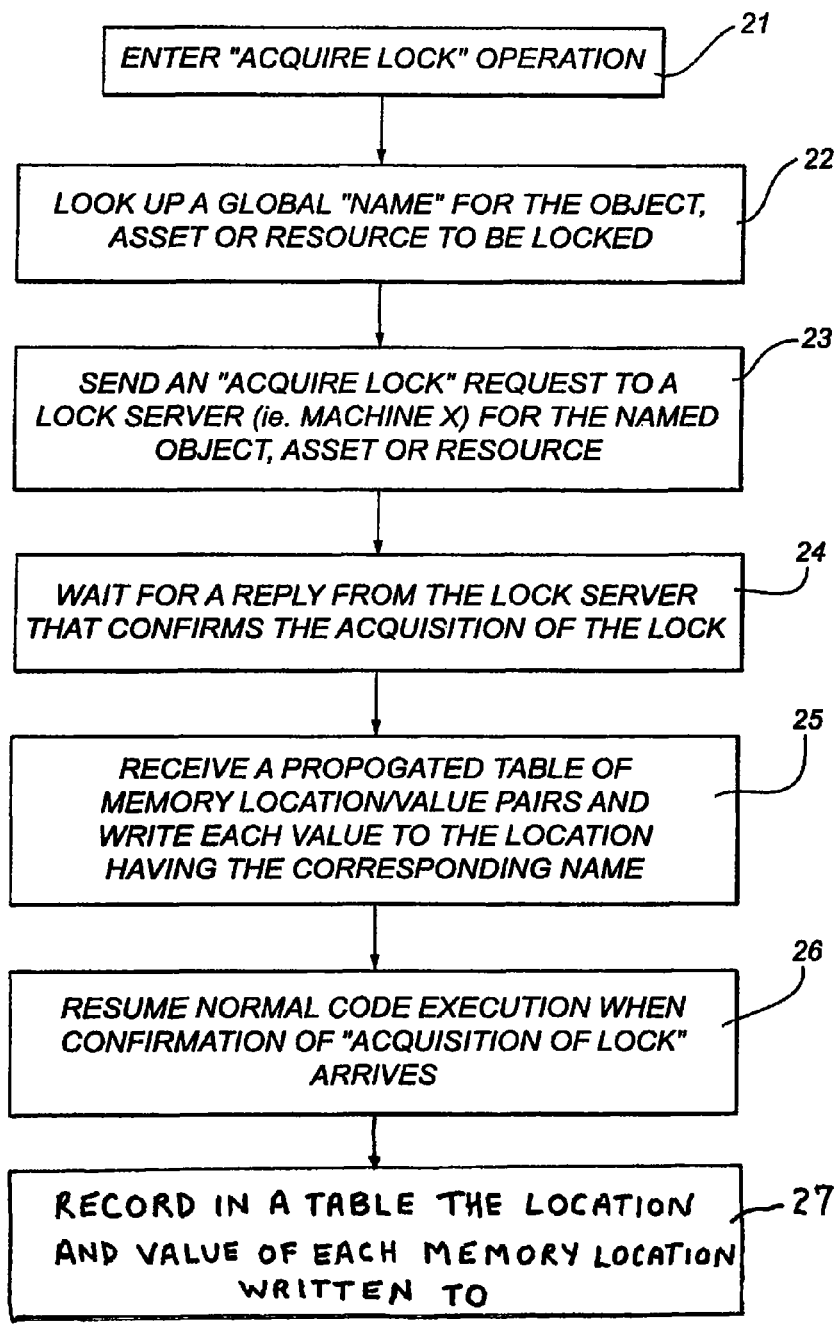
FIG. 62 and FIG. 63 are flowcharts respectively illustrating the acquire lock and release lock procedures of a first embodiment.

Turning now to FIG. 62, the operation of one of the machines M1-Mn on acquiring a lock is illustrated. During normal code execution, the need for a lock arises and thus upon entering the "acquire lock" operation, as indicated at step 21, the acquiring machine, say M5, which is to acquire the lock looks up a global name for the object, asset or resource to be locked. For the purposes of this example, it will be assumed that the object asset or resource is an object. Thus at step 22, the global name of the object is looked up, bearing in mind that each of the machines M1-Mn has a local object which corresponds to the same object in each machine, but which will have the same global name, but possibly a different local name depending upon the organisation of the local memory of each machine.

The global names and the corresponding local memory names or addresses are preferably stored in a table or similar data structure. The table can be presented in each of the "n" machines or in server machine X only. The data structure can take the form of a tag which accompanies each local memory location and which identifies or points to, or refers to the global name. Conversely, the global name can identify, point to, or refer to the local memory location, or object, asset, etc.

Once this global name has been as ascertained by machine M5, machine M5 then sends an "acquire lock" request to the machine X, which functions as the lock server. This is indicated in step 23. As indicated in step 24, machine M5 then awaits a reply from the lock server, which confirms the acquisition of the lock.

For the purposes of explanation, it is convenient to assume that the lock thus acquired is the first lock on the object. As a consequence, machine M5 only carries out steps 21-24 and step 25 will result in receipt of a table with nil values. Machine M5 then proceeds to resume normal code execution. As indicated in step 27, each time a memory location is written to, an entry is made in a table with the name of the memory location and the amended value. As a consequence, when the lock is about to be relinquished, there is in existence a table, which lists the memory location(s) and value(s) of each memory location, where a value has been written to memory. Thus, when a lock acquired is not the first lock on an object, as indicated in step 25, on the acquisition of that subsequent lock, each machine receives a table with the updated memory values and global names to which the lock relates. This procedure is repeated for each lock.

The abovedescribed operation of FIG. 62 can be modified slightly due to possible delays in transmission within the communications network 53. This can result in the confirmation of "acquisition of lock" of step 26 being received before the table of memory location/value pairs of step 25. In these circumstances normal code execution resumes after the receipt of the table of step 25.

Figure 63:
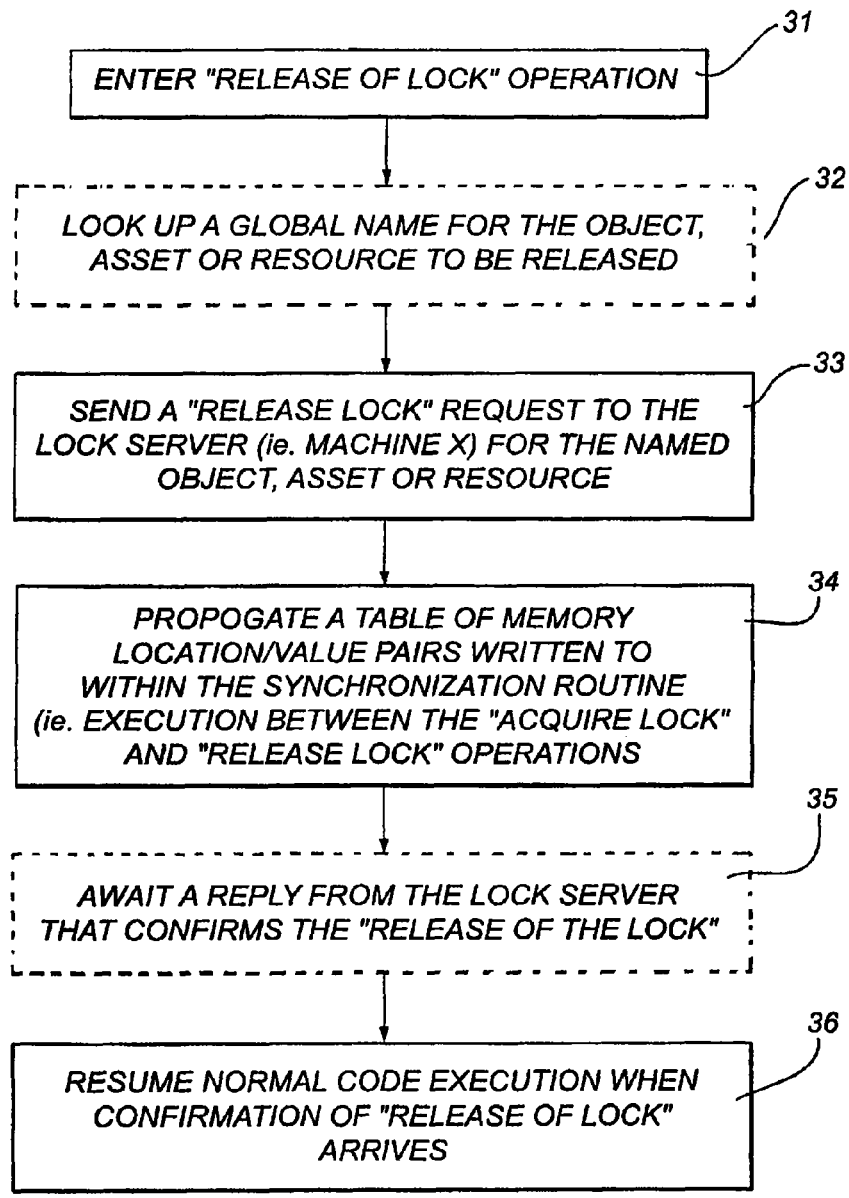

Similarly, as indicated in FIG. 63, where a lock is intended to be released or relinquished, as indicated at step 31 then the relinquishing machine, M5, preferably determines the global name of the object to be unlocked. This is indicated at step 32. Next the relinquishing machine, M5 sends a "release lock" request to the lock server machine X and this is indicated at step 33. The lock server machine X sends to the requesting machine, not only the lock authorization, but also propagates the previously generated table contents (i.e., memory location/value pairs) created whilst the lock was held by machine M5. Preferably as indicated at step 35, the machine M5 awaits a reply from a lock server, which confirms the release of the lock. This step 35, like step 32, is a preferable one, but not essential and thus is indicated in broken lines in FIG. 63. Next, as indicated at step 36, the machine M5 resumes normal code execution.

The abovementioned procedure for lock acquisition and release, can be modified so as to reduce the volume of data contained within the table to be propagated from one machine to the other. In particular, the abovementioned procedure suffers from the disadvantage that where a specific memory location is written to on many occasions, each of the successive values is stored within the table, but it is only the final value which is of interest to the next machine to receive the lock. In order to reduce the volume of data sent with each table, the above-mentioned procedure can be modified by noting only the names of the various locations, which had been written to, during the duration of the lock. Only at the relinquishing of the lock, is the current value of each memory location read and then inserted into the table or then used to form a new table.

Irrespective of which method is used, the lock authorization and its accompanying table of memory locations/content pairs are preferably given top priority for transmission via the communications network 53. As a consequence, the machine in the queue of waiting machines which receives the lock receives not only the lock authorization, but also the global names of the relevant written to memory locations, together with their up-to-date values or content.

Figure 64:
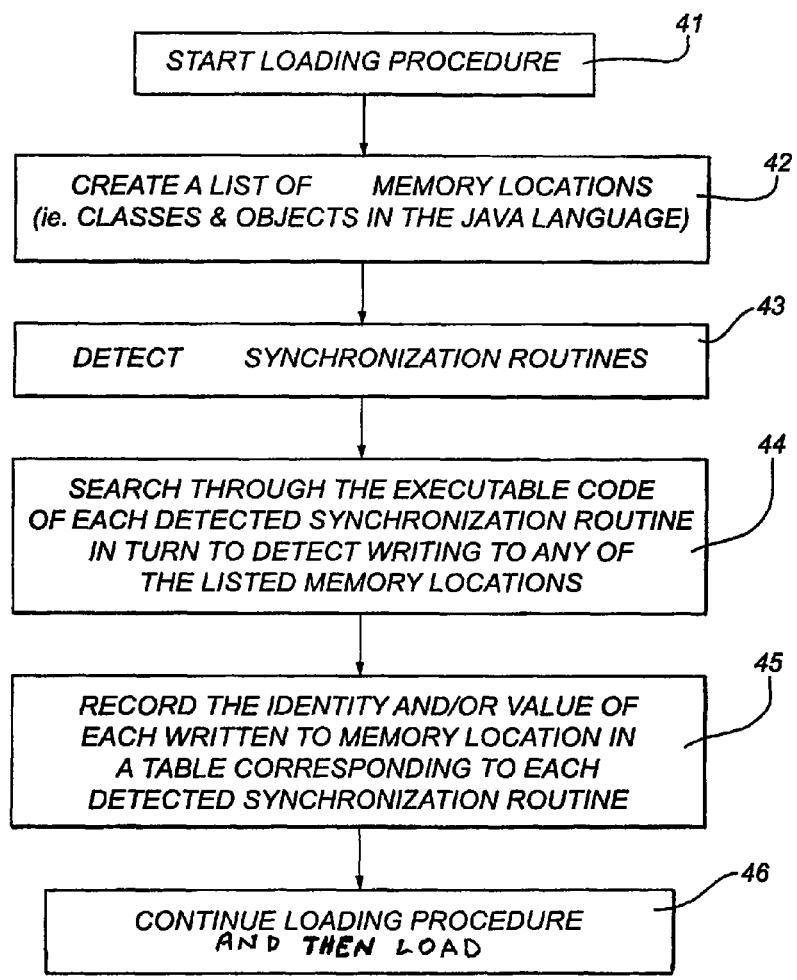
FIG. 64 and FIG. 65 are flowcharts illustrating the respective procedures of a second embodiment.
Figure 65:
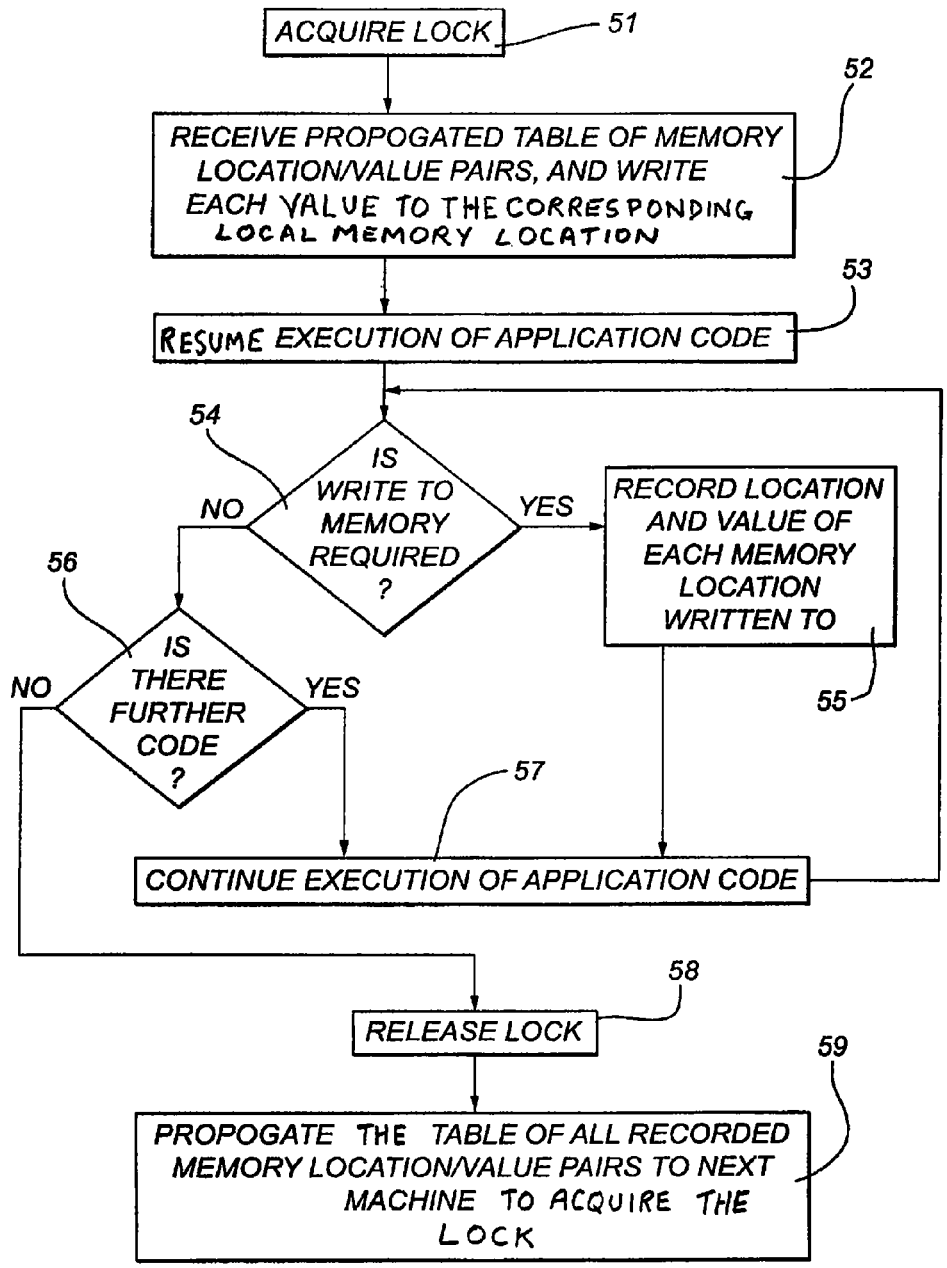

An alternative arrangement is illustrated in FIG. 64 and FIG. 65. Here, during the initial loading of the application program, after commencing the loading procedure at step 41, step 42 is carried out so as to create a list of memory locations to be utilised by the application program. Next, as indicated in step 43, a search of the program is conducted in order to detect synchronisation routines. Then, as indicated in step 44, for each detected synchronisation routine, a search is made to detect any listed memory locations which are to be written to.

In step 45, a table is created (either during the search or during execution of the application program) in which is recorded the identity and value (if all changes to each memory location are to be propagated) or just the identity of each memory location (if the final value of each memory location is to be propagated). Once this procedure has been completed in step 45, the loading procedure continues as indicated at step 46 and the modified application program is loaded.

In FIG. 65, the procedure of acquiring and relinquishing a lock, where the above-mentioned modification of the program has been carried out at loading, is illustrated. As indicated at step 52, once the lock is acquired, the machine acquiring the (subsequent) lock also receives the propagated table of memory location/value pairs. In order to ensure that the local memory location(s) corresponding to the global name(s) has the latest content or value, the machine acquiring the lock updates its local memory. The machine which has acquired the lock is thus in a position to begin execution of the application code with a local memory which is in the condition applying when the previous lock was released. This is indicated at step 53.

During the execution of the application code, as indicated by steps 54 and 55, if any write to memory is to take place, then the location and value of each memory location written to, is recorded in a table. This cycle repeats as necessary, also utilizing steps 56 and 57. After this has been carried out, as indicated at step 56, if there is no further code to be executed within the synchronization routine, then the lock is released as indicated at step 58. As indicated by step 59, at the release of the lock a table is propagated to the machine to next receive the lock in any queue of waiting machines, the table containing all recorded memory location/value pairs where any writing to memory occurred whilst the lock was held by the releasing machine.

The tabulation or recording of memory location/value pairs can be accomplished in various ways. In one form a single table is used for all purposes. In another form one table is used to record the newly written values and a record table is used to record the memory location/value pairs. This second table is transmitted when the lock is released. For example the table in steps 52 and 55 and 59 can be same table or different tables can be used. Alternatively, the table of steps 52 and 59 can be the same table and the table of step 55 can be a different table. Many tabulation formats will be apparent to those skilled in the computing arts. What is important is the nature and content of the tabulated or recorded data, not the tabulation format.

In connection with the foregoing, where reference is made to searching for synchronization routines and written to memory locations, it will be apparent to those skilled in the art that it is routines and locations within the application program 50 which are searched or detected. It is not the entirety of the memory of each machine (which includes an operating system, for example) which is searched.

Set out in an Annexure hereto are code fragments G1-G32 which exemplify the implementation of the above described techniques. Such code fragments are written in the JAVA language.

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:
  (i) re-compilation at loading,
  (ii) a pre-compilation procedure prior to loading,
  (iii) compilation prior to loading,
  (iv) "just-in-time" compilation(s), or
  (v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Given the fundamental concept of modifying memory manipulation operations to coordinate operation between and amongst a plurality of machines M1, M2 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3 . . . Mn (either sequentially or simultaneously or according to any other order, routine or procedure) with the modified object (or class or other assert or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is executable intermediary code.

In this arrangement, which may be termed "master/slave" each of the slave (or secondary) machines M1, M3 . . . Mn loads the modified object (or class), and inclusive of the new modified memory manipulation operation(s), that was sent to it over the computer communications network or other communications link or path by the master (or primary) machine, such as machine M2, or some other machine as a machine X. In a slight variation of this "master/slave" or "primary/secondary" arrangement, the computer communications network can be replaced by a shared storage device such as a shared file system, or a shared document/file repository such as a shared database.

It will be appreciated in the light of the detailed description provided herein that the modification performed on each machine or computer need not and frequently will not be the same or identical. What is required is that they are modified in a similar enough way that each of the plurality of machines behaves consistently and coherently relative to the other machines. Furthermore, it will be appreciated that there are a myriad of ways to implement the modifications that may for example depend on the particular hardware, architecture, operating system, application program code, or the like or different factors. It will also be appreciated that implementation can be within an operating system, outside of or without the benefit of any operating system, inside the virtual machine, in an EPROM, in software, in hardware, in firmware, or in any combination of these.

In a still further embodiment, each machine M1, M2 . . . Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different. It can thereby be enhanced, customized, and/or optimized based upon its particular machine architecture, hardware processor, memory, configuration, operating system, or other factors yet still be similar, coherent and consistent with the other machines and with all other similar modifications.

In all of the described instances or embodiments, the supply or the communication of the asset code (such as class code or object code) to the machines M1, M2 . . . Mn and optionally inclusive of a machine X, can be branched, distributed or communication among and between the different machines in any combination or permutation; such as by providing direct machine to machine communication (for example, M2 supplies each of M1, M3, M4 etc. directly), or by providing or using cascaded or sequential communication (for example, M2 supplies M1 which then supplies M3 which then supplies M4, and so on) or a combination of the direct and cascaded and/or sequential.

The abovedescribed arrangement needs to be varied in the situation where the modification relates to a cleanup routine, finalisation or similar, which is only to be carried out by one of the plurality of computers In this variation of this "master/slave" or "primary/secondary" arrangement, machine M2 loads the asset (such as class or object) inclusive of a cleanup routine in unmodified form on machine M2, and then (for example, M2 or each local machine) deletes the unmodified cleanup routine that had been present on the machine in whole or part from the asset (such as class or object) and loads by means of the computer communications network the modified code for the asset with the now modified or deleted cleanup routine on the other machines. Thus in this instance the modification is not a transformation, instrumentation, translation or compilation of the asset cleanup routine but a deletion of the cleanup routine on all machines except one. In one embodiment, the actual code-block of the finalisation or cleanup routine is deleted on all machines except one, and this last machine therefore is the only machine that can execute the finalisation routine because all other machines have deleted the finalisation routine. One benefit of this approach is that no conflict arises between multiple machines executing the same finalisation routine because only one machine has the routine.

The process of deleting the cleanup routine in its entirety can either be performed by the "master" machine (such as for example machine M2 or some other machine such as machine X) or alternatively by each other machine M1, M3 . . . Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 . . . Mn and optionally the server machine X.

In a further arrangement, a particular machine, say for example machine M1, loads the unmodified asset (such as class or object) inclusive of a finalisation or cleanup routine and all the other machines M2, M3 . . . Mn perform a modification to delete the cleanup routine of the asset (such as class or object) and load the modified version.

In a still further arrangement, the machines M1, M2 . . . Mn, may send some or all load requests to the additional server machine X, which performs the modification to the application program code 50 (including or consisting of assets, and/or classes, and/or objects) and inclusive of finalisation or cleanup routine(s), via any of the abovementioned methods, and returns in the modified application program code inclusive of the now modified finalisation or cleanup routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalisation or cleanup routine(s) to each machine. The modifications performed by machine X can include any of the modifications described. This arrangement may of course be applied to some only of the machines whilst other arrangements described herein are applied to others of the machines.

X. Exemplary Embodiment of a Modified Machine Architecture with Machine Redundancy Co-pending U.S. Patent Application Ser. No. 60/730,303 filed Oct. 25, 2005 describes aspects of synchronization that may be used with the instant invention.

Figure 66:
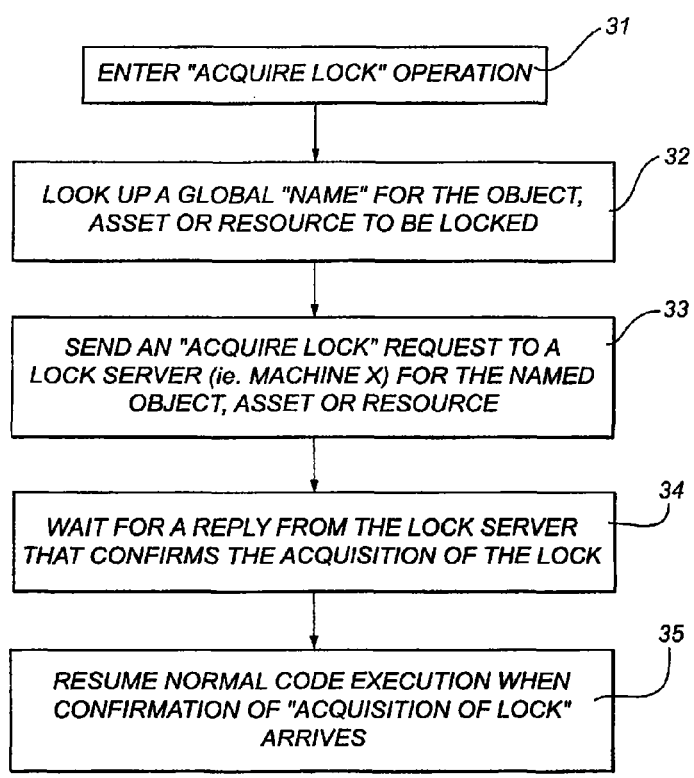
FIG. 66 and FIG. 67 respectively illustrate the steps carried out by any machine Mn to acquire and release a lock in accordance with a first embodiment.

Turning now to FIG. 66, the operation of one of the machines M1-Mn on acquiring a lock is illustrated. Upon entering the "acquire lock" operation, as indicated at step 31, the acquiring machine, say M3, which is to acquire the lock looks up a global name for the object, asset or resource to be locked. For the purposes of this example, it will be assumed that the object, asset or resource is a memory location. Thus at step 32, the global name of the memory location is looked up, bearing in mind that each of the machines M1-Mn has a corresponding local memory location which will have the same global name, but possibly a different local name, depending upon the organisation of the local memory of each machine.

Firstly, the structures, assets or resources (in JAVA termed classes or objects) to be synchronized or locked have already been allocated a name or tag which can be used globally by all machines, as indicated by step 32. This preferably happens when the classes or objects are originally initialized. This is most conveniently done via a table (or list or like data structure the format of which is not critical) maintained by server machine X. This table also includes the identity of the machine receiving the lock, and the synchronization status of the class or object. In one embodiment, this table also includes a queue arrangement which stores the identities of machines which have requested use of this asset.

As indicated in step 33 of FIG. 66, next an "acquire lock" request is sent to machine X, after which, the sending machine M3 waits for confirmation of lock acquisition as shown in step 34. Thus, if the global name is already locked (i.e., the corresponding asset is in use by another machine other than the machine proposing to acquire the lock) then this means that the proposed synchronization routine of the object or class should be paused until the object or class is unlocked by the current owner.

Alternatively, if the global name is not locked, this means that no other machine is using this class or object, and confirmation of lock acquisition is received straight away. After receipt of confirmation of lock acquisition, execution of the synchronization routine is allowed to continue, as shown in step 35.

Figure 67:
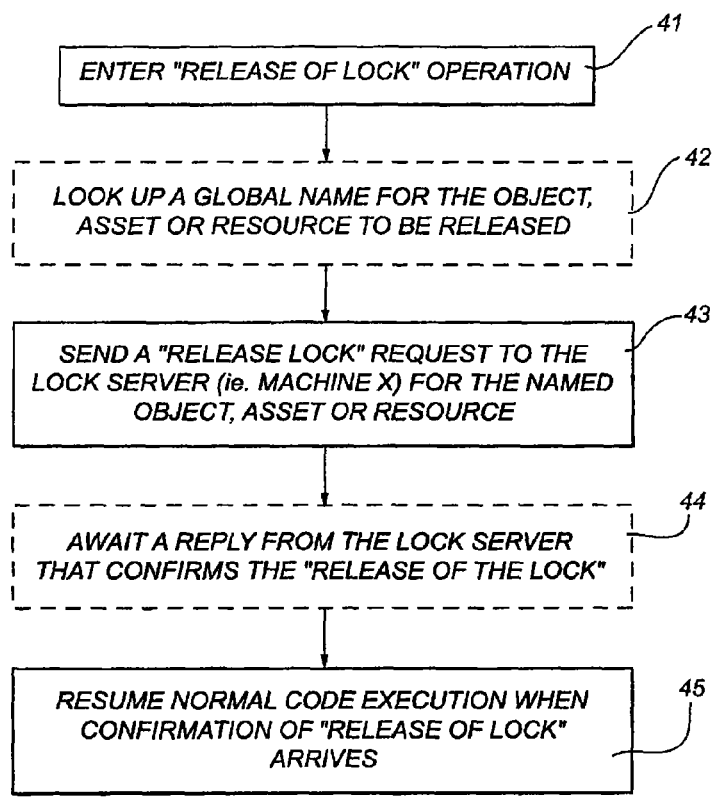

FIG. 67 shows the procedures followed by the application program executing machine M3 which wishes to relinquish a lock. The initial step is indicated at step 41. The operation of this proposing machine is temporarily interrupted by steps 43 and 44 until the reply is received from machine X, corresponding to step 44, and execution then resumes as indicated in step 45. Optionally, and as indicated by broken lines in step 42, the machine M3 requesting release of a lock is made to lookup the "global name" for this lock preceding a request being made to machine X. This way, multiple locks on multiple machines can be acquired and released without interfering with one another.

Figure 68:
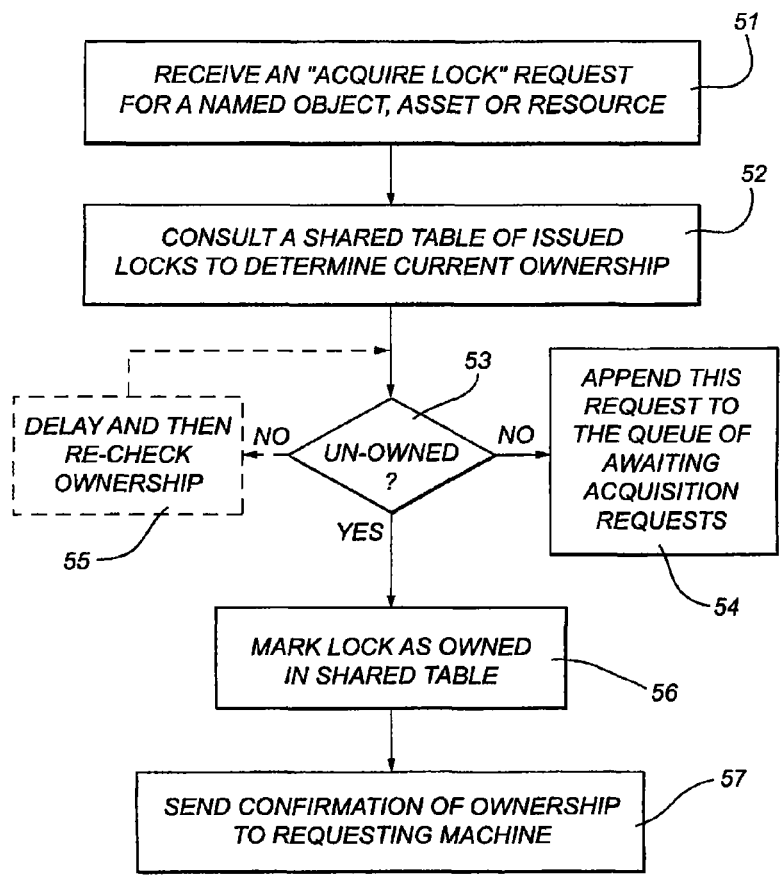
FIG. 68 and FIG. 69 respectively illustrate the steps carried out by the lock server machine MX corresponding to FIG. 66 and FIG. 67.

FIG. 68 shows the activity carried out by machine X in response to an "acquire lock" enquiry (of FIG. 66). After receiving an "acquire lock" request at step 51, the lock status is determined at steps 52 and 53 and, if no—the named resource is not free, the identity of the enquiring machine is added at step 54 to (or forms) the queue of awaiting acquisition requests. Alternatively, if the answer is yes—the named resource is free—the corresponding reply is sent at step 57. The waiting enquiring machine M3 is then able to execute the synchronization routine accordingly by carrying out step 35 of FIG. 66. In addition to the yes response, the shared table is updated at step 56 so that the status of the globally named asset is changed to "locked", and the identity of the new lock owning machine is inserted in the table.

Figure 69:
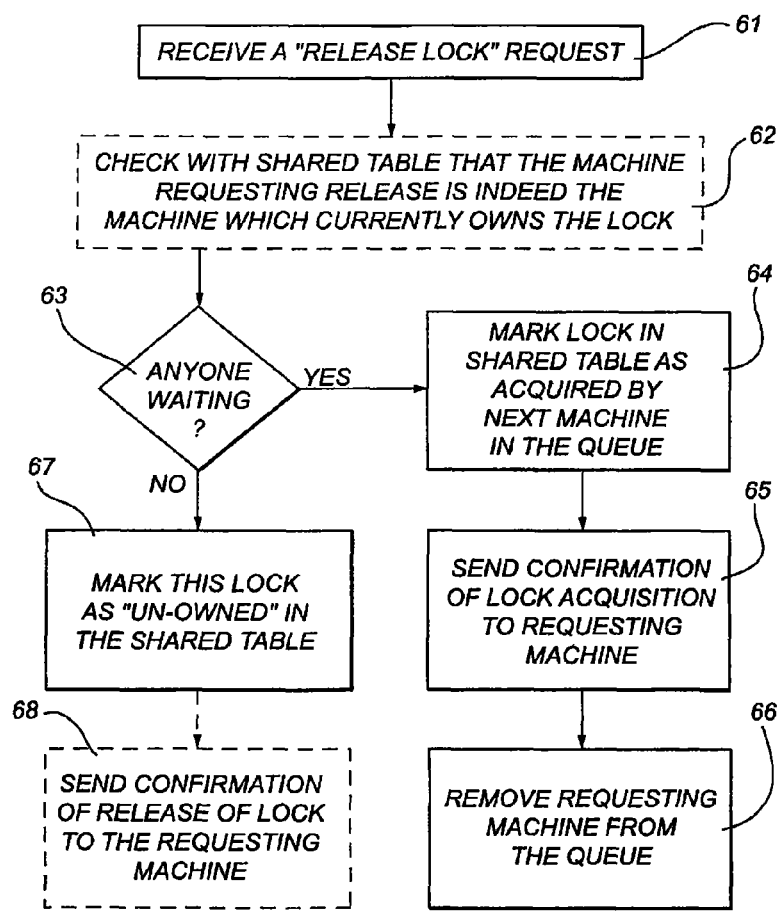

FIG. 69 shows the activity carried out by machine X in response to a "release lock" request of FIG. 67. After receiving a "release lock" request at step 61, machine X optionally, and preferably, confirms that the machine M3 requesting to release the lock is indeed the current owner of the lock", as indicated in step 62. Next, the queue status is determined at step 63 and, if no machine is waiting to acquire this lock, machine X marks this lock as "unowned" in the shared table, as shown in step 67, and optionally sends a confirmation of release back to the requesting machine M3, as indicated by step 68. This enables the requesting machine M3 to execute step 45 of FIG. 67.

Alternatively, if yes—that is, one or more other machines are waiting to acquire this lock—machine X marks this lock as now acquired by the next machine in the queue, as shown in step 64, then sends a confirmation of lock acquisition to the queued machine at step 65, and consequently removes the new lock owner from the queue of waiting machines, as indicated in step 66.

A first embodiment of what happens in the event that machine M3 fails whilst it has been allocated the lock, will now be described with reference to FIG. 70. Clearly, since machine M3 has failed, it cannot carry out step 43 of FIG. 67. Instead, machine X must detect for itself the failure of machine M3 as indicated by step 71 of FIG. 70. There are several ways in which machine X can detect failure of machine M3. The easiest is for machine X to regularly poll each of the machines M1, M2, . . . Mn in turn to question whether they are continuing to operate satisfactorily. Another method is to monitor traffic on the communications network 3 generated by each of the machines M1, M2, . . . Mn and destined for others of those machines. Other strategies will be apparent to those skilled in the computing arts and are described hereafter.

Next, the lock server machine X looks up the table of currently acquired locks to see if the failed machine M3 is listed therein. This is indicated at steps 72 and 73 of FIG. 70. If machine M3 is not listed in the table, then nothing further is required to be done, as indicated at step 74, since there is no lock which cannot be relinquished.

Figure 70:
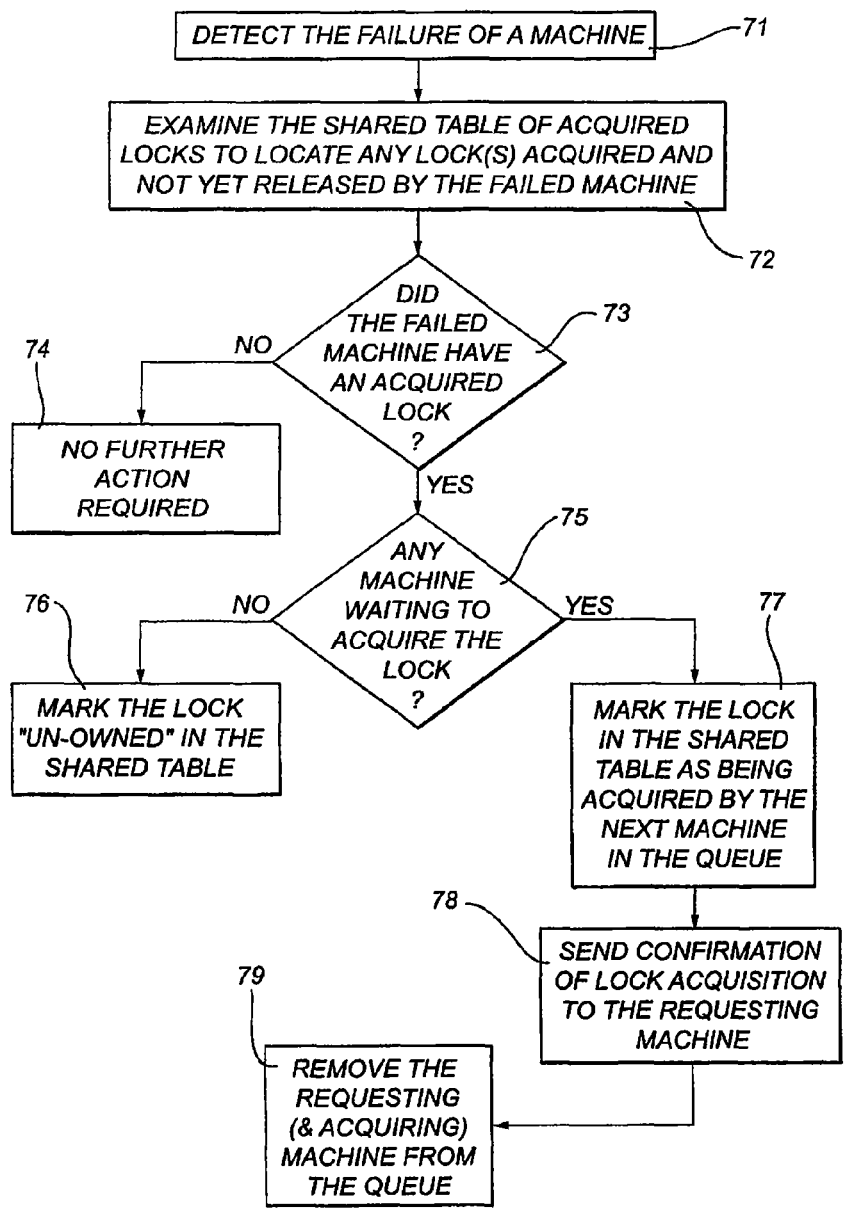
FIG. 70 illustrates the steps carried out by lock server machine MX in accordance with the first embodiment following failure of a machine Mn.

If, however, the answer to this enquiry is yes, then as indicated at step 75 in FIG. 70, a still further enquiry must be made, namely is there a machine (or a queue of machines) waiting for this lock to be allocated to them. If the answer is no, then only relatively minor action is required (as indicated at step 76) in that the look up table must be amended to indicate that the specific lock is now unallocated (and thus available in the event of a further "acquire lock" request).

However, in the event that the latest enquiry reveals at least one waiting machine, then action equivalent to a pseudo "release lock" request from the now defunct machine M3 is required. This is indicated in steps 77-79 in FIG. 70. First, the look up table is amended as indicated in step 77, to show that the waiting machine, say machine M7, (or one of the waiting machines) has acquired the lock.

Next, machine X generates the confirmation of lock ownership message of step 57 of FIG. 68 and (as indicated in step 78 of FIG. 70) sends this to the waiting machine M7. Finally, as indicated in step 79 of FIG. 70, machine M7 (having just acquired the lock) is now removed from the queue of waiting machines.

Figure 71:
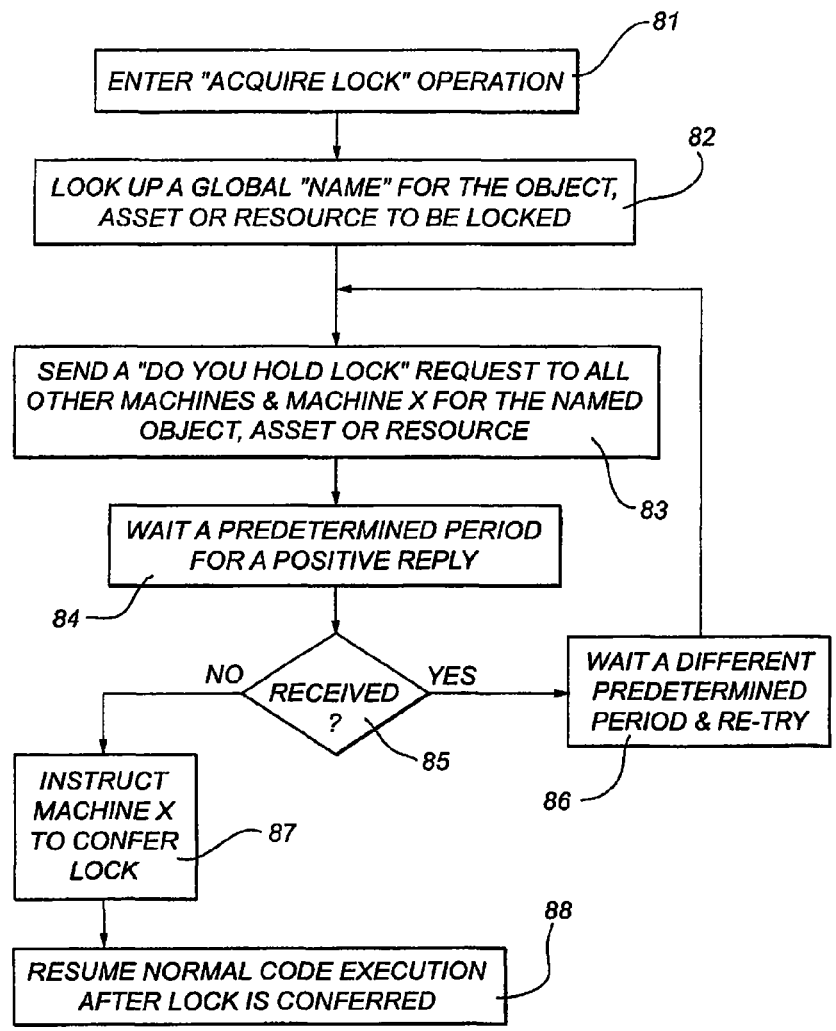
FIG. 71 and FIG. 72 respectively illustrate the steps carried out by a lock requesting machine and the lock server machine MX in accordance with a second embodiment following failure of another lock holding machine.

In a second embodiment illustrated in FIG. 71, the machine, say machine M7, wishing to acquire the lock repeats steps 31 and 32 of FIG. 66 (illustrated as steps 81 and 82 in FIG. 71). However, machine M7 then carries out step 83 in FIG. 71 by sending a "DO YOU HOLD LOCK" request, which names the desired object, asset or resource to be locked, to all the other machines M1, M2, . . . M6, M8, . . . Mn and X. Machine M7 then waits for a short predetermined period to see if any positive reply is received. If so, machine M7 then waits for a relatively long predetermined period and then retries by sending out another request (as indicated by steps 84, 85 and 86 of FIG. 71).

In the alternative, if no positive reply is received within the short predetermined period, machine M7 then instructs machine X to confer the lock upon it (as indicated by steps 84, 85 and 87 in FIG. 71). Once machine X confers the lock, machine M7 resumes normal processing.

Figure 72:
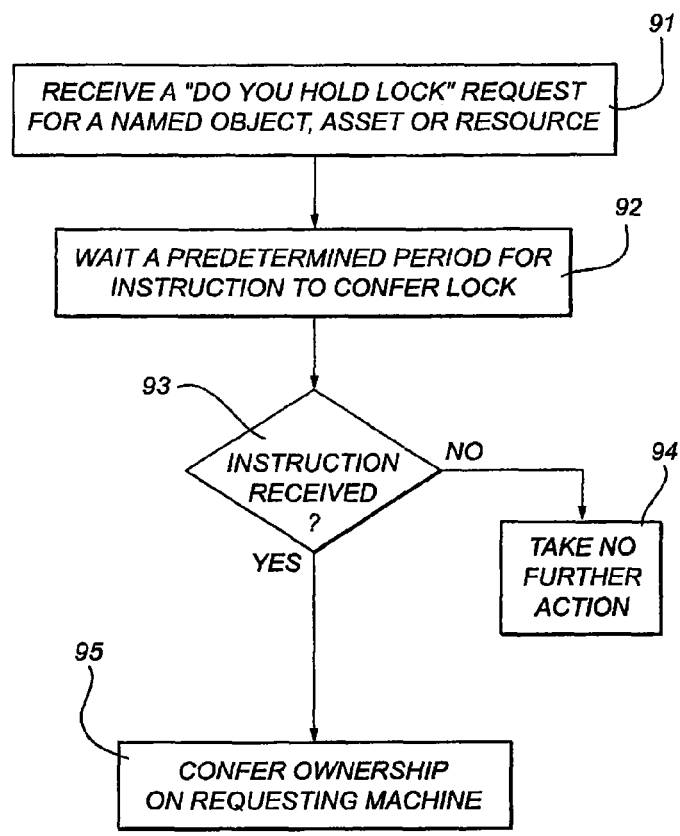

The corresponding actions taken by machine X are illustrated in FIG. 72. Firstly, at step 91 machine X receives the "DO YOU HOLD LOCK" request in respect of the named asset. The machine X waits for a period consistent with the expected time for replies to be received by machine M7. If nothing further is received by machine X within the expected time, machine X takes no further action (as indicated by steps 92, 93 and 94 in FIG. 72).

In the alternative, if the instruction to confer the lock is received from machine M7, then machine X confers ownership of the lock on machine M7 (thereby carrying out steps 92, 93 and 95 of FIG. 72).

The above described second embodiment works in the following way in the event of machine failure. Say machine M6 has had conferred on it the lock in question, and machine M6 fails. Then when M7 asks machine M6 if it has the lock (either initially or as a consequence eventually of a retry by machine M7) machine M7 does not receive a positive reply from machine M6 (which having failed gives no reply—either positive or negative). Thus step 87 of FIG. 71 is triggered and the lock previously conferred on the failed machine M6 is now conferred on a requesting machine M7. So the overall system is able to carry on, notwithstanding the failure of machine M6.

The abovementioned machine failure can occur in any one (or more) of a number of different modes (for example due to failure of its power supply, CPU, failure of its link to the network 53 or similar catastrophic failure). This failure is able to be detected by a conventional detector attached to each of the application program running machines and reporting to machine X, for example.

Such a detector is commercially available as a Simple Network Management Protocol (SNMP). This is essentially a small program which operates in the background and provides a specified output signal in the event that failure is detected.

Such a detector is able to sense failure in a number of ways, any one, or more, of which can be used simultaneously. For example, machine X can interrogate each of the other machines M1, . . . Mn in turn requesting a reply. If no reply is forthcoming after a predetermined time, or after a small number of "reminders" are sent, also without reply, the non-responding machine is pronounced "dead".

Alternatively, or additionally, each of the machines M1, . . . Mn can at regular intervals, say every 30 seconds, send a predetermined message to machine X (or to all other machines in the absence of a server) to say that all is well. In the absence of such a message the machine can be presumed "dead" or can be interrogated (and if it then fails to respond) is pronounced "dead".

Further methods include looking for a turn on event in an uninterruptible power supply (UPS) used to power each machine which therefore indicates a failure of mains power. Similarly conventional switches such as those manufactured by CISCO of California, USA include a provision to check either the presence of power to the communications network 53, or whether the network cable is disconnected.

In some circumstances, for example for enhanced redundancy or for increased bandwidth, each individual machine can be "multi-peered" which means there are two or more links between the machine and the communications network 3. An SNMP product which provides two options in this circumstance—namely wait for both/all links to fail before signalling machine failure, or signal machine failure if any one link fails, is the 12 Port Gigabit Managed Switch GSM 7212 sold under the trade marks NETGEAR and PROSAFE.

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

re-compilation at loading,
a pre-compilation procedure prior to loading,
compilation prior to loading,
"just-in-time" compilation(s), or
re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Given the fundamental concept of modifying memory manipulation operations to coordinate operation between and amongst a plurality of machines M1, M2 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3 . . . Mn (either sequentially or simultaneously or according to any other order, routine or procedure) with the modified object (or class or other assert or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is executable intermediary code.

In this arrangement, which may be termed "master/slave" each of the slave (or secondary) machines M1, M3 . . . Mn loads the modified object (or class), and inclusive of the new modified memory manipulation operation(s), that was sent to it over the computer communications network or other communications link or path by the master (or primary) machine, such as machine M2, or some other machine as a machine X. In a slight variation of this "master/slave" or "primary/secondary" arrangement, the computer communications network can be replaced by a shared storage device such as a shared file system, or a shared document/file repository such as a shared database.

It will be appreciated in the light of the detailed description provided herein that the modification performed on each machine or computer need not and frequently will not be the same or identical. What is required is that they are modified in a similar enough way that each of the plurality of machines behaves consistently and coherently relative to the other machines. Furthermore, it will be appreciated that there are a myriad of ways to implement the modifications that may for example depend on the particular hardware, architecture, operating system, application program code, or the like or different factors. It will also be appreciated that implementation can be within an operating system, outside of or without the benefit of any operating system, inside the virtual machine, in an EPROM, in software, in hardware, in firmware, or in any combination of these.

In a still further embodiment, each machine M1, M2 . . . Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different. It can thereby be enhanced, customized, and/or optimized based upon its particular machine architecture, hardware processor, memory, configuration, operating system, or other factors yet still be similar, coherent and consistent with the other machines and with all other similar modifications.

In all of the described instances or embodiments, the supply or the communication of the asset code (such as class code or object code) to the machines M1, M2 . . . Mn and optionally inclusive of a machine X, can be branched, distributed or communication among and between the different machines in any combination or permutation; such as by providing direct machine to machine communication (for example, M2 supplies each of M1, M3, M4 etc. directly), or by providing or using cascaded or sequential communication (for example, M2 supplies M1 which then supplies M3 which then supplies M4, and so on) or a combination of the direct and cascaded and/or sequential.

The abovedescribed arrangement needs to be varied in the situation where the modification relates to a cleanup routine, finalisation or similar, which is only to be carried out by one of the plurality of computers In this variation of this "master/slave" or "primary/secondary" arrangement, machine M2 loads the asset (such as class or object) inclusive of a cleanup routine in unmodified form on machine M2, and then (for example, M2 or each local machine) deletes the unmodified cleanup routine that had been present on the machine in whole or part from the asset (such as class or object) and loads by means of the computer communications network the modified code for the asset with the now modified or deleted cleanup routine on the other machines. Thus in this instance the modification is not a transformation, instrumentation, translation or compilation of the asset cleanup routine but a deletion of the cleanup routine on all machines except one. In one embodiment, the actual code-block of the finalisation or cleanup routine is deleted on all machines except one, and this last machine therefore is the only machine that can execute the finalisation routine because all other machines have deleted the finalisation routine. One benefit of this approach is that no conflict arises between multiple machines executing the same finalisation routine because only one machine has the routine.

The process of deleting the cleanup routine in its entirety can either be performed by the "master" machine (such as for example machine M2 or some other machine such as machine X) or alternatively by each other machine M1, M3 . . . Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 . . . Mn and optionally the server machine X.

In a further arrangement, a particular machine, say for example machine M1, loads the unmodified asset (such as class or object) inclusive of a finalisation or cleanup routine and all the other machines M2, M3 . . . Mn perform a modification to delete the cleanup routine of the asset (such as class or object) and load the modified version.

In a still further arrangement, the machines M1, M2 . . . Mn, may send some or all load requests to the additional server machine X, which performs the modification to the application program code 50 (including or consisting of assets, and/or classes, and/or objects) and inclusive of finalisation or cleanup routine(s), via any of the abovementioned methods, and returns in the modified application program code inclusive of the now modified finalisation or cleanup routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalisation or cleanup routine(s) to each machine. The modifications performed by machine X can include any of the modifications described. This arrangement may of course be applied to some only of the machines whilst other arrangements described herein are applied to others of the machines.

XI. Exemplary Embodiment of a Modified Machine Architecture with Partial Memory Updating Co-pending U.S. Patent Application Ser. No. 60/730,543 filed Oct. 25, 2005 describes aspects of a modified machine architecture with partial memory updating which may be used in conjunction with the present invention.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems. The genesis of the present invention is a desire to increase of the speed of operation of the multiple computer system by reducing the volume of data which requires to be updated.

The abovementioned related and incorporated by reference specifications disclose a system in which corresponding memory locations can be updated to ensure that the contents of each local memory are substantially identical, apart from a transmission delay. However, as the number of machines increases and the complexity of the applications program also increase, so the volume of data required to be transmitted over the communications network also increases.

In order to overcome this problem, in accordance with one embodiment of the present invention, the memory locations which potentially require updating are divided into at least two categories. The first category consists of those memory locations which are accessible by any two or more of the multiple machines and thus should be continuously updated. The second category consists of those memory locations which are accessible only by the local machine where the memory location is physically located. For these memory locations it is undesirable to, firstly, replicate the contents of that memory location on all the other machines, and secondly, to continue to update the contents of the replicated memory locations each time that the original local memory contents change. Memory locations which fall into the two categories are easily able to be distinguished by whether or not there is a pointer pointing to the memory location concerned. There are several mechanisms, or modes, whereby this categorisation and data transfer can take place.

Figures 74, 75:
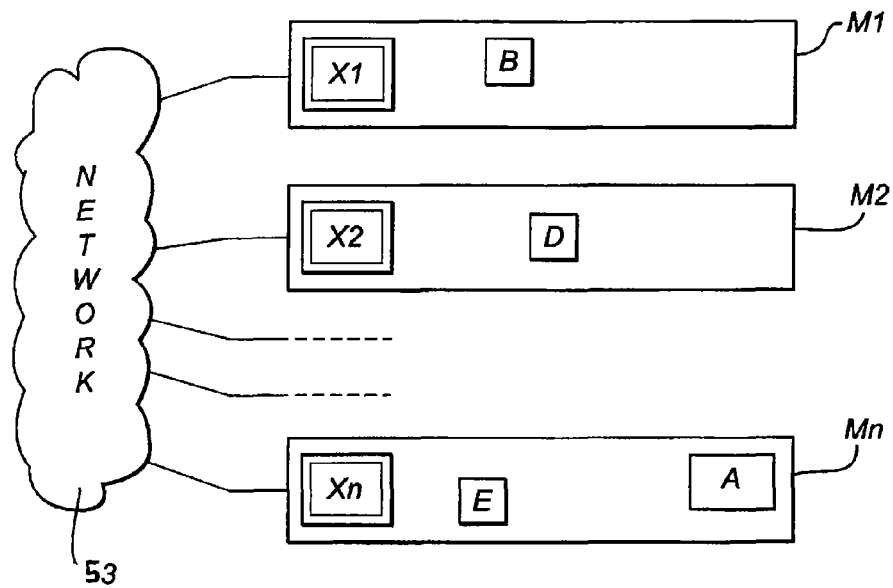
FIG. 74 is a schematic map of the memory locations in all the multiple machines showing memory locations including classes and objects.
FIG. 75 is a table showing the various memory locations of FIG. 74 and their ability to be reached.

Turning now to FIG. 74, each of the multiple machines M1, M2, . . . , Mn (other than any server machine X if present) has its memory locations schematically illustrated. For machine M1 there is a class X1 and an object B. For machine M2 there is a class X2 which is the same as for machine M1, and an object D. For machine Mn there is the same class Xn and two objects A and E. The contents of the memory location X are the same for each of the machines and each machine is able to both read from, and write to, memory location X. For this reason, the boundary of memory location X is indicated with a double line.

Figure 73:
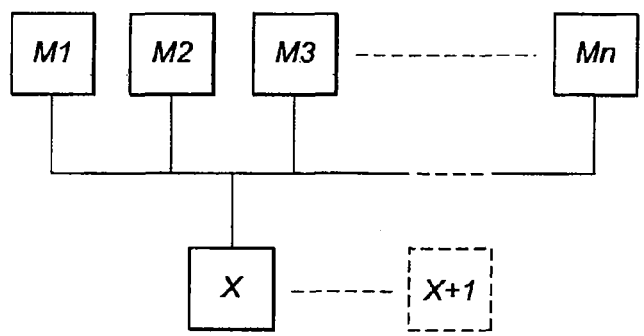
FIG. 73 schematically illustrates "n" application running computers to which at least one additional server machine X is connected as a server.

Preferably, it is convenient for the server machine X of FIG. 73, to maintain a table listing each memory location and the machines which are able to access each memory location in the table. Such a table is said to be a reachability table and is illustrated in FIG. 75. The first row in the table of FIG. 75 deals with memory location A which is only able to be accessed by machine Mn. The second row in the table of FIG. 75 deals with memory location B which is only able to be accessed by machine M1. Similarly, object D is only able to be accessed by machine M2 and object E is only able to be accessed by machine Mn. However, the class X is able to be accessed by all of the machines M1, M2 and Mn.

In the multi-machine environment described above, in the event that the content of class X is changed by being written to by one of the machines, then it is necessary to transmit that change in content via the network 53 to all the other machines. However, since the objects A, B, D and E are each are only able to be accessed by a single machine, there is little point in either creating or updating the contents of these memory locations since they are only able to be accessed by their local machine.

Figures 76, 77:
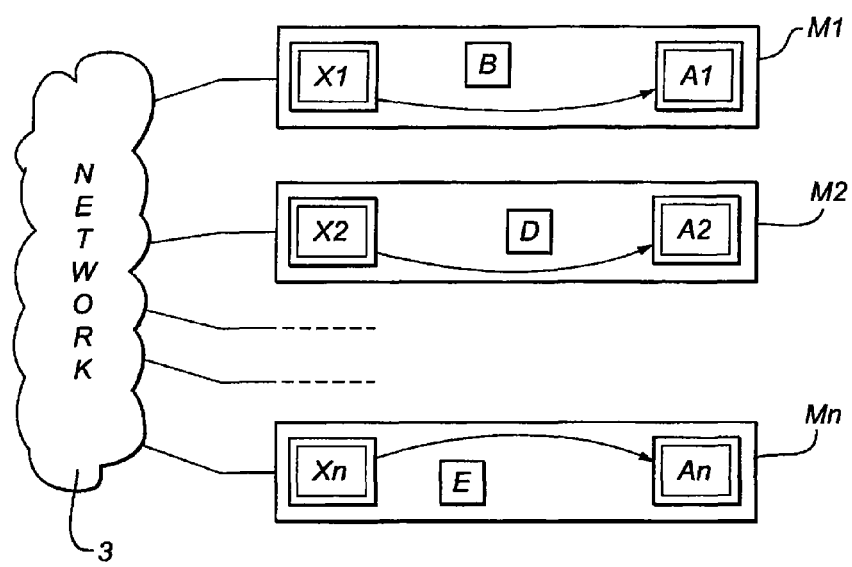
FIG. 76 is a map similar to FIG. 74 and showing the consequence of memory location X pointing to memory location A.
FIG. 77 is the reachability table corresponding to FIG. 76.

If now during the processing carried out by a particular machine, say machine Mn, the class Xn needs to refer to the object A, then class Xn is said to point to object A. This is indicated in FIG. 76 by an arrow pointing from class Xn to object A. The change in status of object A means that it is now able to be accessed or referenced by all the other machines. For this reason in FIG. 76 it is named object An, is bounded by double lines, and is reproduced in each of the other machines as object A1, A2, etc. Furthermore, an arrow points from each corresponding class X1, X2, etc to the corresponding referred object A1, A2, etc. As a result of this change of status of object A, the first row of the reachability table of FIG. 75 is amended as illustrated in FIG. 77 so as to indicate that object A is now able to be reached by the machines M1, M2 and Mn. The server machine X of FIG. 73 uses the amended reachability table of FIG. 77 to ensure that the contents of object A, if amended by one machine, are transmitted via the network 3 to all the other machines.

Figures 78, 79:
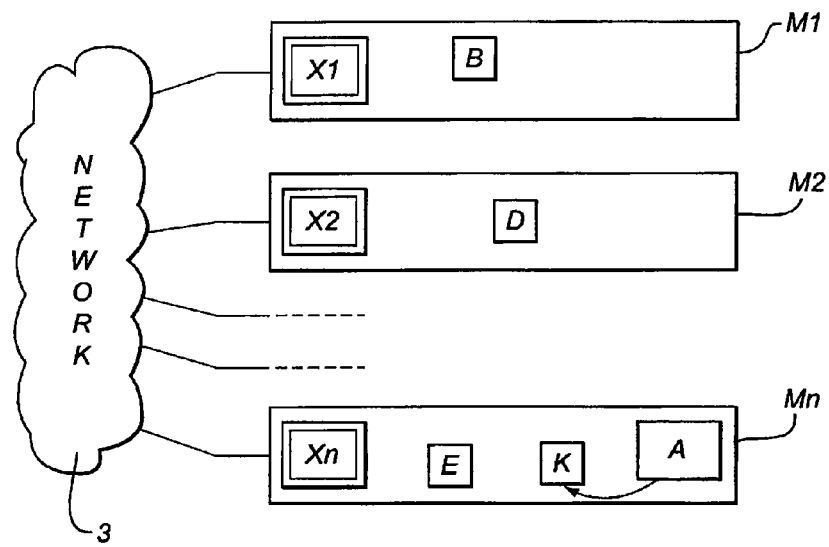
FIG. 78 is a map similar to FIG. 74 and showing memory location A pointing to new memory location K.
FIG. 79 is the reachability table corresponding to FIG. 78.

FIG. 78 and FIG. 79 illustrate a further modification. Here object A in machine Mn, as a result of the processing carried out by machine Mn, now points to a new object K. As a consequence, it is now necessary for an additional row to be inserted into the reachability table as illustrated in FIG. 79. This new row illustrates that object K is only able to be accessed by machine Mn.

Figures 80, 81:
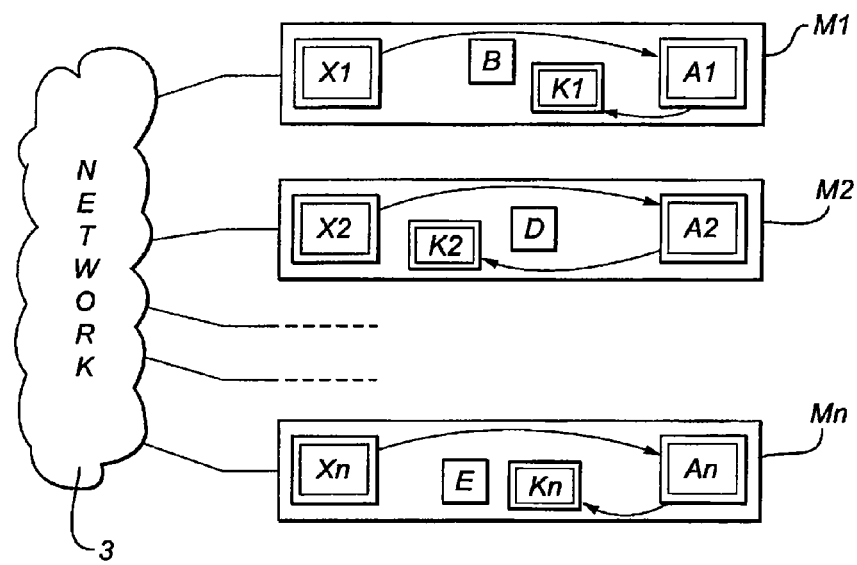
FIG. 80 is a map similar to FIG. 78 but showing the consequence of memory location X pointing to memory location A.
FIG. 81 is the reachability table corresponding to FIG. 80.

Under these circumstances, if the modification previously described above in relation to FIG. 76, takes place, then the situation illustrated in FIG. 80 arises. Since class Xn now points to object An, as before object A is replicated in each of the other machines. However, since object An itself points to object K, it is necessary for each of the objects K to be replicated in each of the other machines. This gives rise to objects K1, K2, ... Kn. Furthermore, each of these objects is accessible by all machines and consequently these objects are indicated by double lines in FIG. 80. The corresponding changes to the reachability table are indicated in FIG. 81 where an object K is now indicated as being accessible by all machines.

The abovementioned detailed description refers to memory locations, however, it is equally applicable to structures, assets or resources (which in JAVA are termed classes or objects). These will have already been allocated a (global) name or tag which can be used globally by all machines (since it is understood that the local memory structure of different machines may be different). Thus, the local or actual name allocated to a specific memory location in one machine may well be different from the local name allocated to the corresponding memory location in another machine. This global name allocation preferably happens during a compilation process at loading when the classes or objects are originally initialized. This is most conveniently done via a table maintained by the server machine X. This table can also include the reachability data.

It will be apparent to those skilled in the computing arts that the reachability data enables structures, assets or resources (i.e., memory locations) to be divided into two categories or classes. The first category consists of those locations which are able to be accessed by all machines. It is necessary that write actions carried out in respect of such memory locations be distributed to all machines so that all corresponding memory locations have the same content (except for delays due to transmission of updating data). However, in respect of the second category, since these memory locations are only accessible by the local machine, write actions to these memory locations need not be distributed to all the other machines, nor need there be corresponding memory locations on the other machines. As a consequence of this categorisation, a substantial volume of data is not required to be transmitted from one machine to the others and so the volume of traffic on the network 53 is substantially reduced.

In the foregoing description, a single reachability table is provided which is located in, and maintained by, the server machine X. However, it is also possible for the computer system to be operated without a server machine X in which case it is desirable for each machine to operate its own reachability table. FIG. 82-FIG. 85 illustrate individual reachability tables for the individual machines in the circumstances corresponding to FIG. 75, FIG. 77, FIG. 79 and FIG. 81 respectively.

Thus, in FIG. 82 the table for machine M1 has a row for class X and a row for object B. Similarly, the table for machine M2 has a row for class X and a row for object D. However, the table for machine Mn has three rows, one for class X, and one for each of objects A and E. When the change illustrated by comparison of FIG. 74 and FIG. 76 takes place, since class Xn now refers to object An, and thus all the other classes X1, X2, etc must now refer to corresponding objects A1, A2, etc. so all machines must now include a row in their reachability table for object A. This is the situation illustrated in FIG. 83. The other machines are said to inherit the table entry for object A.

Machine Mn can determine that object A requires replication across the other machines by consulting the table entry for class X on machine Mn. In the situation illustrated, machine Mn makes a positive determination for replication by comparing the table entries for object A and class X. If the table entry for object A includes all machines in the table entry for class X, then machine Mn can correctly determine that object A does not need to be further replicated on any other machines. Additionally, no table entries need to be added to, or updated on, other machines. Alternatively, if the table entry of object A does not include the full set of machines in the table entry of class X then machine Mn updates the table entry for object A to include the set of machines listed in the table entry for class X, and additionally instructs all machines listed in the new table entry for object A to update their local tables for object A with the set of machines listed in the new table entry for object A on machine Mn. Finally, for the set of machines which were not already present in the table entry for object A on machine Mn prior to the inheritance of the set of machines of class X on machine Mn, machine Mn instructs those machines (i.e., machines M1 and M2) to add a local table entry for object A and create local replicas in memory of object A and associated references to class X.

Similarly, with reference to FIG. 78 when the additional object K is created by machine Mn, so an additional row for object K is created in the reachability table for machine Mn as illustrated in FIG. 84 as machines M1 and M2 do not have a local replica of object K and, as shown in FIG. 78, neither do they have a table entry for objects A and K. As illustrated in FIG. 80, the assignment of a reference of object A to class X requires that object A inherits the table entries of class X. However, in addition, as object A in turn references object K, object K must also indirectly inherit the table entry of class X by inheriting the newly updated table entry of object A (including now the inherited values of the table entry for class X). In accordance with the updating of table entries for objects A and K on machine Mn, machine Mn instructs all machines listed in the table entry for objects A and K to update their local tables, and further instructs all machines not originally present in the table entries of objects A and K respectively to create local replicas of objects A and K. The resulting tables for the individual machines are illustrated in FIG. 85.

Figures 86, 87:
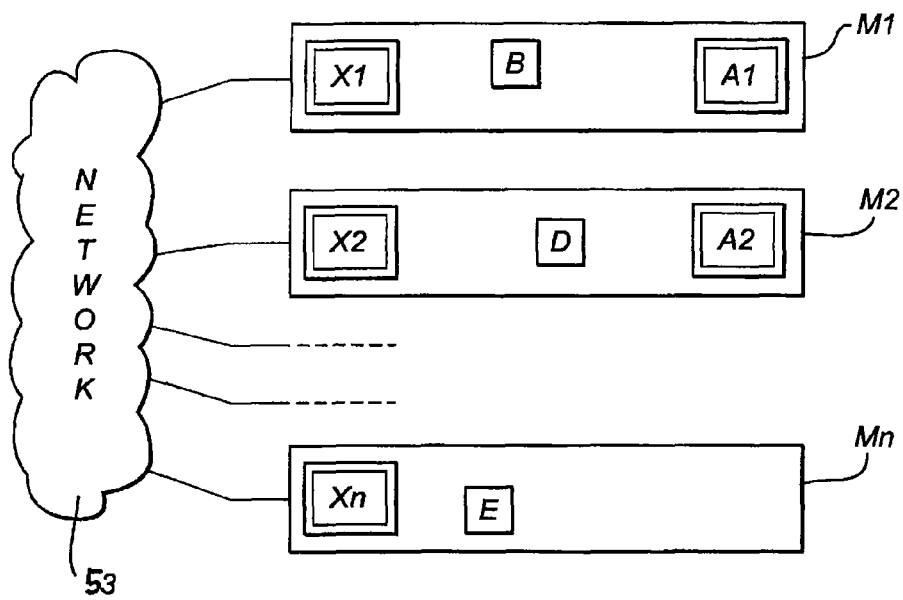
FIG. 86 illustrates a further memory change.
FIG. 87 and FIG. 88 respectively illustrate the single and multiple reachability tables corresponding to the memory changes of FIG. 86.
Figures 88, 89:
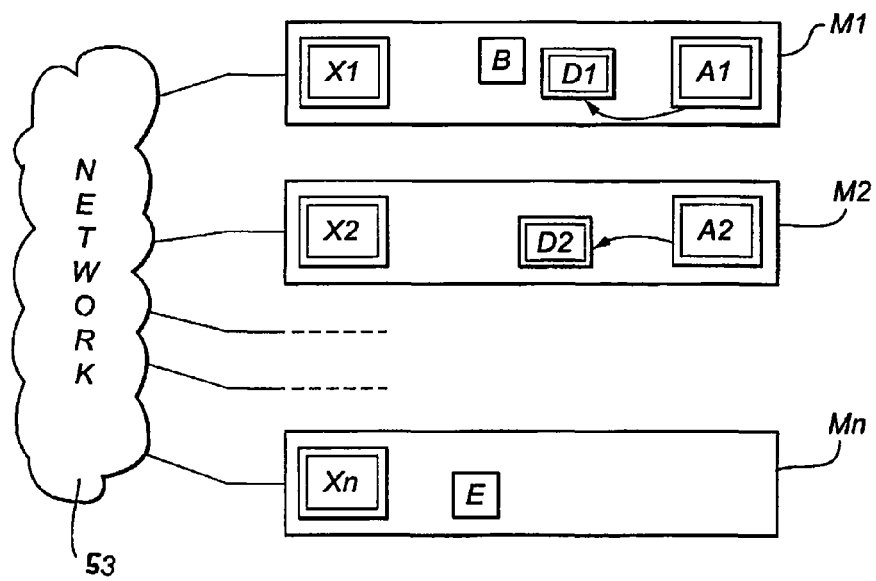
FIG. 89 illustrates another memory change.

A further example is illustrated in FIG. 86. Here an object designated A1 and A2 is shared on machines M1 and M2 but is not present on machine Mn. This is indicated in the table entries for object A in FIG. 87 and FIG. 88 which respectively show the single reachability table utilised by the server machine X or the multiple reachability tables utilised by the individual machines. As illustrated in FIG. 89, machine M2 during processing of the applications program assigns a reference of object D to object A. As a consequence, the DRT 71/2 examines the table entries for objects D and A on machine M2. This interrogation of the table determines that the table entry for object D does not include all machines in the set of machines listed in the table entry for object A. Therefore, the table entry for object D on machine M2 is updated to include the machines of the table entry for object A not already present in the table entry for object D, which in this instance is the additional machine M1. In accordance with this operation, machine M2 instructs machine M1 to create a table entry for object D consisting of the machines listed in the now updated table entry for object D on machine M2, and create a local replica of object D. The resultant changes for a single reachability table, and for multiple reachability tables, are illustrated in FIG. 90 and FIG. 91 respectively.

Figures 92, 93:
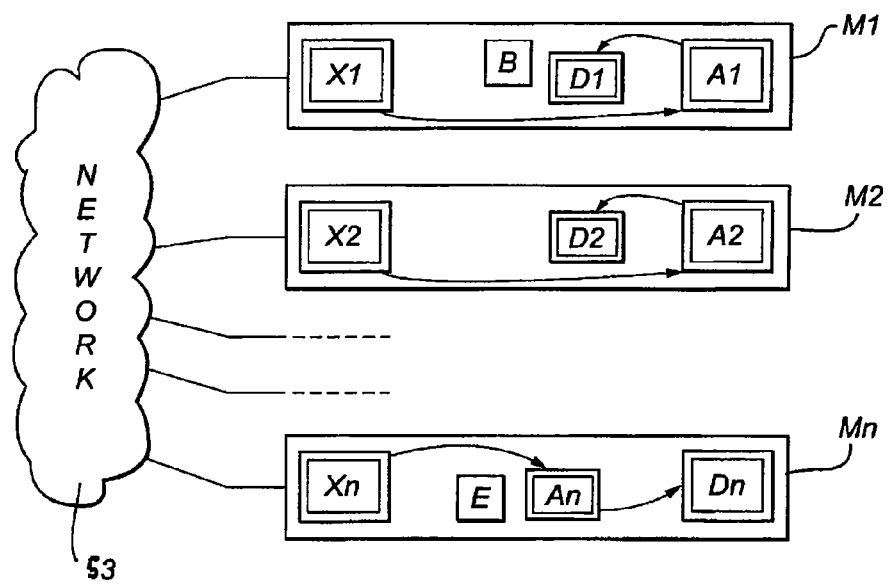
FIG. 92 illustrates a still further memory change.
FIG. 93 and FIG. 94 respectively illustrate the single and multiple reachability tables corresponding to the memory changes of FIG. 92.

A further example is illustrated in FIG. 92 in which the addition of a reference to object A assigned to class X is executed by machine M1. As a consequence, the tables for class X and object A are consulted to determine if object A is changing its reachability state. If the table entries for object A include all machines in the table entry for class X, then no additional action is taken. If, however, as is the case in FIG. 92 class X includes machines in its table entry not included in the table entry for object A, then a reachability change is taking place. In accordance with this change, machine M1 updates the entry for class X. Furthermore, machine M1 instructs all other machines to add and/or update their table entry for object A to be the same as the now updated table entry for object A on machine M1. In accordance with this operation, any machine which was not already present in the table entry for object A is instructed to add that table entry for object A and create a replica in local memory of object A (which in this instance it is only required in machine Mn). However, machine M1 also knows that object A in turn references object D, and so object D has to inherit the reachability change of object A. Consequently, the table entry for object D is updated to include all machines listed in the now updated table entry of object A.

In addition to the above, machine M1 also instructs all machines not previously included in the table entry of object D (which in this instance is only machine Mn), to add a table entry for object D with a value equal to the now updated table entry value on machine M1, and create a replica in local memory of object D. Furthermore, machine M1 instructs all other machines (which in this instance is only machine M2) to update the table entry for object D with the new table entry value updated on machine M1. The single reachability table and multiple reachability tables which reflect these changes are illustrated in FIG. 93 and FIG. 23 FIG. 94 respectively.

Figures 94, 95:
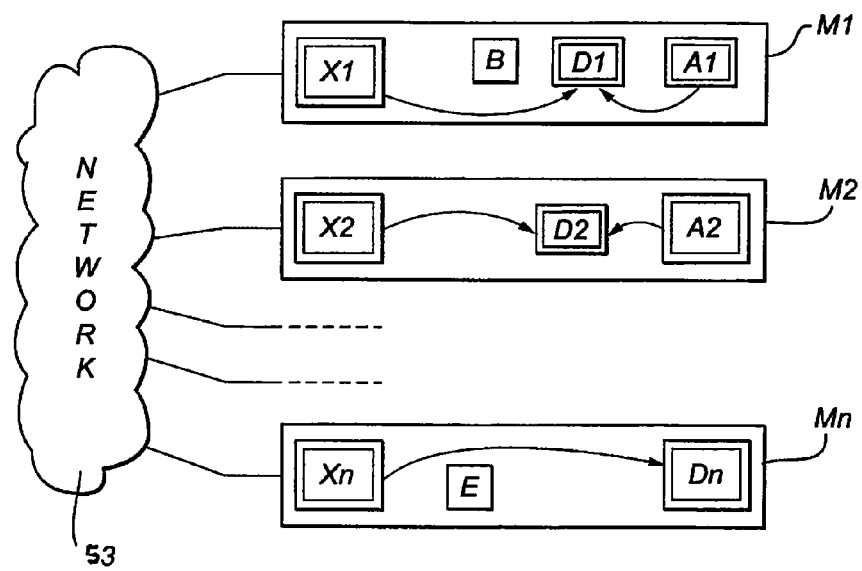
FIG. 95 illustrates yet another memory change.

Turning now to FIG. 95, the position illustrated in FIG. 89 is modified by class X of machine M1 being assigned a reference to object D. In association with this event, the reachability tables of object D and class X are examined by the DRT 71/1 for the possibility of a reachability change having occurred. Consequently, the table entries for object D and class X are compared and if the table entry for object D includes all machines listed in the table entry of class X, then no additional action is required to be taken. Alternatively, if the table entry for object D does not include all machines listed in the table entry for class X then a reachability change has taken place and consequential action is required.

As indicated in FIG. 95, machine M1 determines that object D has undergone a reachability change. Consequently, machine M1 firstly updates its table entry for object D to include all machines in the table entry for class X. For each new machine not previously in the set of machines of the table entry for object D, machine M1 instructs each such machine to add a local table entry for object D equal to the now updated machine entry for object D on machine M1, and create a replica in local memory of object D. For each other machine, machine M1 also instructs the other machine to update its table entry for object D to be equal to the table entry for object D in machine M1. The single reachability table and multiple reachability tables which reflect these changes are respectively illustrated in FIG. 96 and FIG. 97.

The foregoing describes only some embodiments of the present invention and modifications, obvious to those skilled in the art, can be made thereto without departing from the scope of the present invention. For example, the tables of FIG. 75, FIG. 77, FIG. 79 and FIG. 81 all show a row corresponding to each memory location. In practice, for those memory locations such as D and E which are only accessible by their local machine, it is not necessary to have a row in the table at all. Instead, such a row is only created if the memory location becomes accessible by one or more other machines. Similarly, reference to JAVA includes both the JAVA language and also JAVA platform and architecture.

XII. Exemplary Embodiment of Multiple Computer System with Enhanced Memory Clean Up Co-pending U.S. Patent Application Ser. No. 60/730,408 filed Oct. 25, 2005 describes aspects of a multiple computer system with enhanced memory clean up which may be used in conjunction with the present invention.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems.

The abovementioned related and incorporated by reference specifications disclose that clean up of all corresponding memory locations is delayed until all computers have ceased to access a specific memory location. Once the last computer no longer requires access to the specific local memory location, then that local memory location can be cleaned-up (or reclaimed) and so too can all corresponding memory locations on all other machines.

The genesis of the present invention is a desire to accelerate clean up or reclamation of local memory locations in the multiple computer system thereby permitting such memory locations to be sooner re-allocated to future tasks.

Figures 98, 99:
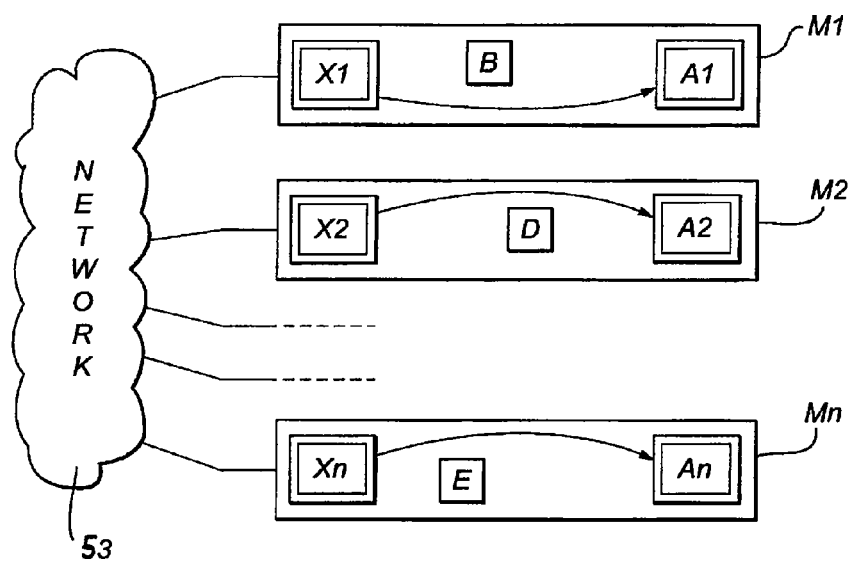
FIG. 98 illustrates a memory change and FIG. 99 is a single reachability table showing the various memory locations of FIG. 98 and their ability to be reached.

Turning now to FIG. 98, each of the multiple machines M1, M2, . . . , Mn (other than any server machine X if present) has its memory locations schematically illustrated. For machine M1 there is a class X1 and objects A1 and B. For machine M2 there is a class X2 (which is the same as class X1 in machine M1), and objects A2 and D. Object A2 in machine M2 is the same as object A1 in machine M1. For machine Mn there is a class Xn and objects An and E. Class Xn and object An are the same as classes X1 and X2 and objects A1 and A2 respectively. Since each of the machines M1, M2 and Mn is able to both read from, and write to, memory locations X and A, the boundary of each of these memory locations is indicated with a double line.

Preferably, it is convenient for the server machine X of 5027J_FIG. 2, to maintain a table listing each memory location and the machines which are able to access each memory location in the table. Such a table is said to be a reachability table and is illustrated in FIG. 99. The first row in the table of FIG. 99 deals with memory location A which is able to be accessed by machines M1, M2 and Mn. The second row in the table of FIG. 99 deals with memory location B which is only able to be accessed by machine M1. Similarly, object D is only able to be accessed by machine M2 and object E is only able to be accessed by machine Mn. However, the class X is able to be accessed by all of the machines M1, M2 and Mn.

A single reachability table can be provided which is located in, and maintained by, the server machine X. However, it is also possible for the computer system to be operated without a server machine X in which case it is desirable for each machine to operate its own reachability table. FIG. 100 illustrates individual reachability tables for the individual machines in the circumstances corresponding to FIG. 99.

In the multi-machine environment described above, in the event that the content of class X or object A is changed by being written to by one of the machines, then it is necessary to transmit that change via the network 53 to all the other machines. However, as the objects B, D and E are each only able to be accessed by a single machine, there is little point in either creating or updating the contents of these memory locations since they are only able to be accessed by their local machine.

As the class X needs to refer to the object A, then class X is said to point to object A. This is indicated in FIG. 98 by an arrow pointing from classes X1, X2 and Xn to objects A1, A2 and An respectively.

Figures 101, 102:
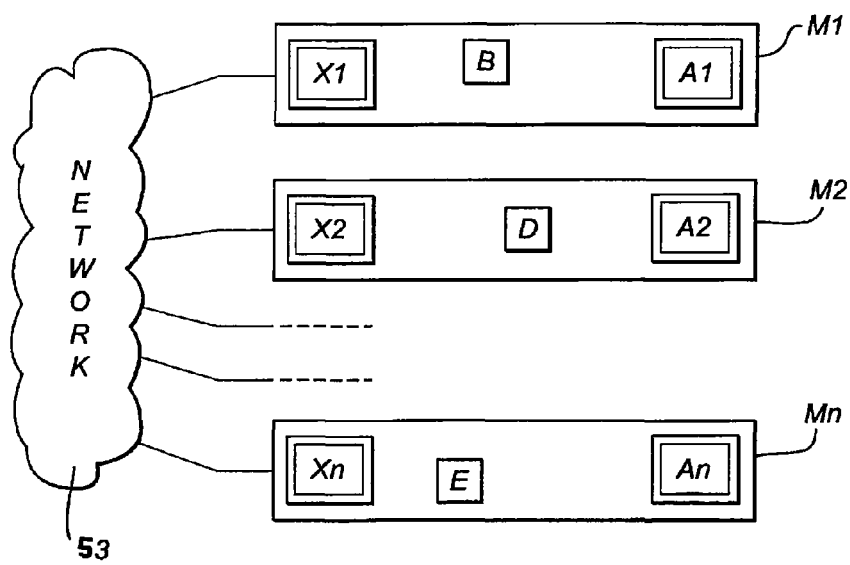
FIG. 101 is a map similar to FIG. 98 and showing memory location X no longer pointing to memory location A.
FIG. 102 is the single reachability table corresponding to FIG. 101.

Turning now to FIG. 101, in the execution of the application program 50, an assignment operation is executed by machine Mn in which the reference from class Xn to object An is overwritten with an empty or "null" reference. In this way, class Xn no longer points to object An. Corresponding to this operation, classes X1 and X2 on machines M1 and M2 are updated to no longer reference objects A1 and A2 respectively. This change is carried out by the server machine X in the case where it is present, or by the DRT 71/n of machine Mn in the case where server machine X is not present.

The situation after the changes illustrated in FIG. 101 is shown in the tables of FIG. 102 and FIG. 103 respectively. However, as the three objects A1, A2 and An continue to exist, and continue to be accessible by the machines M1, M2 and Mn, there is no actual change. Thus the tables of 5027J_FIG. 7 and FIG. 103 are the same as the tables of FIG. 99 and FIG. 100. Thus although class X no longer points to object A, any change to, say object A2, must be communicated to machines M1 and Mn to update objects A1 and An.

Figures 104, 105:
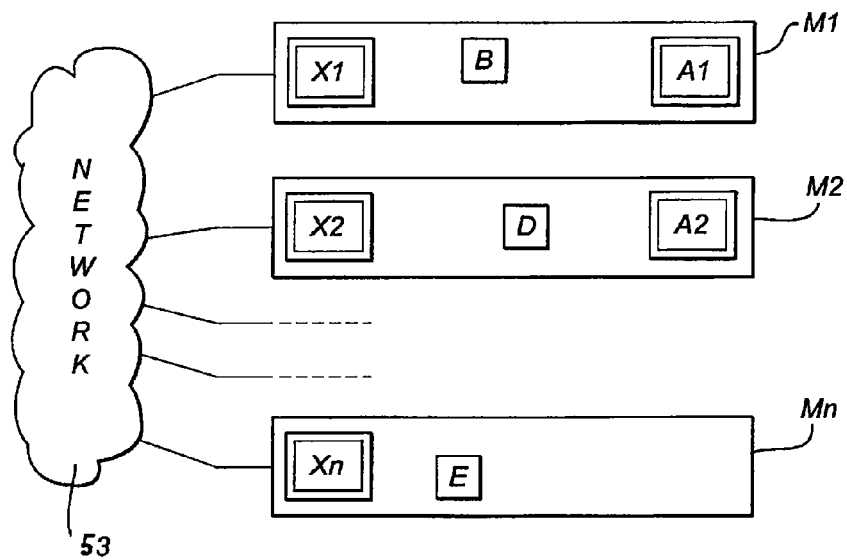

FIG. 104 illustrates the position after the operating system of machine Mn, or the DRT 71/n, determines that object An is no longer needed on machine Mn. At this point machine Mn is free to reclaim the memory presently occupied by the local copy (An) of the object A. Such a system of memory reclamation is inherent in a computer and necessary to ensure that the local memory does not become cluttered with unused material. In addition, such a system operates in the background and thus programmers can rely upon unused objects, etc being cleaned up in due course. Therefore, no specific action needs to be taken by the programmer to delete or finalise unused objects.

When such a change takes place on machine Mn, the single reachability table of FIG. 105, or the reachability table for machine Mn in FIG. 106, is updated to indicate the object A is no longer accessible on machine Mn. Note that at this stage object A is still regarded as being shared because at least two machines, M1 and M2 in this example, are still able to access object A. Thus in FIG. 104 object A is still bounded by double lines. Thus any changes to A1 must be made to A2, and visa versa.

Figures 107, 108:
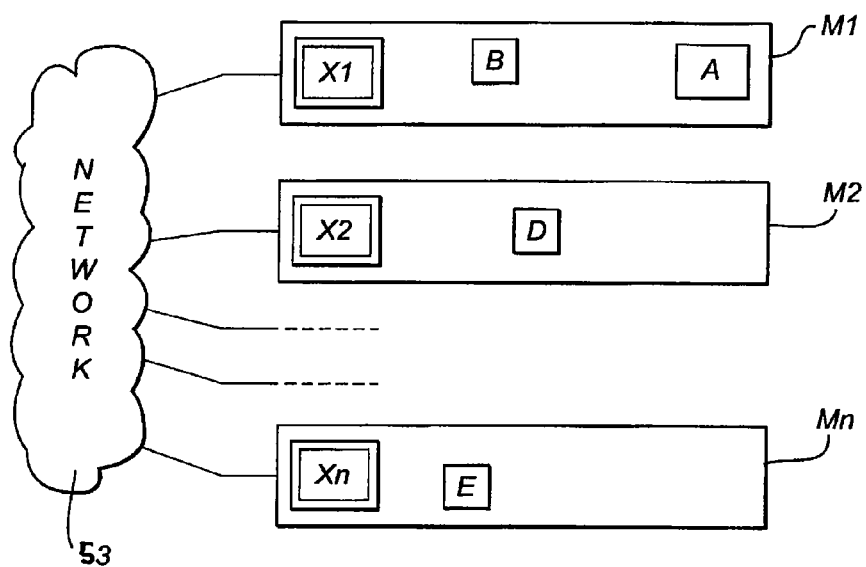

Turning now to FIG. 107, at this time, or at some later time, machine M2, say, determines that object A2 on machine M2 is no longer needed or utilised locally by machine M2. Thus the operating system of machine M2 or DRT 71/2 can execute an inherent procedure to reclaim the memory presently utilized by the local copy A2 of the global object A.

As a consequence, as illustrated in FIG. 108 and FIG. 109, the reachability table(s) is/are modified so that object A is no longer recorded as being accessible by machine M2. As a result, object A is indicated in FIG. 107 as being bounded only by a single line. That is, only machine M1 can access object A (and so it can be referred to in FIG. 107 merely as A rather than A1—since the A1 terminology would imply that the copy on machine M1 of an object is also present on at least one other machine).

As a consequence, the reference to object A in the reachability table(s) can be deleted entirely, if desired. More importantly, changes to object A need not be communicated to any other machine, and if machine M1 no longer needs to make reference to object A then it can be deleted from machine M1 to reclaim the memory space previously occupied by object A.

The abovementioned detailed description refers to memory locations, however, it is equally applicable to structures, assets or resources (which in JAVA are termed classes or objects). These will have already been allocated a (global) name or tag which can be used globally by all machines (since it is understood that the local memory structure of different machines may be different). Thus the local or actual name allocated to a specific memory location in one machine may well be different from the local name allocated to the corresponding memory location in another machine. This global name allocation preferably happens during a compilation process at loading when the classes or objects are originally initialized. This is most conveniently done via a table maintained by the server machine X. This table can also include the reachability data.

It will be apparent to those skilled in the art that the reachability data enables structures, assets or resources (i.e., memory locations) to be divided into two categories or classes. The first category consists of those locations which are able to be accessed by all machines. It is necessary that write actions carried out in respect of such memory locations be distributed to all machines so that all corresponding memory locations have the same content (except for delays due to transmission of updating data). However, in respect of the second category, since these memory locations are only accessible by the local machine, write actions to these memory locations need not be distributed to all the other machines, nor need there be corresponding memory locations on the other machines. As a consequence of this categorisation, unused memory locations can be quickly identified and reclaimed.

The foregoing describes only some embodiments of the present invention and modifications, obvious to those skilled in the art, can be made thereto without departing from the scope of the present invention. For example, the tables of FIG. 99 and FIG. 102 each show a row corresponding to each memory location. In practice, for those memory locations such as D and E which are only accessible by their local machine, it is not necessary to have a row in the table at all. Instead, such a row is only created if the memory location becomes accessible by one or more other machines.

The foregoing describes only some embodiments of the present invention and modifications, obvious to those skilled in the art, can be made thereto without departing from the scope of the present invention. For example, reference to JAVA includes both the JAVA language and also JAVA platform and architecture.

XIII. Exemplary Embodiments of a Failure Resistant Multiple Computer System and Method Co-pending U.S. Patent Application No. Ser. No. 60/730,512 filed Oct. 25,2005 describes aspects of a failure resistant multiple computer system and method which may be used in conjunction with the present invention.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems. The genesis of the present invention is a desire to at least partially overcome the abovementioned difficulty.

Figures 110, 111:
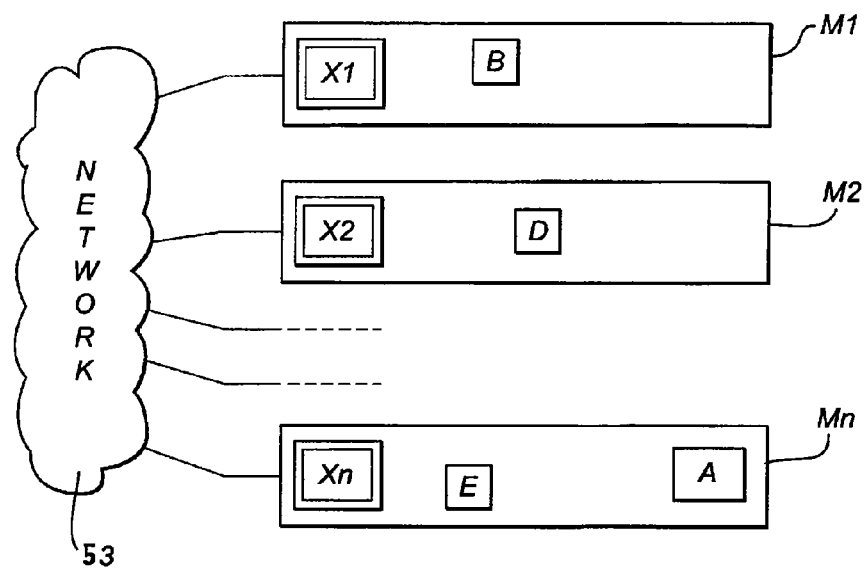
FIG. 110 is a schematic map of the memory locations in all the multiple machines showing memory locations including classes and objects.
FIG. 111 is a single reachability table showing the various memory locations of FIG. 110 and their ability to be reached.

Turning now to FIG. 110, each of the multiple machines M1, M2 . . . Mn (other than any server machine X if present) has its memory locations schematically illustrated. For machine M1 there is a class X1 and an object B. For machine M2 there is a class X2 which is the same as for machine M1, and an object D. For machine Mn there is the same class Xn and two objects A and E. The contents of the memory location X are the same for each of the machines and each machine is able to both read from, and write to, memory location X. For this reason, the boundary of memory location X is indicated with a double line.

Preferably, it is convenient for the server machine X of FIG. 73, to maintain a table listing each memory location and the machines which are able to access each memory location in the table. Such a table is said to be a reachability table and is illustrated in FIG. 111. The first row in the table of FIG. 111 deals with memory location A which is only able to be accessed by machine Mn. The second row in the table of FIG. 111 deals with memory location B which is only able to be accessed by machine M1. Similarly, object D is only able to be accessed by machine M2 and object E is only able to be accessed by machine Mn. However, the class X is able to be accessed by all of the machines M1, M2 and Mn.

The single reachability table of FIG. 111 is preferably located in, and maintained by, the server machine X. However, it is also possible for the computer system to be operated without a server machine X in which case it is desirable for each machine to operate its own reachability table. FIG. 112 illustrates individual reachability tables for the individual machines in the circumstances corresponding to FIG. 111.

Thus, in FIG. 112 the table for machine M1 has a row for class X and a row for object B. Similarly, the table for machine M2 has a row for class X and a row for object D. However, the table for machine Mn has three rows, one for class X, and one for each of objects A and E.

In the multi-machine environment described above, in the event that the content of class X is changed by being written to by one of the machines, then it is necessary to transmit that change in content via the network 53 to all the other machines. However, since the objects A, B, D and E are each are only able to be accessed by a single machine, there is little point in either creating or updating the contents of these memory locations since they are only able to be accessed by their local machine.

Figures 113, 114:
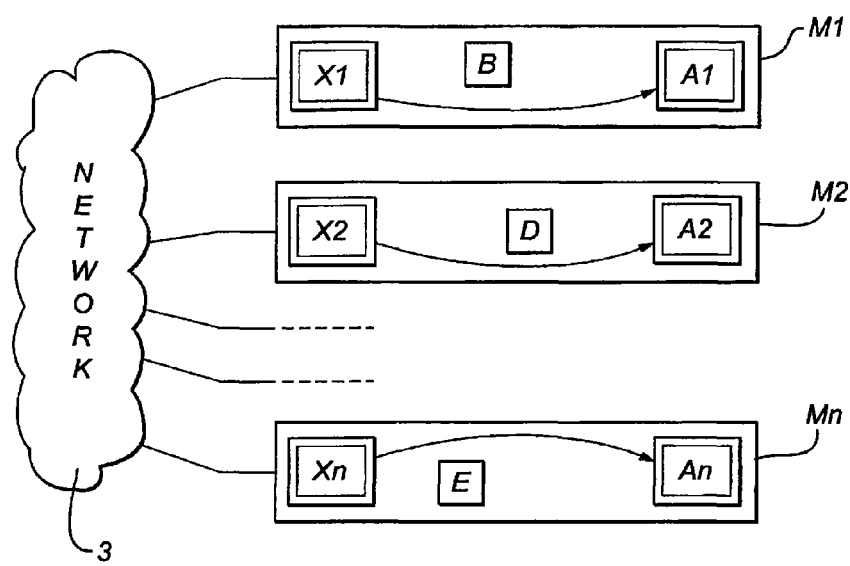
FIG. 113 is a map similar to FIG. 110 and showing memory location X pointing to memory location A.
FIG. 114 is the single reachability table corresponding to FIG. 113.

If now during the processing carried out by a particular machine, say machine Mn, the class Xn needs to refer to the object A, then class Xn is said to point to object A. This is indicated in FIG. 113 by an arrow pointing from class Xn to object A. The change in status of object A means that it is now able to be accessed or referenced by all the other machines. For this reason in FIG. 112 it is named object An, is bounded by double lines, and is reproduced in each of the other machines as object A1, A2, etc. Furthermore, an arrow points from each corresponding class X1, X2, etc. to the corresponding referred object A1, A2, etc. As a result of this change of status of object A, the first row of the reachability table of FIG. 111 is amended as illustrated in FIG. 114 so as to indicate that object A is now able to be reached by the machines M1, M2 and Mn. The server machine X of FIG. 73 uses the amended reachability table of FIG. 114 to ensure that the contents of object A, if amended by one machine, are transmitted via the network 53 to all the other machines.

Similarly, for the situation where multiple reachability tables are used, when the change illustrated by comparison of FIG. 110 and FIG. 113 takes place, since class Xn now refers to object An, and thus all the other classes X1, X2, etc must now refer to corresponding objects A1, A2, etc. so all machines must now include a row in their reachability table for object A. This is the situation illustrated in FIG. 115. The other machines are said to inherit the table entry for object A.

The abovementioned detailed description refers to memory locations, however, it is equally applicable to structures, assets or resources (which in JAVA are termed classes or objects). These will have already been allocated a (global) name or tag which can be used globally by all machines (since it is understood that the local memory structure of different machines may be different). Thus the local or actual name allocated to a specific memory location in one machine may well be different from the local name allocated to the corresponding memory location in another machine. This global name allocation preferably happens during a compilation process at loading when the classes or objects are originally initialized. This is most conveniently done via a table maintained by the server machine X. This table can also include the reachability data.

It will be apparent to those skilled in the art that the reachability data enables structures, assets or resources (i.e., memory locations) to be divided into two categories or classes. The first category consists of those locations which are able to be accessed by all machines. It is necessary that write actions carried out in respect of such memory locations be distributed to all machines so that all corresponding memory locations have the same content (except for delays due to transmission of updating data). However, in respect of the second category, since these memory locations are only accessible by the local machine, write actions to these memory locations need not be distributed to all the other machines, nor need there be corresponding memory locations on the other machines. As a consequence of this categorisation, a substantial volume of data is not required to be transmitted from one machine to the others and so the volume of traffic on the network 53 is substantially reduced.

Machine Mn can determine that object A requires replication across the other machines by consulting the table entry for class X on machine Mn. In the situation illustrated, machine Mn makes a positive determination for replication by comparing the table entries for object A and class X. If the table entry for object A includes all machines in the table entry for class X, then machine Mn can correctly determine that object A does not need to be replicated on any other machines and, additionally, no table entries need to be added to, or updated on, other machines. Alternatively, if the table entry of object A does not include the full set of machines in the table entry of class X then machine Mn updates the table entry for object A to include the set of machines listed in the table entry for class X, and additionally instructs all machines listed in the new table entry for object A to update their local tables for object A with the set of machines listed in the new table entry for object A on machine Mn. Finally, for the set of machines which were not already present in the table entry for object A on machine Mn prior to the inheritance of the set of machines of class X on machine Mn, machine Mn instructs those machines (i.e., machines M1 and M2) to add a local table entry for object A and create local replicas in memory of object A and associated references to class X.

In addition to reducing the volume of data required to be transmitted via the network 53, the abovementioned categorization and reachability table(s) also provide an advantage in the event of failure of one of the computers. This is that the entire system does not fail. Instead the system is able to recover.

To continue the above example, suppose that in the memory condition illustrated in FIG. 113, machine M2, say, fails (for example due to failure of its power supply, CPU, failure of its link to the network 53 or similar catastrophic failure). This failure is able to be detected by a conventional detector attached to each of the application program running machines and reporting to machine X, for example.

Such a detector is commercially available as a Simple Network Management Protocol (SNMP). This is essentially a small program which operates in the background and provides a specified output signal in the event that failure is detected.

Such a detector is able to sense failure in a number of ways, any one, or more, of which can be used simultaneously. For example, machine X can interrogate each of the other machines M1, . . . , Mn in turn requesting a reply. If no reply is forthcoming after a predetermined time, or after a small number of "reminders" are sent, also without reply, the non-responding machine is pronounced "dead".

Alternatively, or additionally, each of the machines M1, . . . Mn can at regular intervals, say every 30 seconds, send a predetermined message to machine X (or to all other machines in the absence of a server) to say that all is well. In the absence of such a message the machine can be presumed "dead" or can be interrogated (and if it then fails to respond) is pronounced "dead".

Further methods include looking for a turn on event in an uninterruptible power supply (UPS) used to power each machine which therefore indicates a failure of mains power. Similarly conventional switches such as those manufactured by CISCO of California, USA include a provision to check either the presence of power to the communications network 53, or whether the network cable is disconnected.

In some circumstances, for example for enhanced redundancy or for increased bandwidth, each individual machine can be "multi-peered" which means there are two or more links between the machine and the communications network 53. An SNMP product which provides two options in this circumstance—namely wait for both/all links to fail before signalling machine failure, or signal machine failure if any one link fails, is the 12 Port Gigabit Managed Switch GSM 7212 sold under the trade marks NETGEAR and PROSAFE.

Figure 116:
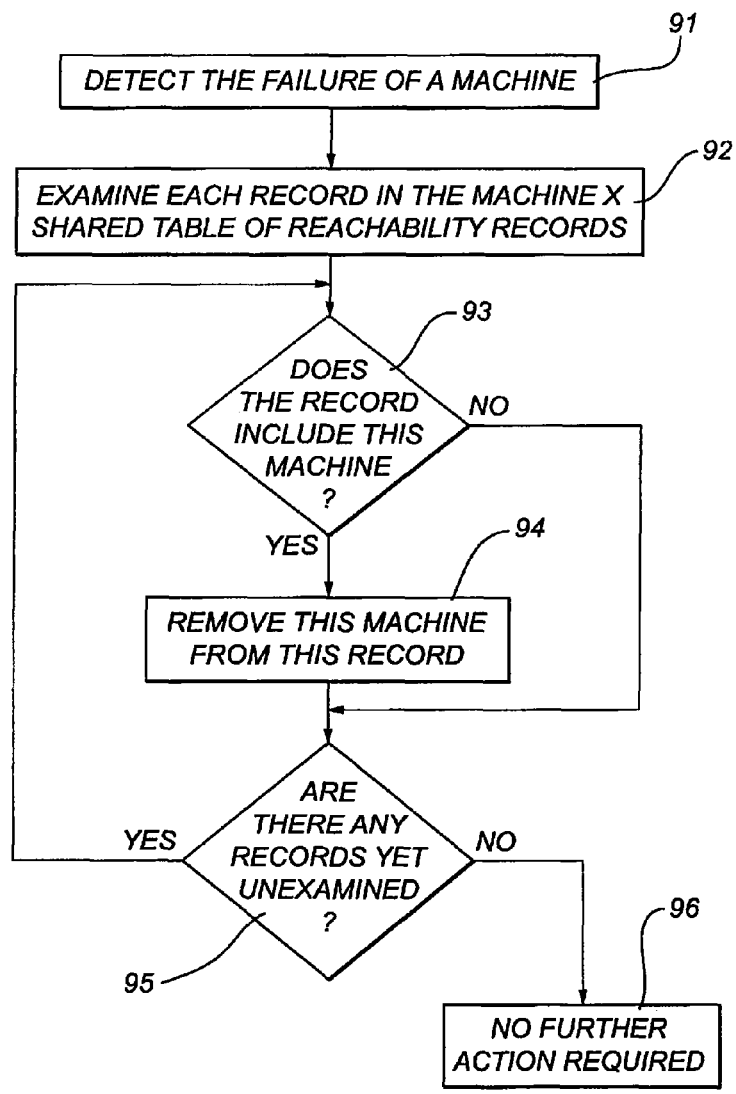
FIG. 116 is a flow chart showing one embodiment of the procedure to be undertaken in the event of failure of one of the n application running computers.

In the event that machine failure is detected, the procedures illustrated in FIG. 116 then come into operation. Step 91 in FIG. 116 is triggered by the detection of machine failure (for machine M2 in this example). As a consequence, machine X examines each record (or row) in its reachability table in turn as indicated at step 92. For each record the question of step 93 is asked to determine if the record in question refers to failed machine M2. If it does, at step 94 the reference to failed machine M2 is removed from the row, and then step 95 is commenced. If it does not, step 95 is commenced immediately.

As indicated in FIG. 116, at step 95 any remaining record or row in the table is then subjected to step 93 until eventually all records have been interrogated and thus no further action is required as indicated at step 96.

Figure 117:
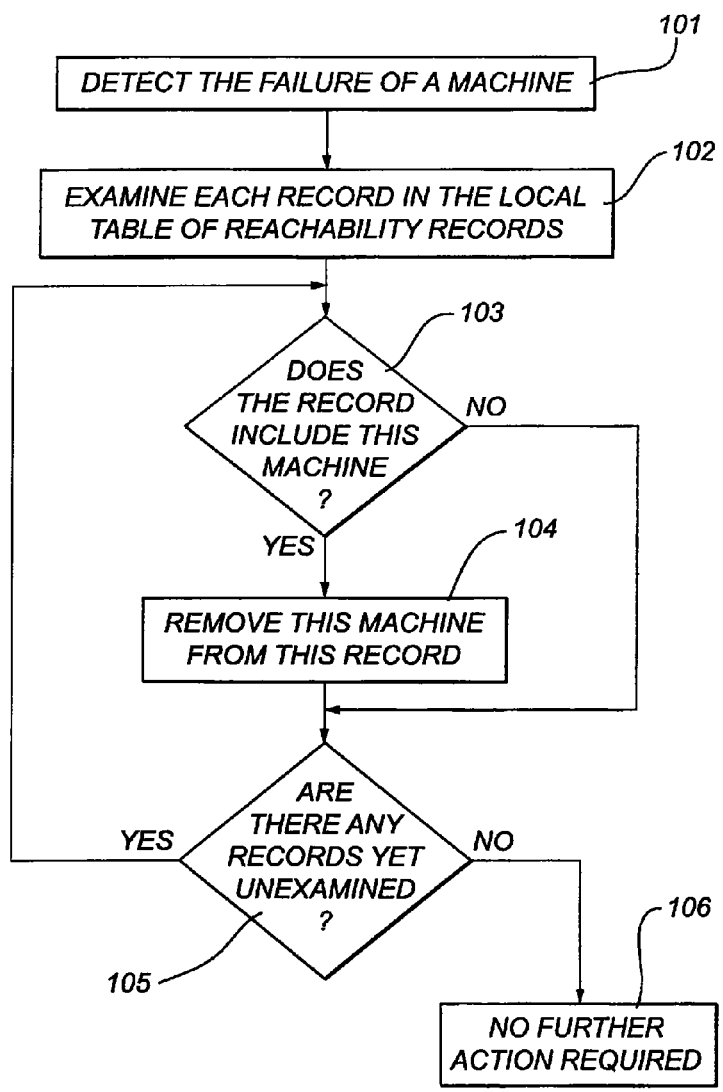
FIG. 117 is a flow chart of the procedures of a second embodiment.

Turning now to FIG. 117, in the event that there is no server machine X and instead there are a multiplicity of individual reachability tables, then each of the machines is able to detect failure of any one of the other machines (for example, by means of all machines providing a predetermined message at regular intervals). In addition, each of the continuing machines M1, M3 . . . Mn carries out steps 101-105 of FIG. 117 which are equivalent to steps 91-95 of FIG. 116, but in respect of its local reachability table. The result is that each of the local reachability tables makes no reference to machine M2 (i.e., has the column containing the "2's" empty—or removed).

Figures 118, 119:
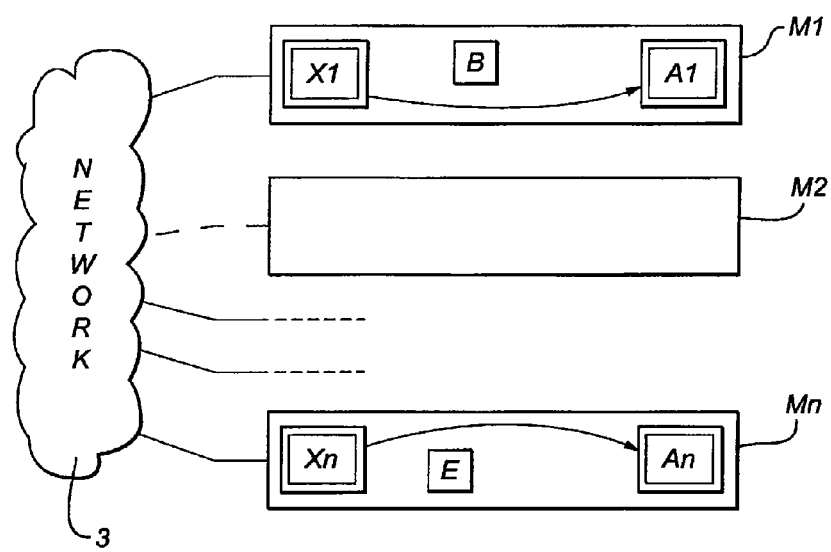
FIG. 118 is a map similar to FIG. 113 but illustrating the situation of a break in communications with machine M2.
FIG. 119 shows the single reachability table in the circumstance of FIG. 118.

FIG. 118 schematically illustrates the situation where machine M2 is dead. This might be due to a power failure or, as indicated in FIG. 118, due to a break in the link between machine M2 and the communications network 53. The changed reachability tables (single and multiple) are respectively illustrated in FIG. 119 and FIG. 120.

Thus the effect of the procedure of either FIG. 116 and FIG. 117 is to remove the column from the table of FIG. 114 which makes reference to machine 2. As a result, the in due course updating of corresponding memory locations X1, Xn and A1, An can take place without machine M2 being active.

Therefore any action which requires an acknowledgement from machine M2, such as a response to the question "Has a data packet been received without error?" and for which no response is possible because machine M2 has failed, does not delay the functioning of the other machines M1, M3, . . . Mn. As a consequence, those portions of the application program 5 which are executing on the continuing machines M1, M3, . . . Mn continue to execute without interruption.

It will also be apparent to those skilled in the art that the failure of machine M2 is not in any way special or restricted to the second machine. That is, it could have been any one of the machines which failed. Thus, if another machine should now fail, the same procedure is carried out. Therefore successive failure of each of a number of machines in turn can be tolerated, and without loss of memory since the contents of memory locations X2 and A2 are duplicated elsewhere whilst the content of memory location D will in due course be regenerated by the re-execution of the code previously executing on machine M2, being carried out by one of the continuing machines.

The foregoing describes only some embodiments of the present invention and modifications, obvious to those skilled in the art, can be made thereto without departing from the scope of the present invention. For example, the tables of FIG. 111 and FIG. 114 each show a row corresponding to each memory location. In practice, for those memory locations such as D and E which are only accessible by their local machine, it is not necessary to have a row in the table at all. Instead, such a row is only created if the memory location becomes accessible by one or more other machines. For example, reference to JAVA includes both the JAVA language and also JAVA platform and architecture.

Similarly, the above described arrangements envisage n computers each of which shares a fraction (1/n th) of the application program. Under such circumstances all n computers have the same local memory structure. However, it is possible to operate such a system in which a subset only of the computers has the same local memory structure. Under this scenario, the maximum number of members of the subset is to be regarded as in the in the description above.

XIV. Exemplary Embodiment of System and Method for Replication of Object Graphs

Co-pending U.S. Patent Application No. Ser. No. 60/730, 354 filed Oct. 25, 2005 describes aspects of a system and method for replication of object graphs which may be used in conjunction with the present invention.

Higher level languages including JAVA and MICROSOFT-.NET have two types of memory locations or fields. The first of these is a so called "primitive" field which contains alphanumeric data such as numbers or letters. This content is easily duplicated merely by being copied to another primitive filed.

The second type of field is a "non-primitive" field generally termed a reference field which essentially contains "a pointer" to another memory location or another object. The programming language uses one or more pointers to re-direct the operation of the computer to the referenced address. If the pointers were slavishly copied then they would point to identical memory locations in the other machines but these locations may, or may not, have the same memory contents.

The genesis of the present invention is a desire to facilitate the replication of non-primitive fields in the multiple computer system thereby permitting the desired goal of substantially identical memory structure and content to be approached as closely as possible.

Figure 121:
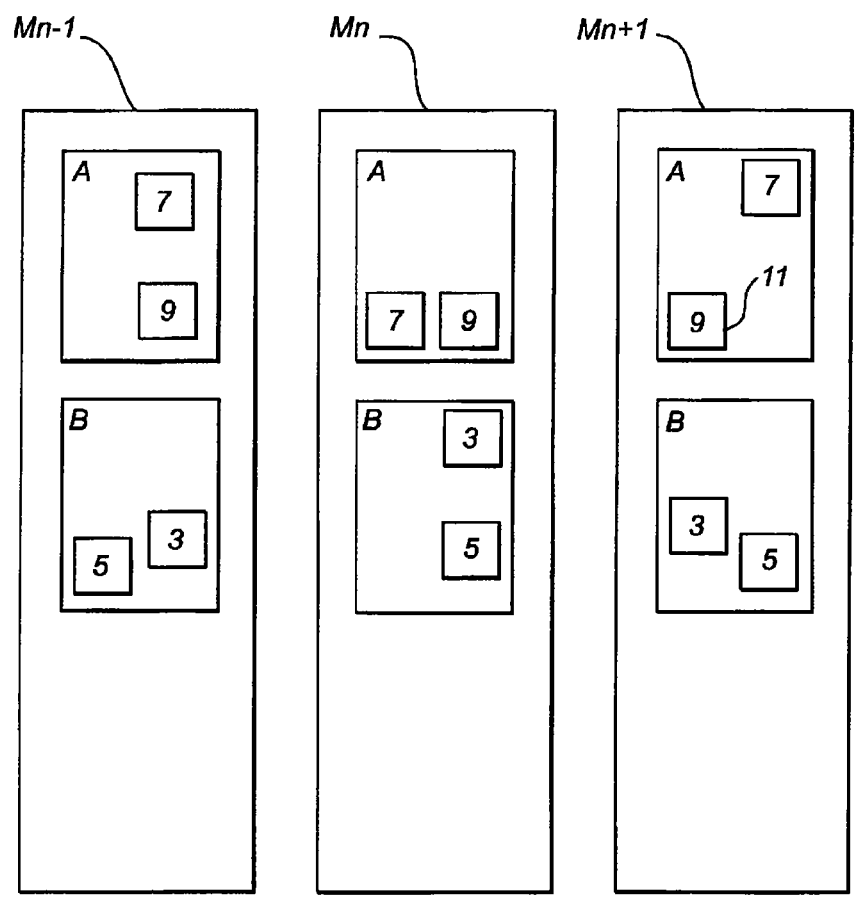
FIG. 121 is a schematic map of the memory locations in the multiple machines showing memory locations including objects and fields.

Turning now to FIG. 121, this drawing illustrates the memory map for any three machines Mn−1, Mn and Mn+1 of the multiple machines making up the computer system. The initialisation process described in the above incorporated patent specification has been carried prior to the commencement of operation of the application program and thus the memory contents of each of the machines is essentially identical. In the particular example illustrated, each machine has two objects A and B and each object has two primitive fields 11 which are capable of storing alphanumeric data. In the particular example given, the two fields of object A contain the numerals 7 and 9 whilst the two fields of object B contain the numerals 3 and 5.

After being initialised as described above, each of the individual computers executes different portions of the application program 5. It is to be expected that each machine will generate only revised data to be stored in both primitive and non-primitive fields. Where such fields are primitive fields which contain only alphanumeric data, these fields are able to be easily copied and thereby replicated on each of the other machines. However, as indicated in FIG. 122, the situation can arise where, say, machine Mn has a reference field 10 which because it is different from the primitive fields 11 is indicated with a double line border.

Inside object A in machine Mn are fields 10, 11 and 12 which have corresponding fields 30, 31 and 32 in object A in machine Mn−1, and corresponding fields 20, 21 and 22 in object A in machine Mn+1.

In this particular example, the new reference field 10 contains a reference to an additional object H which itself includes two primitive fields 11. In FIG. 122, within the reference field 10 are indicated both the name H of the object being referenced and also an arrow to indicate that the contents of the reference field 10 re-directs the program to move from object A to object H. The problem therefore arises as to how to replicate the memory changes which have occurred in machine Mn in all the other machines so as to enable the computer system to maintain a substantially coherent memory.

Figure 122:
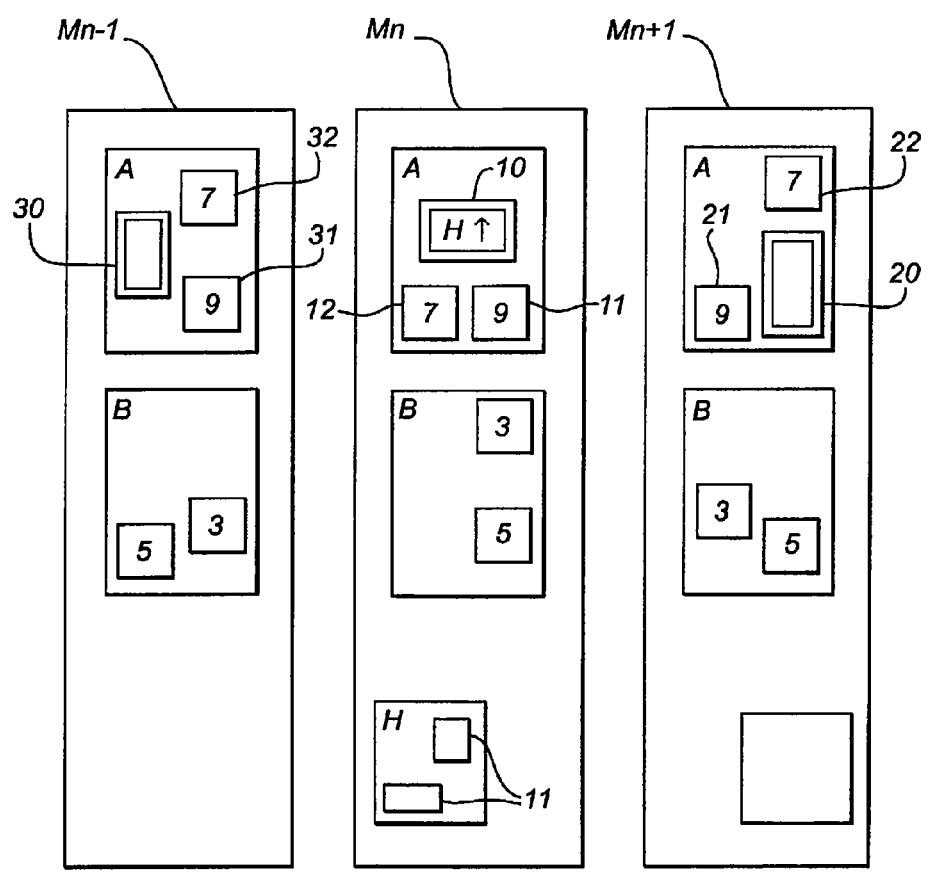
FIG. 122 is a memory map similar to FIG. 121 but showing the creation of a reference field which makes reference to a new object.

As indicated in FIG. 122, in relation to machine Mn−1, it would be possible to have a reference field 30 within the object A, however, this is insufficient since the object H to which the reference field 10 of machine Mn refers, is not present in machine Mn−1. Alternatively, as indicated for machine Mn+1, it would be possible to have both a reference field 20 within the object A and also create a new object within the machine, however, the machine organisations are different in general and thus the pointer (or address) of the new object created in machine Mn+1 is not the same as the pointer (or address) of the object H created in machine Mn.

Figure 123:
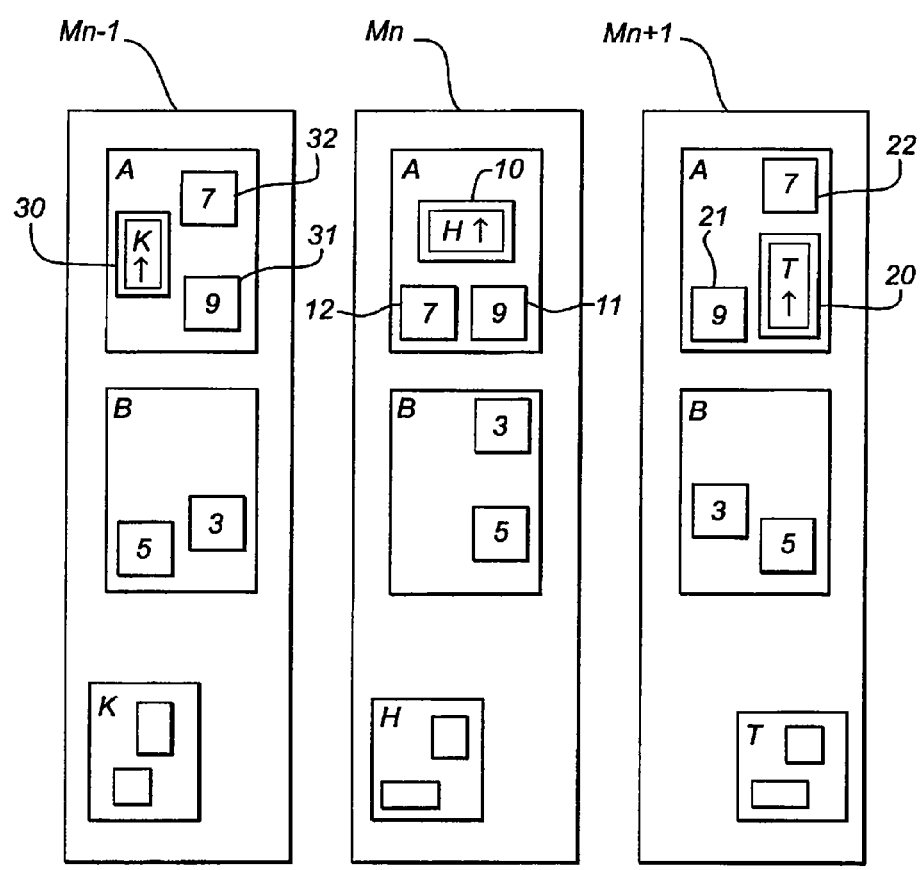
FIG. 123 is a memory map showing the successful replication of the newly created reference field.

The desired final result is illustrated in FIG. 123. Here the machine Mn which had the reference field 10 and the additional object H are as before. However, for the machine Mn+1 the object A is provided with a reference field 20 the contents of which refer to a new object T which has been created in the local memory of machine Mn+1 and which corresponds to the object H of machine N. Similarly, machine Mn−1 has for object A a reference field 30 which corresponds to field 10 and the contents of which refer to a new object K which has been created within the local memory of machine Mn−1 and which corresponds the object H of machine Mn.

The desired outcome illustrated in FIG. 123 is created using a concordance table such as that illustrated in FIG. 124. Such a concordance table is preferably and conveniently stored within the server machine X and is therefore accessible by all other machines. In the concordance table of FIG. 124 the creation of the referenced object H (which for the purposes of this example may conveniently be assumed to relate to an aspect of the application program 50 regarding a human head, is allocated a global name C (conveniently standing for cranium meaning head in Latin)), it being understood that the local pointer (or address) of H will in general be different from the global name C.

For each of the other machines in the multiple computer system, it is necessary to create a local pointer (or address) for the new object which is then entered into the concordance table of FIG. 124 corresponding to the global name C. For the machine Mn−1, the local address of the new object is conveniently referred to as K (standing for Kopf meaning head in German) whilst for machine Mn+1, the local address is conveniently T (standing for tête, meaning head in French).

Because the objects H, T and K are all linked via the concordance table of FIG. 124, the contents of the individual primitive fields in object H can be easily copied across to the corresponding primitive fields in the objects K and T respectively.

Figure 125:
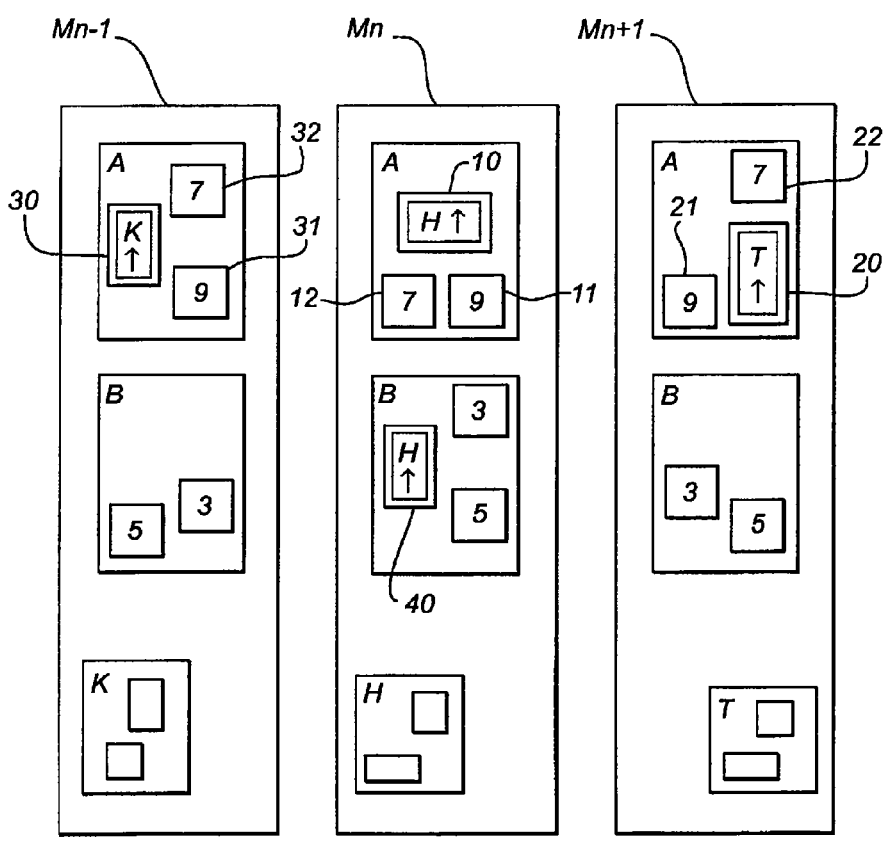
FIG. 125 is a memory map showing the creation of a still further reference field.

Turning now to FIG. 125, a slightly different occurrence is indicated. Here the processing of the application program 50 being carried out by machine Mn generates within object B a new reference field 46 which refers to the existing object H. It is therefore necessary to create a local copy of the reference field 46 in the corresponding objects B contained in machines Mn−1 and Mn+1.

Figure 126:
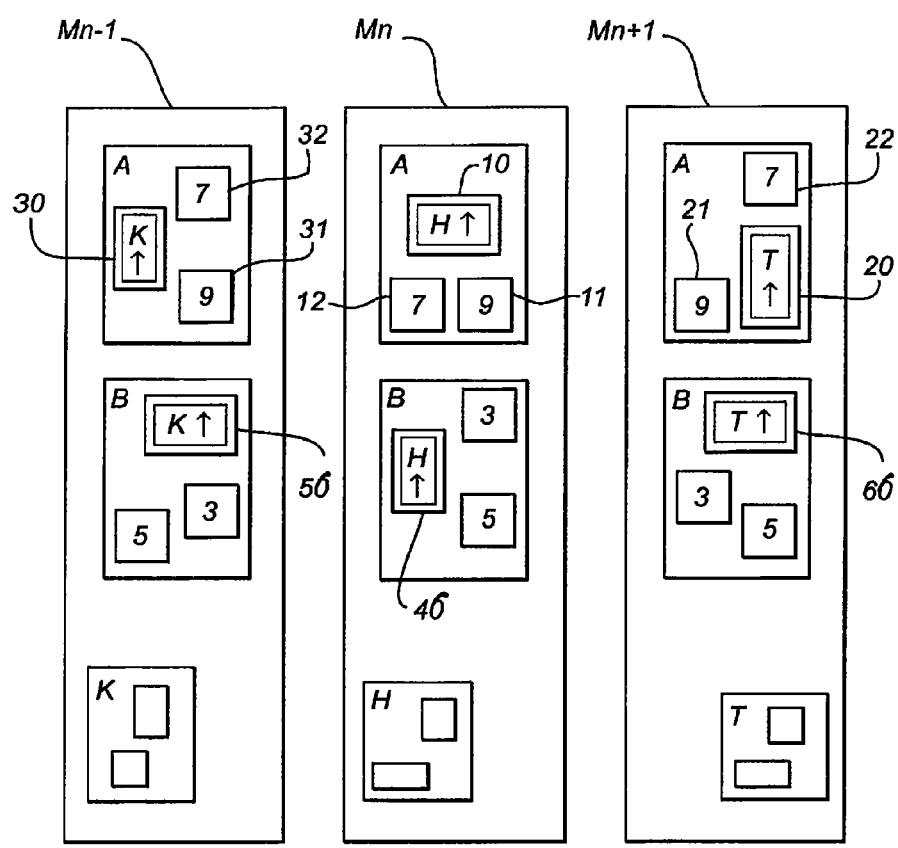
FIG. 126 is a memory map showing the successful replication of the further reference field.

The end result is as illustrated in FIG. 126 where the new reference fields 56 and 66 have been created in machines Mn−1 and Mn+1 respectively. Furthermore, the content of each of these new reference fields is a reference to the objects, K and T respectively, which correspond to the object H of the machine Mn. This creation is possible by consulting the concordance table of FIG. 124 so that machine Mn+1, for example, knows that the object in its local memory corresponding to object H of machine Mn is the object T.

Figure 127:
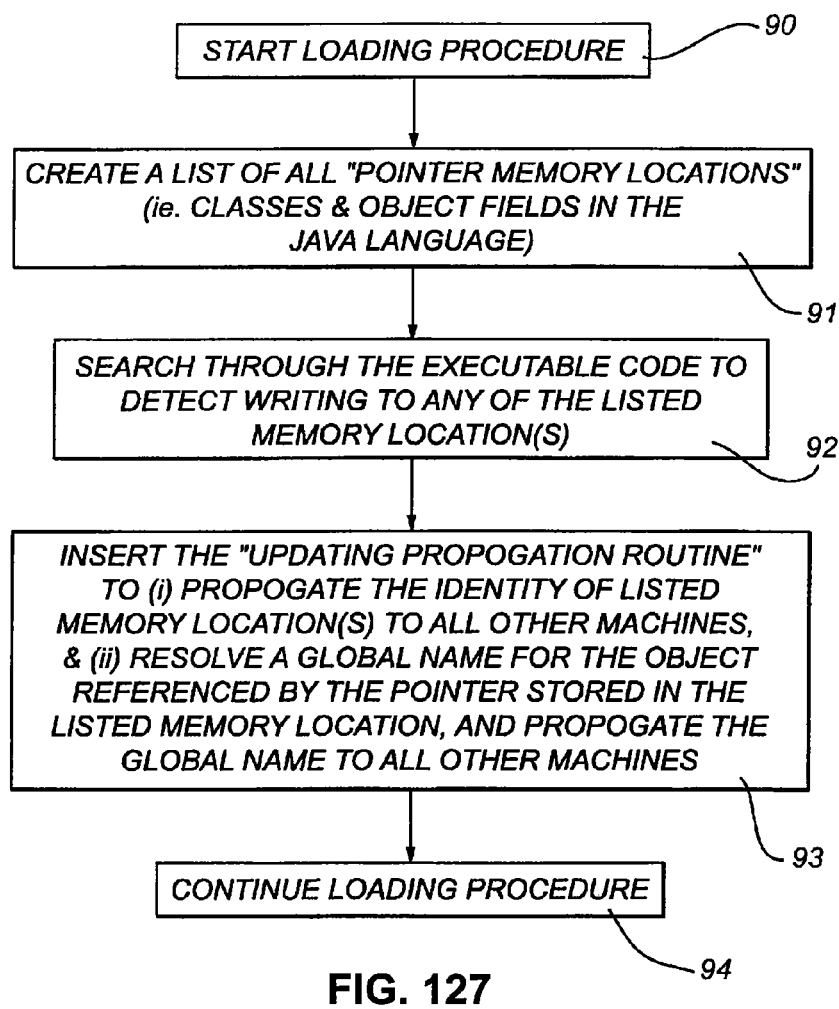
FIG. 127 is a flow chart of the procedure followed during loading of the same application on each machine in the network.

Turning now to FIG. 127, during the initial loading procedure, the program 50 being loaded to create each JAVA virtual machine 72 is modified. This modification commences at step 90 in FIG. 127 and involves the initial substantive step 91 of detecting all memory locations (termed fields in JAVA—but equivalent terms are used in other languages) in the application 50 being loaded. Such memory locations need to be identified for subsequent processing at steps 92 and 93. The DRT 71 during the loading procedure creates a list of all the memory locations thus identified, the JAVA fields being listed by object and class. Both volatile and synchronous fields are listed.

The next phase (designated step 92 in FIG. 127) of the modification procedure is to search through the executable application code in order to locate every processing activity that manipulates or changes field values corresponding to the list generated at step 91 and thus writes to fields so the value at the corresponding memory location is changed. When such an operation (typically putstatic or putfield in the JAVA language) is detected which changes the field value, then an "updating propagation routine" is inserted by step 93 at this place in the program to ensure that all other machines are notified that the content of the field has changed. Thereafter, the loading procedure continues in a normal way as described in the abovementioned incorporated specifications and as indicated by step 94 in FIG. 127.

Figure 128:
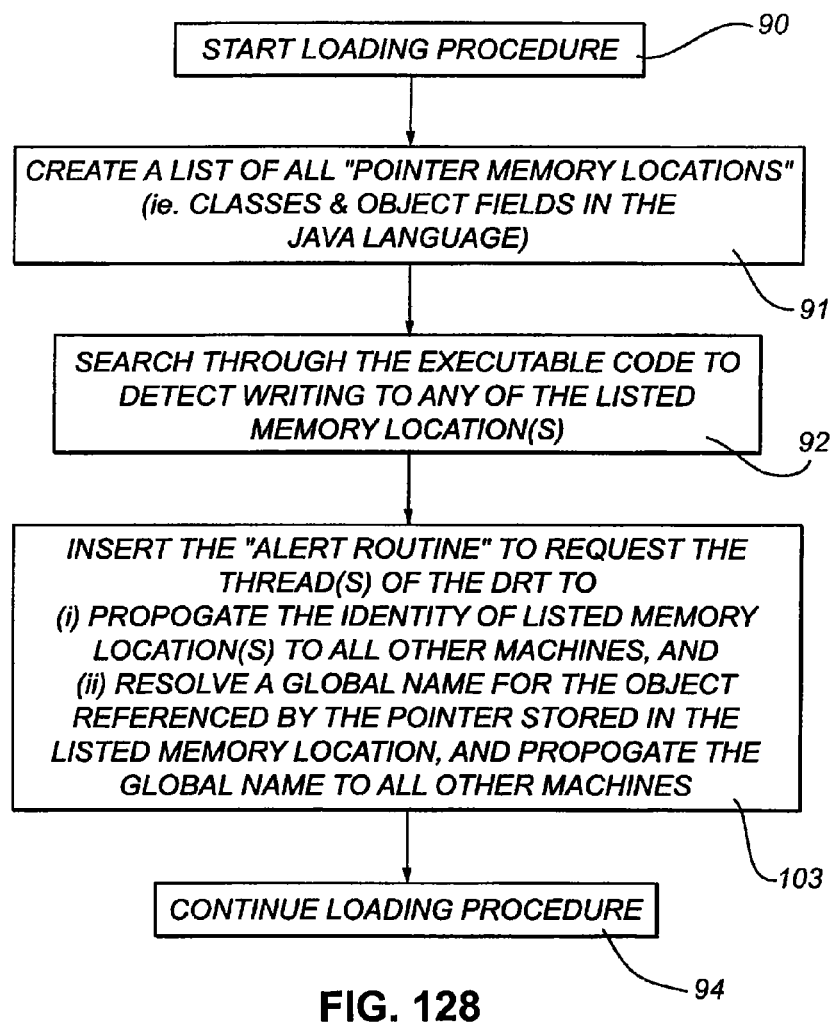
FIG. 128 is a flow chart showing a modified procedure similar to that of FIG. 127.

An alternative form of initial modification during loading is illustrated in FIG. 128. Here the start and listing steps 90 and 91 and the searching step 92 are the same as in FIG. 127. However, rather than insert the "updating propagation routine" as in step 93 in which the processing thread carries out the updating, instead an "alert routine" is inserted at step 103. The "alert routine" instructs a thread or threads not used in processing and allocated to the DRT, to carry out the necessary propagation. This step 103 is a quicker alternative to step 93 of FIG. 127 and one which results in lower overhead.

Figure 129:
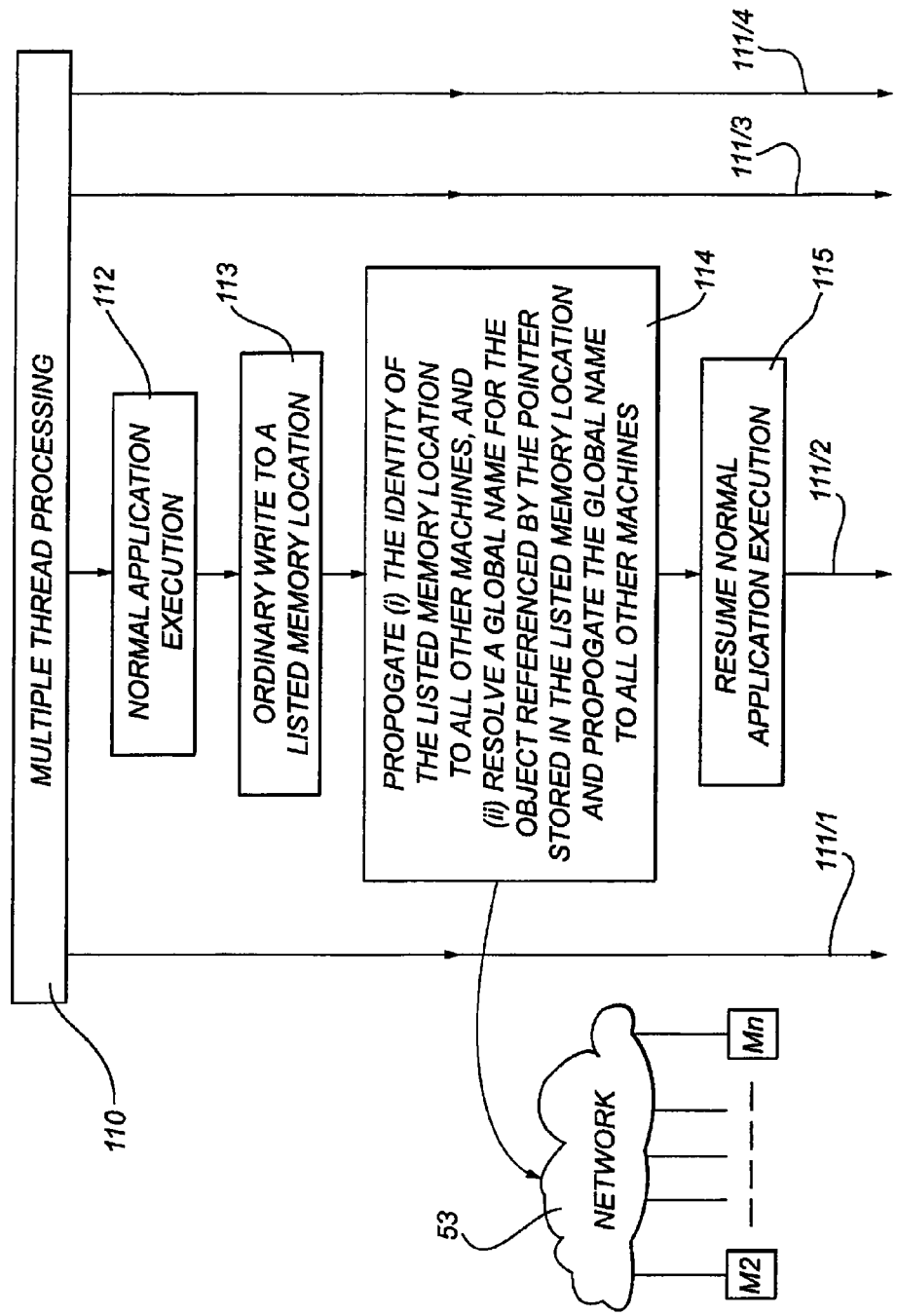
FIG. 129 is a schematic representation of multiple thread processing carried out on the machines of FIG. 126 utilizing a first embodiment of memory updating.
Figure 130:
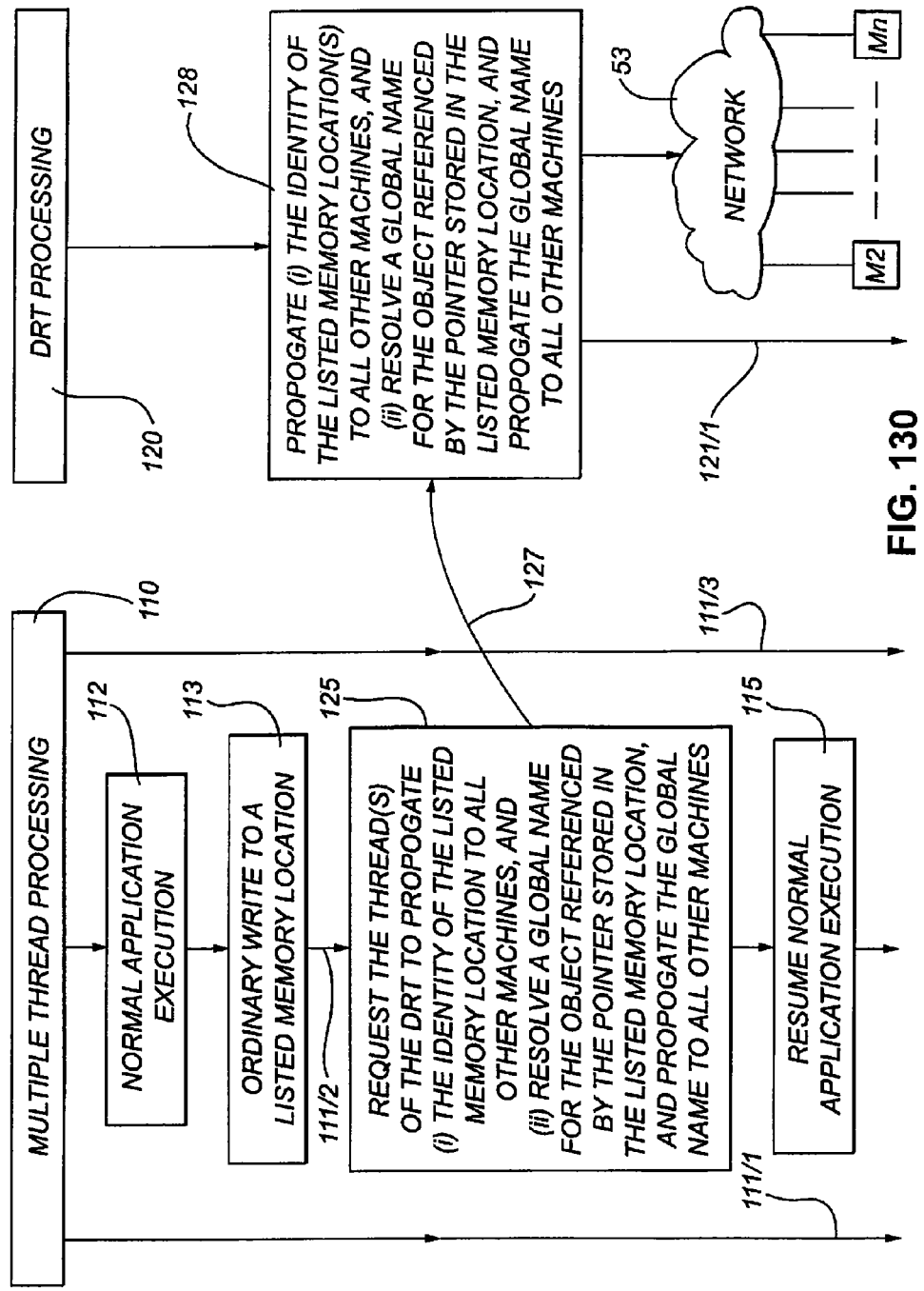
FIG. 130 is a schematic representation similar to FIG. 129 but illustrating an alternative embodiment.

Once this initial modification during the loading procedure as described in FIG. 127 or 10 has taken place, then either one of the multiple thread processing operations illustrated in FIG. 129 and FIG. 130 takes place. As seen in the embodiment of FIG. 129, multiple thread processing 110 on machine M1 consisting of threads 111/1 ... 111/4 is occurring and the processing of the second thread 111/2 (in this example) results in that thread 111/2 becoming aware at step 113 of a change of field value. At this stage the normal processing of that thread 111/2 is halted at step 114, and the same thread 111/2 notifies all other machines M2 ... Mn via the network 53 of the identity of the changed field and the changed content which occurred at step 113. At the end of that communication procedure, the thread 111/2 then resumes the processing at step 115 until the next instance where there is a change of field content.

In the alternative arrangement illustrated in FIG. 130, once a thread 111/2 on machine M1 has become aware of a change of field value at step 113, it instructs DRT processing 120 (as indicated by step 125 and arrow 127) that another thread(s) 121/1 allocated to the DRT processing 120 is to propagate in accordance with step 128 via the network 53 to all other machines M2 ... Mn the identity of the changed field and the changed content detected at step 113. This is an operation which can be carried out quickly and thus the processing of the initial thread 111/2 is only interrupted momentarily as indicated in step 125 before the thread 111/2 resumes processing in step 115. The other thread 121/1 which has been notified of the change (as indicated by arrow 127) then communicates that change as indicated in step 128 via the network 53 to each of the other machines M2 ... Mn.

This second arrangement of FIG. 130 makes better utilisation of the processing power of the various threads 111/1 ... 111/3 and 121/1 (which are not, in general, subject to equal demands) and gives better scaling with increasing size of "n", (n being an integer greater than or equal to 2 which represents the total number of machines which are connected to the network 53 and which each execute a different portion of the application program 50 simultaneously). Irrespective of which arrangement is used, the changed field and identities and contents detected at step 113 are propagated to all the other machines M2 ... Mn on the network.

Figure 131:
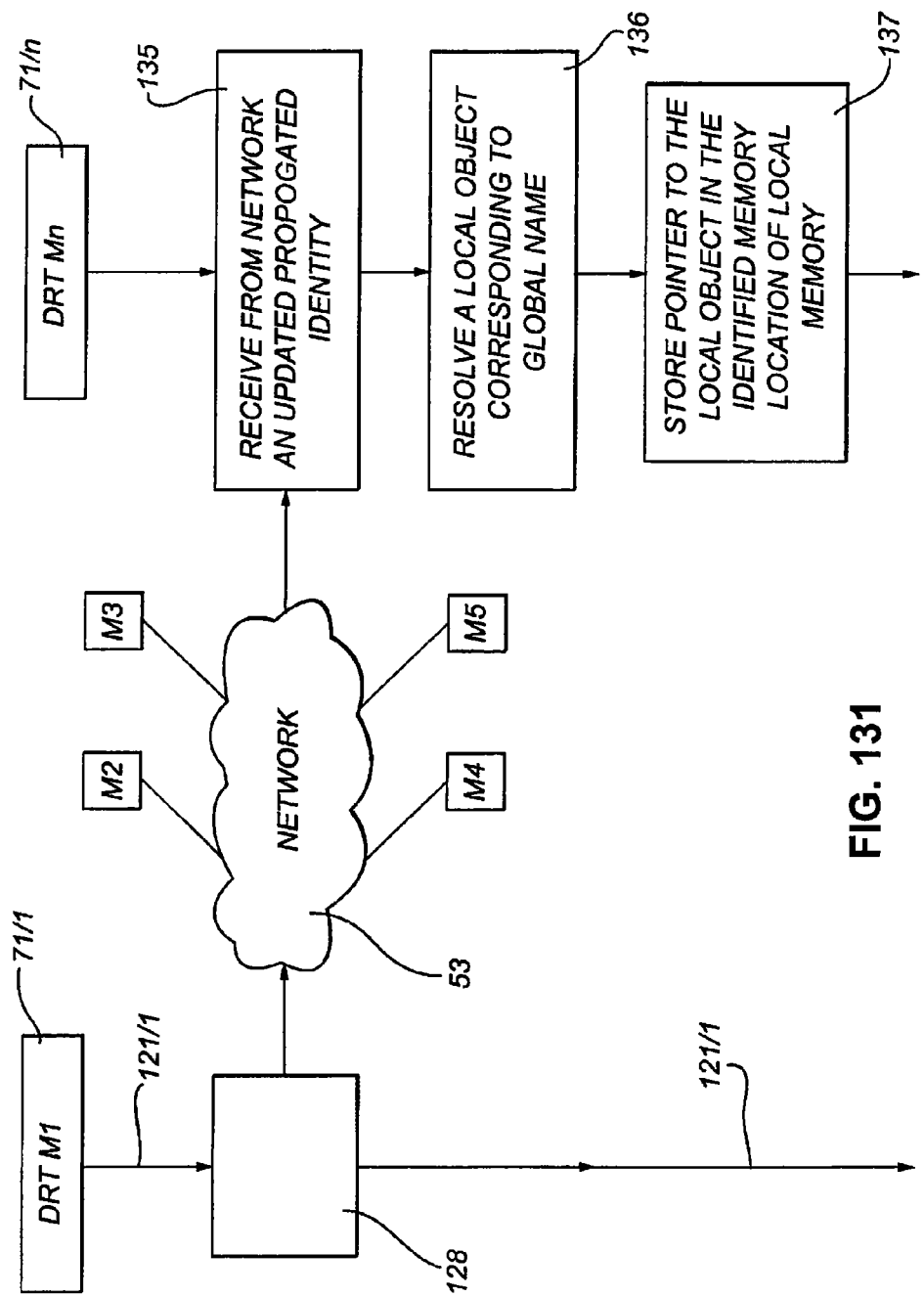
FIG. 131 illustrates multi-thread memory updating for the computers of FIG. 126.

This is illustrated in FIG. 131 where the DRT 71/1 and its thread 121/1 of FIG. 130 (represented by step 128 in FIG. 131) sends via the network 53 the identity and changed content of the listed memory location generated at step 113 of FIG. 130 by processing in machine M1, to each of the other machines M2 ... Mn.

Each of the other machines M2 ... Mn carries out the action indicated by steps 135, 136, and 137 in FIG. 131 for machine Mn by receiving the identity and content pair from the network 53 and writing the new content into the local corresponding memory location.

It will be apparent to those skilled in the computing arts that the concordance table of FIG. 124 is not necessarily only able to be positioned within a server machine X. Instead, a local copy of the table can be maintained in each of the individual machines Mn−1, Mn, Mn+1, etc. In addition, under these circumstances it is not necessary for there to be a global name since each machine is able, by consulting its own table, to determine the object in local memory which corresponds to the object being referred to by any other machine. For example, if machine Mn receives a message from machine Mn+1 to update the contents of a primitive field 11 contained in object T, machine Mn consults the concordance table of FIG. 124 and determines that its object H corresponds to the object T of machine Mn+1 and therefore that is the object which should be updated. That is, the concordance table of FIG. 124 need not include the left hand column entitled "GLOBAL". For this reason the table illustrated in FIG. 124 has the left hand portion separated by broken lines to indicate it is not required if no server machine X is present.

The foregoing describes only some embodiments of the present invention and modifications, obvious to those skilled in the computing arts, can be made thereto without departing from the scope of the present invention.

For example, the above described arrangements envisage "n" computers each of which shares a fraction (1/n th) of the application program. Under such circumstances all "n" computers have the same local memory structure. However, it is possible to operate such a system in which a subset only of the computers has the same local memory structure. Under this scenario, the maximum number of members of the subset is to be regarded as "n" the in the description above.

It is also to be understood that the memory locations can include both data and also portions of code. Thus the new values or changes made to the memory locations can include both new numerical data and new or revised portions of code. Similarly, reference to JAVA includes both the JAVA language and also JAVA platform and architecture.

Given the fundamental concept of modifying memory manipulation operations to coordinate operation between and amongst a plurality of machines M1, M2 ... Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3 ... Mn (either sequentially or simultaneously or according to any other order, routine or procedure) with the modified object (or class or other assert or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is executable intermediary code.

In this arrangement, which may be termed "master/slave" each of the slave (or secondary) machines M1, M3 ... Mn loads the modified object (or class), and inclusive of the new modified memory manipulation operation(s), that was sent to it over the computer communications network or other communications link or path by the master (or primary) machine, such as machine M2, or some other machine as a machine X. In a slight variation of this "master/slave" or "primary/secondary" arrangement, the computer communications network can be replaced by a shared storage device such as a shared file system, or a shared document/file repository such as a shared database.

It will be appreciated in the light of the detailed description provided herein that the modification performed on each machine or computer need not and frequently will not be the same or identical. What is required is that they are modified in a similar enough way that each of the plurality of machines behaves consistently and coherently relative to the other machines. Furthermore, it will be appreciated that there are a myriad of ways to implement the modifications that may for example depend on the particular hardware, architecture, operating system, application program code, or the like or different factors. It will also be appreciated that implementation can be within an operating system, outside of or without the benefit of any operating system, inside the virtual machine, in an EPROM, in software, in hardware, in firmware, or in any combination of these.

In a still further embodiment, each machine M1, M2 . . . Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different. It can thereby be enhanced, customized, and/or optimized based upon its particular machine architecture, hardware processor, memory, configuration, operating system, or other factors yet still be similar, coherent and consistent with the other machines and with all other similar modifications.

In all of the described instances or embodiments, the supply or the communication of the asset code (such as class code or object code) to the machines M1, M2 . . . Mn and optionally inclusive of a machine X, can be branched, distributed or communication among and between the different machines in any combination or permutation; such as by providing direct machine to machine communication (for example, M2 supplies each of M1, M3, M4 etc. directly), or by providing or using cascaded or sequential communication (for example, M2 supplies M1 which then supplies M3 which then supplies M4, and so on) or a combination of the direct and cascaded and/or sequential.

The abovedescribed arrangement needs to be varied in the situation where the modification relates to a cleanup routine, finalisation or similar, which is only to be carried out by one of the plurality of computers In this variation of this "master/slave" or "primary/secondary" arrangement, machine M2 loads the asset (such as class or object) inclusive of a cleanup routine in unmodified form on machine M2, and then (for example, M2 or each local machine) deletes the unmodified cleanup routine that had been present on the machine in whole or part from the asset (such as class or object) and loads by means of the computer communications network the modified code for the asset with the now modified or deleted cleanup routine on the other machines. Thus in this instance the modification is not a transformation, instrumentation, translation or compilation of the asset cleanup routine but a deletion of the cleanup routine on all machines except one. In one embodiment, the actual code-block of the finalisation or cleanup routine is deleted on all machines except one, and this last machine therefore is the only machine that can execute the finalisation routine because all other machines have deleted the finalisation routine. One benefit of this approach is that no conflict arises between multiple machines executing the same finalisation routine because only one machine has the routine.

The process of deleting the cleanup routine in its entirety can either be performed by the "master" machine (such as for example machine M2 or some other machine such as machine X) or alternatively by each other machine M1, M3 . . . Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 . . . Mn and optionally the server machine X.

In a further arrangement, a particular machine, say for example machine M1, loads the unmodified asset (such as class or object) inclusive of a finalisation or cleanup routine and all the other machines M2, M3 . . . Mn perform a modification to delete the cleanup routine of the asset (such as class or object) and load the modified version.

In a still further arrangement, the machines M1, M2 . . . Mn, may send some or all load requests to the additional server machine X, which performs the modification to the application program code 50 (including or consisting of assets, and/or classes, and/or objects) and inclusive of finalisation or cleanup routine(s), via any of the abovementioned methods, and returns in the modified application program code inclusive of the now modified finalisation or cleanup routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalisation or cleanup routine(s) to each machine. The modifications performed by machine X can include any of the modifications described. This arrangement may of course be applied to some only of the machines whilst other arrangements described herein are applied to others of the machines.

Given the concept of modifying memory manipulation operations to coordinate operation between and amongst a plurality of machines M1, M2 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3 . . . Mn (either sequentially or simultaneously or according to any other order, routine or procedure) with the modified object (or class or other assert or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is executable intermediary code.

In this arrangement, which may be termed "master/slave" each of the slave (or secondary) machines M1, M3 . . . Mn loads the modified object (or class), and inclusive of the new modified memory manipulation operation(s), that was sent to it over the computer communications network or other communications link or path by the master (or primary) machine, such as machine M2, or some other machine as a machine X. In a slight variation of this "master/slave" or "primary/secondary" arrangement, the computer communications network can be replaced by a shared storage device such as a shared file system, or a shared document/file repository such as a shared database.

It will be appreciated in the light of the detailed description provided herein that the modification performed on each machine or computer need not and frequently will not be the same or identical. What is required is that they are modified in a similar enough way that each of the plurality of machines behaves consistently and coherently relative to the other machines. Furthermore, it will be appreciated that there are a myriad of ways to implement the modifications that may for example depend on the particular hardware, architecture, operating system, application program code, or the like or different factors. It will also be appreciated that implementation can be within an operating system, outside of or without the benefit of any operating system, inside the virtual machine, in an EPROM, in software, in hardware, in firmware, or in any combination of these.

In a still further embodiment, each machine M1, M2 ... Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different. It can thereby be enhanced, customized, and/or optimized based upon its particular machine architecture, hardware processor, memory, configuration, operating system, or other factors yet still be similar, coherent and consistent with the other machines and with all other similar modifications.

In all of the described instances or embodiments, the supply or the communication of the asset code (such as class code or object code) to the machines M1, M2 ... Mn and optionally inclusive of a machine X, can be branched, distributed or communication among and between the different machines in any combination or permutation; such as by providing direct machine to machine communication (for example, M2 supplies each of M1, M3, M4 etc. directly), or by providing or using cascaded or sequential communication (for example, M2 supplies M1 which then supplies M3 which then supplies M4, and so on) or a combination of the direct and cascaded and/or sequential.

The abovedescribed arrangement needs to be varied in the situation where the modification relates to a cleanup routine, finalisation or similar, which is only to be carried out by one of the plurality of computers In this variation of this "master/slave" or "primary/secondary" arrangement, machine M2 loads the asset (such as class or object) inclusive of a cleanup routine in unmodified form on machine M2, and then (for example, M2 or each local machine) deletes the unmodified cleanup routine that had been present on the machine in whole or part from the asset (such as class or object) and loads by means of the computer communications network the modified code for the asset with the now modified or deleted cleanup routine on the other machines. Thus in this instance the modification is not a transformation, instrumentation, translation or compilation of the asset cleanup routine but a deletion of the cleanup routine on all machines except one. In one embodiment, the actual code-block of the finalisation or cleanup routine is deleted on all machines except one, and this last machine therefore is the only machine that can execute the finalisation routine because all other machines have deleted the finalisation routine. One benefit of this approach is that no conflict arises between multiple machines executing the same finalisation routine because only one machine has the routine.

The process of deleting the cleanup routine in its entirety can either be performed by the "master" machine (such as for example machine M2 or some other machine such as machine X) or alternatively by each other machine M1, M3 ... Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 ... Mn and optionally the server machine X.

In a further arrangement, a particular machine, say for example machine M1, loads the unmodified asset (such as class or object) inclusive of a finalisation or cleanup routine and all the other machines M2, M3 ... Mn perform a modification to delete the cleanup routine of the asset (such as class or object) and load the modified version.

In a still further arrangement, the machines M1, M2 ... Mn, may send some or all load requests to the additional server machine X, which performs the modification to the application program code 50 (including or consisting of assets, and/or classes, and/or objects) and inclusive of finalisation or cleanup routine(s), via any of the abovementioned methods, and returns in the modified application program code inclusive of the now modified finalisation or cleanup routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalisation or cleanup routine(s) to each machine. The modifications performed by machine X can include any of the modifications described. This arrangement may of course be applied to some only of the machines whilst other arrangements described herein are applied to others of the machines.

XV. Exemplary Embodiment of Multiple Machine Architecture with Overhead Reduction and Method Therefore Co-pending U.S. Patent Application No. Ser. No. [60/730,544 filed Oct. 25, 2005 describes aspects of a multiple machine architecture with overhead reduction and method therefore which may be used in conjunction with the present invention.

The need to update each local memory when any change is made to any memory location, creates a substantial overhead burden for the communications network which interconnects the multiple computers. It is towards reducing the abovementioned overhead that the present invention is directed.

Figures 132, 133, 134:
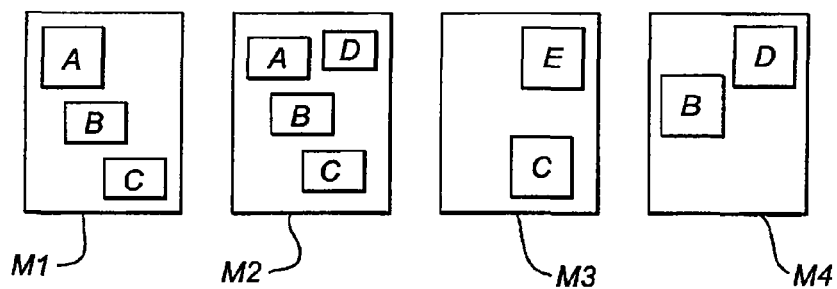

Turning now to FIG. 132, a schematic map of the memory locations of four machines M1-M4 forming a multiple computer system is illustrated. In this particular example, machine M1 has the memory locations A, B and C whilst machine M2 has the same memory locations and an additional memory location D. However, machine M3 only has memory locations C and E whilst machine M4 has memory locations B and D. It follows therefore that if memory location B has to be updated, then it is only necessary to advise machines M1, M2 and M4 and it is not necessary to advise machine M3. Thus the traffic on communications network 3 can be reduced since in this circumstance it is not necessary to communicate with machine M3.

FIG. 133, FIG. 134 and FIG. 135 illustrate three different ways of tabulating or storing data which is sufficient to enable this reduction in communication overhead to be achieved.

In FIG. 133, for each object, or memory location, is maintained a list of machines which have a local copy of the object or location and thus should be communicated with in the event that the object or the contents of the location is to be changed, or manipulated in some way, such as for example by finalisation or synchronization.

Conversely, in FIG. 134, for each machine is maintained a list of objects, or memory locations, present in the machine. Thus if a particular machine makes an amendment, for example, to a particular memory location then the server machine X can check through the list of machines in order to see, in turn, whether each machine refers to (such as a local copy of) the amended memory location and therefore requires to be updated.

In FIG. 135, a still further form of tabulation is provided which again enables the server machine X to determine what communications are required. Thus tabulation takes the form of an array listing the objects on one side and machines on the other and providing a relevant YES or NO in each cell corresponding to a possible object in each possible computer.

Once the above concept has been grasped, the arrangements described in detail in the abovementioned incorporated patent specifications are modified in a straightforward manner to ensure that each of the machines M1, M2, etc. of the multiple computer system only sends messages updating a specific memory location to that sub-set of machines having a corresponding memory location. One way of doing this is to consult the tabulation of any of FIG. 133-FIG. 135 in the process of assembling the addresses to which the updating message is broadcast or the updating messages are sent.

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(vi) re-compilation at loading,
(vii) a pre-compilation procedure prior to loading,
(viii) compilation prior to loading,
(ix) "just-in-time" compilation(s), or
(x) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore include a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system.

XVI. Exemplary Embodiment for Contention Detection

Co-pending U.S. Patent Application Ser. No. 60/850,541 filed Oct. 9, 2006 describes aspects of a system and method for contention detection which may be used with the present invention.

Figure 136:
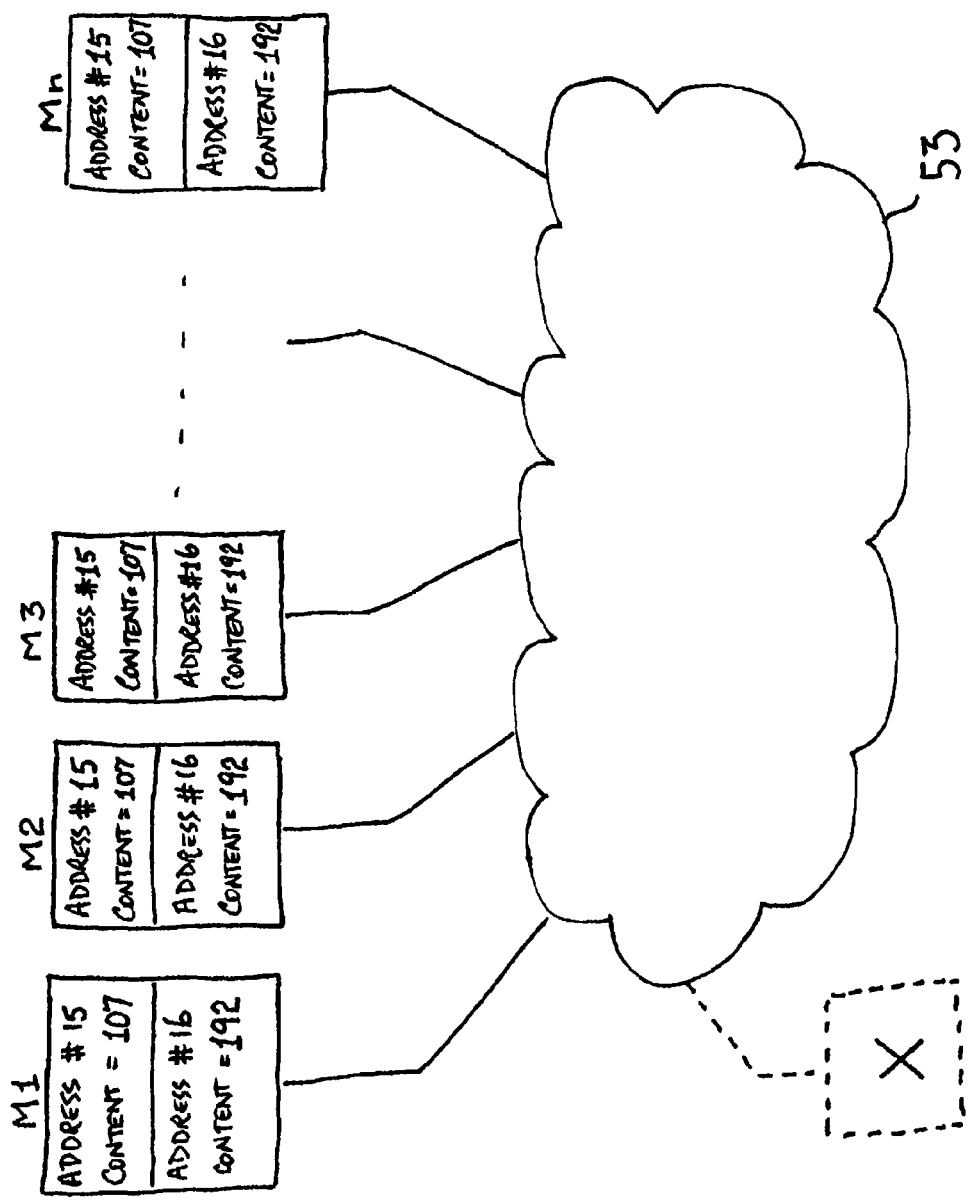
FIG. 136, FIG. 137 and FIG. 138 illustrate the steps of in due course updating memory locations.

In FIG. 136 a number, "n", of application running computers or machines M1, M2, M3 . . . Mn are provided and, if desired, a server machine X can also be provided. Since the server machine is not essential it is indicated in phantom in FIG. 136. All the machines M1-Mn, and X if present, are interconnected in some fashion, preferably via a commodity communications network 53. In each of the application running machines, there are replicated memory locations which, for the sake of this discussion, will be restricted to two in number and which have addresses of #15 and #16 respectively (but which need not be sequential). Each memory location has a content which in some instances can include code but again for the purposes of this discussion will be deemed to constitute merely a number having a numerical value. The content of address #15 is the number 107 and the content of address #16 is the number 192. Each of the n application running machines has the two memory locations and each memory location in each machine has the same content or number.

Figure 137:
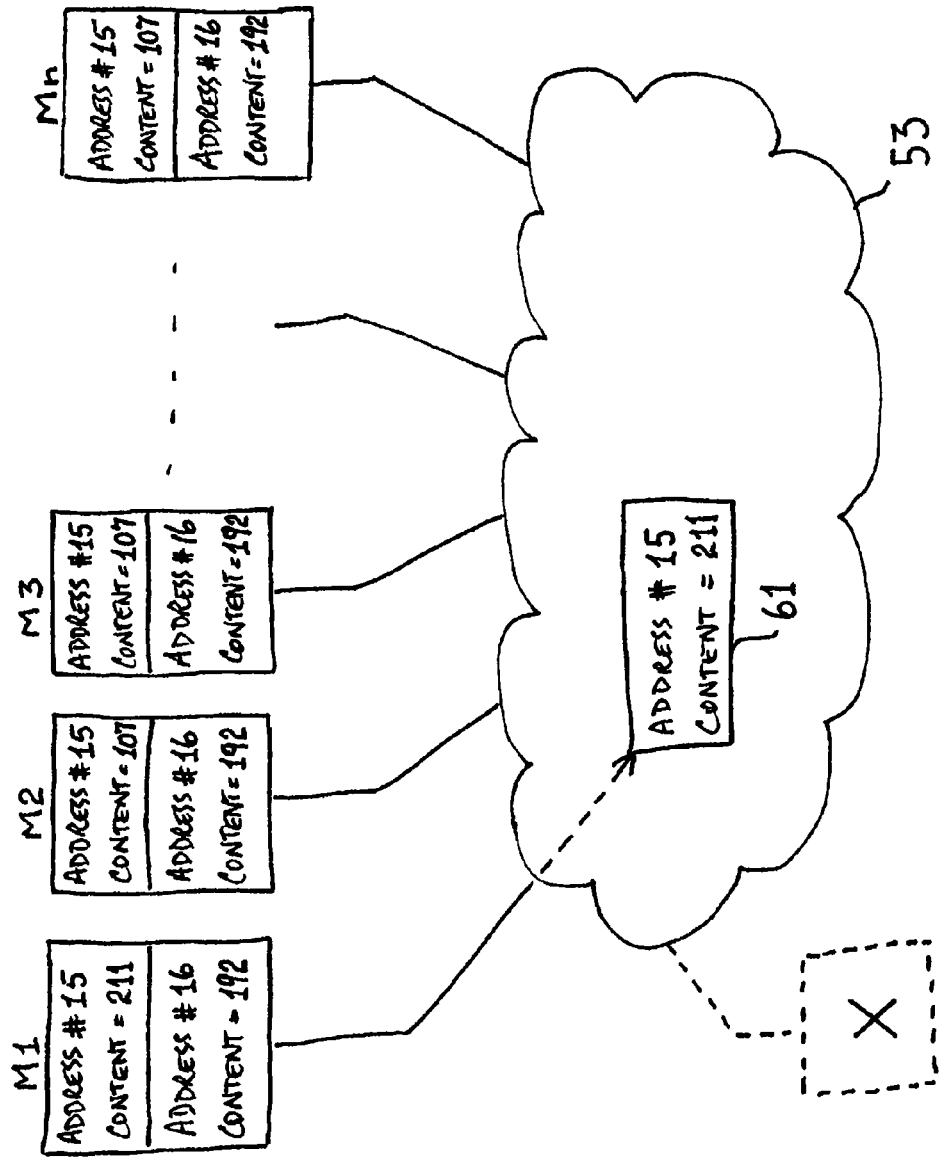

Turning now to FIG. 137, the situation which arises when a change in the content of a specific machine occurs is explained. For the purposes of this description, it is assumed that machine M1 in executing its portion of the application program 50, carries out a memory write which results in the content of address #15 being changed from the number 107 to the number 211. This change is then notified to all other machines M2, M3 . . . Mn via the network 53. This is schematically illustrated in FIG. 137 by the sending of a notification from machine M1 to all the other machines of the address of the memory location with the changed content and also the new content. This message is schematically illustrated as message 61 in FIG. 137.

Figure 138:
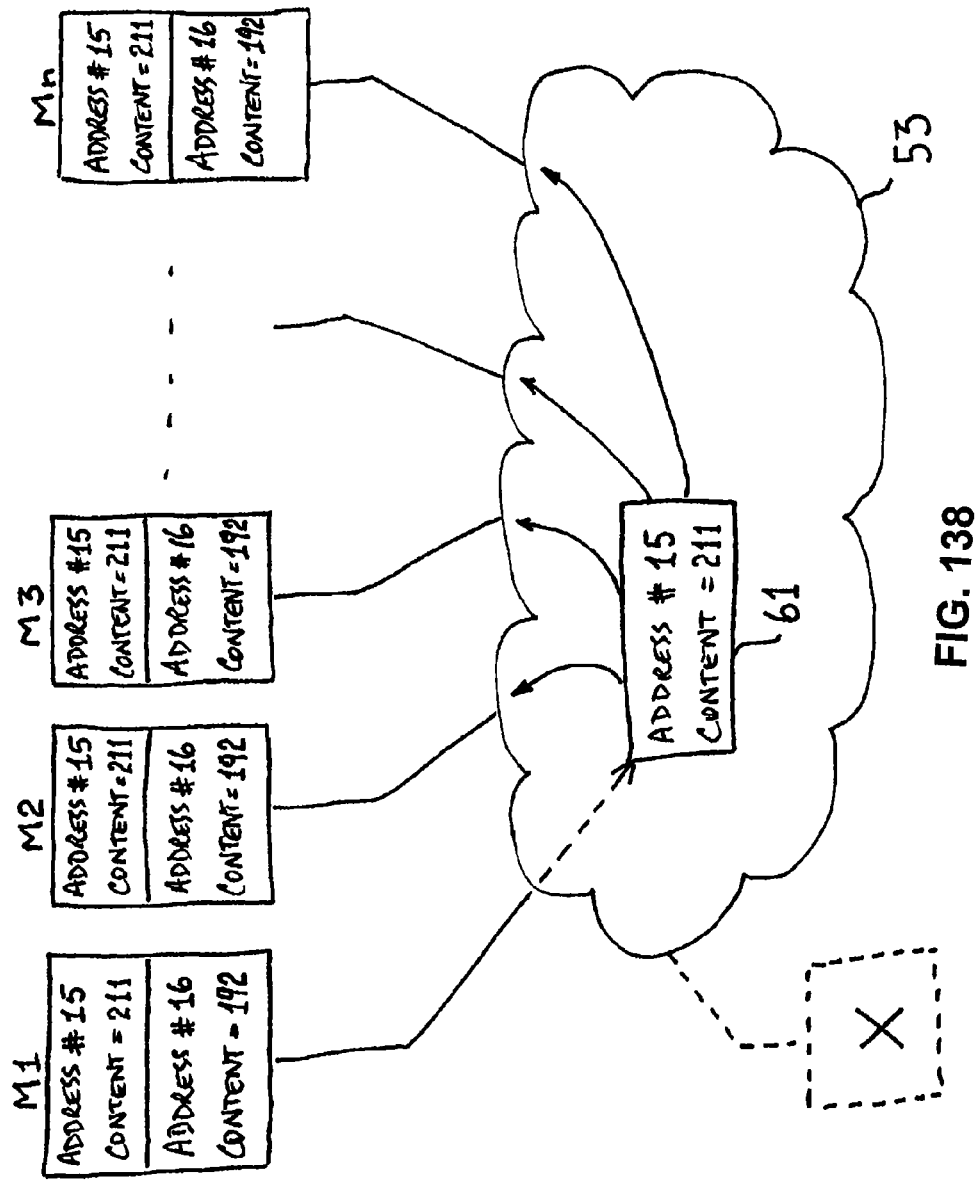

In FIG. 138, the message 61 from machine M1 of FIG. 137 has passed through the network 53 and been received by each of the other machines M2, M3 . . . Mn, which on receipt of the message 61 utilize an overwrite means or arrangement to store the changed content 211 in the local memory location corresponding to address #15. In this connection it should be understood that the actual address in each of the machines may be different but that each of the memory locations has a global address. The local memory address and the global memory address are recorded or tabulated either in tables maintained by each of the machines M1-Mn, or in the server machine X. In FIG. 138, the updating has been successfully carried out and all machines M2, M3 . . . Mn have been consistently updated to take into account the change brought about within machine M1. Thus in the circumstances where only a single machine updates a memory address location with a changed value or content, then no conflict or inconsistency arises between the values of the replicated memory locations on all the machines M1, M2, M3 . . . Mn.

Figure 139:
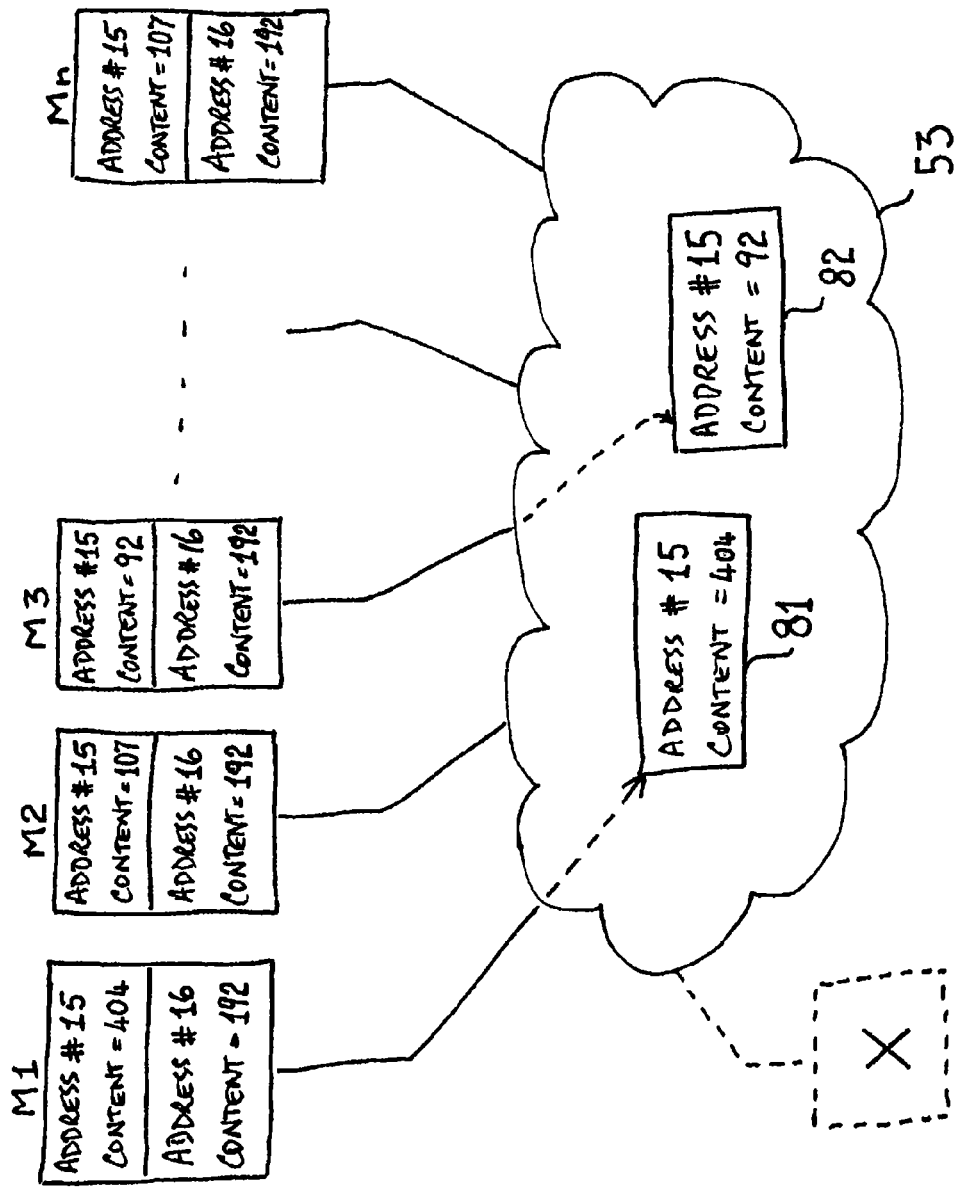
FIG. 139 and FIG. 140 illustrate the stages by which contention can occur.

However, it is possible for the content of a single memory address, say address #15, to be modified simultaneously, or substantially simultaneously, by two machines, say M1 and M3. The term "substantially simultaneously" as used herein is used to refer to events which happen at the same time, or concurrently, or to events which are nearly simultaneous or nearly concurrent. In the example to be described hereafter the new content of address #15 of machine M1 is the number 404 and the new content of address #15 of machine M3 is the number 92. As a consequence of their execution of their different portions of the application program 50, the two machines M1 and M3 modifying the address #15 send a notification 81 and 82 respectively via the network 53 to all the other machines. These notifications are intended to update all the memory locations in the manner indicated in FIG. 139.

Figure 140:
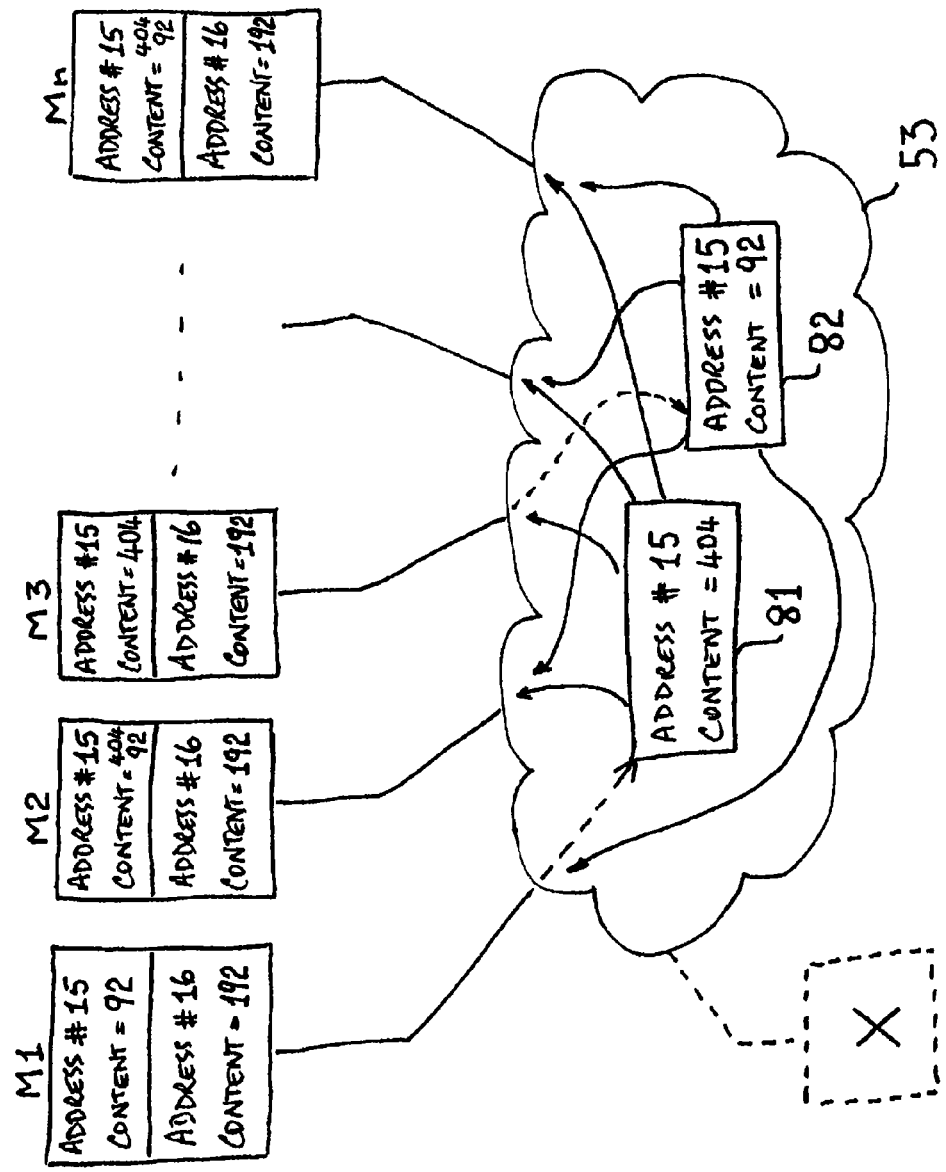

In FIG. 140, machine M1 which has just changed its content at address #15 to number 404, now receives message 82 from machine M3 and therefore updates its content at address #15 to be number 92. Similarly, machine M3 which has just updated its content at address #15 to number 92, then receives the message 81 from machine M1 and thus updates its content at address #15 to be number 404.

However, each of the other machines M2, M4, M5 . . . Mn receives both messages 81 and 82 (in either order depending upon the speed and latency of the network 53). Thus the content appearing at address #15 for these machines will be either number 404 or 92 depending upon whether message 81 or message 82 was received last.

Clearly, the consequence of the circumstances described in relation to FIG. 140 is that the memory contents for corresponding addresses are no longer consistent. Machines M1 and M3 will have swapped values caused by the receipt of each other's notification of the change, whilst the remaining machines will have either one or the other of the values of the two message originating machines (M1 and M3 in this example). It follows that in circumstances where updating messages are issued simultaneously, or nearly simultaneously, it is not possible to guarantee that the replicated memory locations on all of the machines M1, M2 . . . Mn will have consistent contents or values and therefore the desirable state of consistent replicated memory locations is not achieved.

It will be apparent that contention arises because of differences in timing and most solutions of contention problems rely upon time stamping or a synchronizing clock signal which is common to all entities involved. However, in the multiple computer environment in which the preferred embodiment of the present invention arises, there is no synchronizing signal common to all the computers. Similarly, although each computer has its own internal time keeping mechanism, or clock, these are not synchronized (and even if they could be, would not stay synchronized since each clock runs at a slightly different rate or speed). Thus solutions based on time or attempted synchronization are bound to be complex and/or are not likely to succeed. Instead, the preferred embodiment utilizes the concept of sequence, rather than time.

Figure 141:
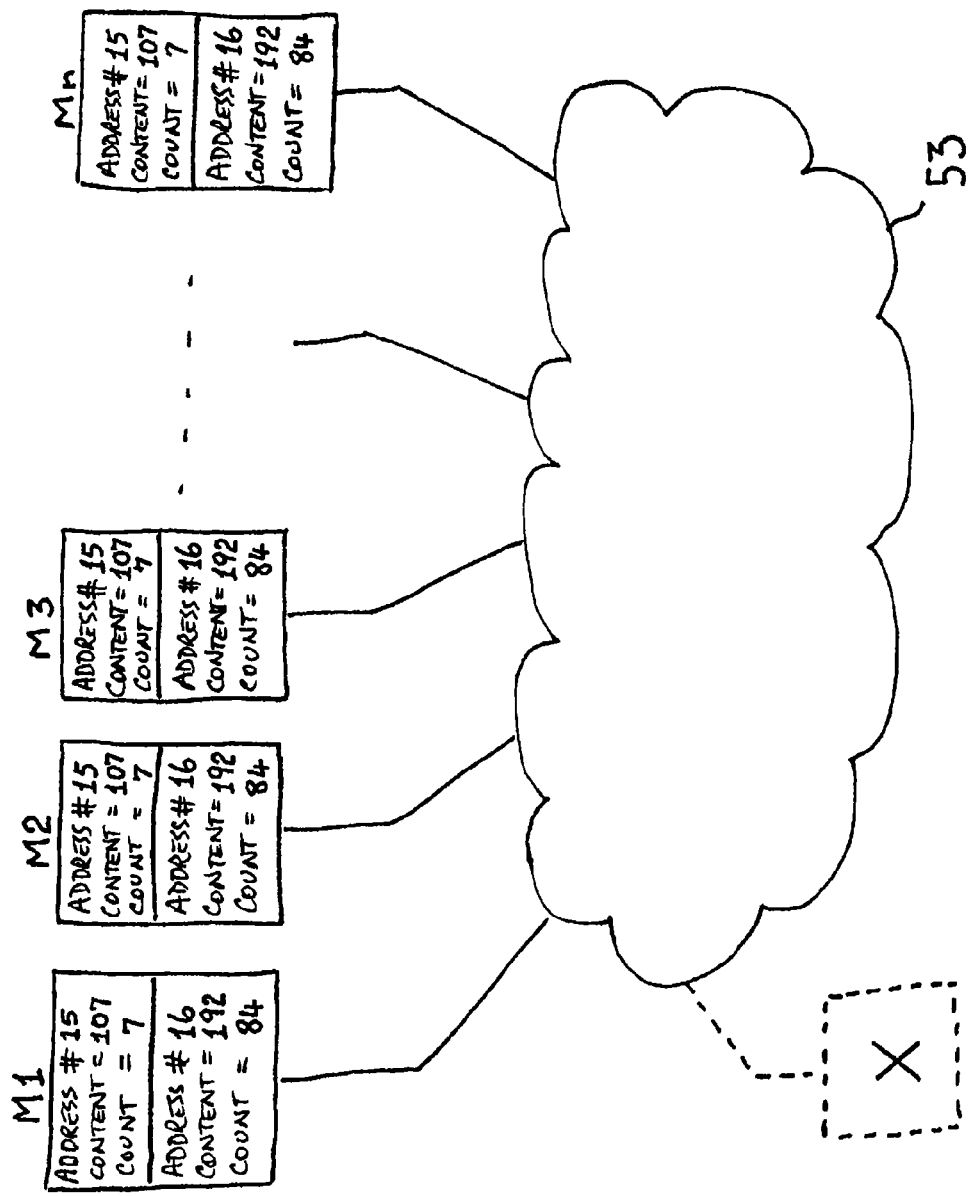
FIG. 141, FIG. 142, FIG. 143, FIG. 144 and FIG. 145 illustrate the stages of an embodiment whereby contention can be detected and resolved.

In accordance with a first embodiment of the present invention, this problem is addressed (no pun intended) by the introduction of a count value associated with each memory location. The modified position is schematically illustrated in FIG. 141 where each of the memory addresses #15 and #16 is provided with a count value. In the particular instance illustrated in FIG. 141, the content of address #15 is 107 and its count value is 7 whilst the content of address #16 is 192 and its count value is 84.

Figure 142:
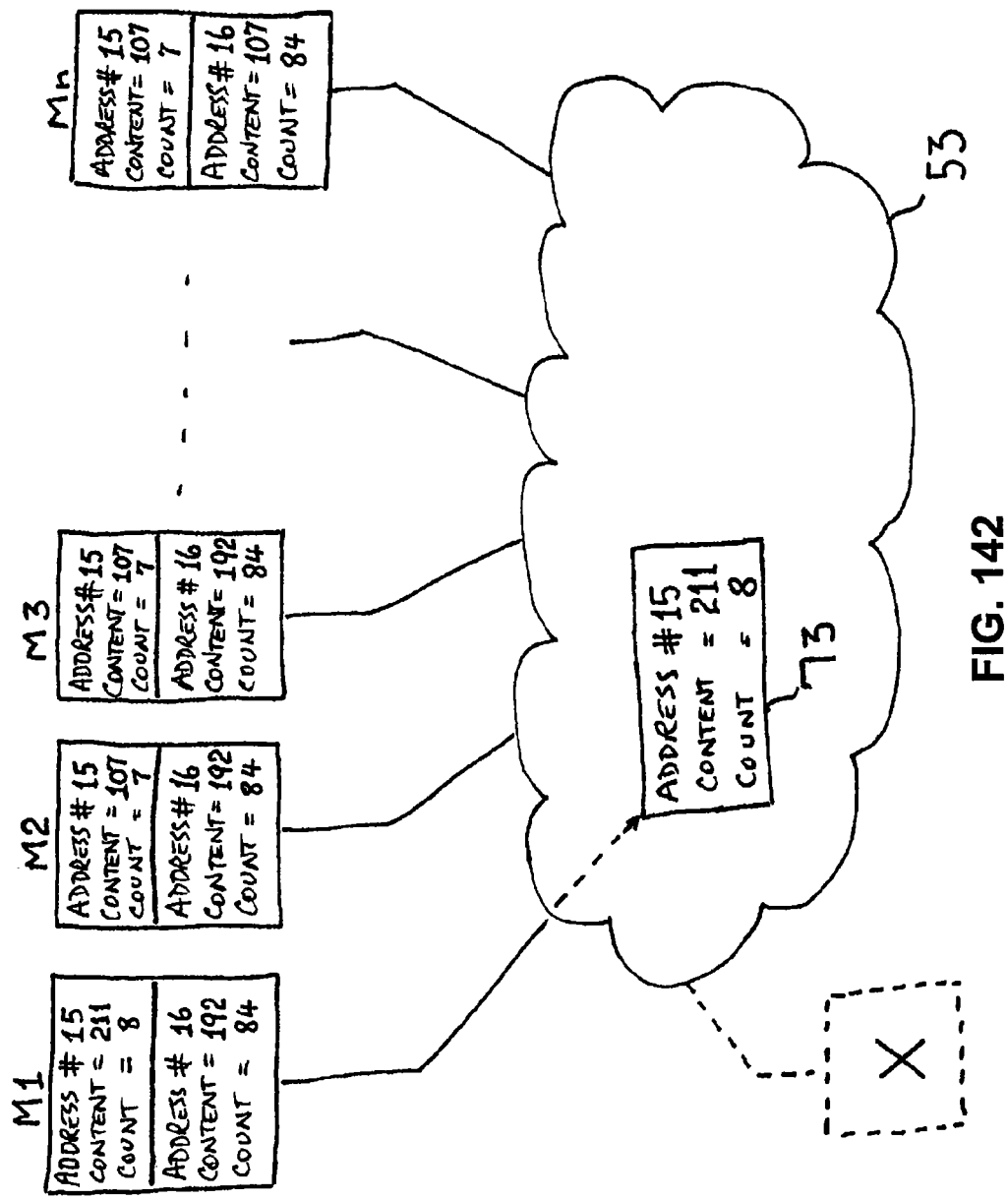

In FIG. 142, the operation of machine M1 causes the content of address #15 to be changed from 107 to 211 and this increments the count value from 7 to 8. Machine M1 then sends a message 93 via the network 53 to all other application running machines M2, M3 . . . Mn to instruct them to update their content for address #15.

Figure 143:
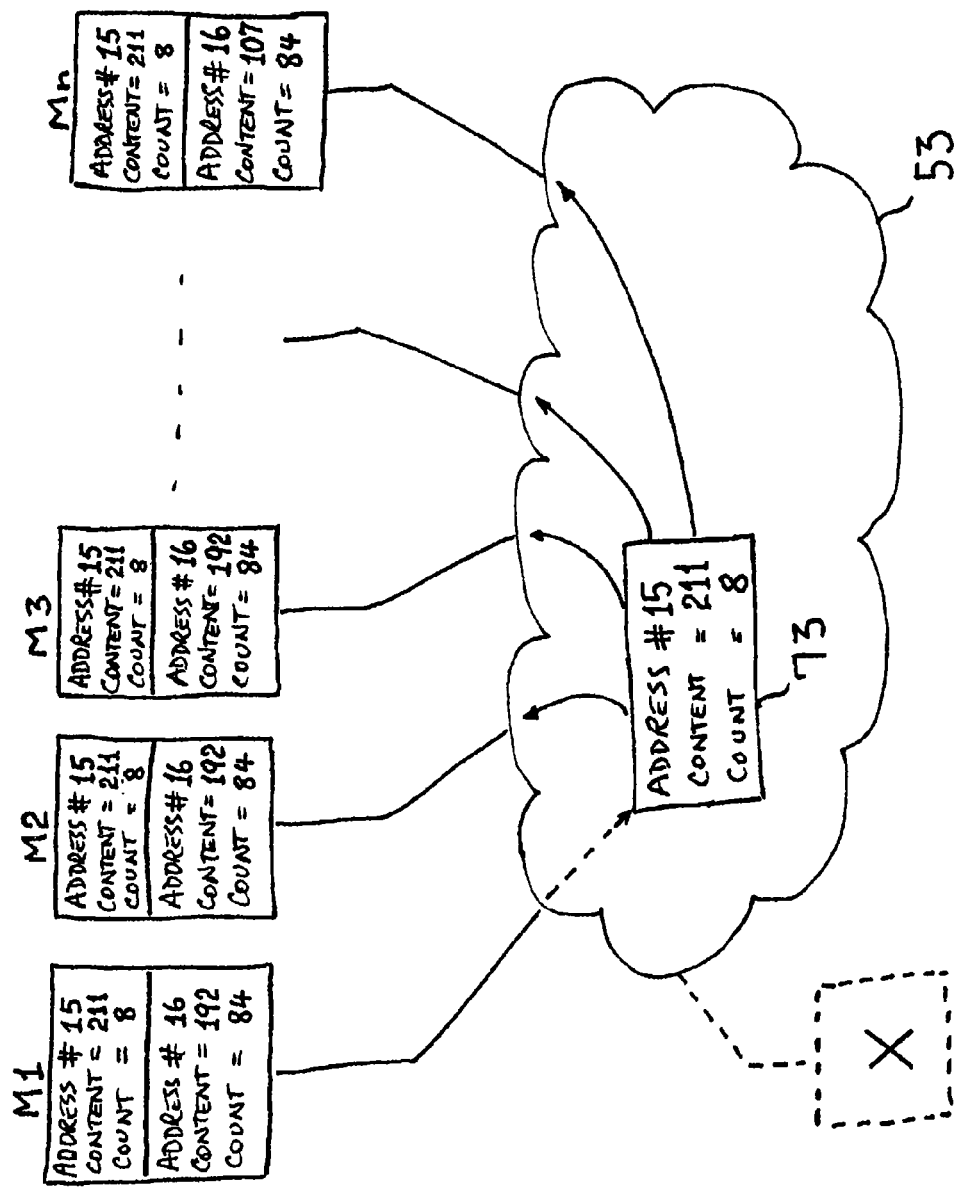

This is exactly what happens as illustrated in FIG. 143 in which the single message 93 is received by all of the other machines M2, M3 . . . Mn so that address #15 for all these receiving machines now has the new content 211 and the new count value 8. Thus the count value for each of the addresses #15 has been changed or overwritten to indicate that a change in content has occurred.

Figure 144:
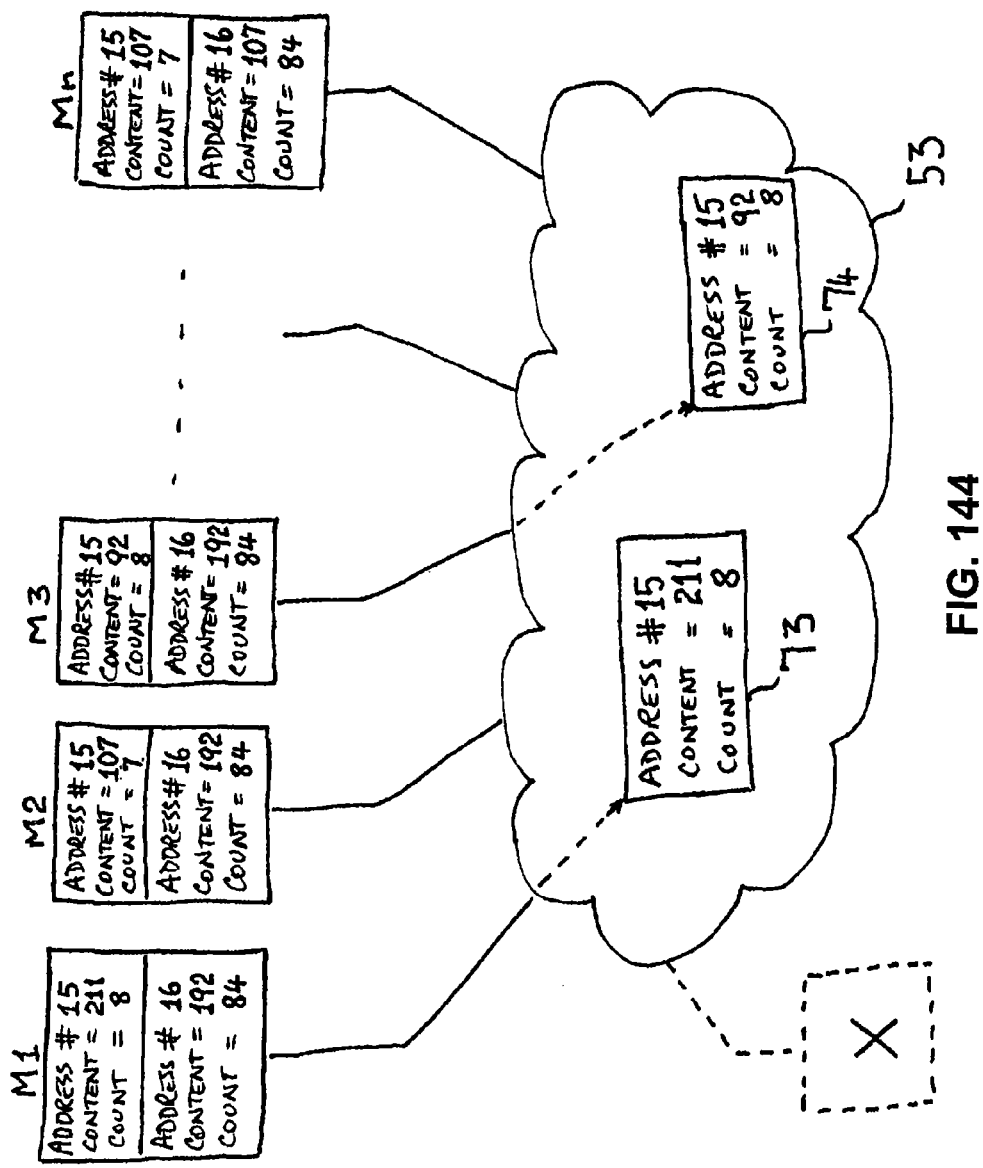

FIG. 144 illustrates what happens in the circumstance discussed above in relation to FIG. 139 where two (or more) machines M1 and M3 simultaneously, or substantially simultaneously, update the same memory address. As in FIG. 143, machine M1 in executing its portion of the application program causes the contents of address #15 to be written with a new content 211 thereby simultaneously incrementing the count value from 7 to 8 and causing the message 73 to be sent via the network 53 to all other machines M2, M3, . . . Mn. Substantially simultaneously, machine M3 in executing its portion of the application program writes a new content 92 at address #15, also increments its count value from 7 to 8 and sends a message 74 containing these particulars to all other machines M1, M2, M4, M5, . . . Mn. This is the situation illustrated in FIG. 144.

Figure 145:
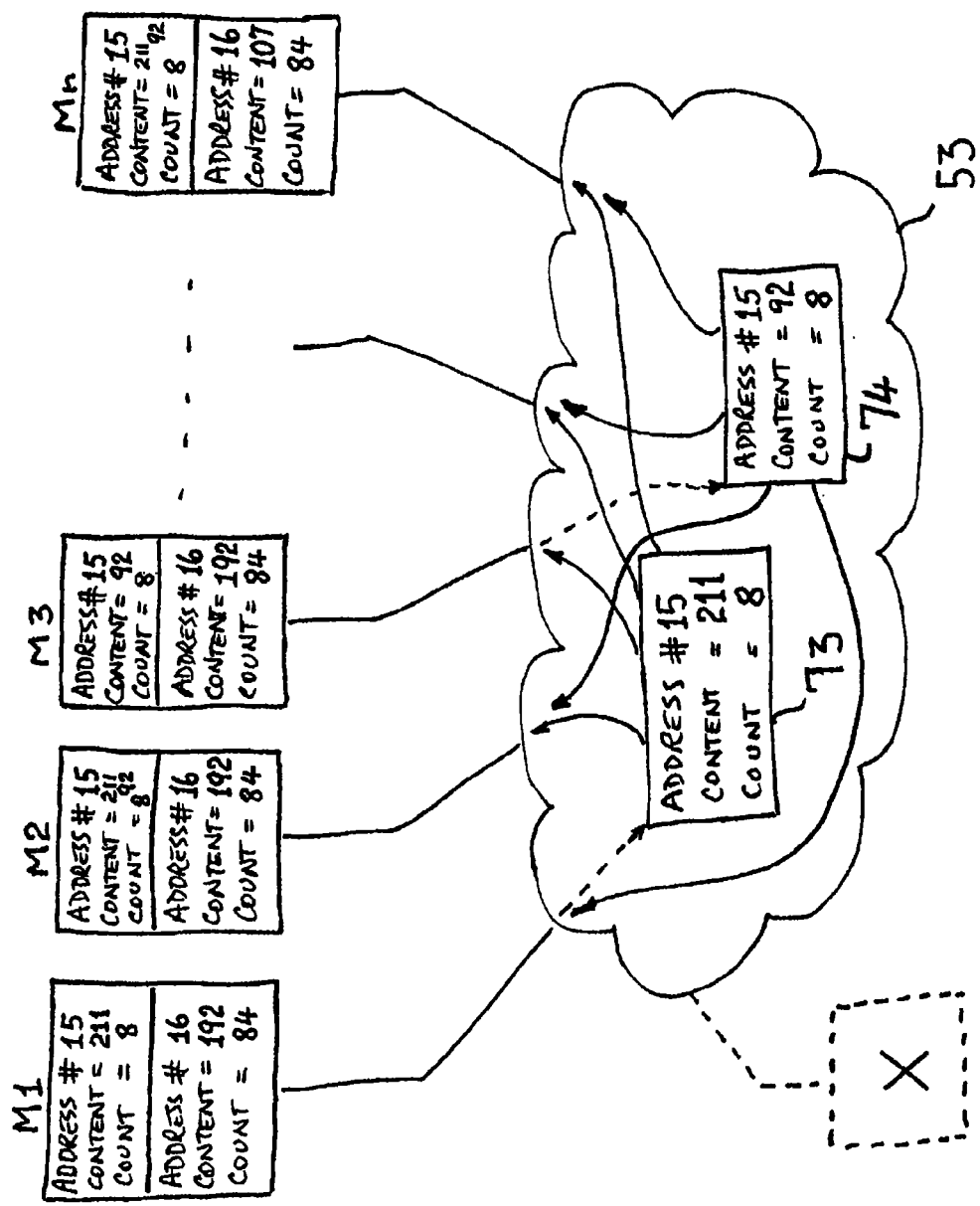

The consequence of the situation illustrated in FIG. 144 is illustrated in FIG. 145. As in FIG. 140, machines M2, M4, M5 . . . Mn which did not initiate any message will have received the messages 73 and 74 in either order and therefore the content stored (or overwritten) at their local memory corresponding to address #15 will be either 211 or 92 depending upon the order of receipt of the messages 73 and 74 because when received the first of these messages will correctly change the count value from 7 to 8.

However, for machine M1, receiving message 74 means that memory location corresponding to address #15 receives an updating signal which does not change the count value, instead the resident count value and received count value are the same. Thus by comparing the count values (by means of a comparator, for example) machine M1 is able to detect and signal that a contention situation has arisen because it detects the situation where the incoming message 74 contains a count value which is identical to the existing state of the count value in memory at address #15. Similarly, machine M3 on receipt of message 73 also receives an incoming message with the same count value as presently resident in the memory location. Thus machine M3 is able to detect and signal a contention state also.

It will also be apparent that the machines M2, M4, M5, . . . Mn having received the first of messages 73 and 74 and thus having a count value of 8, when they receive the second of the messages 73 and 74 will have a resident count value which is the same as the count value of the second received message. Thus these machines too can detect and signal contention.

Thus it will be seen from the above example that the provision of the count value in conjunction with the memory location provides a means by which contention can be detected. This is a first step in ensuring that the replicated memory structure remains consistent.

Thus the provision of the count value and the provision of a simple rule, namely that incoming messages with updating addressed content are valid if the resident count value is less than the received count value, but are invalid if the two count values are the same, enables a state of contention to be detected.

Although in the described example, the count values are integers and the increment is the integer one, this need not be the case. For example fractional count values (i.e., using a float or floating point arithmetic or decimal fraction) are possible but undesirably complex.

XVII. Exemplary Embodiment of System and Method for Contention Detection and Resolution Co-pending U.S. Patent Application No. Ser. No. 60/850,449 filed Oct. 9, 2006 describes aspects of a system and method for contention detection and resolution that may be used in conjunction with the present invention.

The above described scheme enables a certain problems to be avoided. That problem can arise where a specific memory location, say address #16, is written to in quick succession by each of, say, three machines so that, say, machine M1 writes to address #16 with a new value 100 and increases its count from 84 to 85. If the updating message is received virtually instantaneously by machine M2, machine M2 then writes a new value at address #16 of 200 and increments the count from 85 to 86, its updating message is received immediately by machine M3, and machine M3 immediately writes a new content 300 to address #16 and updates the count value to 87 then, it is possible for other machines, such as Mn, to receive three messages in essentially any order. If the order of receipt of the messages is the same as the order of transmission of the messages, then the count value at address #16 of machine Mn is changed from 84 to 85, then from 85 to 86 and then to 87 and all is well. However, if for example, the message from machine M3 is received first then machine Mn is able to accept the value of 300 for the content of address #16 and overwrite the count value from 84 to 87 because the incoming message has a count value which is greater than the currently stored count value and thus can be guaranteed to be correct.

If, under these conditions, the message from machine M1 is then received, the comparison of the count value is that the incoming message has a count value of 85 but the existing count value is 87—which is greater than the incoming count value and thus the incoming message should be rejected. The same rules applies in respect of the message received from machine M2 which has a count value of 86.

Thus the rule for contention is that a state of, or the existence of, contention should be signalled in the event that the incoming message has the same count value as the count value currently residing in the memory location. Whilst the rule for acceptance or rejection of all messages, whether out of order or not, is that incoming memory updating signals should be accepted if the count value residing in the memory has a lower value than the incoming signal, and should be rejected if the count value presently residing in the memory location has a higher count value than that of the incoming signal or packet. Thus the order of receipt of updating messages is immaterial and each machine can correctly identify which updating messages to action and which messages to ignore.

Furthermore, the above rules can be slightly expanded to resolve the contention which arises where the count value of the incoming updating message is the same as the count value presently existing in the memory address to be updated. In one preferred embodiment, the updating message is accepted if it is being issued from a machine which has a higher number assigned to it in a numbered hierarchy of machines than the number assigned to the receiving machine. Thus in the circumstances of FIG. 145, machine M3 on receipt of message 73 firstly detects contention because the count value of the incoming message 73 is compared with, and found to be the same as, the existing count value at address #15. Furthermore, since one is less than three, machine M3 rejects the incoming message from machine M1 and therefore retains the value 92. Conversely machine M1 on receipt of message 74, firstly detects contention because the received message count 8 is equal to the existing memory count 8. However, machine M1 recognising that message 73 is being sent from machine M3, accepts that message and overwrites the existing content 211 with the incoming content 92 because the number three is greater than the number one.

Similarly, each of the remaining machines M2, M4, M5 . . . Mn receives both message 73 and message 74 in either order. The first message to be received is accepted because its count 8 is compared with, and found to be greater than, the pre-existing count value in each of the machines M2, M4, M5 . . . Mn. Thus the first message received is accepted. However, the second message received triggers the detection of a contention state which is able to be resolved in the following way. The machines M1, M2, etc. are allocated the numbers 1, 2, etc. in a hierarchical order which culminates in "n". If the incoming message is from a machine with a higher number in the hierarchical order than the number of the machine that sent the previous message, then the message from the machine with a higher number is accepted. Stated another way, if the second (or subsequent) received message is from a machine with a lower number than that which sent the previous message, then the second (or subsequent) received message is rejected. In this way the contention situation is not only detected but also resolved and the actions of machine M3 take precedence over the actions of machine M1 and thus the content 92 is recorded in all machines at address #15.

Clearly the decision to allow the machine of higher number to prevail is entirely arbitrary, and the lower numbered machine could prevail instead, if desired.

In an alternative arrangement, instead of relying upon a number in a machine hierarchy, each machine can be provided with a locally generated random number, or pseudo-random number (which can be changed from time to time if desired). Thus different machines will take precedence from time to time irrespective of whether a higher, or lower, random number is to prevail.

In a still further alternative arrangement, each incoming updating message, signal or packet can be buffered in a temporary storage buffer. If no other updating message, signal or packet is received within a predetermined time period—selected to be longer than the latency of the network 53, then no contention is indicated and the sole incoming updating message can be actioned. Alternatively, if two or more messages are received within the predetermined period, then any contention is resolved utilizing the count values, and then the message which takes precedence is actioned.

XVIII. Exemplary Embodiment of System and Method for Contention Detection with Modified Message Format Co-pending U.S. Patent Application Ser. No. 60/850,717 filed Oct. 9, 2006 describes aspects of a system and method for contention detection with modified message format which may be used with the present invention.

In a further embodiment, rather than each of the machines M1, M2 . . . Mn sending an individual message to all other machines, the individual machines send only a single message to the server machine X which then prepares a broadcast message 95 as schematically illustrated in FIG. 146. In this example, four addresses are simultaneously updated by the message 95 each with their individual content. Thus the broadcast or group message 95 has four count values, in this example 12, 26, 57, and 15, and the group message is broadcast to all application running machines M1, M2. Mn by the server machine X. Each count value of the group message 95 is compared with the corresponding individual count value stored for each memory and the abovementioned rules of detection and resolution of contention are applied. The rules for detection and resolution of contention are the same and are based upon the count values of the broadcast message which are stored at each corresponding address location as indicated schematically for machine Mn in FIG. 147.

In a still further embodiment, the individual machines send only a single message to the server machine X which then prepares a broadcast message 95 as schematically illustrated in FIG. 148. In this example, four addresses are simultaneously updated by the message 95 each with their individual content. Thus the broadcast or group message 95 has a single count value, in this example 57, and the group message is broadcast to all application running machines M1, M2. Mn by the server machine X. The single count value of the group message 95 is compared with the corresponding individual count value stored for each memory and the abovementioned rules of detection and resolution of contention are applied. The rules for detection and resolution of contention are the same and are based upon the count value of the broadcast message which is stored at each address location as indicated schematically for machine Mn in FIG. 147.

Preferably, as indicated in FIG. 148, the count value 57 which becomes the single count value broadcast, is chosen as the highest magnitude count value present for the four addresses. The highest magnitude count has the advantage that it is less likely to encounter contention than a count value of lower magnitude. The result of the transmission of the updating signal of FIG. 148 is illustrated in FIG. 149 where it will be seen that each of updated memory locations has the same count value.

It will be apparent that the grouping together of updating messages so as to provide a group message 95 as indicated in FIG. 146 or FIG. 148, substantially reduces both the number of messages and total volume of data being sent over the network 53 and thus lightens the load on the network 53.

XIX. Exemplary Embodiment of System and Method for Contention Detection with Data Consolidation Co-pending U.S. Patent Application Ser. No. 60/850,715 filed Oct. 9, 2006 describes aspects of a system and method for contention detection with data consolidation which may be used in conjunction with the instant invention.

It will also be apparent that the abovementioned arrangement substantially increases the volume of memory required since the storing of a count value, for example a 32 bit number, occupies substantial memory space which approaches that of the space occupied by the content itself. This is less than ideal. There are a number of strategies which are able to be adopted in order to reduce this demand for memory and thus result in a modified and consolidated data structure. These strategies utilize the fact that during the processing of the application program, there are many more memory reads than memory writes and thus writing is relatively infrequent compared with reading. In practice, for many application programs there are bursts of writing activity followed by lengthy pauses where no writing activity occurs at all.

As a consequence, a first strategy is that if there are no updating memory messages being sent for some predetermined period of time, then the count value at each address location can be deleted and the memory thereby consolidated. When the next incoming updating message is received, it is then necessary to re-initialise the count value of each of the address locations and to set the re-initialized count value at zero. In particular, the server X is able to supervise or co-ordinate this activity and so ensure that the count value of the updating message is consistent with this, for example, by having a count value of one.

The abovementioned strategy can also be adopted at those times where the local CPU or similar processing logic of the local machine is not busy and thus the data consolidation of the count value is undertaken as a housekeeping function.

Additionally, or alternatively, the housekeeping consolidation of memory can be carried out in the event that the available spare memory is low and thus it is desirable that memory be consolidated in order to make way for further legitimate needs for memory.

It is also possible that instead of deleting the 32 bit count value, it can instead be set to zero and reduced in size to a single bit. Then in the event that the count value is increased from zero to one, then the size of the memory allocated to the count value is also increased from one bit to 32 bits again.

Figure 150:
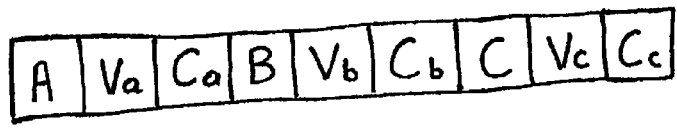
FIG. 150 illustrates yet another data format.
Figure 151:
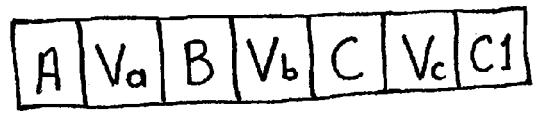
FIG. 151 illustrates a still further data format.

The arrangements illustrated in FIG. 146 and FIG. 148 can be respectively indicated in a more general fashion in FIG. 150 and FIG. 151 respectively. In FIG. 150 an updating signal 195 is formed from a series of updating messages each of which has its own address, content or value, and count value. Thus the message 195 of FIG. 150 is formed from address A, the new value Va with which address A is to be updated and a count value Ca corresponding to address A. Similarly, the next message in the series provides address B, the new value Vb with which address B is to be updated, and a contention count Cb for address B, and so on for the next address C, and subsequent addresses.

However, the updating message 295 of FIG. 151 groups together all the addresses to be updated and updating values, namely A, Va; B, Vb; C, Vc and so on but provides only a single count value C1. A particular example of the storing of the updating count value will now be described. It is desirable to store the count value as an unsigned byte value such as 8 bits and use a counter of finite length. It is well known such an 8 bit counter can have 256 values ranging from a minimum of zero to a maximum of 255. Such an arrangement works well in circumstances such as those where the maximum count value does not exceed 255.

XX. Exemplary Embodiment of System and Method for Contention Detection with Counter Rollerover Co-pending U.S. Patent Application Ser. No. 60/850,540 filed Oct. 6, 2006 describes aspects of a system and method for contention detection with counter rollerover which may be use din conjunction with the present invention.

If the count value will exceed 255 then one solution utilizing a "brute force" technique is to increase the maximum size of the count value. As is well known, this increases to $2^y-1$ where y is the number of bits. Thus where y is 8 above the maximum count value is $2^8-1=256-1=255$. Where y is 9 the maximum count value is $2^9-1=512-1=511$, and so on.

This solution works satisfactorily if the volume of the updating in the application program 50 is not high. However, with increasing y so the volume of data incorporated in the updating count and to be transmitted over the communications network 53 increases. It is, in general, desirable to minimise this volume of transmitted data as much as possible. For this reason it is desirable to maintain y relatively small, for example y=8 is desirable, and develop various strategies to ensure the correct operation of the count value, and utilise at least one of them.

If an 8 bit unsigned byte value for the stored count value is used, and no strategy is adapted to ensure the correct operation of the count value, then the following situation arises. Initially all operates correctly and the stored count values increase in value. However, when the highest count value exceeds 255, instead of storing 256, 257 or some similar number, the stored count is 0, 1 or the like. As a result the abovementioned rules of writing to memory if carried out can result in later received, earlier sent data being overwritten onto later sent, earlier received data. In fact the multiple computer system is deceived into thinking that the data is correctly updated. The result is chaos, or at least uncertainty, with the memory locations of the various computers which should be the same, in fact having differences caused by "stale" values.

A simple strategy to overcome this is to check from time to time the highest current count value. When this count value reaches a number such as 250, near to the maximum value of 255, then all processing is temporarily halted. At the initiation of the temporary halt in processing, all memory locations which should be coherent (i.e. have the same value) are coherent. During the halt in processing, all counters for that (or those) memory location(s) which have a count value of 250 are re-set to zero. Once this re-setting is accomplished, the halt is terminated, and processing resumes. This cycle of events is repeated each time the highest count value reaches the predetermined threshold (250 in the above described example).

This strategy is simple to implement but suffers from the disadvantage that overall processing speed is slowed because of the need to call a halt from time to time.

A second strategy, which also involves data consolidation and which is also easy to implement, is to call a temporary halt to processing at regular predetermined time intervals, say every second, or every 5 seconds. Again during each processing halt all counters storing a count value are re-set to zero. This second strategy suffers from the same disadvantage as the first strategy.

Figure 152:
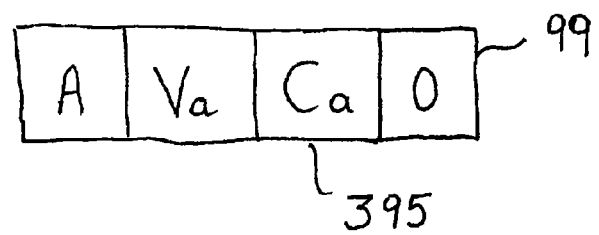
FIG. 152 illustrates a data format similar to FIG. 150.
Figure 153:
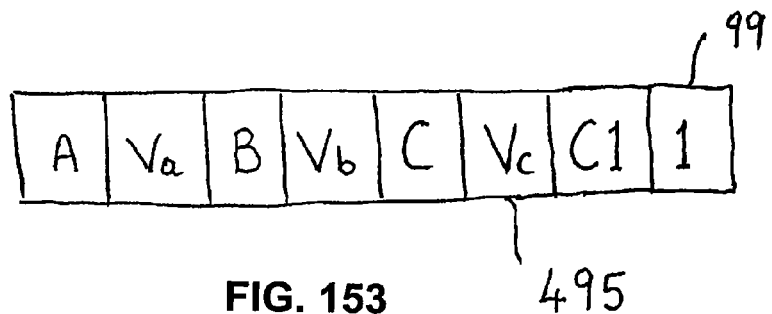
FIG. 153 illustrates a data format similar to FIG. 151.

A third, and improved strategy, is to provide the 8 bit unsigned byte counter as before but to also provide an additional bit of memory storage. This bit is conveniently termed a "rollover" bit and is also transmitted along with the updating signal/packet. The bit values are "zero" and "one" which are conveniently referred to as "LOW" and "HIGH". Using this strategy, the individual and group updating signal/packet are as illustrated in FIG. 152 and FIG. 153 respectively. Thus the individual updating signal/packet 395 includes the address A, value or content Va, and updating count value Ca as before, but in addition also includes the count bit 99 which in this instance is zero signifying LOW.

LOW here means that the count value Ca has not yet reached the maximum possible value of 255. As a consequence, when the updating signal/packet 395 is received by all the machines the normal rules for writing to memory described above are followed.

For the group updating signal/packet 495 as illustrated in FIG. 153, the addresses A, B and C are as before, as are the contents or values Va, Vb, and Vc corresponding to those addresses. However, the count bit 99 is a logical one meaning that the count value C1 has exceeded the value of 255 and rolled over. For example if the maximum count of 255 had been exceeded by 5 the count value C1 would be 4 and the count bit is set to 1 or HIGH to signify this rollover.

Where the count bit 99 is set to 1 it is necessary to modify the rules for content overwriting described above. For example, suppose an updating signal/packet 495 with C1=4 and count bit 99=1 is received first, and an earlier updating signal/packet 495 with C1=254 and count bit 99=0 is received second. Using the normal rules the signal/packet with C1=254 would be presumed to be later than the signal/packet with C1=4 and so would overwrite the earlier received content, thereby generating a false situation.

Instead, the fact that count bit 99 is equal to 1 is recognised and the normal comparison between count values is modified to add 255 to the count value 4 before the count value 254 is compared with it. This comparison is carried out using, say, 9 bits and not 8 bits so 255+4 equals 259 and not 3. Preferably, this comparison is carried out in hardware rather than in software. If this modification is carried out then the correct result for the comparison is obtained and no overwriting of memory by the earlier sent and later received signal/packet takes place.

Clearly, the count bit 99 progressively changes from 0 to 1, and from 1 to 0, and so on. Then if both the received signal/packets have the same count bit 99 (i.e. both zero or both 1) then no change to the normal rules takes place. The above described modification should only take place if one of the received count bits 99 is 1 and the other is zero.

Those skilled in the communication arts will appreciate that the network 53 does or may include a "queue of undelivered messages". Normally the queue is short being only 0, 1, 2, 3 or so messages. However, at periods of high demand on the network 53 the queue of undelivered messages can lengthen considerably. Furthermore, there is no guarantee that the messages in the queue are delivered in the same order (or even approximately the same order) in which they were initiated or sent. Thus a recently sent message may be quickly delivered and effectively jump over the queue.

What should preferably be avoided is the situation where for a specific memory location, (i) an early sent but undelivered message has a count value of say 3 and a count bit 99 of value 0, (ii) that count value rapidly increases in value (as can happen especially with the data format embodiment of FIG. 153) and so successive messages have count values/count bits of say 53/0, 253/0, 13/1, 193/1, and 23/0; and (iii) the message with the count value/count bit of 23/0 is received before the delayed message having the count value/count bit 3/0. If this happens, the content of the memory location in question cannot be guaranteed to be in a regular state.

This situation then provides the answer to the question as to what size should the unsigned count number be? So long as this number exceeds (and preferably by a comfortable margin) the maximum expected network queue (or queue length), the rollover mechanism described above will work correctly and unobtrusively. In the above it will be understood that reference to "incrementing" and "increment" include within their scope "decrementing" and "decrement" since to decrement by 1 is the same as to increment by minus 1.

As the count values for a given memory location progressively increase, the maximum count value (255 in this example) is exceeded and the count bit 99 changes from zero to 1, or if already 1 to zero. This cycle repeats endlessly.

In a further embodiment, the count bit is stored not for each memory location but instead for a group of memory locations. In this circumstance the situation arises where one of the memory locations is updated more frequently than all the others. When an updating message with a changed count bit 99 is received for this memory location, all the counts of the other memory locations are re-set to zero. This is effectively advancing the count of these other memory locations to the point where it rolls over to be consistent with the newly received and stored count bit 99 for the entire group of memory locations. This embodiment is more convenient when using the condensed message format embodiment of FIG. 153.

XXI. Exemplary Embodiments for Contention Resolution with Echo Cancellation and Advanced Contention Detection Co-pending U.S. Patent Application Ser. No. 60/850,521 filed Oct. 9, 2006 describes aspects of a contention resolution with echo cancellation. Co-pending U.S. Patent Application Ser. No. 60/850,711 filed Oct. 6, 2006 describes aspects of an advanced contention detection which may be used with the present invention.

Turning now to FIG. 154-FIG. 159, a still further problem in relation to a multiple computer system will now be described, the problem being that of "echoes" in memory updating.

Figure 154:
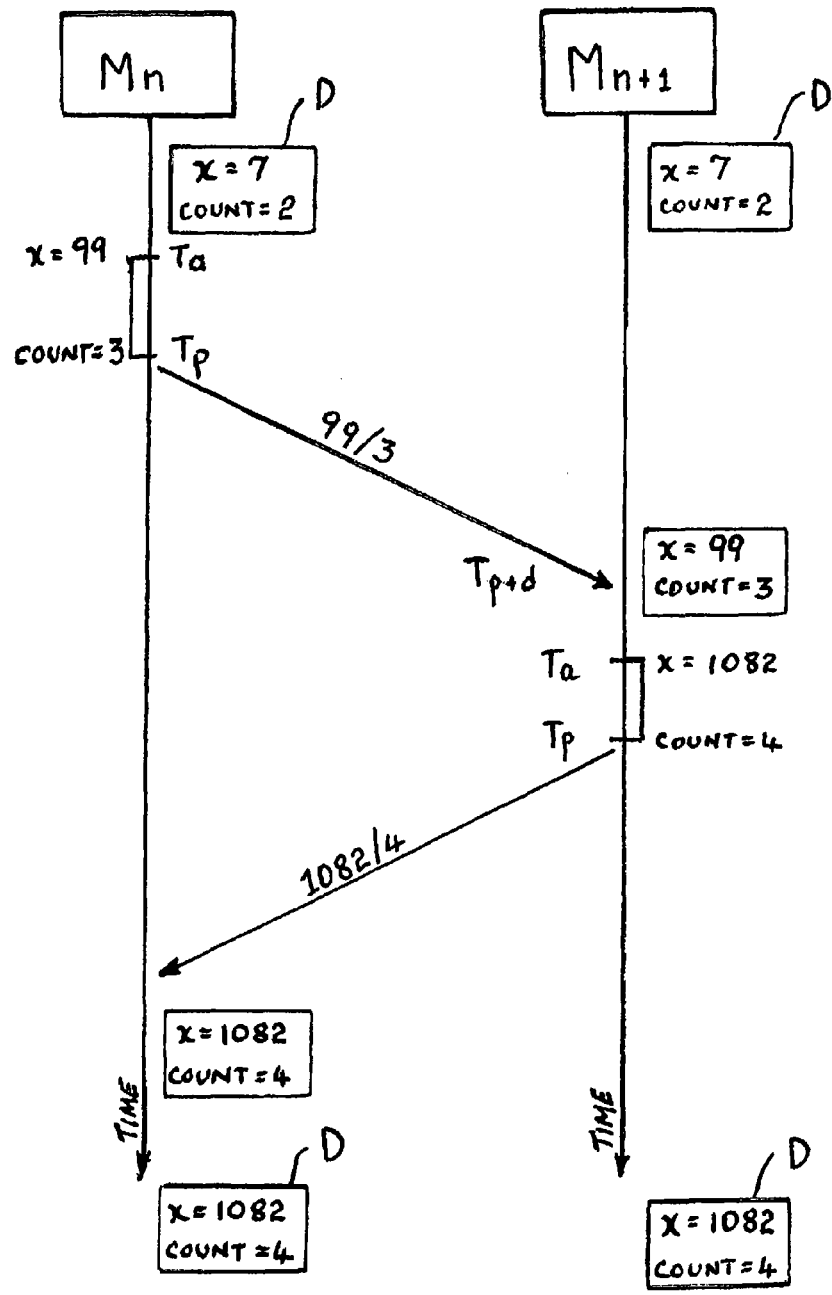
FIG. 154 is a timing diagram illustrating uneventful updating message propagation.

As seen in FIG. 154, two machines Mn and Mn+1 of a multiple computer system initially have identical memory locations D each of which has a value of 7 (but which could equally be some other content such as code instructions) and a count value of 2. FIG. 154 illustrates time extending from the top of the diagram towards the bottom. At some moment during the processing being carried out by machine Mn, a new value for memory location D is generated, the new value being 99. There are two distinct times inherent in the propagation of the new value of 99 to all other machines. The first time Ta is the time at which machine Mn is alerted by its DRT 71 to make the propagation. The second time Tp is the time at which the actual propagation is initiated by machine and a new count value, 3 in this example, created. The delay between the two times Tp and Ta may be as small as a nanosecond or as large as a second. This delay depends very much upon the computational load of the machine Mn at the relevant time.

The message to update the content of memory location D is sent from machine Mn to machine Mn+1 by means of the network 53 and arrives at the machine Mn+1 at a time Tp+d where d is the delay inherent in the network for the propagation to take place. Thereafter the content of memory location D is changed in machine Mn+1 to be the same as machine Mn, namely a value of 99 and a count of 3.

At some time thereafter, machine Mn+1 carries out further processing which results in a new value being written into memory location D, the new value being 1082 and the new count value being 4. At time Ta machine Mn+1 is alerted to propagate the new value and at a further time thereafter Tp the new value is actually propagated and subsequently arrives at machine Mn where the previous value of 99 is overwritten by the new value of 1082 together with the count value of 4.

That is to say, in the circumstances illustrated in FIG. 154, the inherent delay between the creation of an alert and the initiation of a propagation has not adversely impacted upon the intended correct functioning of the multiple machines.

Figure 155:
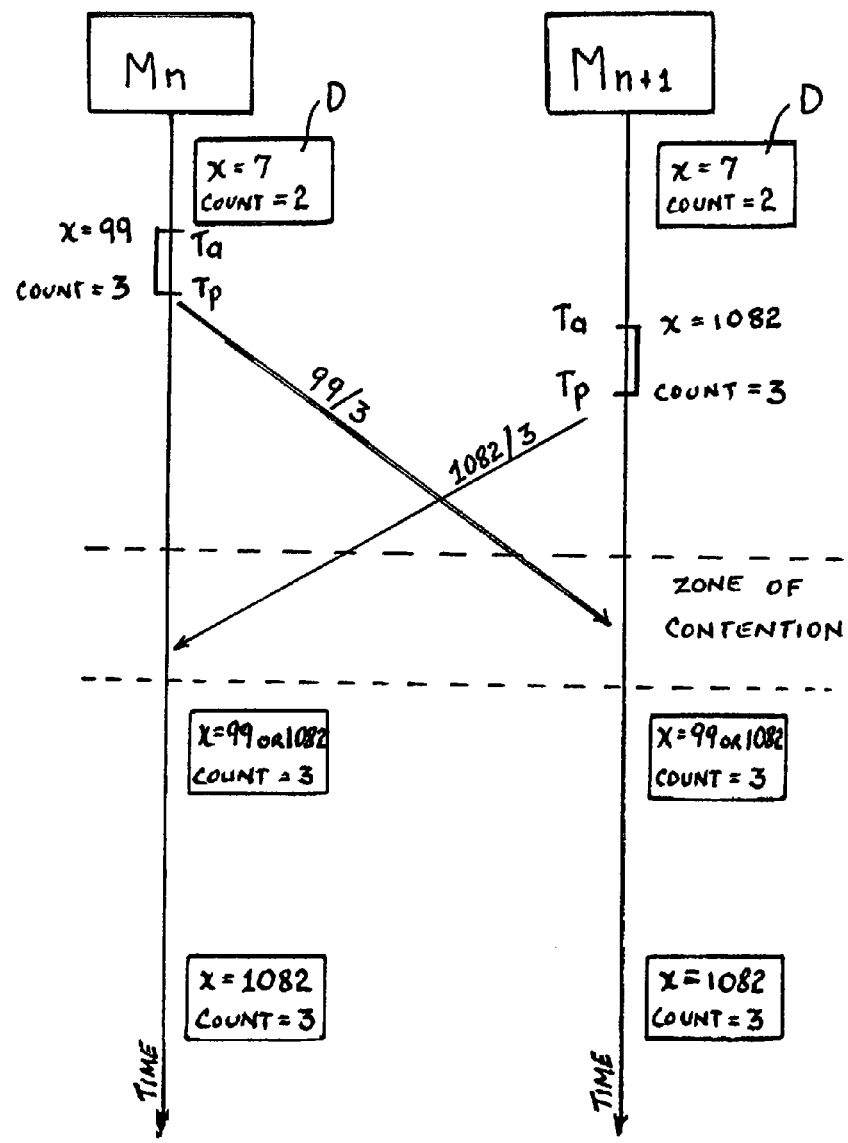
FIG. 155 is a timing diagram similar to FIG. 154 but illustrating contention.

However, this is not always the case and in FIG. 155 an alternative situation is illustrated. In FIG. 155 initially both machines have the content 7 for the memory location D and a count value of 2. As before, at time Ta machine Mn is alerted to change the content of memory location D to 99 and at a time Tp actually propagates the new value together with the new count value of 3. However, before time Tp+d at which the new value for X of 99 arrives at machine Mn+1, machine Mn+1 has by carrying out its own processing changed the value of X to 1082. Thus machine Mn+1 is alerted to carry out the propagation and initiates the propagation prior to the time Tp+d.

As a consequence, machine Mn+1 experiences a contention in that the value for memory location D can be either 99 or 1082, in each instance the count value being 3. Similarly, for machine Mn, the propagating message from machine Mn+1 is received, and the count value of 3 is perceived to be equal to that of the existing count value and thus a contention also arises at machine Mn.

In accordance with the abovementioned rules for contention resolution, a contention is able to be detected and is able to be resolved so that the contents of the memory location D are the same for both machines. However, the question which now arises is whether the resolved content is 1082 or whether it is 99? This will depend in this instance upon whether the higher numbered machine Mn+1 or the lower numbered machine Mn is to prevail.

Figure 156:
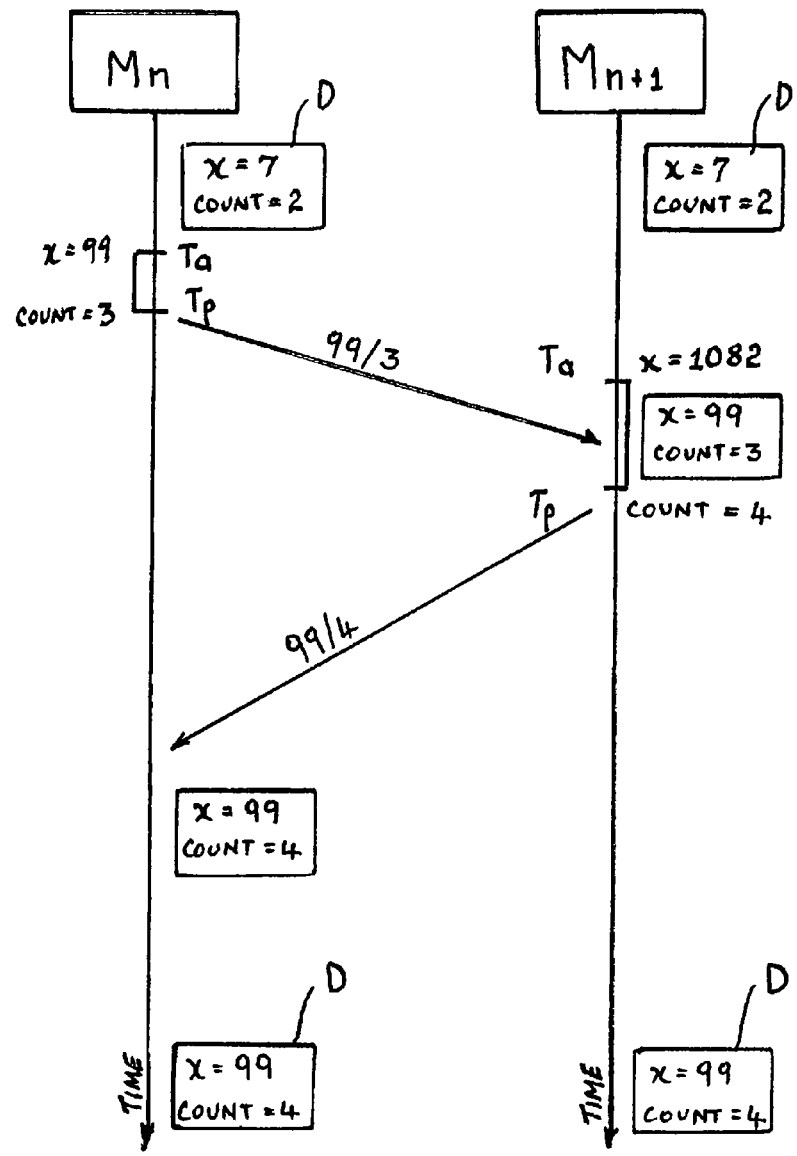

A slightly dissimilar problem, is illustrated in FIG. 156. As before, both machines commence with the value of memory location D being 7 and the count value being 2. Again at time Ta machine Mn is alerted to transmit the new value of 99 for memory location D and this propagation takes place at time Tp and arrives at machine Mn+1 at time Tp+d.

However, shortly before the arrival of the new value of 99, machine Mn+1 by means of its own processing has generated a new value for memory location D of 1082 and has been alerted to propagate the current contents of memory location D. However, before that propagation can be carried out, the new value of 99 is received and is overwritten into memory location D. Therefore, it is this value 99 which is propagated together with the increased count value 4 back to all other machines including Mn.

The consequence is that machine Mn now has received an echo of a value previously sent, namely 99, and has received same with an increased count value of 4. This incoming message is correctly processed and therefore overwrites the existing value (which happens to be the same) and overwrites the count value with the received count value of 4.

Similarly, machine Mn+1 has the received value of 99 for the value for memory location D and the internally generated count value 4. So both machines have a value for memory location D of 99 and a count value of 4. That is to say, although the memory is coherent, it is "stale" since all machines have an incorrect value in memory location D (since the correct value should be 1082).

Figure 157:
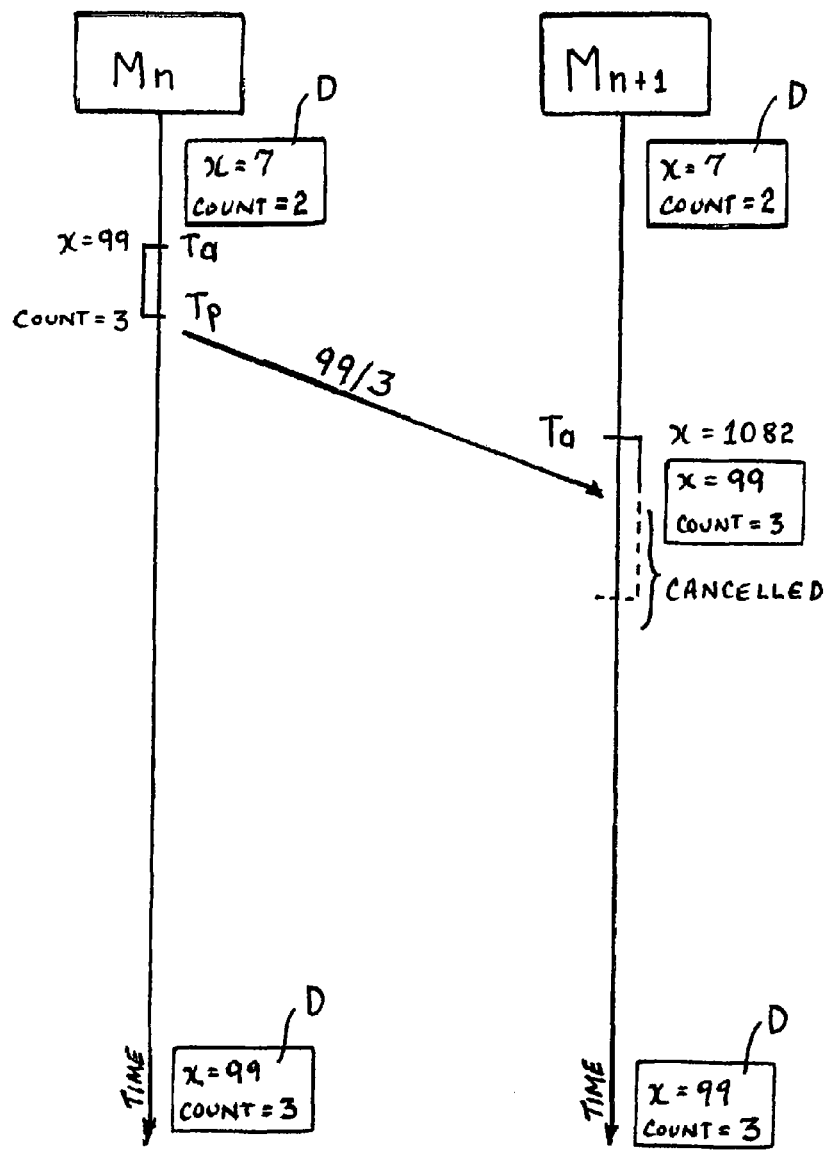

Turning now to FIG. 157, a first solution to the echo problem described in FIG. 156 is disclosed. The same timing situation as in FIG. 156 is present in FIG. 157 with the delayed propagation from machine Mn reaching machine Mn+1 at a time Tp+d after machine Mn+1 had already been alerted with a new value. For this solution, the operation of all of the machines is changed to ensure that after receipt of a propagating message, the receiving machine is to check to see if it is in a state alerted to carry out a propagation. If the answer to this check is yes then the receiving machine is "de-alerted" thereby preventing the intended propagation from being carried out. Naturally if the answer is no, then normal operation is resumed.

This is the situation illustrated in FIG. 157 where the alert to propagate the new value 1082 is cancelled and instead the received value of 99 is written into memory location D for machine Mn+1 and, in addition, the received count value of 3 is also written into the memory at memory location D.

As a consequence of this modification, the echo is prevented, and all machines are coherent having the same content (namely number 99) for memory location D and the same count value. But that value and count are "stale" in the sense that the latest values are the numbers 1082 and 4 respectively and, depending upon the nature of the application program 50, this may or may not be disadvantageous.

Figure 158:
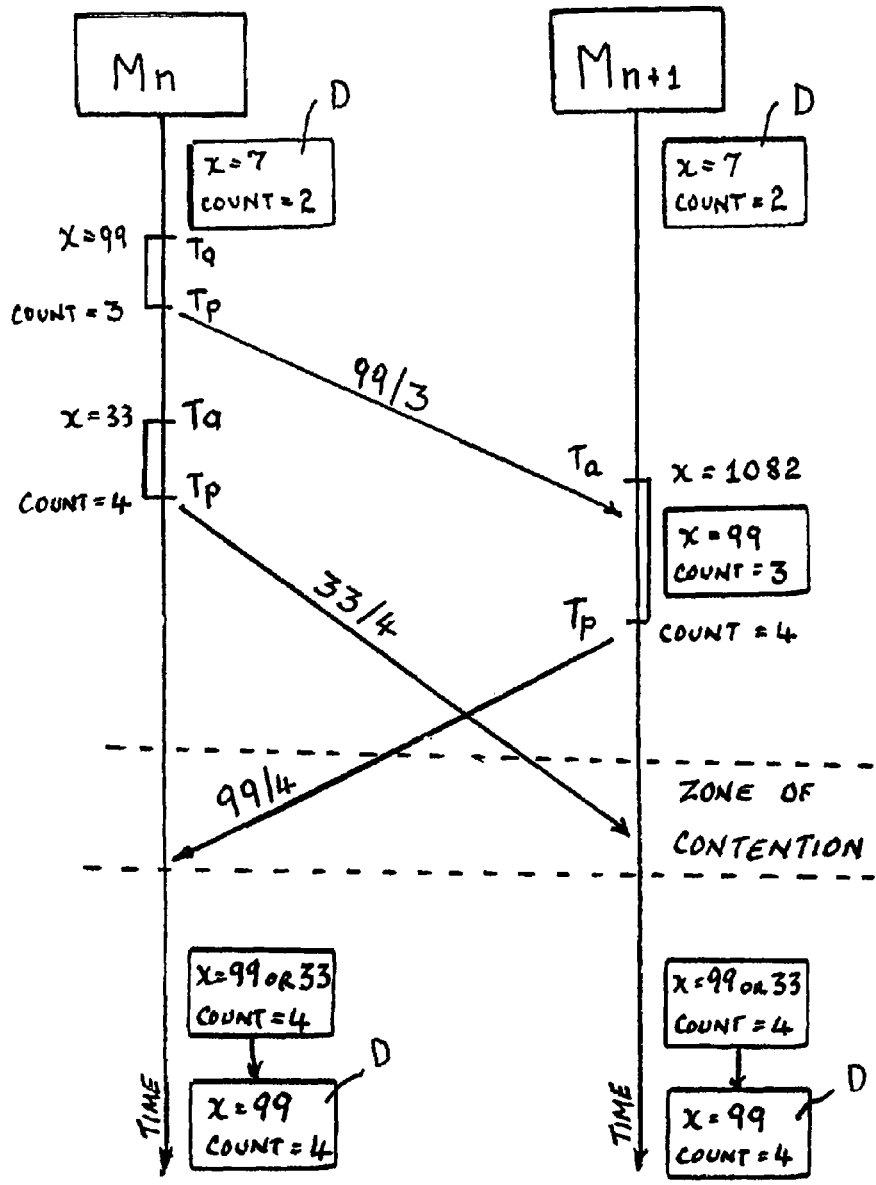

A slightly more complex problem than that illustrated in FIG. 156 is illustrated in FIG. 158. In FIG. 158, as in FIG. 156, the new value of 99 for memory location D is received at machine Mn+1 after that machine has been alerted to propagate its new value 1082 but before that propagation can take place. As a consequence, as in FIG. 156, the propagation from machine Mn+1 is the echo value 99 together with the count of 4 incremented as a result of the processing of machine Mn+1.

In the meantime, the processing being carried out by machine Mn has resulted in a new value of 33 for the memory location D together with an increased count value of 4. This new value of 33 is propagated by machine Mn and thus a contention is detected between the memory contents of both machines. Since the number of machine Mn+1 is greater than the number of machine Mn, then machine Mn+1 prevails in accordance with the abovementioned contention resolution rules. Thus the stale echoed contents of 99 are written into the memory location D on all machines. Again the result is a coherent but "stale" memory which may, or may not, be disadvantageous.

A solution to the abovedescribed situation will now be described in relation to FIG. 159.

Figure 159:
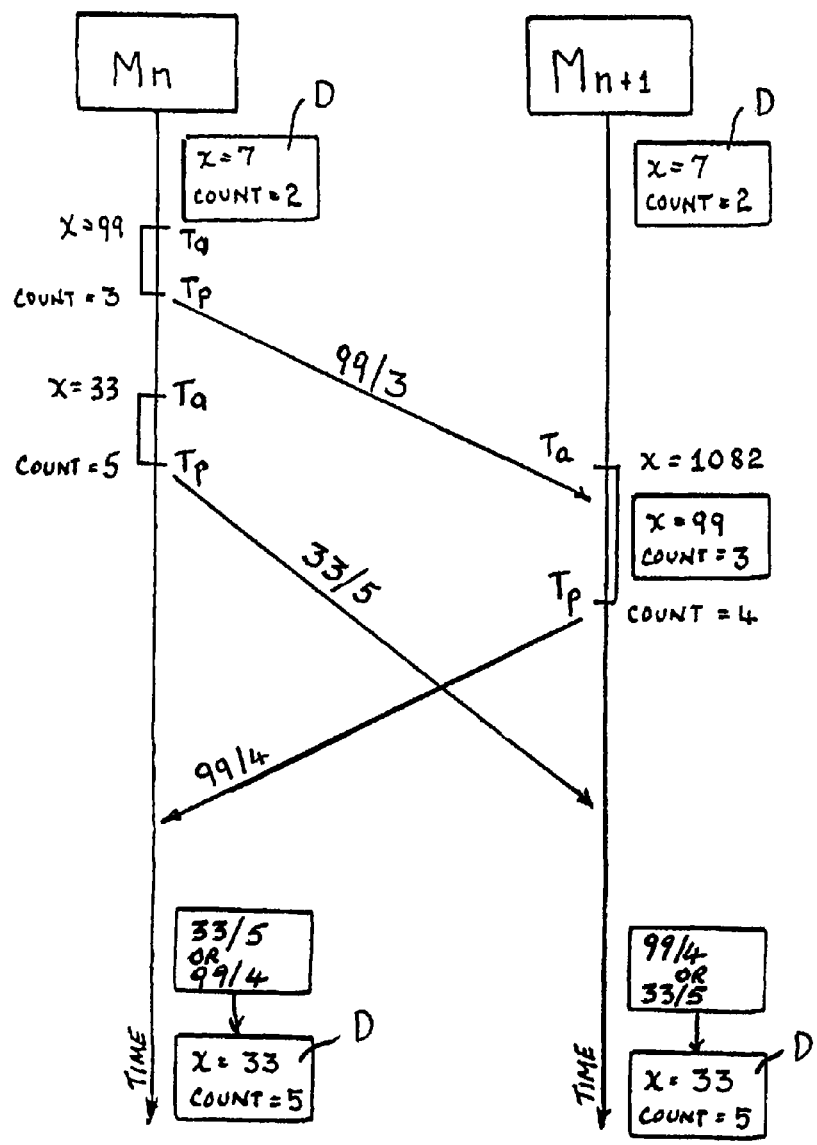

As seen in FIG. 159, the initial actions are the same as in FIG. 158 in that machine Mn+1 transmits an echo back to all other machines including machine Mn, the echo having a value for memory location D of number 99 and a count value of 4. However, in the arrangement of FIG. 159, the operation of all machines has been modified by means of the introduction of a simple rule, namely that where a machine is about to propagate a new value for a memory location, and that machine was the machine which generated the previous value for the same memory location, then the count value for the newly generated memory is not increased by 1, but instead is increased by 2 (or at least 2).

As a consequence of this new rule, the new value of 33 for memory location D is propagated by machine Mn as before but now with a count value of 5. This has the consequence that instead of a state of contention being created by the new substantially simultaneous transmission of the echo value of 99 and the correct value 33, the correct value 33 prevails because it has the higher count value and so no contention arises. Thus the memory is both coherent and "fresh" and the echo rather than being cancelled is able to be disregarded.

Clearly the above arrangement can also be made to operate such that the normal increment to the updating count is, say 2, and the echo suppressing increment to the updating count is 3 (or 4, or more than 4).

The foregoing describes only some embodiments of the present invention and modifications, obvious to those skilled in the computing arts, can be made thereto without departing from the scope of the present invention. For example, reference to JAVA includes both the JAVA language and also JAVA platform and architecture.

Also for example, instead of using a counter which increments from 0 to 255, a counter which decrements from 255 to 0 can be used together with the appropriate changes mutatis mutandis known to those skilled in the art. In this connection a decrement of, say 1 or 2, is equivalent to an increment of −1 or −2.

It will also be apparent to those skilled in the art, that rather than incrementing the count value for successive messages, the count value could be decremented instead. This would result in later messages being identified by lower count values rather than higher count values as described above.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (eg "globalname7787"), and with the understanding that each machine relates the global name to a specific local name or object (eg "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (eg memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(xi) re-compilation at loading,
(xii) a pre-compilation procedure prior to loading,
(xiii) compilation prior to loading,
(xiv) "just-in-time" compilation(s), or
(xv) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to memory updating means and/or memory replicating means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore includes a computer program product comprising a set of program instructions stored in a storage medium or existing electronically in any form and operable to permit a plurality of computers to carry out any of the methods, procedures, routines, or the like as described herein including in any of the claims.

Furthermore, the invention includes a plurality of computers interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system.

XXII. Exemplary Embodiment of Multiple Processor Tagging System Using Per-Processor Tags Co-pending U.S. Patent Application Ser. No. 60/877,865 filed Dec. 29, 2006 describes aspects of a system, device, and method for tagging. Co-pending U.S. Patent Application Ser. No. 61/008,469 filed Dec. 19, 2007 describes aspects of a system, device, and method for multiple processor tagging system using per-processor tags. Co-pending U.S. Patent Application Ser. No. 10/830,042 filed Apr. 23, 2004 also describes a limited set of embodiments utilizing tags and tagging. Each of these applications and invention may be used in conjunction with the present invention and are hereby incorporated by reference.

In one aspect, this invention relates to an improved means of implementing tagging and to tagging on a per-processor basis, and more particularly to per-processor tags and tagging for application programs and multi-threaded applications operating on a plurality of machines in a replicated shared memory arrangement such that for each processor on a given machine in a multiple computer system. In one aspect, this invention relates to an improved means of implementing tagging.

More specifically, this invention relates improvements and enhancements to tags and tagging, including application programs operating on a plurality of machines in a replicated shared memory arrangement, where a means is disclosed of implementing tagging on a per-processor basis, such that for each processor on a given machine in a multiple computer system (or processing unit or some other grouped subset of processors), there is an independent region of memory to store indications of which memory locations have been written by the processor (or processing unit).

The approach described in the co-pending Application Serial No. Attorney Docket No. 5027B includes a general tagging technique for storing write-indications to main memory which indicate one or more memory locations as having been previously written. Though the tagging technique disclosed in this co-pending application is operable for both single processor and multiple processor machine arrangements, at least some specific advantageous methods and techniques for performing tagging on a multiple processor machine that are described here were not disclosed in that application.

With the increasing availability and proliferation of multiple processor machines, such as in the form of Symmetric Multi-Processor machines (or SMPs) and multi-core CPUs comprising a plurality of processors on a single integrated circuit and operating in a SMP arrangement, it is desirable to conceive of an optimized means of performing tagging and write-indication operations for such multiple processor machines. Thus it is the goal of the present invention to conceive of such an improved tagging arrangement for multiple processor machines.

Figure 160:
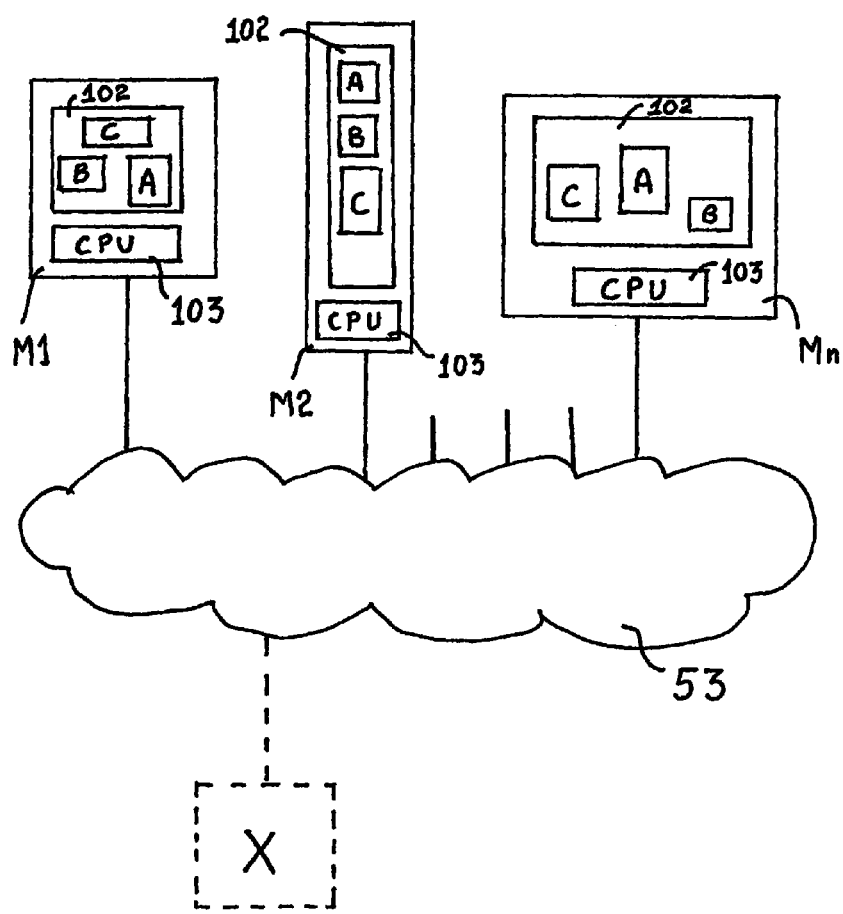

FIG. 160 is a schematic diagram of a prior art replicated shared memory system. In FIG. 160 three machines are shown, that is machines M1, M2, . . . Mn. Additionally, a communications network 53 is shown interconnecting the three machines and a preferable (but optional) server machine X which can also be provided and which is indicated by broken lines. In each of the individual machines, there exists a memory 102 and a CPU 103. In each memory 102 there exists three memory locations, a memory location A, a memory location B, and a memory location C. Each of these three memory locations is replicated in a memory 102 of each machine.

This conventional arrangement of the replicated shared memory system allows a single application program written for, and intended to be run on, a single machine, to be substantially simultaneously executed on a plurality of machines, each with independent local memories, accessible only by the corresponding portion of the application program executing on that machine, and interconnected via the network. In International Patent Application No. PCT/AU2005/000580 published under WO 2005/103926 (and to which U.S. patent application Ser. No. 11/111,946 Attorney Code 5027F-US corresponds) a technique is disclosed to detect modifications or manipulations made to a replicated memory location, such as a write to a replicated memory location A by machine M1 and correspondingly propagate this changed value written by machine M1 to the other machines M2 . . . Mn which each have a local replica of memory location A. This result is achieved by the preferred embodiment of detecting write instructions in the executable object code of the application to be run that write to a replicated memory location, such as memory location A, and modifying the executable object code of the application program, at the point corresponding to each such detected write operation, such that new instructions are inserted to additionally record, mark, tag, or by some such other recording means indicate that the value of the written memory location has changed.

Consequently, a background thread task or process is able to, at a later stage, propagate the changed value to the other machines which also replicate the written to memory location, such that subject to an update and propagation delay, the memory contents of the written to memory location on all of the machines on which a replica exists, are substantially identical. Various other alternative embodiments are also disclosed in this prior art. Whilst the above prior method is adequate for application programs which write infrequently to replicated memory locations, the prior art method is prone to inherent inefficiencies in those application programs which write to memory locations utilizing a loop structure.

Figure 161:
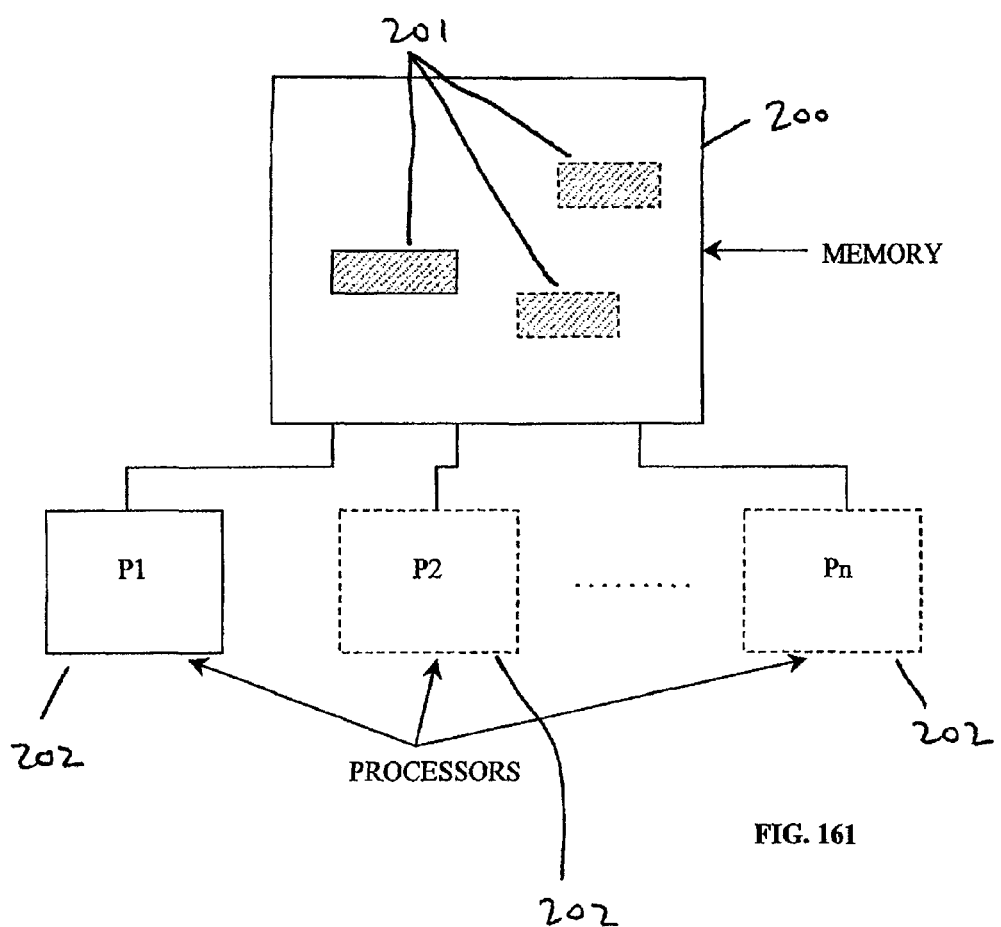

Turning now to FIG. 161. FIG. 161 shows a single computer arrangement of storing write-indications, where one or more processors of a single computing machine store write-indications into one or more memory regions which are shared between all processors (when the single computing system comprises multiple processors). Specifically, a global memory, shared memory, or other system or machine memory 200 is shown, within which there are one or optionally and preferably more than one highlighted regions 201 of memory. These highlighted regions 201 are the memory regions designated to store write-indications of memory locations written to by one or more processors 202. Two regions 201 are shown in dotted outline, and these indicate that in some embodiments more than one region or portion of memory may be used for storing "write-indications" of memory locations written to. For example, in one embodiment, all write-indications of written memory locations of one type are stored in one portion 201, whereas all write-indications of written memory locations of a different type are stored in a different portion 201.

FIG. 161 also shows a processor P1 and optional processors P2 . . . Pn (indicated in dotted outline), all labeled as 202. In the arrangement depicted in FIG. 161, processors 202 (which in FIG. 161 comprise a processor P1 and the optional processors P2 . . . Pn) store write-indications of memory locations written by each processor into the one or more memory portions/regions 201.

Figure 162:
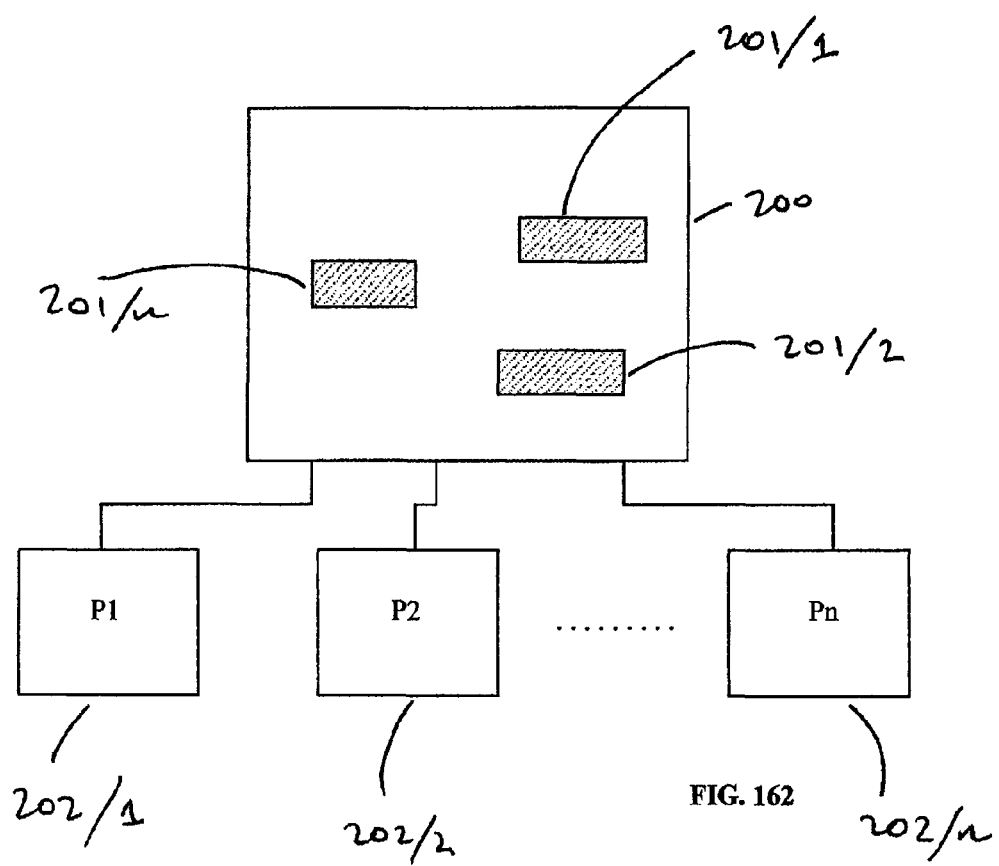

Turning now to FIG. 162. FIG. 162 shows an embodiment of the present invention, whereby a multiple processor machine is shown with a memory 200 and one or more processors 202. Specifically, FIG. 162 depicts 'n' processors, indicated as processor P1, P2 . . . Pn with the labels 202/1, 202/2, and 202/n respectively. Also, FIG. 162 indicates three memory regions 201/1, 201/2, 201/n.

Specifically, for each processor 202 (or some subset of total processors 202) of FIG. 162 operating in a single multiple-processor machine arrangement, there is associated a private region (or regions) of memory 201 for storing write-indications for each the processor. For example, a write-to-memory operation executed by processor P2 of FIG. 162 to a memory location X, would cause an indication of memory location X having been written to be stored in the private memory region associated with processor P2, which in FIG. 162 is memory region 201/2. Further, independently a second processor Pn may also write to memory location X, and as a result an indication of memory location X having been written is stored in the private memory region associated with processor Pn, which in FIG. 162 is memory region 201/n.

This invention is not concerned with precisely what means or manner a the indication of a written memory location is stored in a (one or optionally more) memory region 201 of a memory 202, so long as the recording means used is able to indicate, label, address, or otherwise identify the written-to memory location (such as a memory location X of the above example). Further, it is a preferred arrangement of this invention that the indications stored to a private memory region 201 (or optionally multiple private memory regions 201) are in the most compact and economical format as is practicable, and further that the memory value written to the written memory location (such as the abovementioned location X) not be stored in the private memory region, but rather only an address or other indications means.

Importantly, whilst each processor has associated with it a private region of memory, it is not a requirement of this invention that the private region of memory be inaccessible by any other processor. Indeed, in a preferred embodiment of this invention, all memory regions 201 are able to be accessed (for example read, and even optionally written to) by all processors, even though each processor 202 only stores indications of memory locations it has written to into its associated private memory region (or regions) 201.

Figure 163:
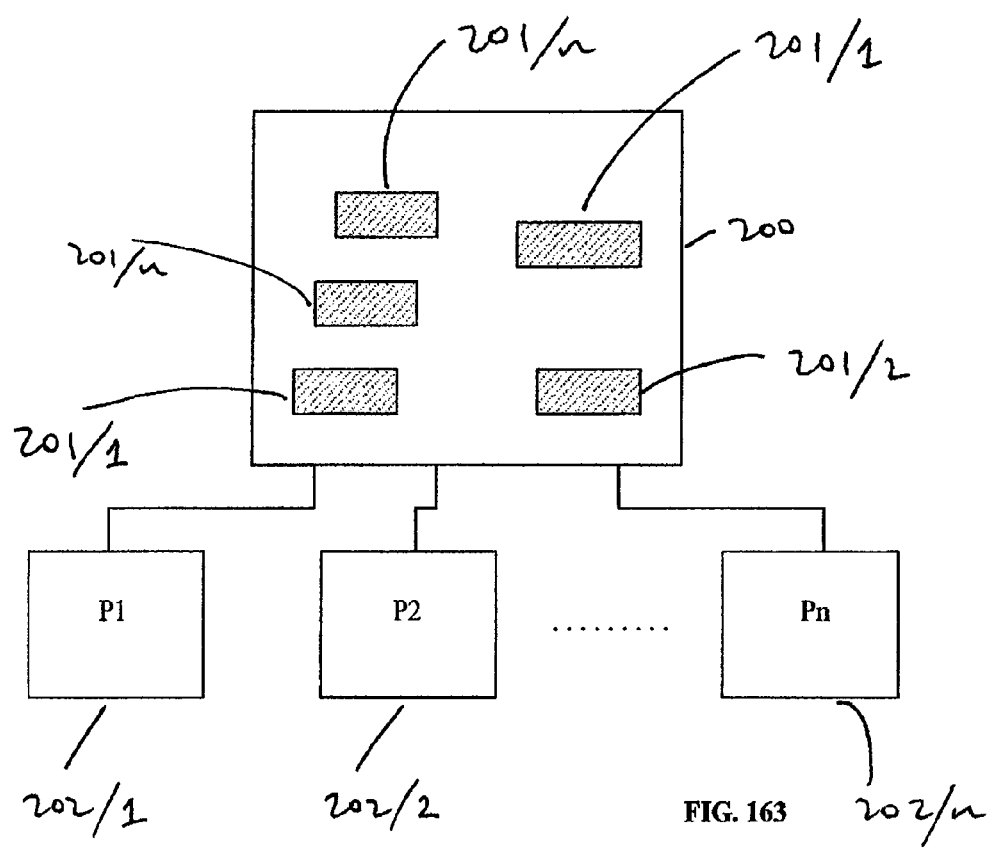

Turning now to FIG. 163. FIG. 163 shows a more sophisticated arrangement of FIG. 162, comprising a plurality of memory regions 201. FIG. 163 shows 3 processors 202/1, 202/2, 202/n as does FIG. 162, and a memory 200 comprising a plurality of private memory regions 201. This figure however, includes an additional 2 private memory regions 201 over the shown memory regions 201 of FIG. 162. These additional depicted private memory regions 201 of FIG. 163 illustrate an alternative arrangement of this invention, whereby each processor 202 is associated with not one private memory region, but optionally more than one.

Specifically, FIG. 163 shows two private memory regions 201/1 associated with processor 202/1. Similarly, two private memory regions 201/n are also shown, and are associated with processor 202/n. Lastly, only a single private memory region 201/2 is shown and is associated with processor 202/2.

Importantly, this invention conceives of arrangements whereby more than one private memory region may be associated with a single processor, and further, that the number of private memory regions associated with each processor need not be equal.

FIG. 163 depicts both such alternative arrangements, wherein processors 202/1 and 202/n have associated with them each more than one private memory region (which are memory regions 201/1 and 201/n respectively), and a third processor 202/2 which is associated with only one private memory region 201/2. The reader will appreciate then, that in the arrangement depicted in FIG. 163, this invention conceives of potentially multiple private memory regions associated with a single processor, and further that each processor in a multiple processor machine may optionally be associated with a differing number of private memory regions (such as a first processor being associated with 1 memory region, a second processor being associated with 2 memory regions, a third processor being associated with 10 memory regions and so forth).

Furthermore, this invention conceives of both the size and number of memory regions with each processor being variable over time. For example, at a first point in time a specific processor may be associated with 3 private memory regions, but at a later second point in time the number of memory regions associated with the specific processor may be different—for example only 1 memory region (or alternatively 10 memory regions).

Additionally, the size of the memory regions, as well as the format, coding, arrangement, /or placement in main memory 200 of the memory regions is not to be restricted by the examples herein. Rather, this invention conceives of any size of memory region (as well as different and variable sizes for different memory regions, or even for the same memory region over time), such as for example 1 byte memory regions or 1 megabyte memory regions. Further, this invention is not limited by a specific format, coding, arrangement, and/or placement in main memory of the memory regions, and any arrangement, placement, format or coding of the memory regions in memory 200 is to be included within the scope of this invention. Further, it is also anticipated that the size, arrangement, placement, and/or format or coding of the private memory regions disclosed above may change over time, and potentially many number of times.

Additionally, the private memory region(s) 201 associated with a given processor 202, may be of as functional or logical queues (such as queues of write-to-memory operations that have transpired on the processor 202), though this need not so. Indeed, in one preferred embodiment the private memory regions are not functionally or logically a "queue" of write-to-memory operations (such as for example a FIFO queue (or some other queue means) which indicates memory locations written to in order of occurrence or some other queue order) and may be an unstructured and/or unordered list or other record of memory locations written by the processor. In a further alternative embodiment though, the private memory regions may be conceived functionally or logically as a queue of written memory locations.

In a further embodiment of this invention for computing architectures comprising multicore Central Processing Units, or multi-threaded/multi-stream central processing units (such as Intel HyperThread CPUs, Sun Niagra, Tera MTA CPUs), private memory region(s) 201 may be associated with a single logical processing means (preferably serial processing means or other serial execution stream), such as a single core of a multi-core CPU, or a single thread/stream of a multi-thread/multi-stream CPU (such as a single logical processor/thread of an Intel Hyperthread CPU, Sun Niagara CPU, or Tera MTA CPU).

Figure 164:
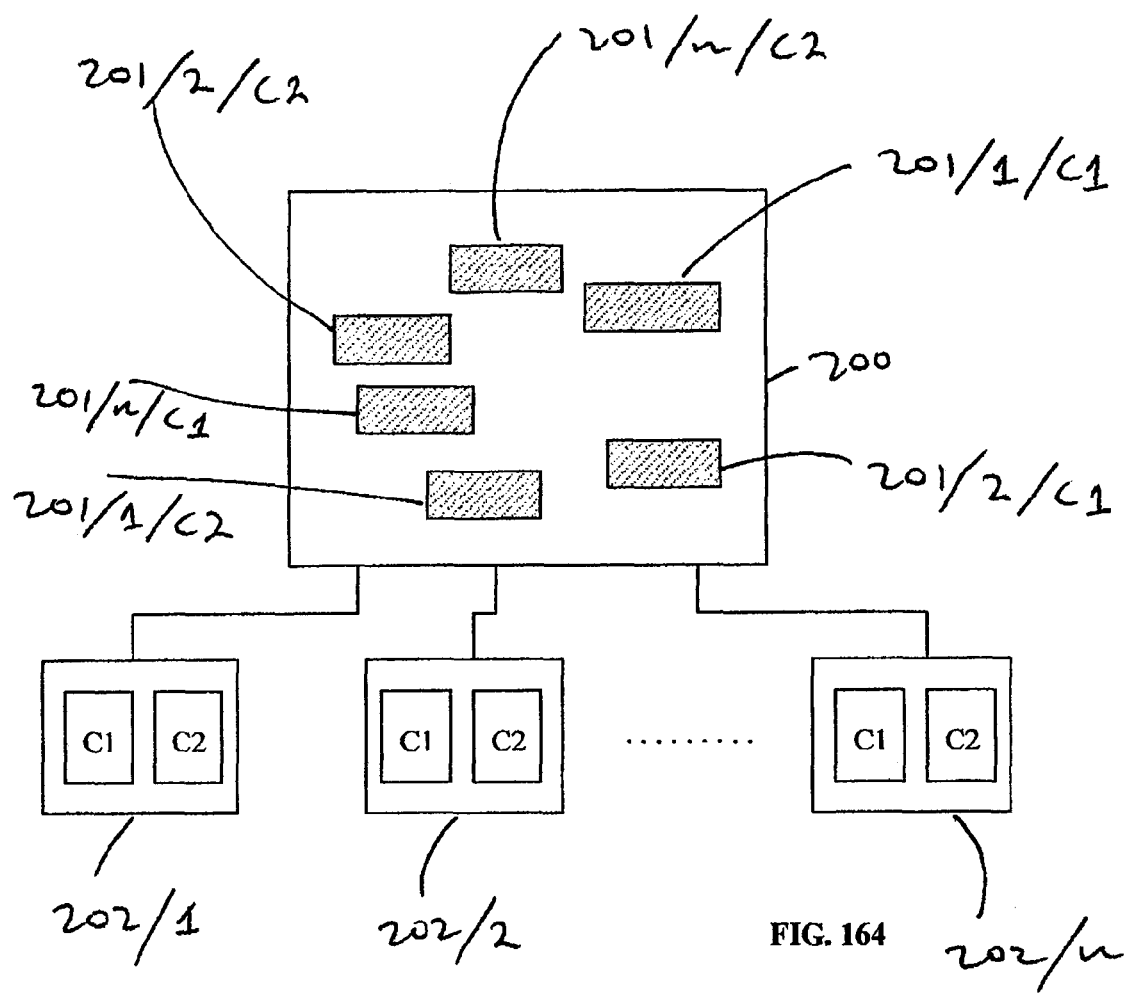

Turning to FIG. 164, a multi-processor, multi-core computing system is shown comprising a plurality of processors 202 and a memory 200, wherein the memory 200 comprises memory regions 201, and where each processor 202 comprises 2 processing cores C1 and C2. Importantly, each of the two cores C1 and C2 of each processing unit are a discreet processing means, and in accordance with this invention are preferably treated as a single logical processing unit. As a consequence, in accordance with this invention there exists in memory 200 a private memory region associated with each of the processing "cores" C1 and C2 of each processing unit 202. Specifically, memory region 201/1/C1 is the memory region associated with the processing core C1 of processing unit 202/1. In a similar manner, memory region 201/1/C2 is the memory region associated with the processing core C2 of processing unit 202/1. It will be obvious to the reader then that for each discrete processing means there is an associated memory region (or optionally regions), and in the context of FIG. 164 where multi-core processing units are indicated, there is a private memory region associated with each processing core (or other logical single processing means).

In a further alternative embodiment of this invention, in some instances it may be desirable to associate a memory region (or regions) 201 with more than one processors or processing (but preferably not all processors). For example, such an alternative envisaged embodiment is shown in FIG. 165.

Figure 165:
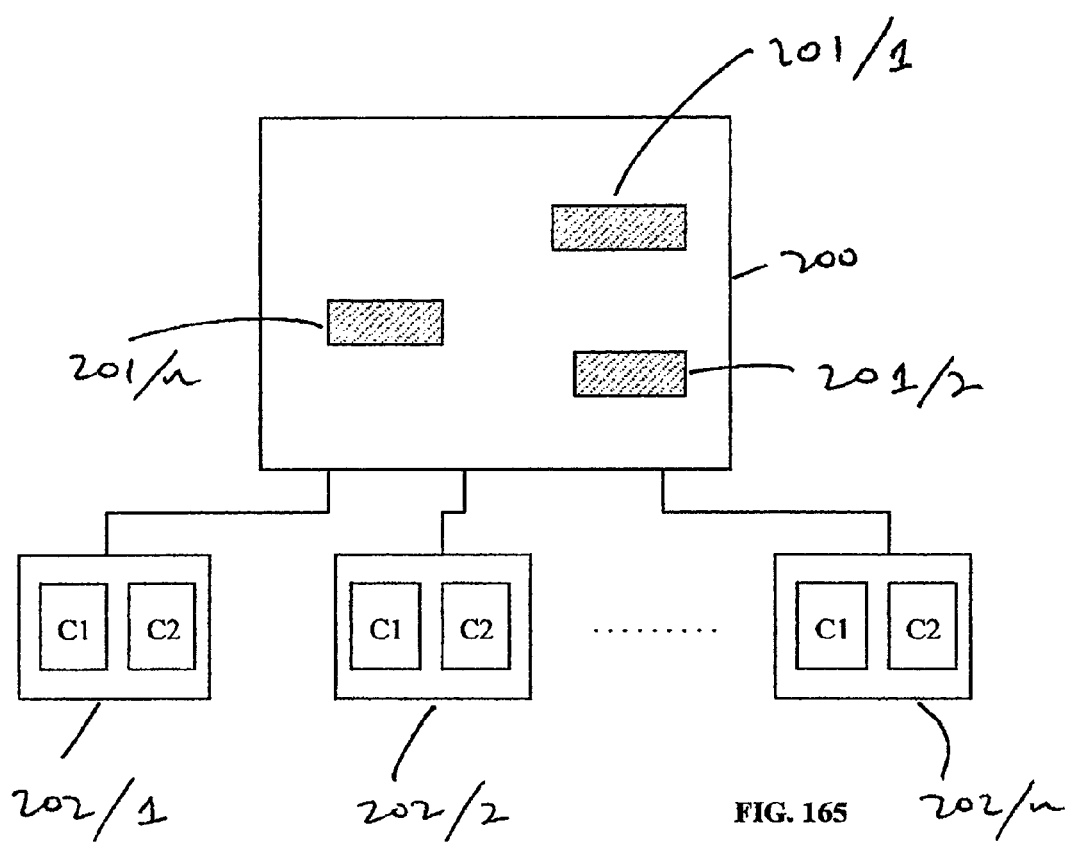

Turning to FIG. 165, a same multiple processor, multiple core computing system of FIG. 164 is shown. Unlike FIG. 164 though, FIG. 165 shows three private memory regions 201/1, 201/2, and 201/n in memory 200. In the arrangement of FIG. 165, each processing unit 202 is associated with one or more private memory regions 201, so for example processing unit 202/1 is associated with private memory region 201/1. Importantly, even though each processing unit 202 contains potentially multiple processing means (which in the context of FIG. 165 are 2 processing cores per processing unit), in an alternative preferred arrangement of this invention, private memory regions may be associated with more than a single logical processing means such as is shown in FIG. 165. The arrangement of FIG. 165 may be desirable in certain circumstances where there are either a large number of processors (or processing means or processing units) in the single computing system, or where it may be desirable to conserve memory 200 by not having a private memory region allocated for every single discrete processing means. This optionally efficient arrangement is achieved in FIG. 165 where there are only 3 private memory regions associated with 6 single logical processing means (that is, cores).

Figure 166:
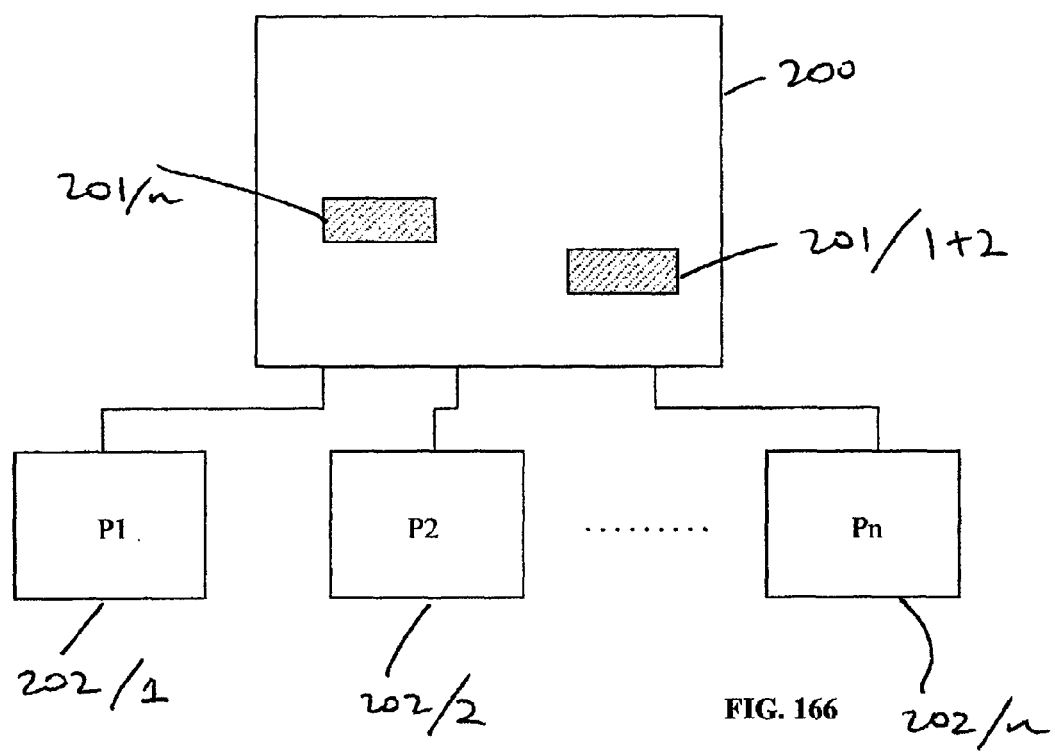

Though FIG. 165 illustrates such a relationship of a single private memory region to more than a single processing means in terms of multi-core processing unit, the scope of this invention additionally includes and anticipates any arrangement whereby a single private memory (or regions) is or are associated with more than one single logical processing means. FIG. 166 depicts this further arrangement.

Turning now to FIG. 166. FIG. 166 shows a multiple processor computing system comprising three processors 202, and a memory 200. Additionally, the reader will observe that within memory 200 there are two private memory regions 201, a first memory region 201/n and a second memory region 201/1+2. Memory region 201/n is associated with processor 202/n, but memory region 201/1+2 is associated with BOTH processors 202/1 and 202/2. Thus, FIG. 166 shows a logically similar arrangement as that of FIG. 165 where a single private memory region (or regions) 201 is associated with more than one single logical processing means.

Importantly, from the above examples it can be determined by the known association between a memory region 201 and a processor 202, that if a memory region 201/n indicates that a memory location X has been written, that it can be deduced that the memory location X was written to by processor 202/n due to the fact that memory region 201/n stores the indication of memory location Lx having been written, and memory region 201/n corresponds to processor 202/n.

Those skilled in computing arts and familiar with this invention will be aware of alternative arrangements of the above invention without departing from the scope of this invention. All such alternative arrangements are to be understood to be included within the scope of the present invention.

It may be appreciated in light of the description provided here that in one aspect, embodiments of the provide a method, wherein each processor (or other processing means) is associated with an independent region of memory in which to store the indication or identifying means corresponding to write operations performed by same processor.

In another aspect, embodiments of the invention provide a method, wherein tagging operations store an indication of a written memory location, and wherein the stored indication is in a region of memory corresponding to the micro-processor on which an associated write operation took place, whereby for each processor executing or able to execute the application program, there is a private region of memory for storage of the indications.

In one arrangement of this invention, the memory regions Mn are accessible by all machines. In another alternative arrangement of this invention, the memory regions Mn are not accessible by all machines. In a further alternative arrangement of this invention, the memory regions Mn are all the same size. In a further alternative arrangement of this, the memory regions Mn are different sizes. In a further alternative arrangement of this invention, the memory regions Mn are permissible to be different sizes, but may not necessarily be.

XXIII. Exemplary Embodiment of System and Method for Multithreaded Application Programs Utilizing Per-Processor Write-to-Memory Indications or Tags Embodiments of the invention may further pertain to structure, means, and method of implementing tagging for multi-threaded software systems and computing systems executing multi-threaded applications, wherein the multithreaded application program operates on a plurality of machines in a replicated shared memory arrangement, and where each processor (or processing unit or some other grouped subset of processors) has associated with it a private memory region in which to store write-to-memory indications ("tags").

Software multi-threaded application programs typically operate in one of two ways on modern processor computing systems. One such way that multi-threaded application programs operate in a multi-processor computing system is to assign software threads (i.e. single serial execution/instruction streams) to specific processors. For example, in such an assignment system, a first thread T1 of a multi-threaded application program may be assigned to processor P1, a second thread T2 of the same application program (or optionally a different application program) may be assigned to a processor P2 and so on and so forth. Once threads are assigned to a specific processor, they continue to execute on the processor until the assigned threads complete execution, die, or are otherwise terminated. Thus in such an arrangement as this, the association between threads and the processors which execute them is fixed and generally does not change over the lifetime of a thread.

One advantage that this first method of executing multi-threaded application programs may have, is the processor and resource affinity that comes from executing the same workload on the same processor over a long period of time, such as efficiencies that may arise from cache data access and management policies of grouped like-threads (or otherwise related threads) together on a single processor (or processing unit, such as a multi-core processor etc).

However, this first method of operating multithreaded application programs also suffers from the primary disadvantage that if a single processor becomes burdened or overloaded with work whilst other processors in the multiple computing system are idle, then typically the application program thread(s) waiting on the stalled processor are not free and able to continue executing on a new and different processor which is not stalled and is otherwise idle. Thus in such a situation the entire computing system comprising multiple processors may not be being used at full utilization as there are idle processors without any work to do whilst yet other processors may be stalled and overloaded with work.

Another method of operating multithreaded application programs on modern computing systems comprising multiple processors, is to not fix or assign each thread to a specific processor, but rather allow and facilitate threads operating on potentially some or all of the multiple processors of the computing system over the course of a threads life of execution. example, in such an "un-fixed" system where threads are not assigned and fixed to a specific processor, threads are free to take turns executing on any available processor, and thus potentially take turns executing on different processors over the lifetime of the executing thread.

This second method of operating multithreaded applications overcomes the limitation of the first method, whereby a thread is free to operate on potentially any available in the multiple computer system on which the multithreaded application program is running. The advantage of this second method over the first method is that should a single processor become stalled or overloaded with work, then threads which were previously executing on the stalled processor are free to be executed on any other available processor and thereby continue execution, resulting in increasing the efficiency of the computing system as a whole.

Lastly, in some commercial computing systems of the day, various arrangements between the of the first and second above methods are used. For example, in circumstances where it is desirable to take advantage of some of the benefits of the first approach, and yet in other circumstances (and optionally simultaneously) take advantage of some of the benefits of a second approach, then in an application programs comprising many threads of execution, some subset of the threads may benefit from being grouped or clustered together on a single processor or processing unit (such as a multicore processor), whereas other threads of the same application program (or optionally some other application program) may be more advantageously deployed across a plurality of available processor resources and thus not being "fixed" to any single processor (or processing unit).

In the exemplary embodiment of multiple processor tagging system using per processor tags described above, a tagging system and method (or more generally, write-indication and method) is conceived wherein each processor is associated with a private memory region so that indications or identifications of memory locations written to be the associated processor are stored. The multiple processor tagging system using per processor tags embodiment generically describes the operation of a tagging system on a multiple processor computing system, and goes on to describe the some or the various merits and advantages of such a system, and the alternative arrangements which are conceived.

In this embodiment of a System and Method for Multi-threaded Application Programs Utilizing Per-Processor Write-to-Memory Indications or Tags, specific embodiments of a multithreaded tagging system (and the operation and behaviour of multithreaded application programs therein) for such a processor arrangement is described.

It is the object then of this invention to provide a specific exemplary multithreaded tagging system and method for a multiple processor computing system where each processor is with a private memory region (or regions) wherein indications or identifications of memory locations written to by the associated processor are to be stored.

Figure 167:
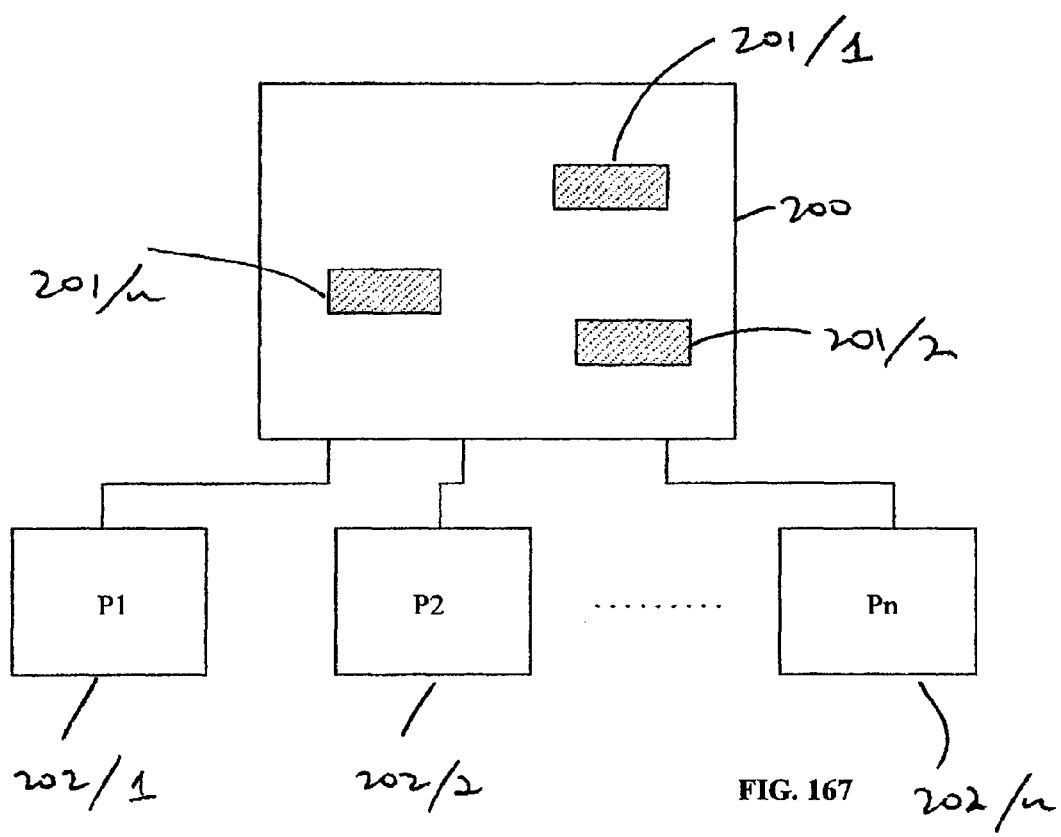

Turning now to FIG. 167. FIG. 167 shows a multiple processor computing system in a per-processor tagging arrangement described above. The multiple processor computing system of FIG. 167 comprises 3 processors 202 and a memory 200. Additionally, private memory regions 201 are also shown, and the association between each of the three private memory regions and each processor is indicated—where memory region 201/1 is associated with processor 202/1, memory region 201/2 is associated with processor 202/2, and memory region 202/n is associated with processor 202/n and so on.

Turning now to FIG. 168. FIG. 168 shows a multiple processor computing system comprising three processors 202, a memory 200, and private memory regions 201. Additionally, a multithreaded application program comprising three application threads T1, T2, and Tn is illustrated. These additional application threads T1 . . . Tn are indicated as part of memory 200, though this is for illustrative purposes only.

As is typical of multithreaded application programs, no pre-ordained (or pre-determined) between threads and processors is known or defined by the application program or computing system. Therefore, upon occasion that one or each of the three threads T1, T2, and Tn are to commence execution, the processors to which they will each in due course be assigned are not known and may be determined by any means. Consequently, on the part of the multithreaded application program, the assignment of threads to processors appears (or may appear) essentially random in nature. As a result, a multithreaded application program (and the software developer, software development tools, and compilers that produced the multithreaded application program) typically cannot assume a specific thread-to-processor assignment relationship.

This introduces a complexity in the design and implementation of a multithreaded tagging system for multiple processor computing systems where each processor is associated with a private memory region in which to store write-to-memory indications. For example, if a specific application thread doesn't know beforehand which processor (and hence which private memory region) it is to run on, how is the thread to know where to store write-to-memory indications? Specifically, application programs which are written for a multiple processor computing systems where the association between threads, processors and/or memory is known at compile time (or development time), it is easy to ensure that the executable code sequences (e.g., threads) that execute on each processor will store their write-to-memory indications to the correct private memory region that is associated with that processor. Thus, at compile of such an application program on such a processor the necessary write-to-memory indication code can be generated and inserted at the necessary points of the application with certainty.

However, in most multithreaded application programs such an association is not known, and therefore an additional facility is required in the development of multithreaded application programs for such a multiprocessor computing system where each processor is associated with a private memory region in which to store write-to-memory indications. For example, unlike a fixed association known at compile time where write-to-memory indication code can be generated to store to the "correct" private memory region, in a arrangement where association between threads and processors (and hence private memory regions) is not known such pre-generated and pre-inserted code cannot be used (or used without modification and additional enhancement).

Thus, for such multithreaded application programs it is desirable and necessary to conceive of a means to execute such multithreaded application programs on such multiple processor computing systems, where upon that the association between threads and processors becomes known (typically at runtime), then the "correct" write-to-memory indications may either be generated, updated, completed, or otherwise actioned or modified so as to store write-to-memory indications of the thread to the associated private-memory region (or regions) of the processor to which the thread is assigned (and optionally executing).

Turning now to FIG. 169. FIG. 169 shows one mode of this invention as it relates to the fixed assignment of application threads to processors (or processing units). Specifically, FIG. 169 expands on the computing arrangement shown in FIG. 168, and additionally shows the three application threads T1 . . . Tn now to be executing within (as indicated by the drawing of the thread icons inside the processor boxes) each of the processors. So, as is seen in FIG. 169, application thread T1 is shown to be executing on processor 202/n (processor Pn), and application thread T2 is shown to be executing on processor 202/1 (processor P1), and finally application thread Tn is shown to be executing on processor 202/2 (processor P2).

In the arrangement shown in FIG. 169 each thread T1 . . . Tn has been assigned in a fixed manner one of the available processors (which are processors P1 . . . Pn respectively). In this arrangement, the application threads are fixed (or "locked") to the processor to which they are assigned, and are not free to seamlessly and arbitrarily move execution between and amongst the other processors to which they are not assigned.

In accordance with one embodiment of this invention then a system is disclosed whereby, corresponding to an application thread being assigned to a processor (or processing unit) and commencing execution (such as a thread T2 being assigned to a processor P1), upon execution of a write-to-memory operation by thread T2 whilst executing on processor P1, a write-to-memory indication (also known as a "tag") is to be stored into the private memory region associated with processor P1, which in this instance is private memory region 201/1.

In a further alternative embodiment, the thread is modified so as to insert a "tagging" operation at a point corresponding to one or more write-to-memory operations of the thread, and where the "tagging" operation stores write-to-memory indications in the private memory region (or regions) associated with the processor on which the thread is assigned. And further preferably, where the modification takes place during application program loading into the computing system, and preferably before execution of the thread commences (or optionally even after execution of the thread has commenced).

Alternatively, the thread may be initialized with a reference, pointer, address, or other addressing which identifies the private memory regions to which a given thread assigned to a specific processor is to record write-to-memory indications to.

Further, the thread may be modified prior to loading, such as during translation or compilation from code to object-code, and wherein the modifications are the insertion of "tagging" operations which take (or utilize) a runtime-provided argument (or other argument means such as a variable, datastructure, address, reference, pointer or other address means) which identifies the private memory region (or regions) to which write-to-memory indications are to be stored, or alternatively identifies the processor on which the thread is assigned and executing (or to be executed) and from which can be determined the associated private memory region (or regions) to which write-to-memory indications are to be stored.

Further, the thread may be initialized with a reference, pointer, identifier, or other identifying means which identifies the processor on which a given thread is assigned and executing, and where the reference, pointer, identifier, or other identifying means may be used to locate, determine, or address the private memory region associated with the identified processor.

Additionally, of the above arrangements are to be included within the scope of the present invention.

Not all multithreaded computing systems however operate to assigning threads to processors in a fixed manner. In conventional multiprogrammable/multithreaded computing systems, a thread may be "locked" to execute on a specific processor but this is not always the case. In such cases when this is not the case, the threads are free to execute on some or potentially all available processors on the computing system over the lifetime of a given thread.

For example, in a multiple computer system comprising 2 processors (P1 and P2) and executing an program AP comprising a plurality of threads, and where there are no constraints on which processor a given thread may run, then when a specific processor (say P1) becomes available to execute a thread a waiting thread from a list of threads waiting to execute may be selected and execution of the selected thread may commence (e,g., thread T1). Sometime later the processor my unload or pause execution of thread T1 in order that another paused that may take a turn at execution (such as a thread T2). When again a second processor P2 becomes free and goes to select a waiting thread for execution, the previously executed thread T1 may be chosen and execution of T1 on processor P2 may then commence. This process may repeat with any number of threads and or processors, wherein a given thread may over a period of time execute on more than one processor.

Such behaviour is known in the prior art computing systems, and is an important feature of today's efficient computing systems. Such behaviour of a threading system is desirable in today's computing systems in order that multiple processors may be fairly and equally shared between many more threads than there are available processors. For example, if a computing system required a given thread to be locked to a given processor, then such a computing system would suffer from a major disadvantage were the chosen processor for a given thread to become stalled or busy processing another thread. This would be an inefficient arrangement, as there may potentially be one or more idle other processors in the computing system waiting for work to do, but because the hypothetical computing system locks threads to processors the waiting thread or threads on the stalled processor are not free to move to the available processor(s) to continue execution. Therefore, it is desirable that in conceiving the per-processor tagging system of this invention, that a method of operation is conceived where threads are not fixed or locked to specific processors but rather a free to take turns executing on different (and potentially random) processors in the multiple processor computing system.

Such an "un-" (or "un-fixed") multithreaded computing system where threads are free to execute on more than one processor over the lifetime of a given thread introduces further complication in the implementation of per-processor tag regions of memory for multithreaded applications.

The reason for this is that the association between thread and processor is no longer fixed, and therefore it is not possible to simple associate, identify or configure in a fixed fashion (either ahead of time, during loadtime, or upon commencement of execution) the private memory region (or regions) to which all write-to-memory indications are to be stored by a thread, because no such fixed or "locked" relationship between a given thread and a given processor exists.

Restated, as the assignment of threads to processors may change over the lifetime of a single thread (and/or group of threads), a dynamically adjustable system is required to keep up with the changing processors which may be executing a given thread (or group of threads) so that when a given thread executes a write-to-memory operation the associated write-to-memory indication is stored in the private memory region associated with the processor that the given thread was executing at the time of the write-to-memory operation. Obviously then, each time a thread moves to a different processor and executes a write-to-memory operation, then it is necessary to store the write-to-memory indication in a different private region memory (that is, the private region of memory associated with the new and current processor on which the given thread is executing).

Turning now to FIG. 170 where one embodiment of this invention is shown. FIG. 170 shows a series of smaller diagrams presented in a time sequence. Firstly, attention is drawn to the large arrow 500 on left hand side of the figure, which is identified with the label "TIME". The direction of this arrow 500 indicates the passing of time, and is to be used to interpret the smaller subdiagrams that occur vertically down the time arrow.

FIG. 170 also displays 4 sub-diagrams. Each of these sub-diagrams indicates a different state of the same computing system over a series of four time intervals, with the first subdiagram at the very top of the figure being the first time interval, and the bottom-most subdiagram being the last time interval. The four subdiagrams are labeled 501, 502, 503, and 504 respectively.

Turning now to the computing system 501 (that is, the computing system depicated in the first time interval). A computing system is shown comprising a memory 200 and 2 processors 202. Additionally, 2 private memory regions 201 are also indicated, and where each private memory region is associated with a specific processor. The associations between private memory region and processor are as follows: memory region 201/1 is associated with processor 202/1, memory region 201/2 is associated with processor 202/2. Though the computing system depicted in FIG. 170 only comprises 2 processors, this is not to be a limitation of this invention and instead any number of processors or processor combinations are envisaged by this invention (including multi-core processors, and hardware-threading processors, such as Intel HyperThreading CPUs, Sun Niagara CPUs, and Tera MTA CPUs). Lastly, the computing system 501 also shows three threads of an application program, threads T1, T2 and T3. Thread T1 is shown to be currently executing on processor 202/1 (P1), and thread T2 is shown to be currently executing on processor 202/2 (P2).

In the computing system 501, the two executing threads T1 and T2 execute on processors P1 and P2 respectively. Suppose then, that thread T1 executed a write-to-memory operation whilst executing on processor P1. In accordance with this invention, thread T1 corresponding to the write-to-memory operation would store a write-to-memory indication to the private memory region associated with the processor on which thread T1 is executing, which is memory region 201/1.

Similarly, supposing that thread T2 executed a write-to-memory operation whilst executing on processor P1, then the T2 would store a write-to-memory indication to the private memory region associated with the processor on which thread T2 is executing, which is memory region 201/2.

Turning now to diagram 502, where the same computing system is depicted of diagram 501. Structurally, the computing system of 501 has remained unchanged. However, the reader will observe that two arrows 521 and 522 have been added. These two arrows 521 and 522 indicate a swapping action of threads T1 and T3 on processor P1 (202/1). More specifically, the arrows indicate that thread T1 is being suspended (temporarily) and unloaded from executing on processor P1 and instead thread T3 (which was previously suspended temporarily) is being loaded in place of T1 on processor P1.

Such behaviour and operation is known in the prior of multithreaded software systems as a "context switch" or similar, and is used in instances where an executing thread (which in this instance was thread T1) is replaced with a waiting thread (which in this instance was thread T3) so that the waiting thread may take a turn at execution. Typically this process then repeats sometime later when a different waiting thread is swapped in place of the executing one. Altogether, this arrangement facilitates efficient use of the available processors amongst multiple threads as each thread is given periodic access to a processor so that it may continue execution.

Thus at this point in the time sequence, thread T1 has suspended execution (as indicated by being stored in memory and not inside a processor), whilst thread t3 has commenced (or continued) execution on processor P1. Accordingly, should thread T3 write to memory, then thread T3 would store a write-to-memory indication into the private memory region 201/1 associated with the processor P1 on which it is executing.

Turning now to the computing system depicted at 503. Like 502, structurally the computing system of 503 is unchanged relative to the computing system of 501. However, the reader will observe that two additional arrows 531 and 532 are shown. These two arrows indicate a "context switch" of the executing thread of processor P2 (that is, thread T2) with the suspended thread T1. Thus, arrows 531 and 532 indicate that thread T2 is suspended and unloaded from the processor P2 and replace with the previously suspended thread T1.

At this point, the reader will observe that Thread T1 which was previously executing on processor P1 is now executing (or about to continue executing) on processor P2.

Lastly, turning now to the computing system depicted at 504, the execution of threads T3 on processor P1 and thread T1 on processor P2 is shown. In accordance with this invention, corresponding to the movement of execution of thread T1 from processor P1 to processor P2, so too does thread T1 change the private memory region it stores write-to-memory indications in. Specifically, now with thread T1 executing on processor P2, in accordance with this invention were thread T1 to write to memory, thread T1 would store a write-to-memory indication in the private memory region 201/2 associated with processor P2, which is the current processor on which thread T1 is executing.

In accordance with one embodiment of this invention then a system is disclosed whereby corresponding to an application thread writing to memory, the application thread stores a write-to-memory indication into the private memory region (or regions) associated with the processor on which the writing to memory operation took place.

In accordance with another embodiment of this invention, a system is disclosed whereby, corresponding to an application thread being moved to a new processor (or processing unit) and commencing execution (such as a thread T1 being moved from processor P1 to processor P2), and upon execution of a write-to-memory operation by thread T1 whilst executing on processor P2, a write-to-memory indication (also known as a "tag") is to be stored into the private memory region associated with processor P2, which in this instance is private memory region 201/2.

In a further alternative embodiment, a system is disclosed whereby corresponding to an application thread being moved to a new processor (or processing unit) and commencing execution (such as a thread T1 being moved from processor P1 to processor P2), the application thread is updated, initialized (or re-initialized), configured (or re-configured) so as to store write-to-memory indications into the private memory region associated with the processor to which the thread has been moved to.

In a further alternative embodiment, the thread is modified so as to insert a "tagging" operation at a point corresponding to one or more write-to-memory operations of the thread, and where the "tagging" operation stores write-to-memory indications in the private memory region (or regions) associated with the processor on which the thread is executing. And further preferably, where the modification takes place during application program loading into the computing system, and preferably before execution of the thread commences (or optionally even after execution of the thread has commenced).

Alternatively, an embodiment where the thread may be initialized with a reference, pointer, address, or other addressing means which identifies the private memory regions to which the thread is to store write-to-memory indications, and which is updated over the lifetime of the thread to reference, point-to, or address the private memory region associated with the processor on which the thread is executing at a given point in time.

Further, the thread may be modified prior to loading, such as during translation or compilation from source-code to object-code, and wherein the modifications are the insertion of "tagging" operations which take (or utilize) a runtime-provided argument (or other argument means such as a variable, datastructure, address, reference, pointer or other address means) which identifies the private memory region (or regions) to which write-to-memory indications are to be stored, or alternatively identifies the processor on which the thread is executing (or to be executed) and from which can be determined the associated private memory region (or regions) to which write-to-memory indications are to be stored. Further, where the runtime provided argument (or other argument means . . . ) is updated over the lifetime of the thread to be current with the processor on which the thread executes at a given point in time.

Further, the thread may be initialized with a reference, pointer, identifier, or other identifying means which identifies the processor on which a given thread is executing, and where the reference, pointer, identifier, or other identifying means may be used to locate, discover, determine, or address the private memory region associated with the identified processor.

Additionally, combinations of the above arrangements are to be included within the scope of the present invention.

Altogether, this invention satisfies the goal of conceiving of a method where the threads of an application program are able to execute on a plurality of processors (in varying arrangements—such as "fixed" and "not-fixed"), and each the processor has associated with it a private region of memory wherein indications of written memory locations are to be stored.

Further, where as a given thread executes on a given processor, all write indications of memory locations written to by the given thread whilst executing on the given processor are stored to the private memory region associated with the processor.

And further where, on occasion that the given thread executes (or is transferred to execute) on a second processor, then all write indications of memory locations written to by the given thread whilst executing on the second processor are stored to the private memory region associated with the second processor.

It may be appreciated in light of the description provided here that in one aspect, embodiments of the invention provide a first method, where after a thread is assigned to a processor in a "fixed" manner, the thread is configured (by initializing thread-level datastructures for example) to record the private memory region (or processor) to which the executing thread is to store write-to-memory indications.

Further, where the thread configuration means includes supplying a address, identification, offset, or other locating or addressing means of the private memory region which is to be used by the executing thread assigned to a specific processor.

Further, what is also provided, is a method of executing multiple threads of a multithreaded application program on a multiple processor computing systems, where each processor is associated with a private memory region and where any and all threads assigned to a specific processor record write-to-memory indications in the private memory region associated with the executing processor.

Further, where a method of assigning threads of a multithreaded application program to specific processors of a multiple processor computing system, and where the threads are initialized with the address, location, or other locating or addressing means of the private memory region (or regions) associated with the specific processor to which the threads are assigned.

Associating a variable with each thread which indicates which processor the thread is executing on, and where value of the variable changes each time the thread is moved by the operating system (or other resource management means) to a new processor. Advantageous because it may be a computationally expensive operation to otherwise determine which processor this thread is executing on, and therefore by storing an indication of the processor on which a thread is operating on when it is swapped in is fast and efficient.

Associating a variable with each thread which indicates which memory region the thread is executing on, and where value of the variable changes each time the thread is move by the operating system (or other thread management means) to a new processor. Advantageous because it may be a computationally expensive operation to otherwise determine which private memory region this thread is to store write-to-memory indications on, and therefore by updating stored variable identifying the private memory region to which a thread is to store write-to-memory indications into is fast and efficient.

Alternatively, could invoke an operating system (or general software platform) operation which identifies the current processor on which a given thread is executing.

Alternatively again, could invoke an operating system (or other general platform) operation which identifies the current memory region to which a given thread should store its write-indications.

XXIV. Exemplary Embodiment of System and Method for Hardware Assisted Tagging

This invention relates to a method for hardware-assisted tagging. More specifically, this invention relates to an improved method of hardware-assisted tagging of write-to-memory operations in accordance with the co-pending U.S. Patent Application Ser. No. 60/830,042 filed Apr. 23, 2004. This invention provides an improved system, means, device, and method comprising a hardware-assisted tagging system within the CPU and systems architecture together with partial software modification. The advantages that such a hybrid hardware/software tagging system would have over an all software and all hardware implementation of tagging will be described thus.

An all software tagging system has certain benefits over an all hardware tagging system, but also has certain disadvantages. Alternatively, an all hardware tagging system has certain benefits over an all software tagging system, but also has certain disadvantages. Speaking generally, an all software tagging system is unlikely to be as efficient as an all hardware tagging system, as an all software tagging system requires additional instructions to be inserted in the application program code to implement the desired tagging operations, thus slowing the application program down. On the other hand, a hardware tagging system is able to perform tagging without the aid of additional inserted instructions into the application program code and so executes faster. Thus on this level, an all hardware tagging system may be more desirable than an all software tagging system.

However, all hardware tagging system also have disadvantages which all software tagging systems don't have. For example, an all hardware tagging system typically can't differentiate between "tagged" memory locations and "untagged" memory locations—either tagging all memory locations or none at all. On the other hand, a software tagging system is able to differentiate between "tagged" and "non-tagged" memory locations, and not insert tagging operations at those application program code points where writing to "untagged" memory locations takes place.

This invention anticipates a system whereby a "tagging" system is implemented in a combination of hardware and software. More specifically, this invention conceives of a special additional instruction (or instructions or other operations) which act to store a tag indication (or other identifier indication) of a memory location which is written.

This invention also conceives of a system of modifying the application program executable code as it is being loaded into a computer system, or after it has loaded into a computer system, and even after it has commenced execution, whereby said modifications are to detect write operations to memory locations which are to be, or may be, tagged. And corresponding to locating such write to memory operations, inserting an additional instruction or instructions, wherein said inserted additional instruction is a said "special additional instruction".

Further, this invention conceives of a CPU or other processing means which implements said "special additional instruction" by storing an indication or other identifier means to memory indicating that an identified memory location has been written. And where, said implementation of the "special additional instruction" within a CPU stores said an indication or identifier directly to main memory without storing said indication or identifier to cache memory. Further wherein, said implementation of the "special additional instruction" within a CPU queues said tag indications to memory via a private write-buffer not shared with the write buffer used for non-indication and non-identifier store-to-memory operations.

Thus, it is the goal of the present invention to conceive of a hardware-assisted tagging method for CPUs and computer architectures and platforms of machines operating in a replicated shared memory arrangement.

Embodiments of the present invention will now be described with reference to the following figures:

FIG. 172 is a schematic diagram of a prior art replicated shared memory system. In FIG. 172 three machines are shown, this is machines M1, M2 . . . Mn. Additionally, a communications network 53 is shown interconnecting the three machines and a preferable (but optional) server machine X which can also be provided and which is indicated by broken lines. In each of the individual machines, there exists a memory 102 and a CPU 103. In each memory 102 there exists three memory locations, a memory location A, a memory location B and a memory location C. Each of these three memory locations is replicated in a memory 102 of each machine.

This prior arrangement of the replicated shared memory system allows a single application program written for, and intended to be run on, a single machine, to be substantially simultaneously executed on a plurality of machines, each with independent local memories, accessible only by the corresponding portion of the application program executing on that machine, and interconnected via the network 53. In International Patent Application No. PCT/AU2005/000580 published under WO 2005/103926 (and to which U.S. patent application Ser. No. 11/111,946 corresponds) a technique is disclosed to detect modifications or manipulations made to a replicated memory location, such as a write to a replicated memory location A by machine M and correspondingly propagate this changed value written by machine M1 to the other machines M2 . . . Mn which each have a local replica of memory location A. This result is achieved by the preferred embodiment of detecting write instructions in the executable object code of the application to be run that write to a replicated memory location, such as memory location A, and modifying the executable object code of the application program, at the point corresponding to each such detected write operation, such that new instructions are inserted to additionally record, mark, tag, or by some such other recording means indicate that the value of the written memory location has changed.

Consequently, a background thread task or process is able to, at a later stage, propagate the changed value to the other machines which also replicate the written to memory location, such that subject to an update and propagation delay, the memory context of the written to memory location on all of the machines on which a replica exists, are substantially identical. Various other alternative embodiments are also disclosed in this prior art. Whilst the above prior method is adequate for application programs which write infrequently to replicated memory locations, the prior art method is prone to inherent inefficiencies in some application programs.

FIG. 173 is a schematic map of the memory locations of four machines M1-M4 is illustrated in a partial replicated shared memory arrangement. In this particular example, machine M1 has the memory locations A, B, and C whilst machine M2 has the same memory locations and an additional location D. However, machine M3 only have memory locations C and E whilst machine M4 has memory locations B and D, It follows therefore if memory location B has to be updated then it is only necessary to advise machines M1, M2 and M4 and it is not necessary to advice machine M3. Thus the traffic on the communications network interconnecting the plurality of machines may be reduced in this circumstantial as it is not necessary to communication with machine M3.

FIG. 174 is an excerpt of a disassembled instruction sequence of Java application program. The instructions comprise a write-to-memory operation (putstatic #4), which for the purposes of this description is assumed to be a write to a replicated memory location of a plurality of machines operating in a replicated shared memory arrangement.

FIG. 175 is an excerpt of a disassembled instruction sequence of Java application program. The instructions comprise an execution loop (bounded by the starting $9^{th}$ instruction "iload 4" and the ending "goto 23" instruction). Within this executable loop code is a write-to-memory operation ("iastore"), which for the purposes of this description is assumed to be a write to a replicated memory location of a plurality of machines operating in a replicated shared memory arrangement.

FIG. 176 is an illustrative diagram of the operations and progress of a single thread of execution T1, against the vertical indication of time from top to bottom. Specifically, FIG. 176 shows a case of the application program of FIG. 174 which has been modified in accordance with the methods described in co-pending U.S. Patent Application Ser. No. 60/830,042 filed Apr. 23, 2004 to record or mark written-to replicated memory locations as having been written or modified. The inserted/modified instructions are indicated in bold.

Thread T1 is indicated starting with the iload_2 instruction and ending with the istore_1 instruction. The proceeding and preceding arrows 501 indicate normal application program code execution, which are not material for the purposes of this description and thus have been omitted for simplicity.

Specifically, FIG. 176 shows thread T1 to be executing the application program code of FIG. 174 which has been modified in accordance with the software modification methods described in co-pending U.S. Patent Application Ser. No. 60/830,042 filed Apr. 23, 2004, where the modified/inserted instructions are indicated in bold. Thus, the original application instructions are indicated in non-bold (i.e. normal), whilst the inserted instructions in accordance with the co-pending U.S. Patent Application Ser. No. 60/830,042 filed Apr. 23, 2004 method are indicated in bold.

The execution path of the Thread T1 is indicated via the dotted lines 501, 502, and 503. Line 502 indicates a "function call" or other call/invocation of the subroutine comprising the five instructions getstatic #2 through to the return instruction on the right hand side of the figure. The returning arrow 503 indicates the return from the subroutine back to the normal execution of the application program code of thread T1.

The purposes of this subroutine call is to mark or tag or otherwise store an indication of the replicated memory location #4 written to by the "putstatic #4" instruction" as having been written or modified. Specifically, the subroutine stores an indication into a tag array (or other tag data structure or tag memory region) that corresponds to the written-to memory location #4 that the memory location has been modified or written.

Whilst the methods described in co-pending U.S. Patent Application Ser. No. 60/830,042 filed Apr. 23, 2004 as illustrated in FIG. 176 work satisfactorily to achieve the goals of identifying written-to or modified replicated memory locations, they do however consume considerable computation cycles and resources—specifically in the example of FIG. 176 some 7 instructions. Thus, corresponding to the single write-to-memory putstatic #4 instruction, 7 extra instructions (indicated in bold) are inserted and executed in order to record an indication of memory location #4 as having been written. This 7-to-1 ratio—meaning that 7 "tag" or "mark" instructions are executed for every single write-to-replicated-memory instruction or operation—means that for applications which write frequently to replicated memory locations, approximately 7 times more instructions will be executed recording the write-to indications. In some applications this additional computation cost may be undesirable or unacceptable and therefore a more efficient method of recording write-to indications would be advantageous for such cases.

FIG. 177 is an illustrative diagram of the operations and progress of a single thread of execution T1, against the vertical indication of time from top to bottom. Specifically, FIG. 177 shows a case of the application program of FIG. 175 which has been modified in accordance with the methods of the co-pending U.S. Patent Application Ser. No. 11/111,946 filed Apr. 22, 2005 to record or mark written-to replicated memory locations as having been written or modified. The inserted/modified instructions are indicated in bold.

Thread T1 is indicated starting with the iload_2 instruction and ending with the istore_1 instruction. The proceeding and preceding arrows 401 indicate normal application program code execution, which are not material for the purposes of this description and thus have been omitted for simplicity.

Specifically, FIG. 176 shows thread T1 to be executing the application program code of FIG. 174 which has been modified in accordance with the software modification methods described in the co-pending U.S. Patent Application Ser. No. 11/111946 filed Apr. 22, 2005, where the modified/inserted instructions are indicated in bold. Thus, the original application instructions are indicated in non-bold (i.e. normal), whilst the inserted instructions in accordance with the method described in co-pending U.S. Patent Application Ser No. 11/111,946 filed Apr. 22, 2005 are indicated in bold.

The execution path of the Thread T1 is indicated via the dotted lines 601, 602, and 603. Line 602 indicates a "function call" or other call/invocation of the subroutine comprising the twelve instructions iload_0 through to the return instruction on the right hand side of the figure. The returning arrow 603 indicates the return from the subroutine back to the normal execution of the application program code of thread T1.

The purposes of this subroutine call is to mark or tag or otherwise store an indication of the indices 0-10 of the integer array of the replicated memory location #4 written to by the "iastore" instruction during iterations of the enclosing loop as having been written or modified. Specifically, the subroutine stores an indication into a tag array (or other tag data structure or tag memory region) that corresponds to the written-to array indices that the memory locations of the written-to array indices have been modified or written.

In this example, the inserted instructions in bold and the subroutine call are in accordance with the methods in co-pending U.S. Patent Application Ser No. 11/111,946 filed Apr. 22, 2005. The reader is directed to the description of this invention for a fuller discussion of the methods of group-tagging as illustrated in FIG. 177.

Whilst the methods of the co-pending U.S. Patent Application Ser. No. 60/878,138 filed Dec. 29, 2006 invention as illustrated in FIG. 177 work satisfactorily to achieve the goals of identifying written-to or modified replicated memory locations (which in this example are the 10 written-to array indices), they do however consume considerable computation cycles and resources—specifically in the example of FIG. 177 approximately 96 instructions (including the instructions of all iterations of the embedded loop of the subroutine). Thus, corresponding to the 10 write-to-memory "iastore" instructions, 96 extra instructions (indicated in bold) are inserted and executed in order to record an indication of memory location #4 as having been written. These additional 96 instructions—meaning that additional "tag" or "mark" instructions which are executed for the 10 write-to-replicated-memory instructions or operations—means that for applications which write frequently to replicated memory locations in a looped code structure, tens or hundreds (or even thousands) of additional instructions will be executed recording the write-to indications. In some applications this additional computation cost may be undesirable or unacceptable and therefore a more efficient method of recording write-to indications would be advantageous for such cases.

Taken together, the above two cases illustrated in FIG. 176 and FIG. 177 show the variation in marking or tagging methods that may be employed in recording indications of written-to replicated memory locations. On the one hand, FIG. 176 shows a method of recording a single indication corresponding to a write operation to a single replicated memory location. On the other hand, FIG. 177 shows another method of recording multiple indications corresponding to multiple write operations to multiple replicated memory locations. Both methods are advantageous for their case, for example where the method indicated in FIG. 177 is more efficient than the method indicated in FIG. 176 for recording groups of replicated memory locations which are written to together (such as in a loop), but where the method indication in FIG. 176 is more efficient for recording single written-to replicated memory locations.

Taken together, the two cases illustrated in FIG. 176 and FIG. 177 show it is desirable to conceive of a more efficient method of recording write-to indications for written-to replicated memory locations of a machine operating in a replicated shared memory arrangement. Thus it is the goal of the present invention to conceive of such an improved method of recording mark or tag or write-to indications of written to replicated memory locations.

Specifically, in conceiving a more efficient method of recording write-to indications, it is also desirable that such an improved method be conceived in such a manner as to be operable with various tagging or marking methods—such as group tagging methods as illustrated in FIG. 177, and single tagging methods illustrated in FIG. 176—rather than being restricted to a single hardware-only tagging method. This is one of the major limitations of hardware-only tagging methods, as special handling for different write-to-memory cases (such as group-writes and single-writes of FIG. 177 and FIG. 176 respectively) cannot easily or effectively be differentiated and treated accordingly in hardware-only designs. This is because it is generally unfeasible to implement the large and complex code-analysis processes necessary to detect and classify write operations into various cases (such as group or single) and then select and perform the most efficient tagging method for each case.

Compared to hardware-only tagging methods (such as the CR invention), software-only tagging methods do not suffer from the same limitations when it comes to implementing multiple tagging or marking methods for different write-to-memory cases. In a software-only tagging method, it is possible to analyze large code sequences to detect the presence of multiple write-to-replicated-memory operations and group them effectively together into a single (or less number of) tagging or marking operation(s). However, a software-only tagging method results in substantial bodies of inserted instructions and operations which when executing mean that useful application processing is not being done.

It is especially desirable then that an improved tagging method be conceived to combine the "best of both worlds"—that is, the relative efficiency of a hardware-only tagging method with the relative flexibility of a software-only tagging method. Such a hybrid system has been conceived and is hereafter described in this invention.

In accordance with a first aspect of this invention, a method of designing a CPU or other processing device for more efficient marking or tagging or recording of write indications is taught. Specifically, a special "mark instruction" of a CPU or other processing device is disclosed, which stores an indication or value to a memory location that may be used to indicate that an associated or corresponding other memory location has been written to or modified.

Unlike an all-hardware tagging method such as described in the CR invention where no special "mark instruction" exists, this invention anticipates a special "mark instruction" which implements the tag or mark or write-indication behaviour of the "tag" or "mark" subroutine of FIG. 176 and FIG. 177.

Specifically, the inventive "mark instruction" of this invention is to operate in the following described manner. Unlike an implicit hardware-only tagging method such as described in the CR invention where tagging or marking is transparent to the application program (i.e. accomplished without inserting of additional tagging instructions), the method of this invention is an explicit method and still requires application program code to be modified and new instructions/code inserted. However, the inserted/modified instructions do not implement the tagging operation directly as they did in the examples of FIG. 176 and FIG. 177, but instead execute the special "mark instruction" on the processor or other processing device which performs the tag or mark operation entirely in hardware. Thus, the inventive method of this invention is a special "mark instruction" which performs tagging or marking in hardware, but which must be executed by an appropriate inserted instruction into the application program code corresponding to a write-to-replicated memory operation. The various methods and operations of such a "mark instruction" will now be described in more detail.

In one embodiment of this invention, this special "mark instruction" takes as an argument a memory location, memory offset, or memory address at which to store an indication or other data value, to be used to indicate an associated or corresponding other memory location as having been written. For example, in a simple embodiment, a single "true" bit may be stored to a tag indication location in memory associated or corresponding to a written-to replicated memory location to indicate the associated replicated memory location as having been written or modified.

Preferably, the stored indication or other data value is a processor-generated value, and not a value loaded or generated by separate processor instructions. For example, rather than loading a value of "1" (a true value) onto the processor stack to be stored as the "indicator value", in a preferred embodiment of a special "mark instruction" such an indicator value (or any other indicator or data value) is generated or loaded by the processor as part of the execution of the special "mark instruction". The advantage of such a preferred arrangement is that the one or more instructions necessary to generate or load a value such as indicated in FIG. 176 and FIG. 177 may be skipped or not inserted, and thus avoid the computational cost of executing these additional instructions.

Often, contemporary computer architectures are often designed with bus transfer widths of greater than a single bit (for example one byte, two bytes, or four bytes). In such arrangements then, the storage of a single "true" bit as a tag-indication may require to be promoted to be a whole one byte, two byte, or four byte bus transfer. When such is the case, storing only a single bit as a tag-indication means that the remaining bits of the bus transfer unit are effectively un-utilized. Therefore, in more sophisticated arrangements, these otherwise "un-used bits" may be used as part of the tag-indication to store larger useful or meaningful data or values than a single bit, such as for example timestamps, clock values, processor ID's, thread ID's, or the like.

In alternative embodiments then, different values may be stored instead of a 1 or "true" value, such as time-stamp values, program-counter values (e.g. instruction-offset values), event-counter values, processor-ID values, thread-ID values, or any other value as is compatible and able to be stored to the designated "tag" or "mark" memory location.

In a further embodiment of this invention, a special "mark-all instruction" may take as an argument a range of memory locations, memory offsets, or memory addresses at which to store an indication or other data value to be used to indicate associated or corresponding other memory locations as having been written. In implementing such a "mark-all instruction", various arrangements may be used to store such an indication. For example, one method is for the execution of the "mark-all instruction" to cause the range of tag memory locations to be recorded to indicate the associated or corresponding replicated memory locations as having been written. In alternative arrangement, a "mark-all instruction" may store to a "tag memory region" the range of written-to replicated memory locations and not individual indications for each written-to replicated memory location.

In a further embodiment of this invention, a "mark instruction" and a "mark-all instruction" may be implemented by a single processor, where a first "mark instruction" relates to a single written-to replicated memory location, and a second "mark-all instruction" relates to a range of written-to replicated memory locations.

In a still further embodiment of this invention, alternative arrangements of "mark instructions" may be devised which takes one or more arguments associated with or corresponding to one or more written-to replicated memory locations, and stores an indication into the associated/corresponding indicator memory.

Once such a one or more "mark instruction" is implemented and available on a processor, then such an instruction may be used in place of inserted software-only tagging instructions/operations of the co-pending U.S. Patent Application Ser. No. 60/830,042 filed Apr. 23, 2004 and co-pending U.S. Patent Application Ser. No. 60/878,138 filed Dec. 29, 2006 applications. Such an alternative arrangement utilizing a "mark instruction" is indicated in FIG. 178 and FIG. 179.

Two arrangements of software modifications utilizing a special "mark instruction" are shown in FIG. 178 and FIG. 179.

FIG. 178 is an illustrative diagram of the operations and progress of a single thread of execution T1, against the vertical indication of time from top to bottom. Specifically, FIG. 178 shows a case of the application program of FIG. 174 which has been modified in accordance with the methods of this invention to utilize a special "mark instruction" to record or mark written-to replicated memory locations as having been written or modified. The inserted/modified instructions are indicated in bold.

Thread T1 is indicated starting with the iload_2 instruction and ending with the istore_1 instruction. The proceeding and preceding arrows 701 indicate normal application program code execution, which are not material for the purposes of this description and thus have been omitted for simplicity.

Specifically, FIG. 178 shows thread T1 to be executing the application program code of FIG. 174 which has been modified in accordance with the software modification methods of this invention, where the modified/inserted instructions are indicated in bold and utilize the inventive "mark instruction" of this invention. Thus, the original application instructions are indicated in non-bold (i.e. normal), whilst the inserted instructions in accordance with this invention are indicated in bold.

Following the putstatic #4 instruction, an inserted "mark #4" instruction is indicated in bold. This instruction executes a "mark instruction" in accordance with this invention, which stores an indication of the associated replicated memory location (as written-to by the putstatic #4 instruction) as having been written. Precisely what data value or form the stored indication takes is not material to this invention, so long as the stored indication can be used to determine that the written-to memory location (putstatic #4") has been modified.

When comparing the embodiment of this invention indicated in FIG. 178 with the software-only method indicated in FIG. 176, the improvement and advantages of the inventive method of this invention are obvious. Specifically, the 7 inserted/tagging instructions required in the software-only example of FIG. 176 has been reduced to a single "mark #4" instruction in FIG. 178, thus representing a saving of 6 instructions (e.g. a 600% saving). Obviously then, such a "mark" instruction and tagging method utilizing such a "mark" instruction is much more efficient than the software-only method of FIG. 176.

FIG. 179 is an illustrative diagram of the operations and progress of a single thread of execution T1, against the vertical indication of time from top to bottom. Specifically, FIG. 179 shows a case of the application program of FIG. 175 which has been modified in accordance with the methods of this invention to utilize a special "mark-all instruction" to record or mark written-to replicated memory locations as having been written or modified. The inserted/modified instructions are indicated in bold.

Thread T1 is indicated starting with the iload_2 instruction and ending with the istore_1 instruction. The proceeding and preceding arrows 801 indicate normal application program code execution, which are not material for the purposes of this description and thus have been omitted for simplicity.

Specifically, FIG. 179 shows thread T1 to be executing the application program code of FIG. 175 which has been modified in accordance with the software modification methods of this invention, where the modified/inserted instructions are indicated in bold and utilize the inventive "mark-all instruction" of this invention. Thus, the original application instructions are indicated in non-bold (i.e. normal), whilst the inserted instructions in accordance with this invention are indicated in bold.

Following the exit of the loop (that is, the goto 23 instruction), four inserted instructions is indicated in bold. First an aload_3 instruction is indicated, which loads a reference onto the replicated integer array data structure which was written to by the iastore instruction during the iterations of the enclosing loop. Next are inserted "iconst_0" and "bipush 10" instructions, which load the range of indices of the replicated integer array data structure which were written to during the iterations of the loop. Finally, an inserted "markall" instruction is indicated. This instruction "markall instruction" records an indication of the range (0-9) of associated replicated memory locations (as written-to by the iastore instruction during the iterations of the preceding loop) as having been written. Precisely what data value or form the stored indication takes is not material to this invention, so long as the recorded indication(s) can be used to determine that the written-to memory locations have been modified.

When comparing the embodiment of this invention indicated in FIG. 179 with the software-only method indicated in FIG. 177, the improvement and advantages of the inventive method of this invention are obvious. Specifically, the 15 inserted/tagging instructions (resulting in the execution of approximately 96 instructions) required in the software-only example of FIG. 177 has been reduced to four instructions—aload_3, iconst_0, bipush 10, and markall—thus representing a real saving of tens of instructions. Obviously then, such a "markall" instruction and tagging method utilizing such a "markall" instruction is much more efficient than the software-only method of FIG. 177.

FIG. 180 shows a further alternative case such as indicated in FIG. 178 and FIG. 179, where an example code is indicated in un-bold and the inserted instructions and "mark" instruction of a processor in accordance with this invention are indicated in bold. Specifically, the "mark" instruction indicated in FIG. 180 accepts as an argument a reference to the object to which the written-to replicated memory location relates (putfield #9). As for FIG. 178, the mark instruction acts to store or record an indication of memory location #9 of the associated object as having been written and in need of updating to other corresponding replicated memory locations on other machines.

FIG. 181 shows a schematic arrangement of a CPU/processor 1001 comprising an execution core 1003, write-buffer 1004, cache memory 1005, and bus interface 1006, and a memory 1002 of a computing system to be operated in a replicated shared memory arrangement and implementing one arrangement of the methods of this invention. Indicated in dotted outline is a tag-buffer 1010 and associated tag write-path 1011. Specifically, one preferred arrangement of implementing "mark instructions" is indicated.

A further disadvantage of a software-only tagging method such as described in co-pending U.S. Patent Application Ser. No. 60/830,042 filed Apr. 23, 2004 and co-pending U.S. Patent Application Ser. No. 60/878,138 filed Dec. 29, 2006, is tagging instructions and operations which act to record/store an indication of written-to replicated memory locations to main memory, typically does so in an undistinguished fashion to all other write-to-memory operations (such as the write-to-memory operation which triggered the tag event in the first place). In other words, stored indications of written-to memory locations are stored by the processor in exactly the same manner as the original associated write-to-memory operation in the first place, thus consuming one (or more than one) slot of the write-buffer 1004, as well as occupying limited cache memory space 1005.

Thus, in software-only arrangements, for every write to a replicated memory location there is a corresponding write by the processor to an associated tag memory location, and generally both of these writes would take place and travel via the general-purpose "write buffer" 1004 of the execution core 1003, as indicated by the arrow 1020. Unfortunately, most CPU/processors have limited write-buffer slots (that is, the capacity to asynchronously store a write value to cache and/or main memory whilst the processor continues executing other instructions), such as for example 4 or 8 slots, before the write-buffer becomes full and the processor would stall on the next write operation until one or more slots of the write-buffer become free. Thus, efficient use of write-slots of a write-buffer is an important part of compiler optimizations of application program codes.

Were an application to be compiled or written to use all the maximum available write-slots of a write-buffer, and then such an application was to execute in a replicated shared memory arrangement and be modified in accordance with the methods of FIG. 176 or FIG. 177, additional tag-indications would also now have to be stored for each written-to replicated memory location. In cases where the application has been fine-tuned to use all of but not exceed the available write-slots of the processor (so that costly processor stalls waiting for write-slots to become vacant is avoided), then any additional inserted instructions to store tag-indications will interfere with such delicate fine tuning and optimization by the application program code and likely result in occurrences of the processor stalling due to excess use of write-slots in the write-buffer. Obviously such stalling behaviour would be undesirable.

Furthermore, such stored/recorded indicator data or values will be stored to one or more cache memories 1005, along with the written to application memory locations. As for write-slots, cache memory is a scarce resource, and application programs and programmers often fine tune and optimize the use of cache memory in order that their application program memory may be as fast as possible. And thus, as for the dilemma with write-buffers described above, were an application program to be written to use all of the available cache memory for its operation, then the insertion of tag-indicator memory data to be stored to memory will generally be stored to cache memory in an identical fashion to the original written-to application data. As a consequence storing tag-indications to cache memory may interfere with caching policies and arrangements of application programs as some subset of the limited available cache memory must be used to store the non-application tag-indicator memory data. Thus, this is also an undesirable property of a software-only tagging method.

Also, cache memories are most effective when storing data which will be frequently accessed again (that is read), or may be re-read in the future again. Often, when an application program reads or writes a memory location, it may read or write the same memory location again, or memory locations nearby. However, tag indications are never read by a processor, only written, and so the advantage of using a cache to hold recently accessed data close to the processor should it be accessed or read again does not apply to the storage of tag-indications. Therefore, in addition to being undesirable to interfere with the cache use policies or arrangements of application program code, so too is it often ineffective to store tag-indications to cache memory in the first place because they are never "re-accessed" (e.g. read) by the processor, and hence storing such tag-indications in the cache offers no performance advantage.

Taken all together then, there are many reasons why storing tag-indications to memory via the general-purpose write-buffer 1004 and cache memory 1005 is not ideal, and indeed may be disadvantageous to performance of the processor 1001 and application program as a whole. Thus, in conceiving of a hardware-assisted tagging method utilizing special "mark" instructions, it is also advantageous to conceive of various arrangements and methods of overcoming the above described undesirable consequences for write-buffers and cache memories.

Indicated in FIG. 181 is the provision of an optional and preferably tag buffer 1010. This tag buffer 1010 is independent to the general-purpose write-buffer 1004, and used to buffer tag indications stored by the "mark instruction(s)" of the execution core 1003. For example, in a preferred implementation of the mark instruction in the execution core 1003, the tag indication to be stored to main memory is stored to the tag-buffer 1010 and not the write-buffer 1004, thereby not occupying slots of the general-purpose write-buffer, which remains entirely free to be used by the application program.

Also indicated is the preferred arrangement of storing tag indications to memory 1002, which is shown via arrow 1011. Unlike the stored data of the write-buffer 1004 which is stored via arrow 1020 to cache memory 1005, tag indications stored via the tag buffer 1010 bypass the cache 1005 and instead proceed directly to memory 1002 as indicated (such as for example via a bus interface 1006).

The consequence of one or both of the tag buffer 1010 and cache-bypass 1011 is that the write-slots and cache memory is not interfered with by the tagging operations, and so are left free and undisturbed to be used by the application program as originally intended.

One or both of the tag buffer 1010 or cache-bypass 1011 may be used in implementing one or more "mark instruction(s)" in an execution core 1003. So for example, in an arrangement where the tag-buffer 1010 is implemented but not the cache-bypass 1011, then indications are stored by the tag-buffer to cache memory 1005 in a regular fashion (such as by the write buffer for example). Alternatively, the optional tag-buffer 1010 may be chosen not to be implemented and instead tag-indications are stored directly to the write-buffer 1004, but the write-buffer 1004 distinguishes tag-indication data from non-tag-indication data (i.e. regular memory data), and stores tag-indication data directly to memory 1002 bypassing the cache 1005 whilst storing non-tag-indication data to cache 1005 as per normal. Various other combinations and arrangements of the above may be envisaged and are to be included within the scope of the present invention.

However, a tag buffer 1010 and cache-bypass 1011 are optional and in alternative simpler arrangements of mark instructions may be chosen not to be implemented, in which case tag-indications are stored to memory in an undistinguished manner to regular data stores.

FIG. 182 shows a modified schematic diagram of a processor and memory arrangement as for FIG. 181. Additionally indicated is an extra cache memory 1107, such as a "Level 3 cache" or "off-chip cache" between the memory 1002 and the processor 1001. As for FIG. 181, an optional tag-buffer 1010 is indicated, and also a cache-bypass 1011 of the "on-chip cache" 1005 of the processor. This figures shows an extended implementation originally depicted in FIG. 181, where the cache-bypass feature has been extended to also by-pass the "off-chip cache" 1107 between the processor and memory. This optional extended cache-bypass path is indicated by label 1112.

FIG. 183 shows a modified schematic diagram of a processor and memory arrangement as for FIG. 181. However, the cache by-pass feature 1011 is not indicated. Instead a path 1201 is indicated from the tag-buffer 1010 to the write-buffer 1004. Here, an alternative arrangement is depicted.

Specifically, as for the tag-buffer 1010 of FIG. 181, tag indications are stored to the tag-buffer and not the general-purpose write-buffer. However, when a slot in the write-buffer becomes vacant, then any pending tag-indication stored in the tag-buffer is transferred to the write-buffer, which in turn will transfer it to either or both of cache memory 1005 or memory 1002. Thus, in this arrangement, the benefits of an independent tag-buffer are enjoyed but implementation may be simplified as write-buffers may be rarely fully utilized all of the time and therefore in the idle periods or empty periods pending tag-indications stored in the tag-buffer may be transferred to the write-buffer and stored to memory thereafter.

In a further alternative arrangement of FIG. 183, the "mark" instruction(s) may first attempt to store tag-indication(s) to the general-purpose write-buffer 1004, and only if the write-buffer 1004 is full (such as no free or available slots), then instead storing the tag-indication to the tag-buffer 1010. Therefore, in this alternative arrangement, the tag-buffer 1010 serves as an "overflow buffer" for buffering of tag-indications when the general-purpose write-buffer is full or unavailable.

A further envisaged alternative in the above described arrangements is to arrange to store the tag-indications to un-cached or non-cached memory regions, such as for example non-cached memory pages or memory pages flagged as not-to-be-cached. The advantage of this alternative arrangement is that the disadvantages and/or undesirable consequences of populating ("polluting") the cache memories of a processor or computer system with stored tag-indications is avoided without requiring an explicit cache-bypass method such as 1011 of FIG. 181. Instead, tag-indications are arranged to be stored to un-cached or non-cachable memory regions, such as memory regions flagged as uncachable, thereby realizing the benefit of not storing tag-indications to cache memory.

Additionally is conceived a preferred further improved arrangement of the present invention of storing tag-indications. Specifically, it is envisaged of preferably storing tag-indications in such a manner so as to be inaccessible by the application program such as by the application program code. FIG. 184 describes this further preferred storage arrangement.

FIG. 184 depicts a single machine M1 of the plurality of machines depicted in FIG. 173. The other machines (M2-M4) have been omitted from this figure for simplicity of illustration, though the depiction of the preferred storage arrangement of FIG. 184 is applicable to all such machines of such a plurality (such as machines M2-M4, and machines M1-Mn of FIG. 172), as well as any other replicated, distributed, or multiple computer system arrangement.

Specifically, indicated in the memory of machine M1 is a non-application memory region 1301, indicated as a dotted square. Such memory is inaccessible to the application program executing on machine M1, in contrast to memory locations A, B and C, and the dotted outline is used in this figure to indicate this and differentiate it from the accessible memory locations A, B and C.

In the preferred arrangement depicted in FIG. 184, the tag-indications are stored in such a non-application memory region, so as to be inaccessible to the application program and application program code.

Various memory arrangements and methods for non-application-accessible memory regions is know in the prior art, such as using virtual memory, pages, and memory management units (MMUs) to create memory spaces or regions inaccessible to specific instructions or code (such as for example application program code). Other arrangements are also known in the prior art, such as through the use of namespaces, software or application domains, virtual machines, and segregated memory heaps, and all such memory partitioning, segregation and/or memory access-control methods and arrangements are to be included within the scope of the present invention.

Such an arrangement is preferable so that the tag-indications stored in the non-application memory region 1301 are not able to be tampered with, edited, manipulated, modified, destroyed, deleted or otherwise interfered with by the application program or application program code in an unauthorized, unintended, unexpected or unsupported manner.

Though only a single non-application memory region is indicated in FIG. 184, more than one non-application memory region may be used, and any such multi-region arrangement is to be considered included within the scope of the present invention.

A further alternative arrangement of the methods of this invention is also anticipated and envisaged where the operations of a special "mark instruction" described above may be incorporated into a single "store-and-mark instruction" or operation, in which a first value is written to one memory location (i.e. the "application value") and a second value is stored to another (preferably associated and corresponding) memory location (i.e. the "tag-indication value"). Such an alternative arrangement is depicted in FIG. 185.

FIG. 185 is an illustrative diagram of the operations and progress of a single thread of execution T1, against the vertical indication of time from top to bottom, such as FIG. 176, FIG. 177, FIG. 178, FIG. 179, and FIG. 180. Specifically, FIG. 185 shows a case of the application program of FIG. 174 which has been modified in accordance with the methods of this invention to utilize a special "store-and-mark instruction" to record or mark written-to replicated memory locations as having been written or modified. The inserted/modified instructions are indicated in bold.

Specifically, the operation of thread T1 executing application program code of FIG. 174 (indicated in "non-bold") and a "store-and-mark instruction" indicated in bold ("putstatic and_mark") is shown. This "putstatic and_mark" instruction combines in a single instruction the operation of the "putstatic #4" and "mark #4" instructions of FIG. 178. Together, this combined "putstatic and_mark" instruction stores the data value "99" placed at the top of the argument stack by the "bipush 99" instruction to memory_location 4, and also stores a tag-indication (such as in any of the above described arrangements) to the associated/corresponding tag memory location of the written-to memory_location 4.

In a preferred embodiment of this "putstatic_and_mark instruction", these two separate store operations (the store of the data value "99" and the store of the tag-indication) take place in parallel by the processor 1001 or execution core 1003, such as for example storing simultaneously or concurrently the data value "99" to the write-buffer 1004 and the tag-indication value to the tag-buffer 1010 of FIG. 181. Other alternative concurrent or simultaneous arrangements will be known to those skilled in the computing arts and familiar with this invention, and are to be included in the scope of this invention.

When such "store-and-mark instructions" exist on a processor or execution core, and the application program code is to be modified (such as with inserted or altered instructions) to effect tagging operations sufficient to operate in a replicated shared memory arrangement, then the insertion of a "store-and-mark instruction" will preferably replace the associated/corresponding original write-to-memory instruction or operation (such as "putstatic #4" of FIG. 174). This is indicated in FIG. 185, in contrast to the arrangement in FIG. 178 where the original "putstatic #4" instruction remains unaltered.

One potential advantage of such a "store-and-mark instruction" is the further efficiency gained by condensing the two separate instructions of FIG. 178 (i.e. "putstatic #4" and "mark #4") into the single instruction "putstatic_and_mark #4" of FIG. 185.

A further example of a "store-and-mark instruction" is shown in FIG. 186. FIG. 186 shows a modified case of FIG. 180 in accordance with the above described method utilizing a single "store-and-mark instruction."

It is further anticipated and envisaged that combined "store-and-mark instruction" such as described above may take multiple forms. For example, rather than a special instruction (to replace the original "store instruction" without an associated tag operation), an alternative arrangement may be conceived utilizing a flag or other indication which is associated with a "write-to-memory instruction" (such as may be stored in an un-utilized bit or argument of a "write-to-memory instruction"), where the flag or other indication signals to the processor when executing the "write-to-memory instruction" whether an associated tag-indication is to be stored also.

Functionally, such an alternative arrangement utilizing existing "write-to-memory instructions" would still behave as for the combined "store-and-mark instruction" arrangement described above. One potential benefit of this alternative arrangement is that explicit new combined "store-and-mark instructions" may not be required, and instead existing instructions and instruction sets may be utilized, the only modification or enhancement being the use of additional flags or arguments to the existing "write-to-memory" instructions or operations, signaling to the processor to store an associated tag-indication when executing the write-instruction or operation.

Other similar arrangements will be able to be conceived by those skilled in the computer arts and familiar with this invention without departing from the scope of this invention. Also, various alternative arrangements utilizing any combination of the above techniques and are to be included within the scope of the present invention.

It is also anticipated and envisaged that a "mark instruction" in accordance with the above described methods may be implemented entirely in silicon, or alternatively implemented in microcode within a CPU, or alternatively implemented in firmware or other low-level CPU code, or alternatively in any other fashion such as may accomplish the above described methods and outcomes.

The use of "putstatic" and "putfield" instructions as examples herein is illustrative only, to aid in the understanding of the methods of this invention. Any comparable instructions or operations in alternative computer architectures and platforms may be substituted for the described putstatic and putfield instructions, and such alternative instructions and operations will be known to those skilled in the computer arts, are to also be included within the scope of the present invention.

Precisely what form the tag memory takes is not material to this invention, so long as any indication stored to a "tag memory" is able to be understood to indicate that the associated memory location(s) have been written. Various anticipated and envisaged "tag memory" arrangements are for example: a tag memory region with a single bit, byte or other memory value being used to store an indication; or a list or buffer or stack of written-to memory addresses or memory identifiers of written-to memory locations. All such various "tag memory" arrangements are to be included within the scope of the present invention.

Combinations of the above described methods are anticipated and envisaged, and to be included within the scope of the present invention.

Further, any of the above described methods, or combinations thereof, are anticipated to be employed and used in the operation of one, some, or all of a plurality of machines operating in a replicated shared memory arrangement such as indicated in FIG. 172 and FIG. 173. For example, one machine in a plurality of 10 machines may implement the methods of this invention as related to storing tag indications to main memory to indicate written-to replicated memory locations, which in due course will have the updated value or data propagated to the other corresponding replicated memory locations on any other machines of the plurality, while all other machines of the plurality do not use or employ the methods of this invention. Alternatively, all machines of the plurality may simultaneously employ the methods of this invention, or further some subset may and some other subset may not. All such arrangements are also to be included within the scope of the present invention.

It will also be apparent to those skilled in the art in light of the description provided herein that the abovementioned modification of the application program code (such as during loading) can be accomplished in many ways or by a variety of means. These ways or means include, but are not limited to at least the following five ways and variations or combinations of these five, including by:

(i) re-compilation at loading,
(ii) by a pre-compilation procedure prior to loading,
(iii) compilation prior to loading,
(iv) a "just-in-time" compilation, or
(v) re-compilation after loading (but, or for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language Analysis or scrutiny of the application code may take place either prior to loading the application program code, or during the application program code loading procedure, or even after the application program code loading procedure. It may be likened to an instrumentation, program transformation, translation, or compilation procedure in that the application code may be instrumented with additional instructions, and/or otherwise modified by meaning-preserving program manipulations, and/or optionally translated from an input code language to a different code language (such as for example from source-code language or intermediate-code language to object-code language or machine-code language), and with the understanding that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary-code languages" which are a form of "pseudo object-code".

In all described instances of modification, where the application code is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Micrsoft.NET platform and architecture (Visual Basic, Visual C/C++, and C#) FORTRAN, C/C++, COBOL, BASIC etc.

The abovementioned arrangement, in which the JAVA code which updates memory locations or field values is modified, is based on the assumption that either the runtime system (say, JAVA HOTSPOT VIRTUAL MACHINE written in C and Java) or the operating system (LINUX written in C and Assembler, for example) of each machine M1 . . . Mn will ordinarily update memory on the local machine (say M2) but not on any corresponding other machines (M1, M3 . . . Mn). It is possible to leave the JAVA code which updates memory locations or field values unamended and instead amend the LINUX or HOTSPOT routine which updates memory locally, so that it correspondingly updates memory on all other machines as well. In order to embrace such an arrangement the term "updating propagation routine" used herein in conjunction with maintaining the memory of all machines M1 . . . Mn essentially the same, is to be understood to include within its scope both the JAVA putfield and putstatic instructions and related operations and the "combination" of the JAVA putfield and putstatic operations and the LINUX or HOTSPOT code fragments which perform memory updating.

In alternative multicomputer arrangements, such as distributed shared memory arrangements and more general distributed computing arrangements, the above described methods of this invention may still be applicable, advantageous, and used. Specifically, any multi-computer arrangement where replica, "replica-like", duplicate, mirror, cached or copied memory locations exist, such as any multiple computer arrangement where memory locations (singular or plural), objects, classes, libraries, packages etc are resident in more than one computer of the multiple computer arrangement and preferably updated to remain consistent, then the methods of this invention apply. For example, distributed computing arrangements of a plurality of machines (such as distributed shared memory arrangements) with cached memory locations resident on two or more machines and optionally updated to remain consistent comprise a functional "replicated memory system", and is to be included within the scope of the present invention. Thus, it is to be understood that the aforementioned methods of this invention apply to such alternative multiple computer arrangements.

It is also anticipated and envisaged that any of the described functions or operations described as being performed by an optional server machine X (or multiple optional server machines) may instead be performed by any one or more than one of the other participating machines of the plurality (such as machines M1, M2, M3 . . . Mn of FIG. 172).

Alternatively or in combination, it is also further anticipated and envisaged that any of the described functions or operations described as being performed by an optional server machine X (or multiple optional server machines) may instead be partially performed by (for example broken up amongst) any one or more of the other participating machines of the plurality, such that the plurality of machines taken together accomplish the described functions or operations described as being performed by an optional machine X. For example, the described functions or operations described as being performed by an optional server machine X may broken up amongst one or more of the participating machines of the plurality.

Further alternatively or in combination, it is also further anticipated and envisaged that any of the described functions or operations described as being performed by an optional server machine X (or multiple optional server machines) may instead be performed or accomplished by a combination of an optional server machine X (or multiple optional server machines) and any one or more of the other participating machines of the plurality (such as machines M1, M2, M3 . . . Mn), such that the plurality of machines and optional server machines taken together accomplish the described functions or operations described as being performed by an optional single machine X. For example, the described functions or operations described as being performed by an optional server machine X may broken up amongst one or more of an optional server machine X and one or more of the participating machines of the plurality.

Various record storage and transmission arrangements may be used when implementing this invention. One such record or data storage and transmission arrangement is to use "tables", or other similar data storage structures. Regardless of the specific record or data storage and transmission arrangements used, what is important is that the replicated written-to memory locations are able to be identified, and their updated values (and identity) are to be transmitted to other machines (preferably machines of which a local replica of the written-to memory locations reside) so as to allow the receiving machines to store the received updated memory values to the corresponding local replica memory locations.

Thus, the methods of this invention are not to be restricted to any of the specific described record or data storage or transmission arrangements, but rather any record or data storage or transmission arrangement which is able to accomplish the methods of this invention may be used.

Specifically with reference to the described example of a "table", the use of a "table" storage or transmission arrangement (and the use of the term "table" generally) is illustrative only and to be understood to include within its scope any comparable or functionally equivalent record or data storage or transmission means or method, such as may be used to implement the methods of this invention.

XXV. Exemplary Embodiment of a Two Computer System and Operation

Having now described aspects of the memory management and replication, attention is now directed to an exemplary operational scenario illustrating the manner in which application programs on two computers may simultaneously execute the same application program in a consistent, coherent manner.

In this regard, attention is directed to FIG. 20 to FIG. 171, two laptop computers 101 and 102 are illustrated. The computers 101 and 102 are not necessarily identical and indeed, one can be an IBM or IBM-clone and the other can be an APPLE computer. The computers 101 and 102 have two screens 105, 115 two keyboards 106, 116 but a single mouse 107. The two machines 101, 102 are interconnected by a means of a single coaxial cable or twisted pair cable 314.

Two simple application programs are downloaded onto each of the machines 101, 102, the programs being modified as they are being loaded as described above. In this embodiment the first application is a simple calculator program and results in the image of a calculator 108 being displayed on the screen 105. The second program is a graphics program which displays four coloured blocks 109 which are of different colours and which move about at random within a rectangular box 310. Again, after loading, the box 310 is displayed on the screen 105. Each application operates independently so that the blocks 109 are in random motion on the screen 105 whilst numerals within the calculator 108 can be selected (with the mouse 107) together with a mathematical operator (such as addition or multiplication) so that the calculator 108 displays the result.

The mouse 107 can be used to "grab" the box 310 and move same to the right across the screen 105 and onto the screen 115 so as to arrive at the situation illustrated in FIG. 21. In this arrangement, the calculator application is being conducted on machine 101 whilst the graphics application resulting in display of box 310 is being conducted on machine 102.

However, as illustrated in FIG. 171, it is possible by means of the mouse 107 to drag the calculator 108 to the right as seen in FIG. 21 so as to have a part of the calculator 108 displayed by each of the screens 105, 115. Similarly, the box 310 can be dragged by means of the mouse 107 to the left as seen in FIG. 21 so that the box 310 is partially displayed by each of the screens 105, 115 as indicated FIG. 171. In this configuration, part of the calculator operation is being performed on machine 101 and part on machine 102 whilst part of the graphics application is being carried out the machine 101 and the remainder is carried out on machine 102.

Further Description

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

An advantage of using a global identifier in the invention described is as a form of 'meta-name' or 'meta-identity' for all the similar equivalent local objects (or classes, or assets or resources or the like) on each one of the plurality of machines M1, . . . , Mn. For example, rather than having to keep track of each unique local name or identity of each similar equivalent local object on each machine of the plurality of similar equivalent objects, one may instead define or use a global name corresponding to the plurality of similar equivalent objects on each machine (e.g., "globalname7787"), and with the understanding that each machine relates the global name to a specific local name or object (e.g., "globalname7787" corresponds to object "localobject456" on machine M1, and "globalname7787" corresponds to object "localobject885" on machine M2, and "globalname7787" corresponds to object "localobject111" on machine M3, and so forth).

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Micrsoft.NET platform and architecture (Visual Basic, Visual C/C++, and C#) FORTRAN, C/C++, COBOL, BASIC etc.

The abovementioned arrangement, in which the JAVA code which updates memory locations or field values is modified, is based on the assumption that either the runtime system (say, JAVA HOTSPOT VIRTUAL MACHINE written in C and Java) or the operating system (LINUX written in C and Assembler, for example) of each machine M1 . . . Mn will ordinarily update memory on the local machine (say M2) but not on any corresponding other machines (M1, M3 . . . Mn). It is possible to leave the JAVA code which updates memory locations or field values unamended and instead amend the LINUX or HOTSPOT routine which updates memory locally, so that it correspondingly updates memory on all other machines as well. In order to embrace such an arrangement the term "updating propagation routine" used herein in conjunction with maintaining the memory of all machines M1 . . . Mn essentially the same, is to be understood to include within its scope both the JAVA putfield and putstatic instructions and related operations and the "combination" of the JAVA putfield and putstatic operations and the LINUX or HOTSPOT code fragments which perform memory updating.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, propagation means, distribution update means, counter means, synchronization means, and the like. In at least one embodiment of the invention, any one or each of these various means may be implemented by computer program code statements or instructions (possibly including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

The invention may therefore includes a computer program product comprising a set of program instructions stored in a storage medium or exiting electronically in any form and operable to permit a plurality of computers to carry out any of the methods, procedures, routines, or the like as described herein including in any of the claims.

Furthermore, the invention may include a plurality of computers interconnected via a communication network or other communications ink or path and each operable to substantially simultaneously or concurrently execute the same or a different portion of an application program code written to operate on only a single computer on a corresponding different one of computers, wherein the computers being programmed to carry out any of the methods, procedures, or routines described in the specification or set forth in any of the claims, or being loaded with a computer program product.

The term "comprising" (and its grammatical variations) as used herein is used in the inclusive sense of "having" or "including" and not in the exclusive sense of "consisting only of".

Copyright Notice

This patent specification contains material which is subject to copyright protection. The copyright owner (which is the applicant) has no objection to the reproduction of this patent specification or related materials from publicly available associated Patent Office files for the purposes of review, but otherwise reserves all copyright whatsoever. In particular, the various instructions are not to be entered into a computer without the specific written approval of the copyright owner.

Additional Incorporation Of Related Applications By Reference

The above description may make direct, indirect, or cross-reference to one or more related patent applications, including to any one or more of the following patent applications as set out in the following four tables and each of which has the same inventor and assignee (or applicant in Australia) as the present invention. The contents of all the specifications or patent applications listed in the following four tables are hereby incorporated into the present specification for all purposes. Furthermore, the contents of all the specifications or patent applications referenced in the present patent application as filed are incorporated into the present specification and patent application for all purposes.

TABLE 1

| Inventor Ref | Attorney Ref | PCT Appl'n | US Appl'n | Title |
|---|---|---|---|---|
| B | 5027B | PCT/AU2005/000582 | 10/830,042 | Modified Computer Architecture |
| C | 5027C | PCT/AU2005/000578 | 11/111,781 | Modified Computer Architecture with Initialization of Objects |
| D | 5027D | PCT/AU2005/000581 | 11/111,778 | Modified Computer Architecture with Finalization of Objects |
| E | 5027E | PCT/AU2005/000579 | 11/111,779 | Modified Computer Architecture with Synchronization of Objects |
| F | 5027F | PCT/AU2005/000580 | 11/111,946 | Modified Computer Architecture with Coordinated Objects |
| G | 5027G | PCT/AU2006/001445 | 60/730,493 | Modified Machine Architecture with Advanced Synchronization |
| H | 5027H | PCT/AU2006/001446 | 60/730,303 | Modified Machine Architecture with Machine Redundancy |
| I | 5027I | PCT/AU2006/001447 | 60/730,543 | Modified Machine Architecture with Partial Memory Updating |
| J | 5027J | PCT/AU2006/001448 | 60/730,408 | Modified Machine Enhanced Memory Clean Up |
| K | 5027K | PCT/AU2006/001449 | 60/730,512 | Failure Resistant Multiple Computer System & Method |
| L | 5027L | PCT/AU2006/001450 | 60/730,354 | Replication of Object Graphs |

TABLE 1-continued

| Inventor Ref | Attorney Ref | PCT Appl'n | US Appl'n | Title |
|---|---|---|---|---|
| M | 5027M | PCT/AU2006/001451 | 60/730,544 | Multiple Machine Architecture with Overhead Reduction |

TABLE 2

| Inventor Ref | Attorney Ref | Australian Prov Appl'n No. | United States Prov Appl'n No. | Title |
|---|---|---|---|---|
| N | 5027N | 2006 905 514 | 60/850,541 | Contention Detection |
| O | 5027O | 2006 905 516 | 60/850,449 | Contention Detection and Resolution |
| P | 5027P | 2006 905 518 | 60/850,717 | Contention Detection with Modified Message Format |
| Q | 5027Q | 2006 905 519 | 60/850,715 | Contention Detection with Data Consolidation |
| R | 5027R | 2006 905 521 | 60/850,540 | Contention Detection with Counter Rollover |
| S | 5027S | 2006 905 522 | 60/850,521 | Contention Resolution with Echo Cancellation |
| T | 5027T | 2006 905 527 | 60/850,711 | Advanced Contention Detection |
| U | 5027U | 2006 905 524 | 60/850,713 | Advanced Synchronization and Contention Resolution |
| V | 5027V | 2006 905 526 | 60/850,508 | Multiple Computer System with Redundancy Architecture |
| W | 5027W | 2006 905 529 | 60/850,532 | Redundant Multiple Computer Architecture |
| X | 5027X | 2006 905 530 | 60/850,533 | Asynchronous Data Transmission |
| Y | 5027Y | 2006 905 534 | 60/850,537 | Hybrid Replicated Shared Memory |
| Z | 5027Z | 2006 905 533 | 60/850,531 | Multiple Communication Networks for Multiple Computers |
| AA | 5027AA | 2006 905 539 | 60/850,528 | Multiple Network Connections for Multiple Computers |
| AB | 5027AB | 2006 905 538 | 60/850,534 | Asynchronous Data Transmission |
| AR | 5027AR | 2006 905 535 | 60/850,450 | Synchronization with Partial Memory Replication |
| BJ | 5027BJ | 2006 905 525 | 60/850,500 | Silent Memory Reclamation |
| BK | 5027BK | 2006 905 528 | 60/850,503 | Job Scheduling Amongst Multiple Computers |
| CQ | 5027CQ | 2006 905 531 | 60/850,501 | Adding One or More Computers to a Multiple Computer System |
| CR | 5027CR | 2006 905 532 | 60/850,502 | CPU Hardware for Multiple Computer Systems |
| CT | 5027CT | 2006 905 507 | 60/850,507 | Multiple Computer System with Dual Mode Redundancy Architecture |
| CU | 5027CU | 2006 905 523 | 60/850,504 | Cyclic Redundant Multiple Computer Architecture |
| CV | 5027CV | 2006 905 520 | 60/850,510 | Multi-Path Switching Networks |
| CY | 5027CY | 2006 905 504 | 60/850,505 | Network Protocol for Network Communications |
| CZ | 5027CZ | 2006 905 505 | 60/850,509 | Redundant CPU Hardware and Method |
| DA | 5027DA | 2006 905 503 | 60/850,519 | Switch Protocol for Network Communications |

TABLE 3

Co-pending Australian and US Provisional Patent Applications

| Inventor Ref | Attorney Ref: | Title |
|---|---|---|
| AC | 5027AC | Cached Loop Batching |
| AD | 5027AD | Linear Batching |
| AE | 5027AE | Consecutive Linear Batching |

TABLE 3-continued

Co-pending Australian and US Provisional Patent Applications

| Inventor Ref | Attorney Ref: | Title |
|---|---|---|
| AF | 5027AF | Static Linear Loop Batching |
| AG | 5027AG | Dynamic Linear Loop Batching |
| AH | 5027AH | Infinite Loop Batching |
| AI | 5027AI | Non-Contiguous Loop Batching |
| AJ | 5027AJ | Dynamic Linear Loop Batching with Loop Counting |
| ALA | 5027ALA | Anti-Tagging for Local Variables |
| ALB | 5027ALB | Exit Profiling for Instruction Sequences |
| AM | 5027AM | Anti-Tagging with Shared Declaration |
| ANA | 5027ANA | Anti-Tagging Profiling Method Parameters |
| ANB | 5027ANB | Anti-Tagging Profiling Method Return Values |
| AP | 5027AP | Anti-Tagging with Double Method Compilation |
| AV | 5027AV | Two Stage Tagging Compilation Based on Usage Statistics |
| AX | 5027AX | Multi-Reference Loop Batching |
| BS | 5027BS | Exception Handling for Tagging |
| BT | 5027BT | Advanced Exception Handling for Tagging |
| BU | 5027BU | Exception Handling for Synchronization |
| CA | 5027CA | Withholding Assignment of Object Initialization |
| CXA | 5027CXA | Hot Spare Computer for a Multiple Computer System with Mirroring |
| CXB | 5027CXB | Hot Spare Computer for a Multiple Computer System with Parity |
| CXC | 5027CXC | Hot Spare Computer for a Multiple Computer System with Mirroring and Parity |
| DB | 5027DB | Non-Consecutive Linear Batching |

TABLE 4

Co-pending Australian and US Provisional Specifications

| Inventor Ref | Attorney Ref | Title |
|---|---|---|
| AQ | 5027AQ | Fragmentation of Atomic Memory Units |
| AS | 5027AS | Per-Processor Queues |
| AT | 5027AT | Tagging for SIMD Instructions |
| AU | 5027AU | MMU Implemented Tagging |
| AY | 5027AY | Static Compilation with Binary Markup |
| BA | 5027BA | Fragmentation with Hot Swapped Memory |
| BB | 5027BB | Queue Throttling |
| BC | 5027BC | Abstract Reachability |
| BD | 5027BD | Non-Distribution of System Library |
| BE | 5027BE | Non-Distribution of Data Structures |
| BF | 5027BF | Non-Distribution of Input/Output Structures |
| BG | 5027BG | Non-Distribution of Network Interfaces & Structures |
| BH | 5027BH | Non-Distribution of Introspection & Reflection |
| BI | 5027BI | Non-Distribution of Garbage Collection Reference Handles |
| BL | 5027BL | DRT/SAN Interface with State Reloading |
| BM | 5027BM | Behaviour Recognition in Application Instructions |
| BN | 5027BN | Behaviour Recognition with Barrier only Profiling |
| BO | 5027BO | Gang Scheduling Profiling |
| BP | 5027BP | Wait as Last Instruction Profiling |
| BQ | 5027BQ | Wait as Not Last Instruction Profiling |
| BR | 5027BR | Virtual Atomics Profiling |
| BU | 5027BU | Exception Handling for Advanced Synchronization |
| BV | 5027BV | Characterization of Method Routines |
| BW | 5027BW | Per-Processor Tags |
| BX | 5027BX | Static Compilation with Re-Compiler |
| BY | 5027BY | Local Lock Acquisition & Release |
| BZ | 5027BZ | Sub-Set Lock Acquisition & Release |
| CB | 5027CB | Thread Migration |
| CC | 5027CC | Ignoring Writes to Unshared Objects |
| CD | 5027CD | Two Stage Locking |
| CE | 5027CE | Unidirectional Replication with Mirroring |
| CF | 5027CF | Unidirectional Parity |
| CG | 5027CG | Exception Based Execution Redundancy with Mirroring |
| CH | 5027CH | Exception Based Execution Redundancy with Parity |
| CI | 5027CI | Profile Based Execution Redundancy with Mirroring |
| CJ | 5027CJ | Profile Based Execution Redundancy with Parity |
| CK | 5027CK | Full Execution Redundancy with Mirroring |
| CL | 5027CL | Full Execution Redundancy with Parity |
| CM | 5027CM | Object Reconstruction with Parity |

TABLE 4-continued

Co-pending Australian and US Provisional Specifications

| Inventor Ref | Attorney Ref | Title |
|---|---|---|
| CN | 5027CN | Thread Reconstruction with Parity |
| CO | 5027CO | Thread Shadowing with Mirroring |
| CP | 5027CP | Contention Implemented Coherency |
| CS | 5027CS | Modified Central Processor Unit |
| CW | 5027CW | Redundancy Execution Architecture |

I claim:

1. A method for striping computer program code across a plurality of computing machines in a multiple computer system including the plurality of computing machines, each computing machine having a processor and each processor having an associated local memory that is only accessible by an associated processor from among the plurality of processors, the method comprising:
   replicating at least a portion of stored memory data contents from each local memory into the local memory of each of the plurality of computing machines;
   interconnecting the plurality of computing machines by a communications network;
   updating, via said communications network, a replicated memory content value in each other of the plurality of local memory every time a replicated local memory location is written to in any one or the local memory of the plurality of computing machines so that replicated memory locations remain substantially consistent between all of the computing machines, the updating including transmitting, via said communications network, the updated content value from the computing machine that performed the content value update to other ones of the plurality of computing machines and receiving of the updated content value by the other ones of the plurality of computing machines;
   satisfying all computing machine memory access requirements from the processor, including read access and write access, substantially exclusively by access to the associated local memory for memory content that is part of the replicated memory, and preventing access to memory that is resident in a different one of the plurality of computing machines; and
   replicating at least a portion of an executable code of an application program, the executable code of the application program being different from the replicated memory data contents that result from the execution of the application program code, on each of the plurality of computing machines, where replication is configured for variations of the executable code so that different computing machine operational requirements may be realized, and permits but does not require an exact copy of the executable code on each of the plurality of computing machines.

2. A method as in claim 1, wherein the code-striping comprises an arrangement of in-memory computer program executable code replicated on the plurality of computing machines.

3. A method as in claim 1, wherein the code-striping further comprises procedures for updating and manipulating the in-memory data.

4. A method as in claim 1, wherein the code-striping comprises an arrangement of in-memory computer program executable code replicated on the plurality of computing machines, and procedures for updating and manipulating the in-memory data.

5. A method as in claim 1, the method further comprising: a contention controller that allows the plurality of computing machines to update corresponding replicated memory locations concurrently and resolve any conflicts or inconsistencies arising with such updating.

6. A method as in claim 5, wherein the contention controller comprises at least one of:
   a contention detector,
   a contention detector and contention resolver,
   a contention detector with messenger and a modified message format,
   a contention detector with data consolidation, and
   a contention resolver with echo cancellation, and any combination of two or more of these.

7. A method as in claim 1, further comprising synchronizing updating of replicated memory locations between and among the plurality of computing machines.

* * * * *